US012797958B2

(12) United States Patent
Ravindra et al.

(10) Patent No.: US 12,797,958 B2
(45) Date of Patent: Nov. 17, 2026

(54) OPTOMECHANICAL TOOLING

(71) Applicant: Micro-LAM, Inc., Portage, MI (US)

(72) Inventors: Deepak VM Ravindra, Kalamazoo, MI (US); Hossein Shahinian, Kalamazoo, MI (US)

(73) Assignee: Micro-LAM, Inc., Portage, MI (US)

( * ) Notice: Subject to any disclaimer, the term of this patent is extended or adjusted under 35 U.S.C. 154(b) by 724 days.

(21) Appl. No.: 16/912,557

(22) Filed: Jun. 25, 2020

(65) Prior Publication Data

US 2020/0406363 A1 Dec. 31, 2020

Related U.S. Application Data

(60) Provisional application No. 62/868,430, filed on Jun. 28, 2019.

(51) Int. Cl.
*B23B 27/14* (2006.01)
*B23B 27/00* (2006.01)
(Continued)

(52) U.S. Cl.
CPC ........ *B23B 27/145* (2013.01); *B23K 26/0093* (2013.01); *B23K 26/0652* (2013.01);
(Continued)

(58) Field of Classification Search
CPC ....... B23B 27/145; B23B 27/00; B23B 27/20; B23K 26/0093; B23K 26/0652;
(Continued)

(56) References Cited

U.S. PATENT DOCUMENTS 4,126,136 A * 11/1978 Auth ...................... B23K 26/06 606/17
5,859,405 A 1/1999 Golz et al.
(Continued)

FOREIGN PATENT DOCUMENTS

CN 101246365 A * 8/2008
CN 108345267 A 7/2018
(Continued)

OTHER PUBLICATIONS

Machine English Translation of CN-101246365-A (Year: 2008).*
(Continued)

*Primary Examiner* — Erwin J Wunderlich
(74) *Attorney, Agent, or Firm* — Honigman LLP; Brett A. Krueger

(57) ABSTRACT

Optomechanical tools, systems, and methods are disclosed. An exemplary optomechanical tool includes a body of material having an entrance face, a rake face, a flank face, a rake side face, and a flank side face. The rake face is connected to the flank face to define a curved cutting edge. The entrance face extends away from the flank side face to define a back-relief angle. The rake face extends away from the rake side face to define a rake angle. The entrance face is configured to direct a light beam toward one or more of the rake face, the flank face, the rake side face, the flank side face, and the curved cutting edge and through one or more of the rake face, the flank face, and the curved cutting edge, causing the light beam to refract onto the workpiece.

47 Claims, 100 Drawing Sheets

(51) Int. Cl.

| | |
|---|---|
| ***B23B 27/20*** | (2006.01) |
| ***B23K 26/00*** | (2014.01) |
| ***B23K 26/064*** | (2014.01) |
| ***B23P 25/00*** | (2006.01) |
| ***B26D 7/08*** | (2006.01) |
| ***B28D 1/22*** | (2006.01) |
| ***B28D 5/04*** | (2006.01) |
| ***G02B 5/18*** | (2006.01) |
| ***G02B 7/04*** | (2021.01) |
| ***G02B 7/18*** | (2021.01) |
| ***G02B 17/08*** | (2006.01) |

(52) U.S. Cl.

CPC ................ *B23P 25/00* (2013.01); *B26D 7/08* (2013.01); *B28D 1/22* (2013.01); *B28D 5/04* (2013.01); *G02B 5/1866* (2013.01); *G02B 7/04* (2013.01); *G02B 7/1805* (2013.01); *G02B 17/086* (2013.01); *B23B 27/00* (2013.01); *B23B 27/20* (2013.01); *B23P 25/006* (2013.01)

(58) Field of Classification Search

CPC ...... G02B 5/1866; G02B 7/04; G02B 7/1805; G02B 17/086; B23P 25/006; B23P 25/00; B26D 7/08; B28D 1/22; B28D 5/04

USPC ...................................................... 219/121.69

See application file for complete search history.

(56) References Cited

U.S. PATENT DOCUMENTS

| | | | | |
|---|---|---|---|---|
| 6,294,757 | B1 * | 9/2001 | Whittenbury | B23K 26/0624 219/121.72 |
| 6,429,982 | B2 * | 8/2002 | Bolt | G02B 26/0883 359/837 |
| 6,673,065 | B1 * | 1/2004 | Veligdan | A61B 18/20 606/17 |
| 7,556,456 | B2 * | 7/2009 | Yoshinaga | B23B 27/20 407/118 |
| 8,656,815 | B2 * | 2/2014 | Morimoto | B23B 1/00 82/1.11 |
| 8,839,497 | B2 * | 9/2014 | Shin | B23B 27/10 219/121.72 |
| 8,933,366 | B2 * | 1/2015 | Patten | H05K 3/0029 219/121.66 |
| 9,295,518 | B2 * | 3/2016 | Verhagen | B26B 21/56 |
| 9,707,629 | B2 * | 7/2017 | Yano | B23K 26/355 |
| 10,065,267 | B2 * | 9/2018 | Frank | B23P 23/04 |
| 10,449,644 | B2 * | 10/2019 | Ravindra | B23B 1/00 |
| 11,813,678 | B2 * | 11/2023 | Saitoh | B23C 5/202 |
| 11,878,353 | B2 * | 1/2024 | Kubo | B23C 5/1009 |
| 2006/0120816 | A1 * | 6/2006 | Morimoto | B23P 15/24 82/1.11 |
| 2007/0062920 | A1 * | 3/2007 | Shin | B23P 25/006 219/121.72 |
| 2008/0273253 | A1 * | 11/2008 | Kimura | B23B 1/00 359/742 |
| 2010/0286672 | A1 * | 11/2010 | Walker | A61B 17/3211 606/3 |
| 2012/0223061 | A1 * | 9/2012 | Atsumi | B23K 26/53 219/121.72 |
| 2015/0217418 | A1 * | 8/2015 | Yamashida | B23B 27/20 407/115 |
| 2017/0120345 | A1 * | 5/2017 | Patten | B23K 26/0823 |
| 2018/0015578 | A1 * | 1/2018 | Ravindra | B23B 1/00 |
| 2019/0258067 | A1 * | 8/2019 | Suhara | B23K 26/0648 |

FOREIGN PATENT DOCUMENTS

| | | | | | |
|---|---|---|---|---|---|
| CN | 108463309 | A | | 8/2018 | |
| CN | 108818983 | A | | 11/2018 | |
| CN | 111347571 | A | * | 6/2020 | B28D 7/04 |
| CN | 112743297 | A | * | 5/2021 | B23Q 11/00 |
| JP | 2007030055 | A | * | 2/2007 | |
| JP | 4878517 | B2 | * | 2/2012 | |
| WO | 2006068031 | A1 | | 6/2006 | |
| WO | 2007040528 | A1 | | 4/2007 | |
| WO | WO-2014115985 | A1 | * | 7/2014 | B23K 26/0648 |
| WO | 2018017584 | A1 | | 1/2018 | |

OTHER PUBLICATIONS

Machine English Translation of JP-2007030055-A (Year: 2007).*

Machine English Translation of WO-2014115985-A1 (Year: 2014).*

Machine English translation of JP-4878517-B2 (Year: 2012).*

Machine English translation of CN-111347571-A (Year: 2020).*

Machine English translation of CN-112743297-A (Year: 2021).*

International Search Report and Written Opinion for the related Application PCT/US2020/039698, Dated Oct. 21, 2020.

China National Intellectual Property Administration ("CNIPA") Office Action for the related Application No. 202080053527.4, issued Jun. 9, 2023, 14 pages.

Office Action issued in related Korean Patent Application No. 10-2022-7003031, dated Nov. 27, 2024.

* cited by examiner

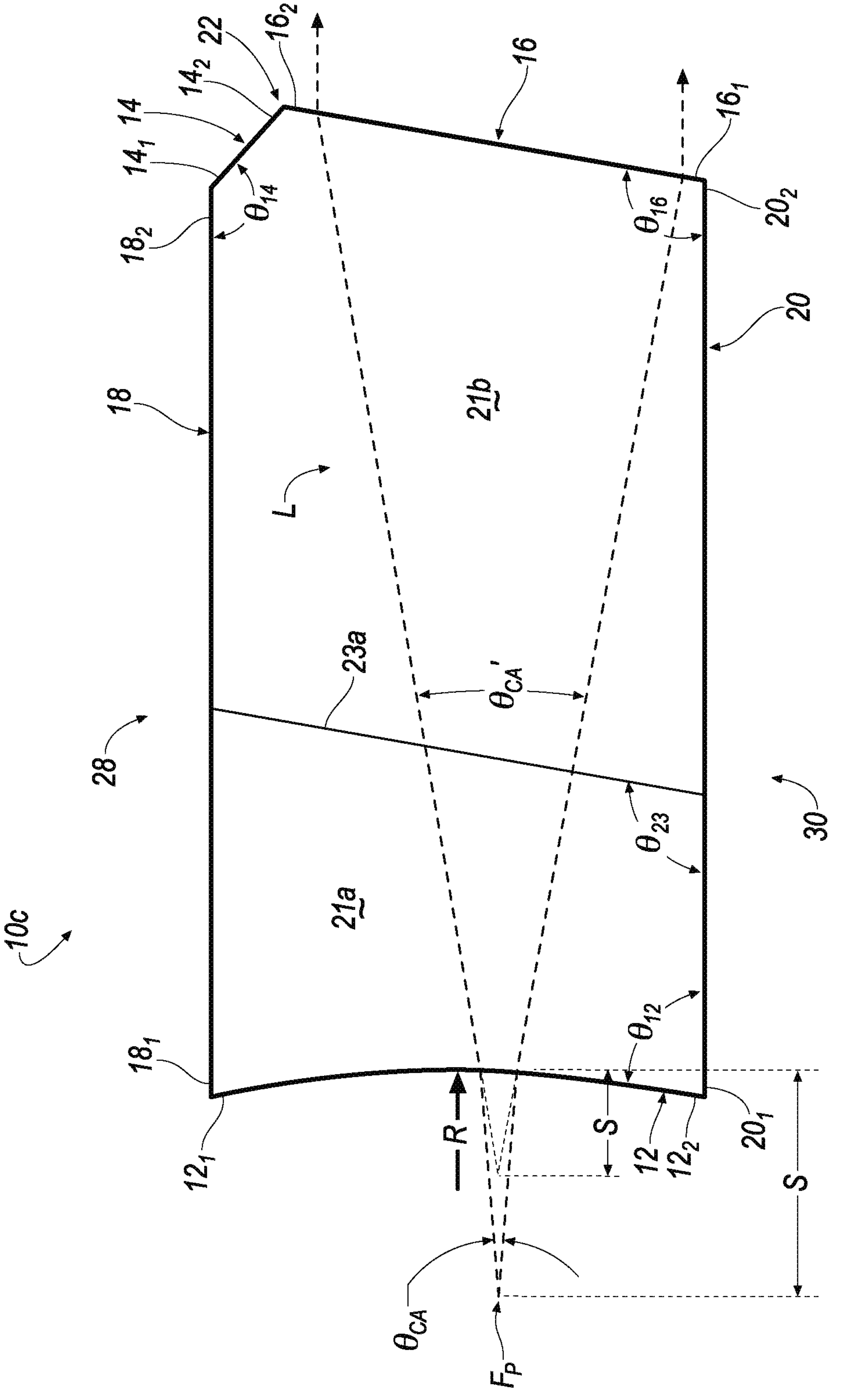
FIG. $5D_D$

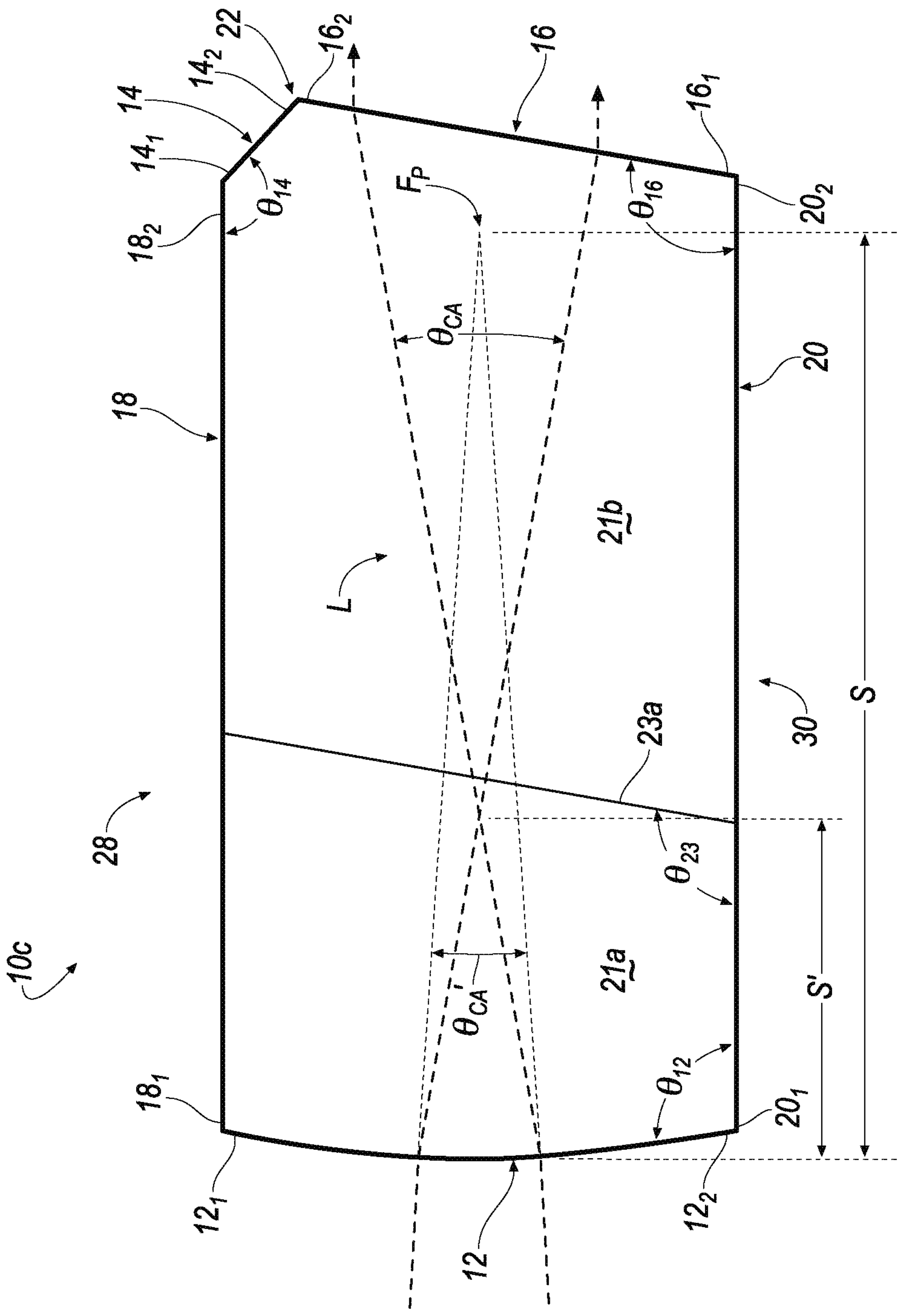
FIG. $5E_C$

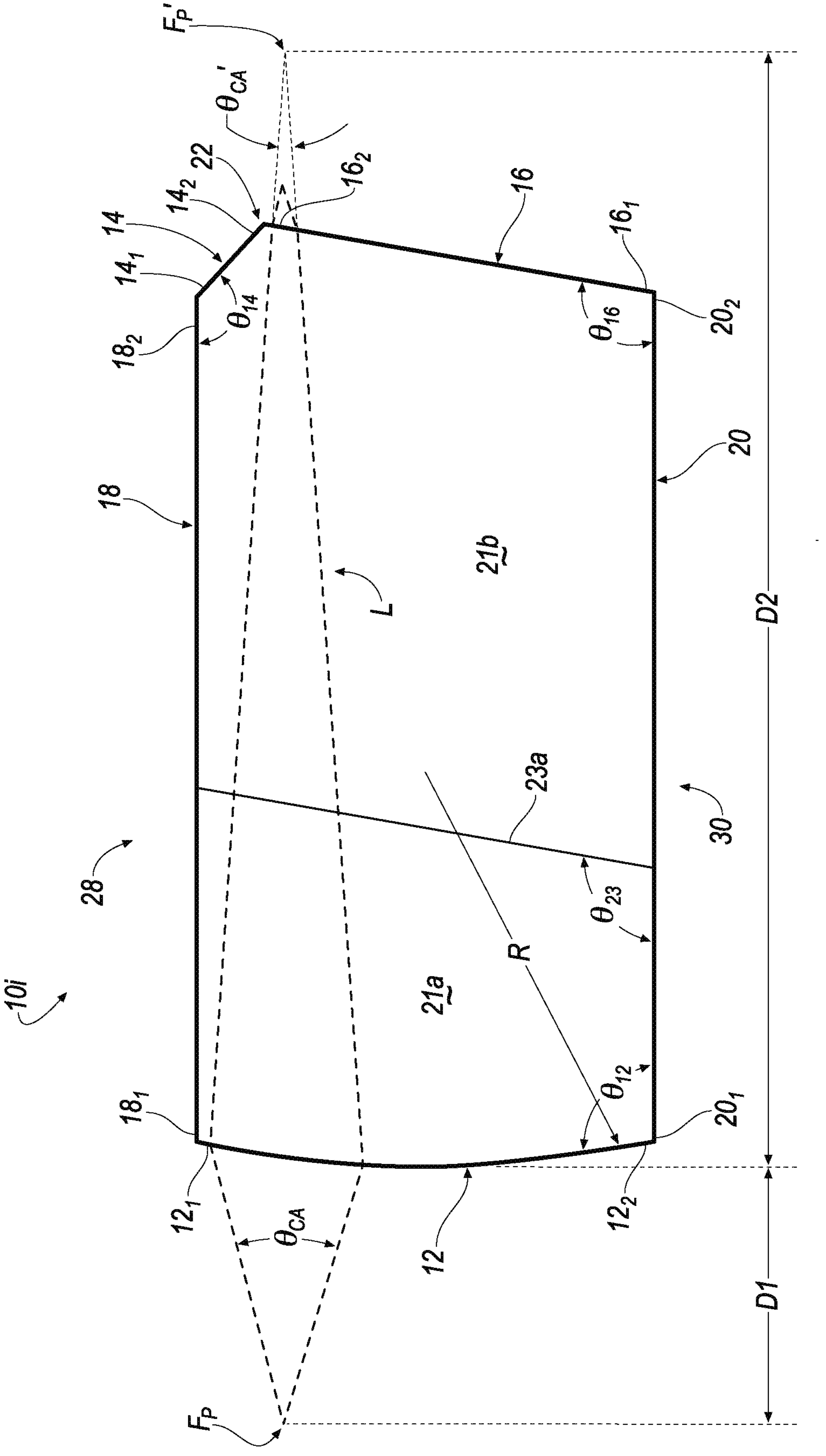
FIG. $5E_D$

OPTOMECHANICAL TOOLING

CROSS REFERENCE TO RELATED APPLICATIONS

This U.S. patent claims priority under 35 U.S.C. § 119(e) to U.S. Provisional Application 62/868,430, filed on Jun. 28, 2019, which is hereby incorporated by reference in its entirety.

TECHNICAL FIELD

This disclosure relates to optomechanical tooling, systems including optomechanical tooling and methodologies for utilizing systems including optomechanical tooling.

BACKGROUND

This section provides background information related to the present disclosure which is not necessarily prior art.

Light-assisted (e.g., laser-assisted) machining tools are known. While existing light-assisted machining tools perform adequately for their intended purpose, improvements to light-assisted machining tools are continuously being sought in order to advance the art.

DESCRIPTION OF DRAWINGS

FIG. 1B' is a perspective view of the optomechanical tool of FIG. 1B.

FIG. 1C' is a perspective view of the optomechanical tool of FIG. 1C.

FIG. 1D' is a perspective view of the optomechanical tool of FIG. 1D.

FIG. 1E' is a perspective view of the optomechanical tool of FIG. 1E.

FIG. 1F' is a perspective view of the optomechanical tool of FIG. 1F.

FIG. 1G' is a perspective view of the optomechanical tool of FIG. 1G.

FIG. 3B' is a perspective view of the optomechanical tool of FIG. 3B.

FIG. 3C' is a perspective view of the optomechanical tool of FIG. 3C.

FIG. 3D' is a perspective view of the optomechanical tool of FIG. 3D.

FIG. 3E' is a perspective view of the optomechanical tool of FIG. 3E.

FIG. 3F' is a perspective view of the optomechanical tool of FIG. 3F.

FIG. 3G' is a perspective view of the optomechanical tool of FIG. 3G.

FIG. 5B' is a perspective view of the optomechanical tool of FIG. 5B.

FIG. 5C' is a perspective view of the optomechanical tool of FIG. 5C.

FIG. 5D' is a perspective view of the optomechanical tool of FIG. 5D.

FIG. $5D_C$ is a side view of an exemplary optomechanical tool that receives a converging light beam at an inwardly-projecting laterally cylindrical light beam entrance face arranged at a perpendicular or right back-relief angle.

FIG. $5D_D$ is a side view of an exemplary optomechanical tool that receives a diverging light beam at an inwardly-projecting laterally cylindrical light beam entrance face arranged at a perpendicular or right back-relief angle.

Figure 5A:
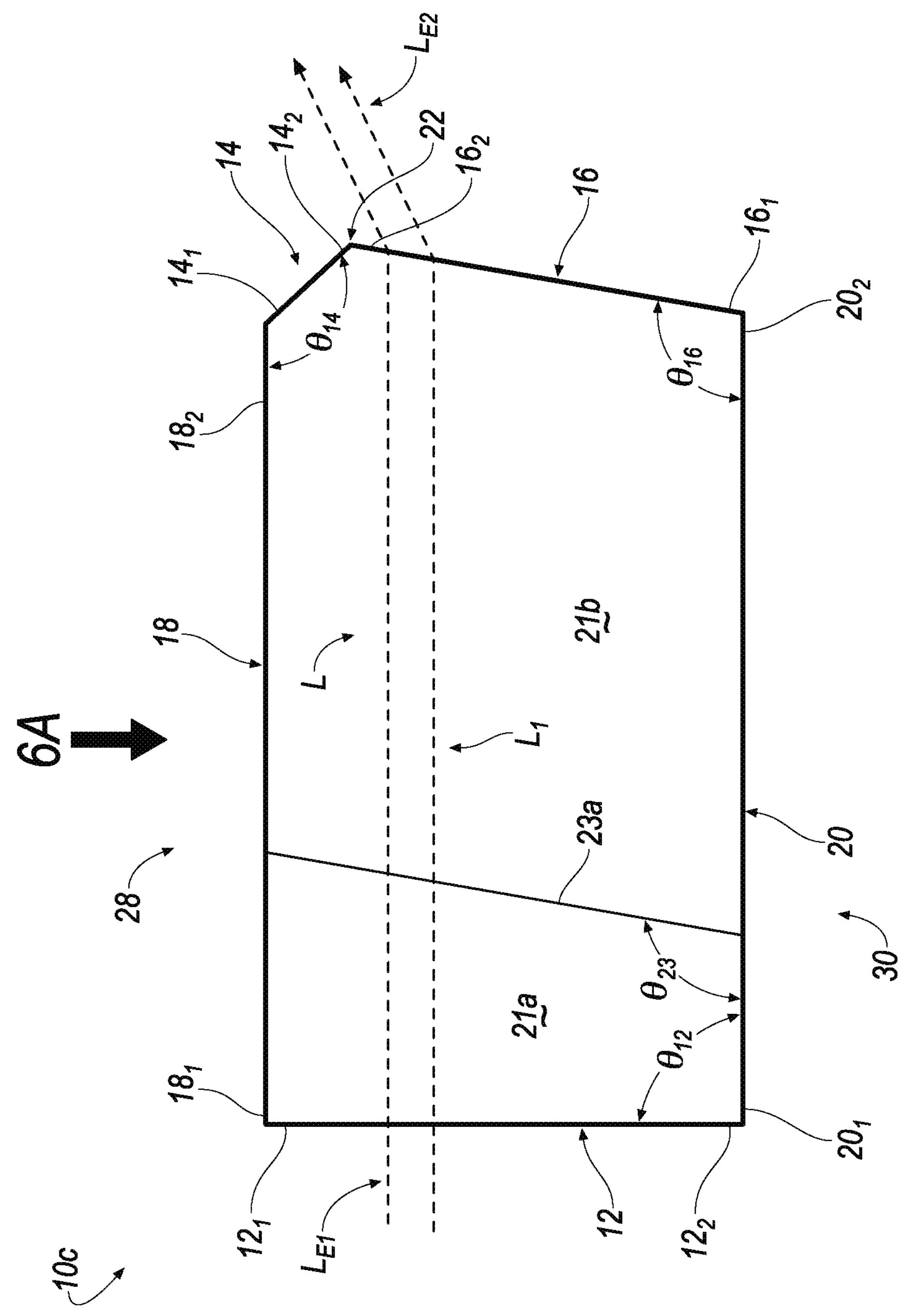
FIG. 5A is a side view of an exemplary optomechanical tool that receives a collimated light beam at a substantially linear, flat or planar light beam entrance face arranged at a perpendicular or right back-relief angle.
Figure 5B:
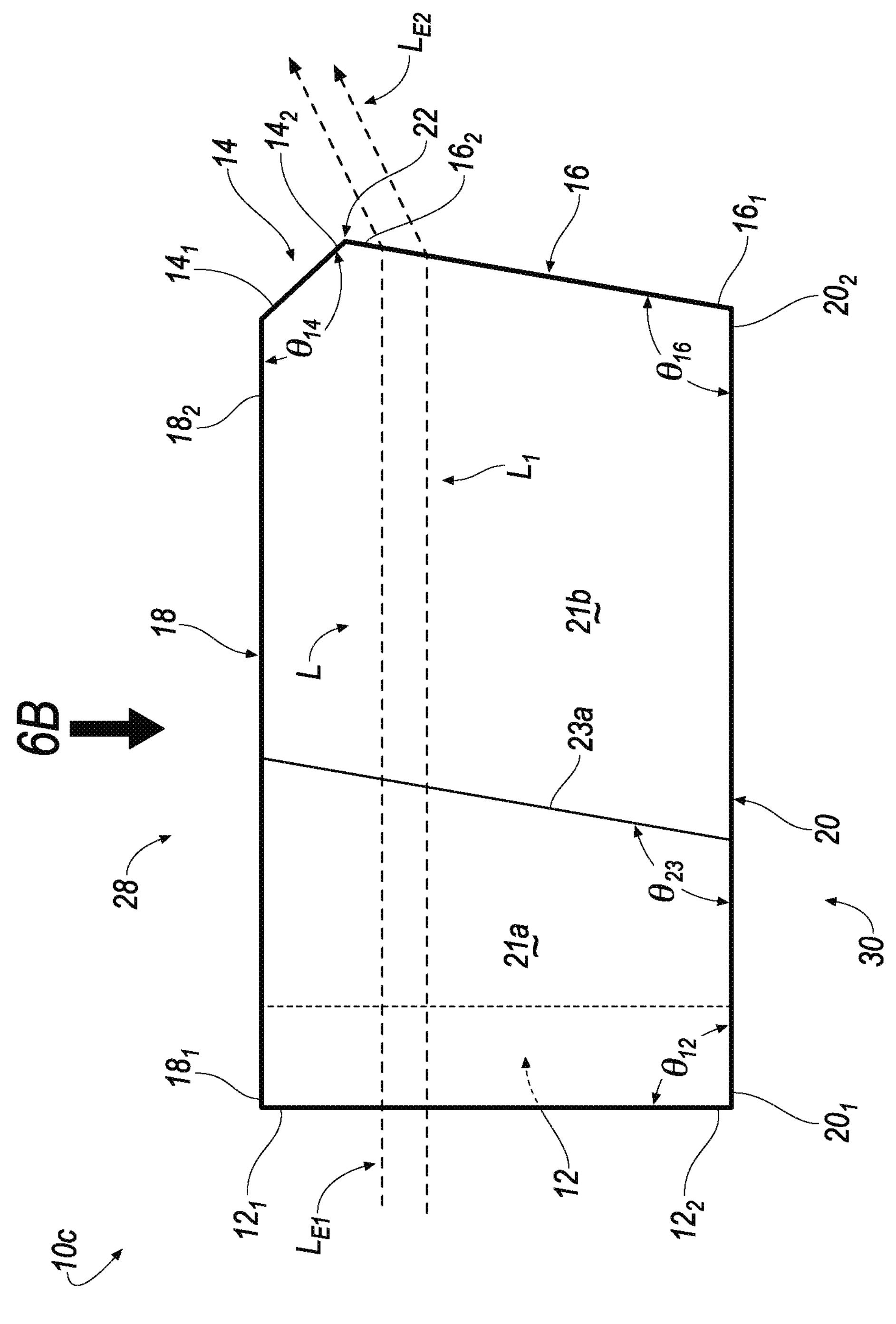
FIG. 5B is a side view of an exemplary optomechanical tool that receives a collimated light beam at an inwardly-projecting axially cylindrical light beam entrance face arranged at a perpendicular or right back-relief angle.
Figure 5B:
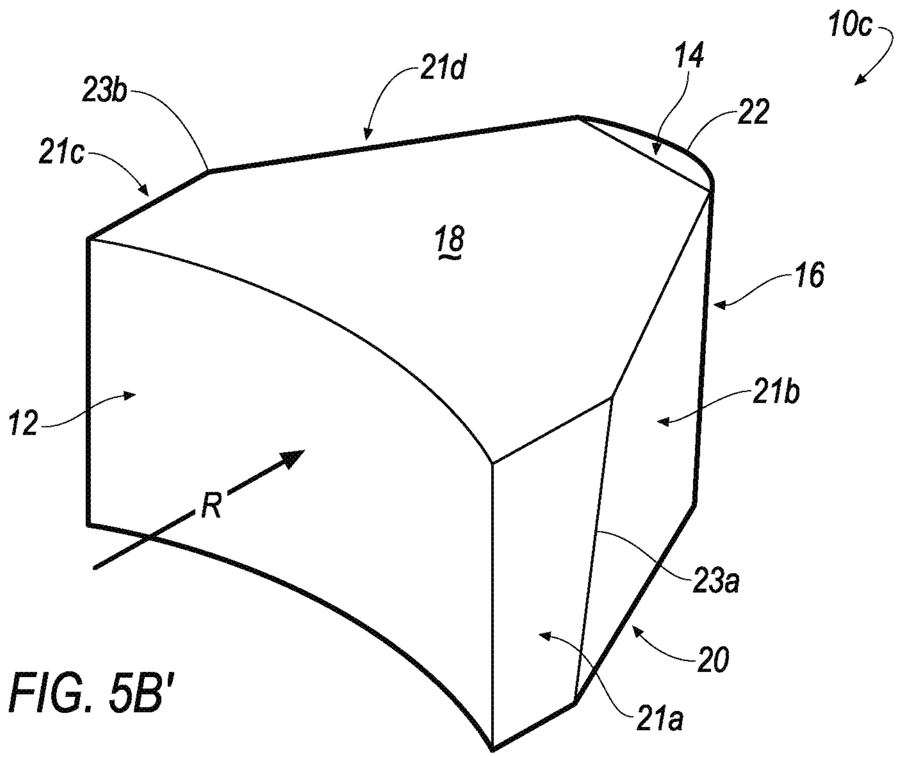
Figure 5C:
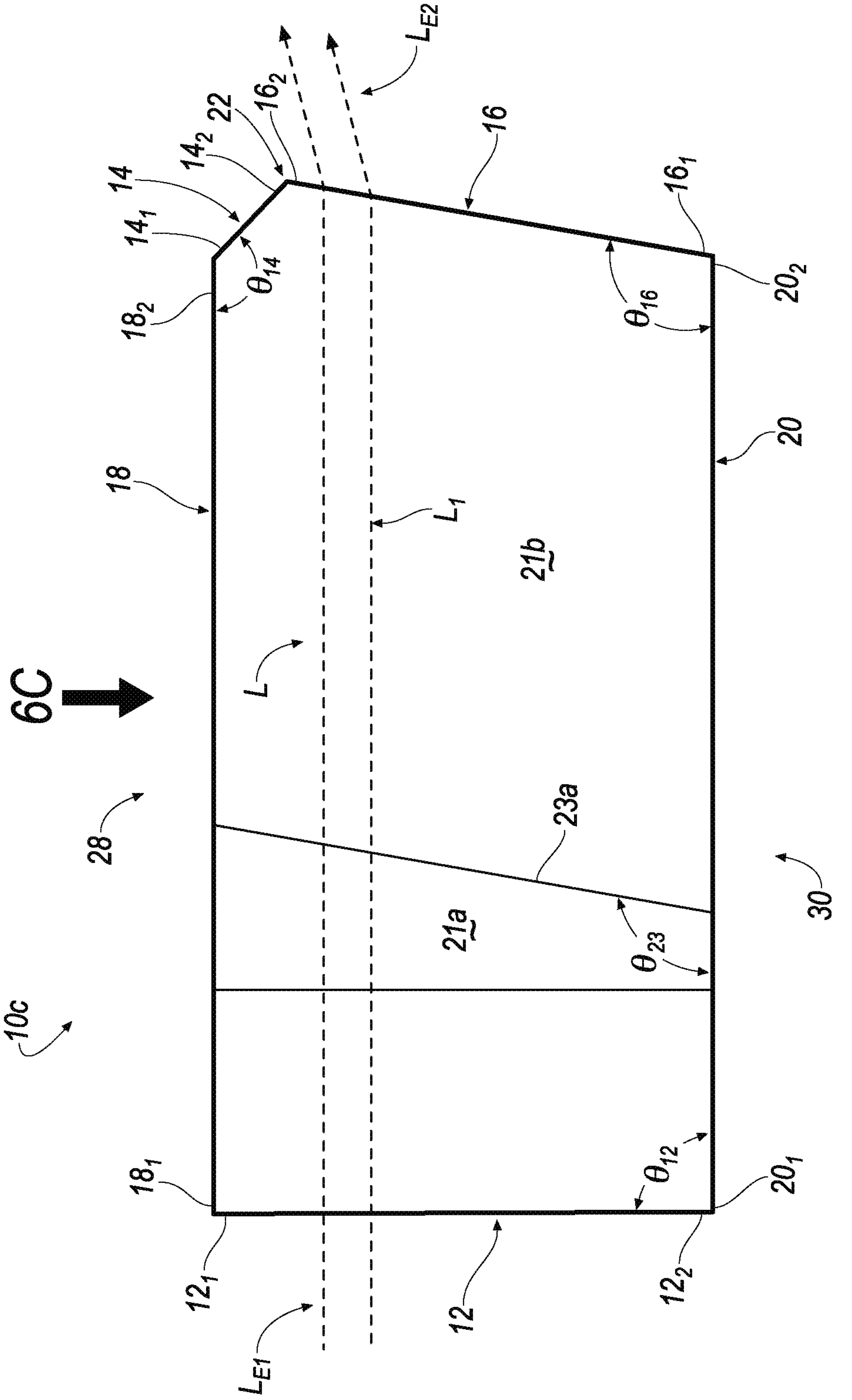
FIG. 5C is a side view of an exemplary optomechanical tool that receives a collimated light beam at an outwardly-projecting axially cylindrical light beam entrance face arranged at a perpendicular or right back-relief angle.
Figure 5C:
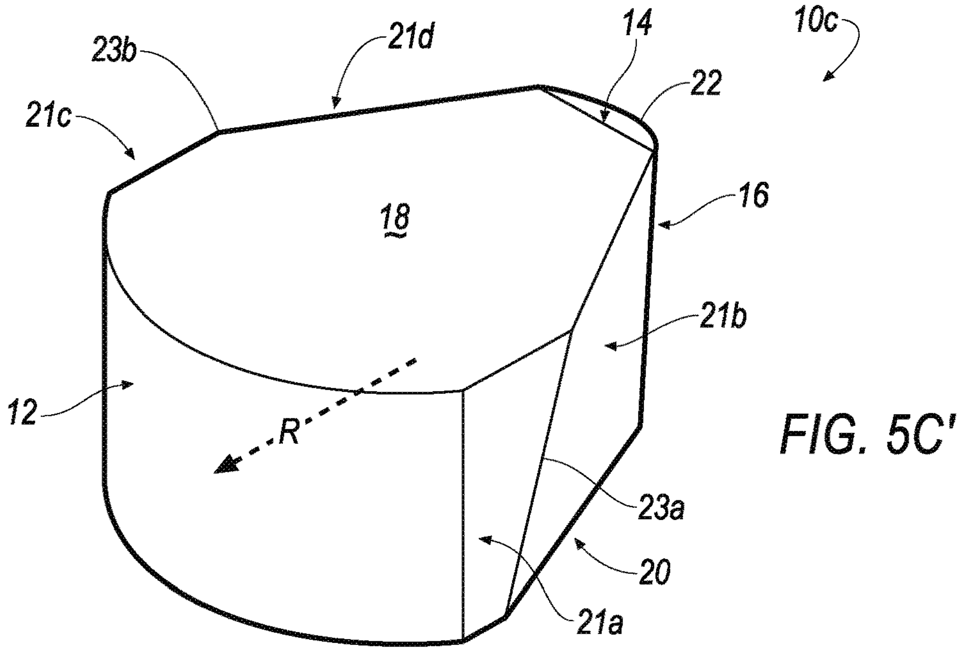
Figure 5D:
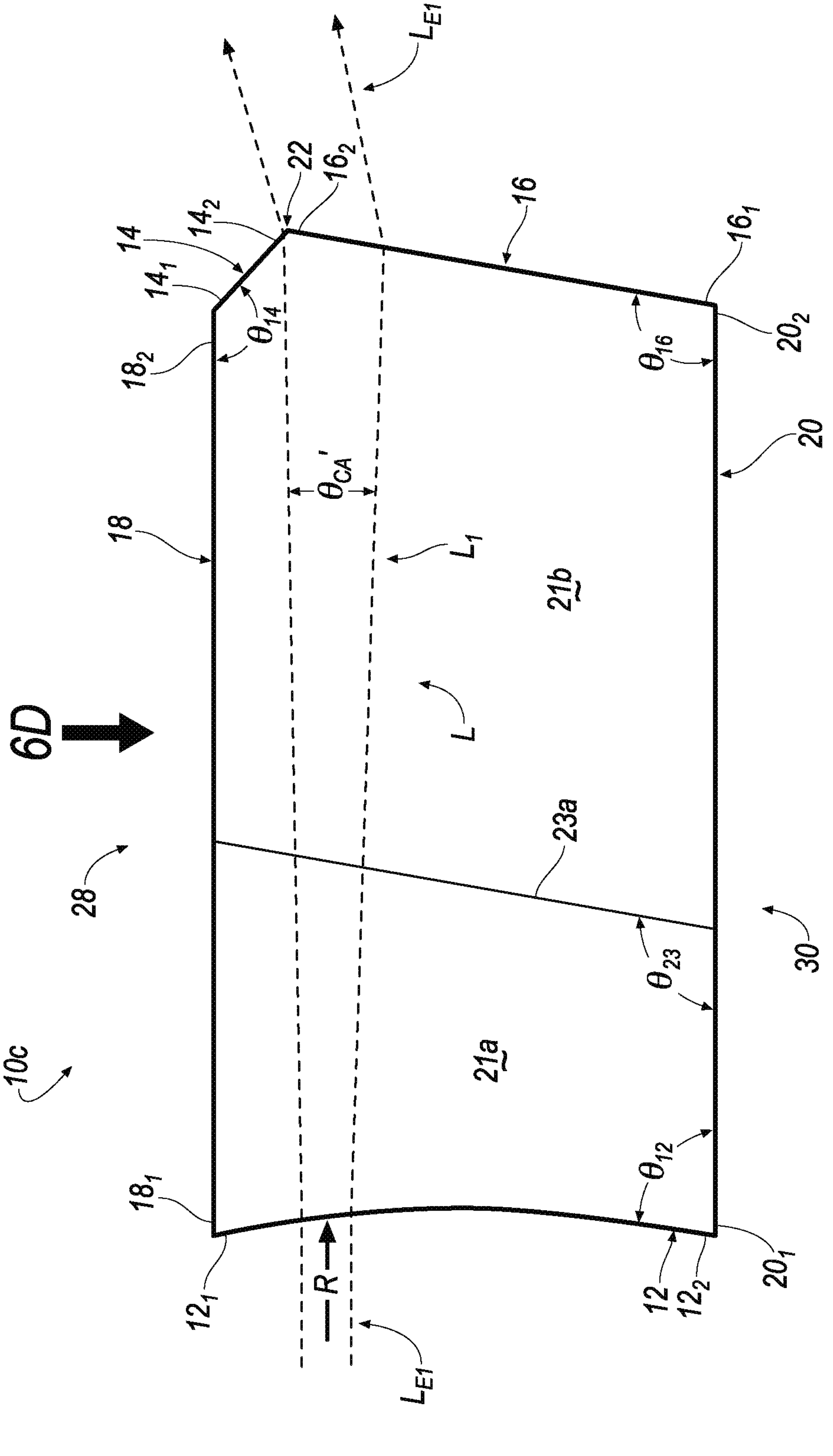
FIG. 5D is a side view of an exemplary optomechanical tool that receives a collimated light beam at an inwardly-projecting laterally cylindrical light beam entrance face arranged at a perpendicular or right back-relief angle.
Figure 5D:
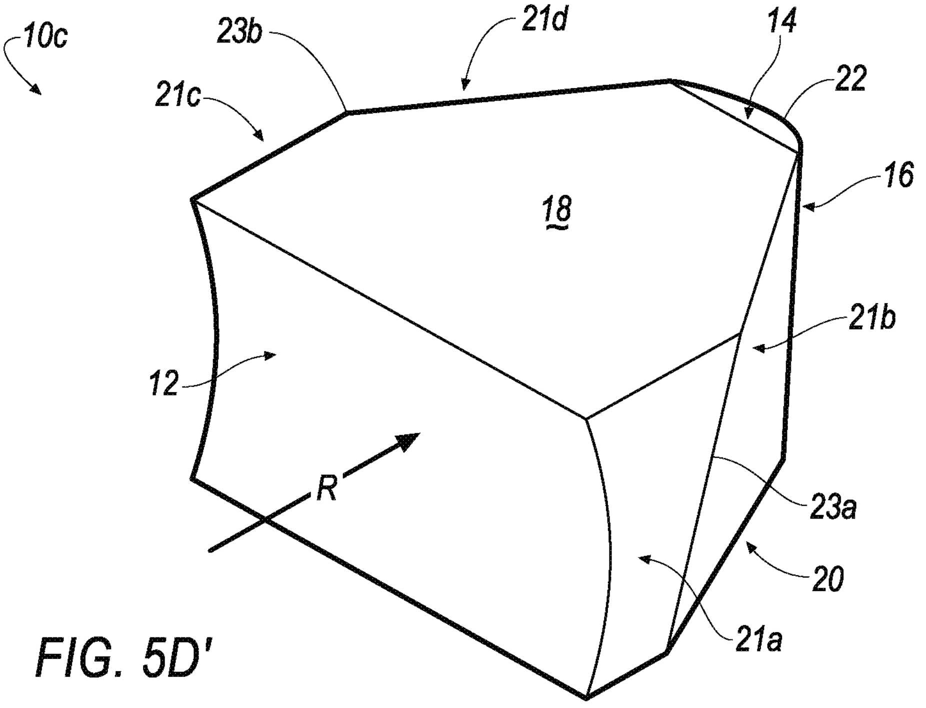
Figure 5D:
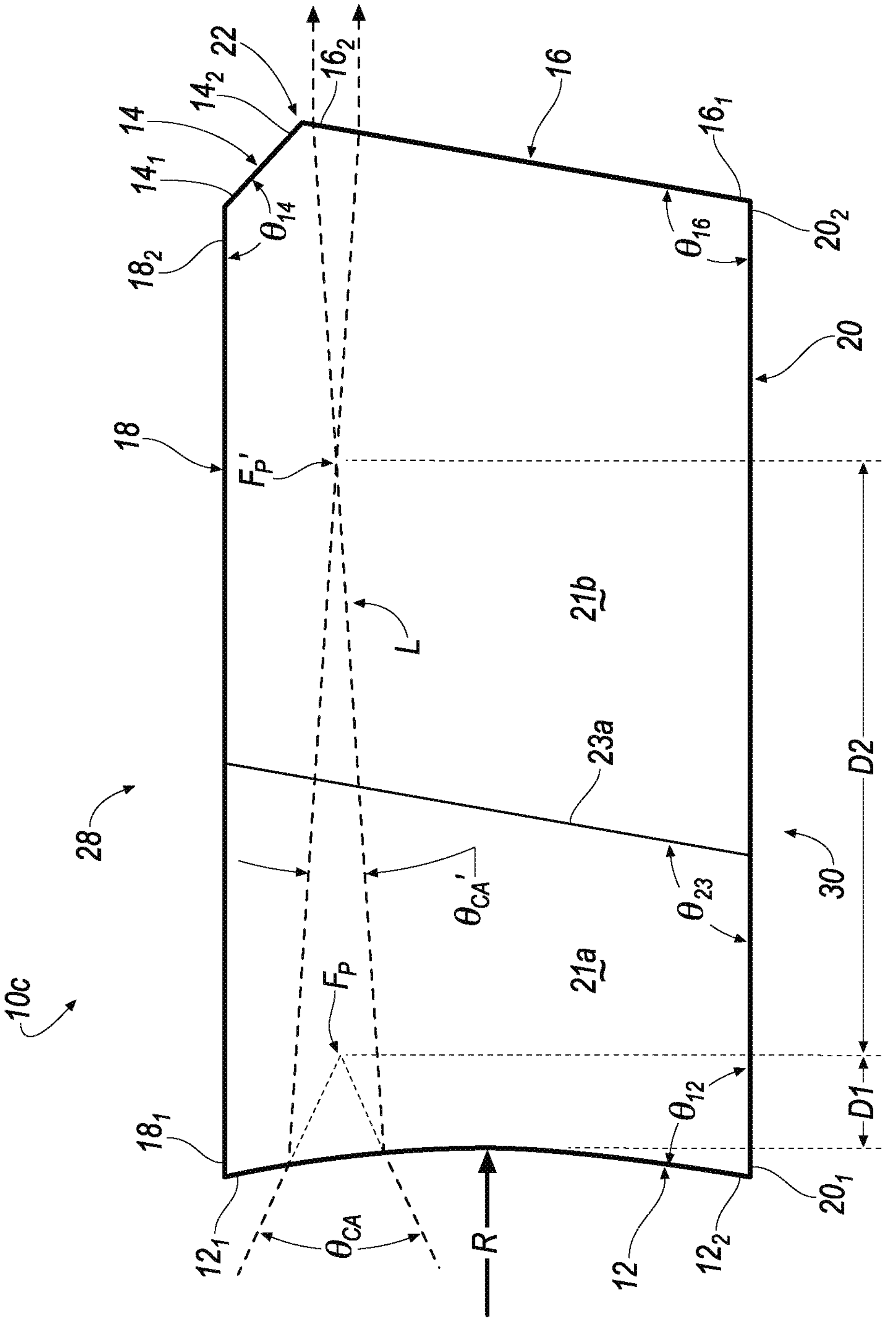
Figure 5E:
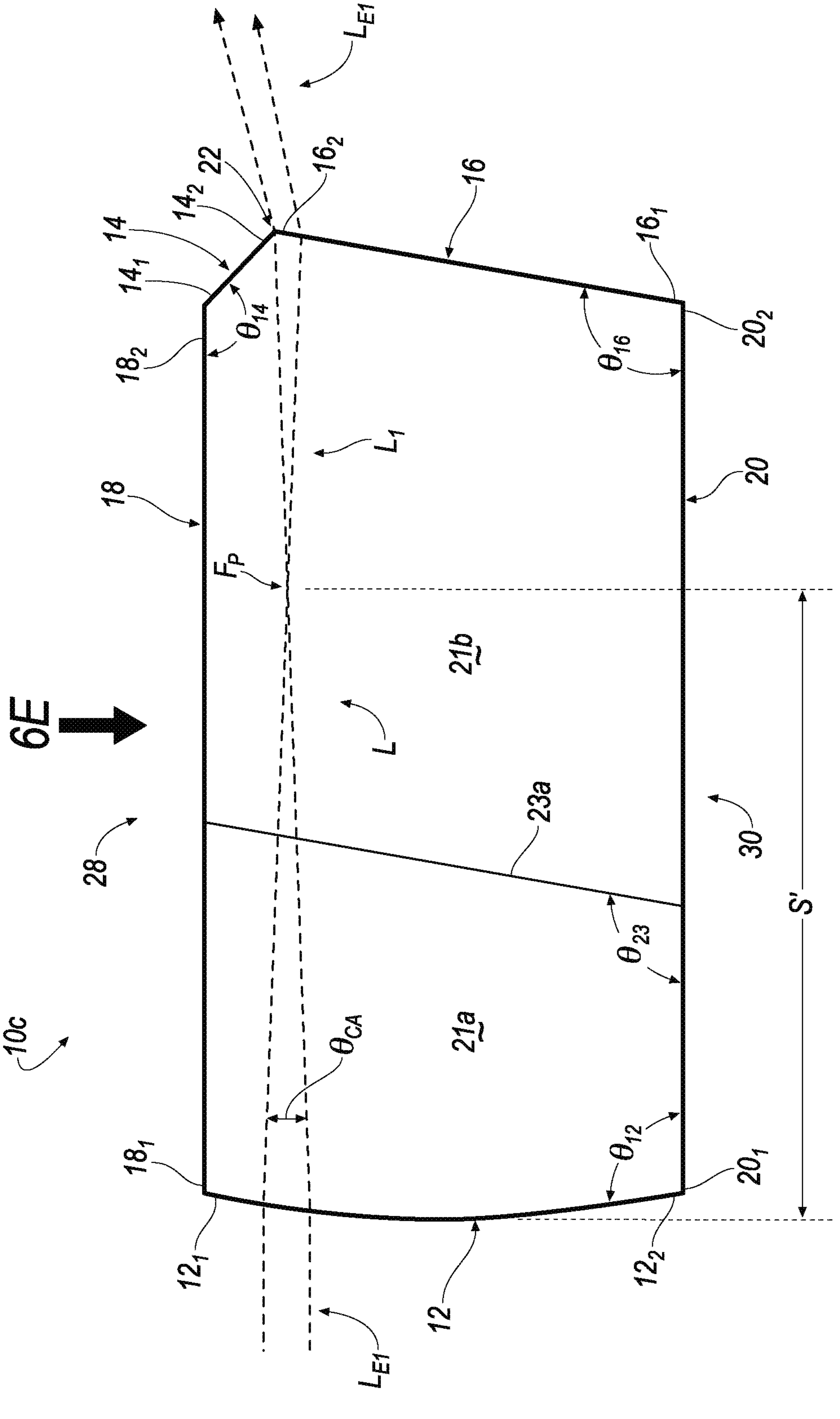

FIG. 5E is a side view of an exemplary optomechanical tool that receives a collimated light beam at an outwardly-projecting laterally cylindrical light beam entrance face arranged at a perpendicular or right back-relief angle.

FIG. 5E' is a perspective view of the optomechanical tool of FIG. 5E.

FIG. $5E_C$ is a side view of an exemplary optomechanical tool that receives a converging light beam at an outwardly-projecting laterally cylindrical light beam entrance face arranged at a perpendicular or right back-relief angle.

FIG. $5E_D$ is a side view of an exemplary optomechanical tool that receives a diverging light beam at an outwardly-projecting laterally cylindrical light beam entrance face arranged at a perpendicular or right back-relief angle.

Figure 5E:
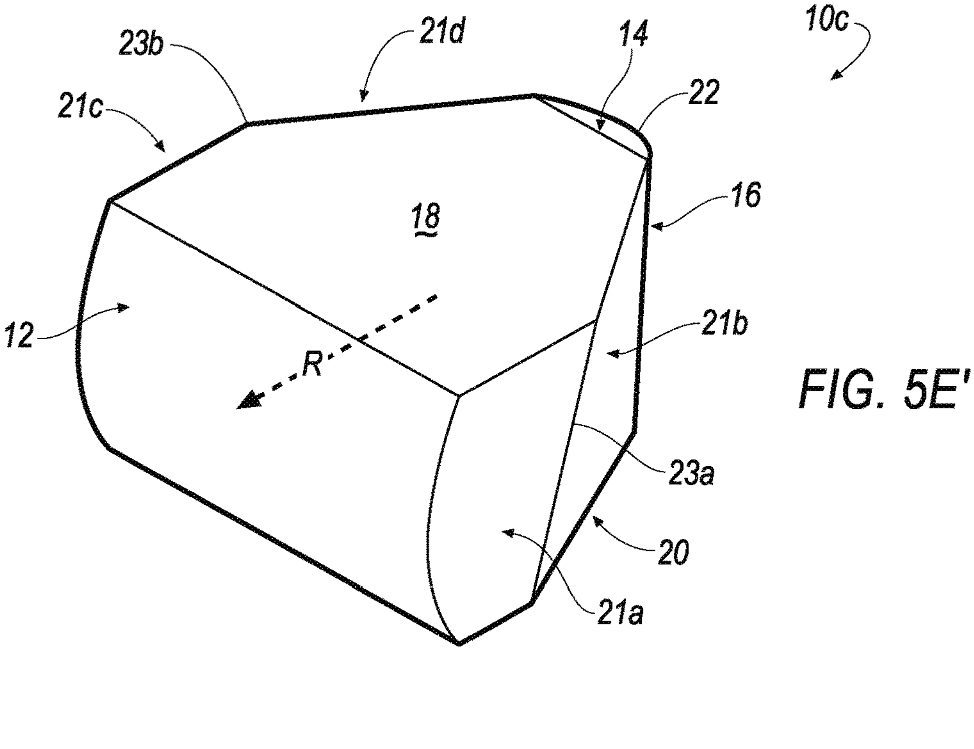
Figure 5F:
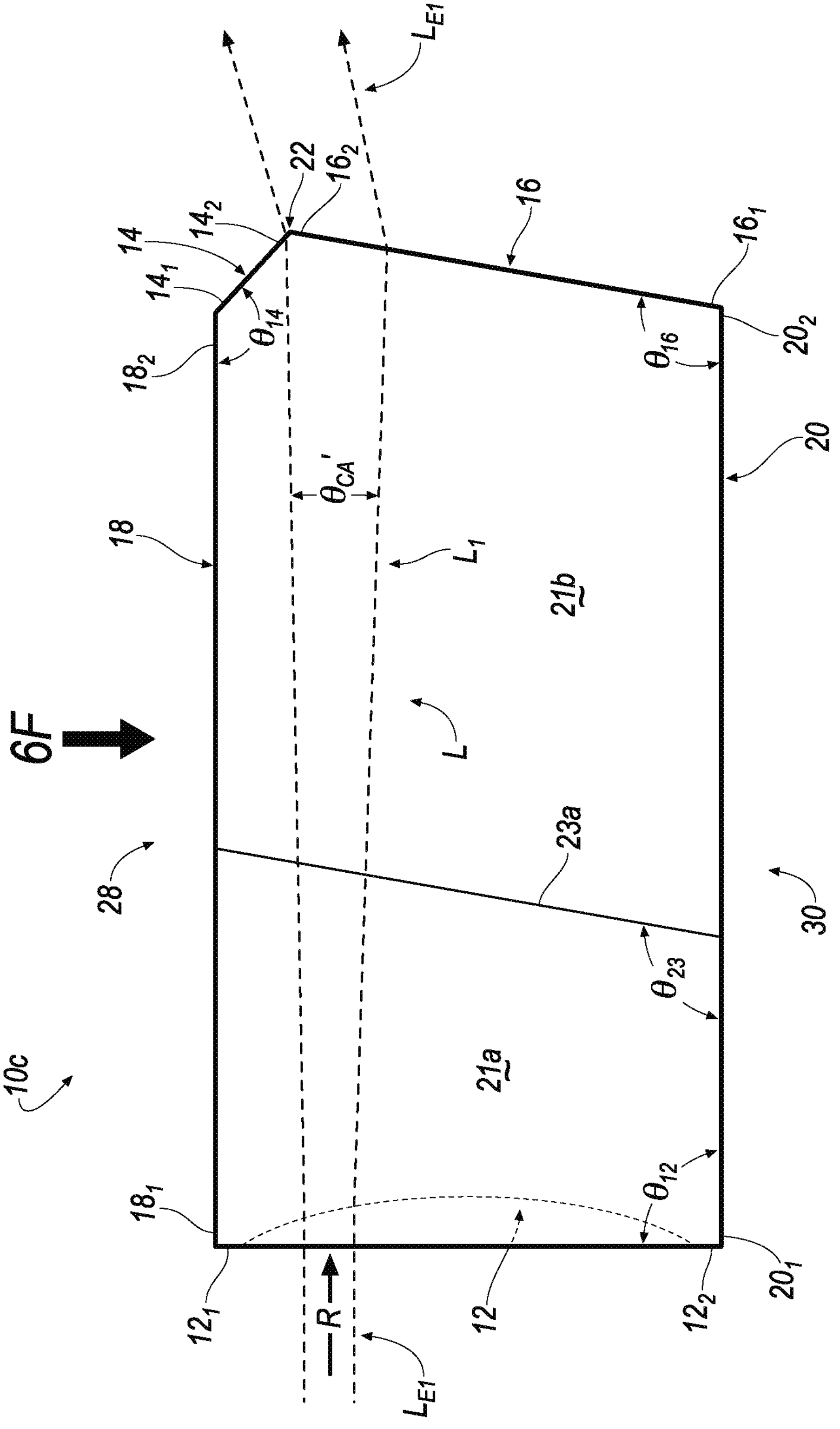

FIG. 5F is a side view of an exemplary optomechanical tool that receives a collimated light beam at an inwardly-projecting spherical light beam entrance face arranged at a perpendicular or right back-relief angle.

FIG. 5F' is a perspective view of the optomechanical tool of FIG. 5F.

Figure 5F:
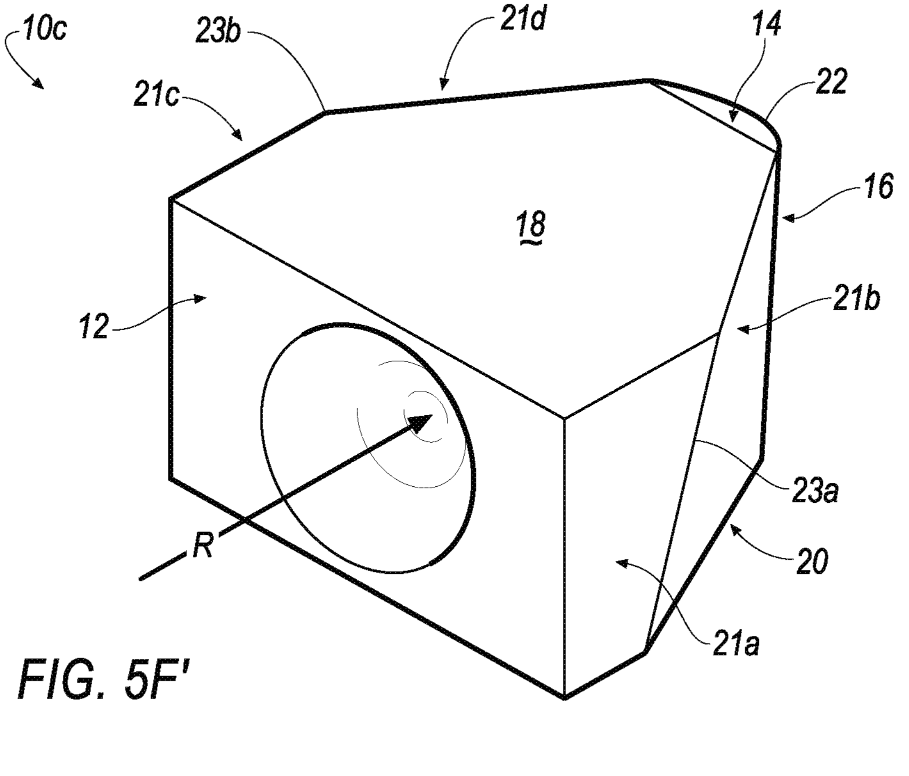
Figure 5G:
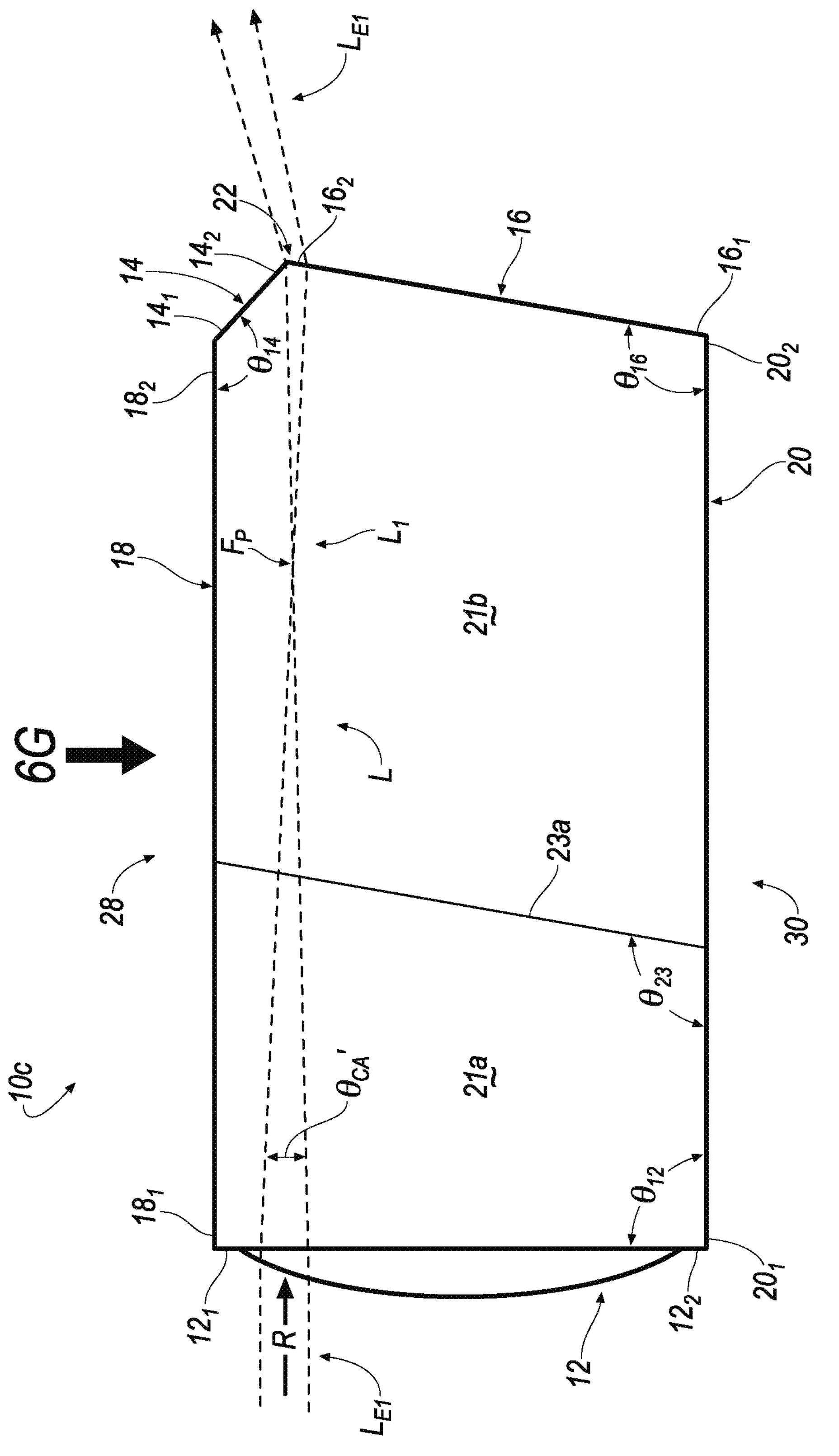

FIG. 5G is a side view of an exemplary optomechanical tool that receives a collimated light beam at an outwardly-projecting spherical light beam entrance face arranged at a perpendicular or right back-relief angle.

FIG. 5G' is a perspective view of the optomechanical tool of FIG. 5G.

Figure 6B:
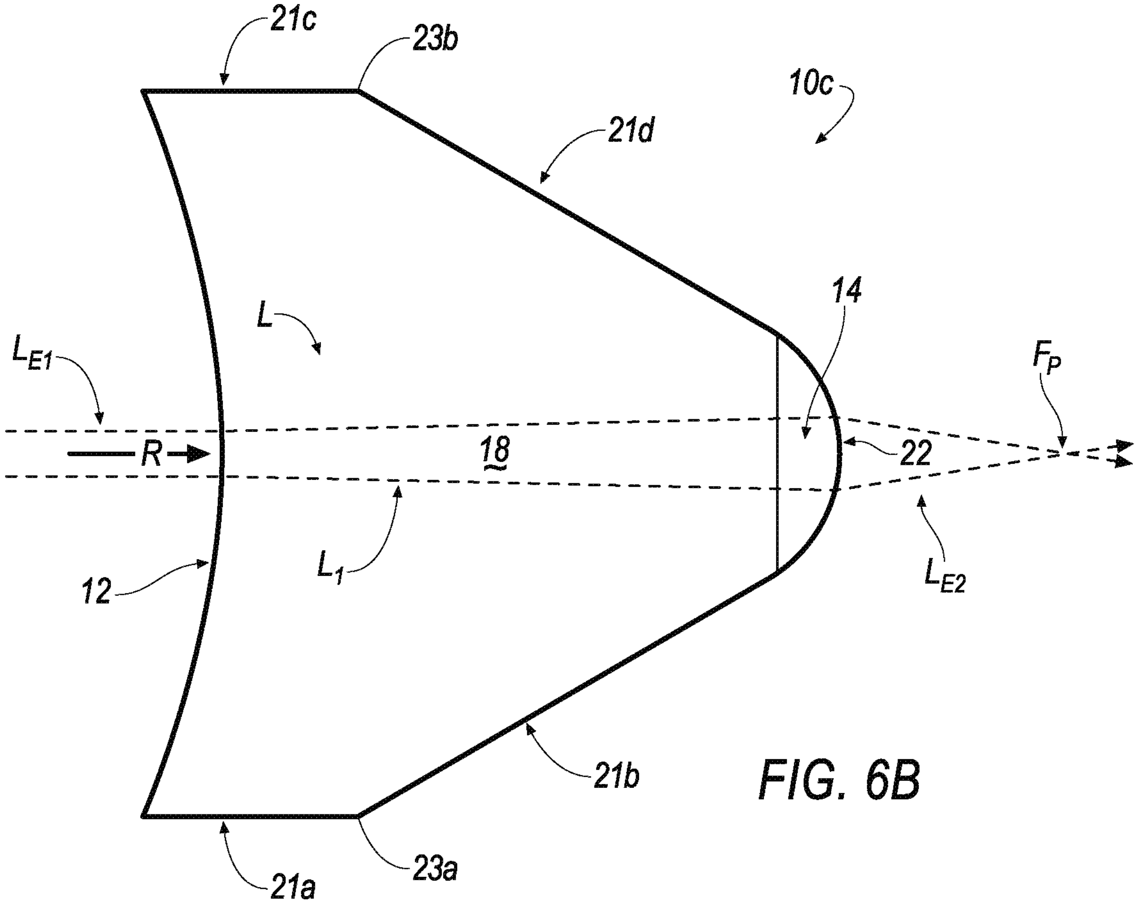
Figure 6C:
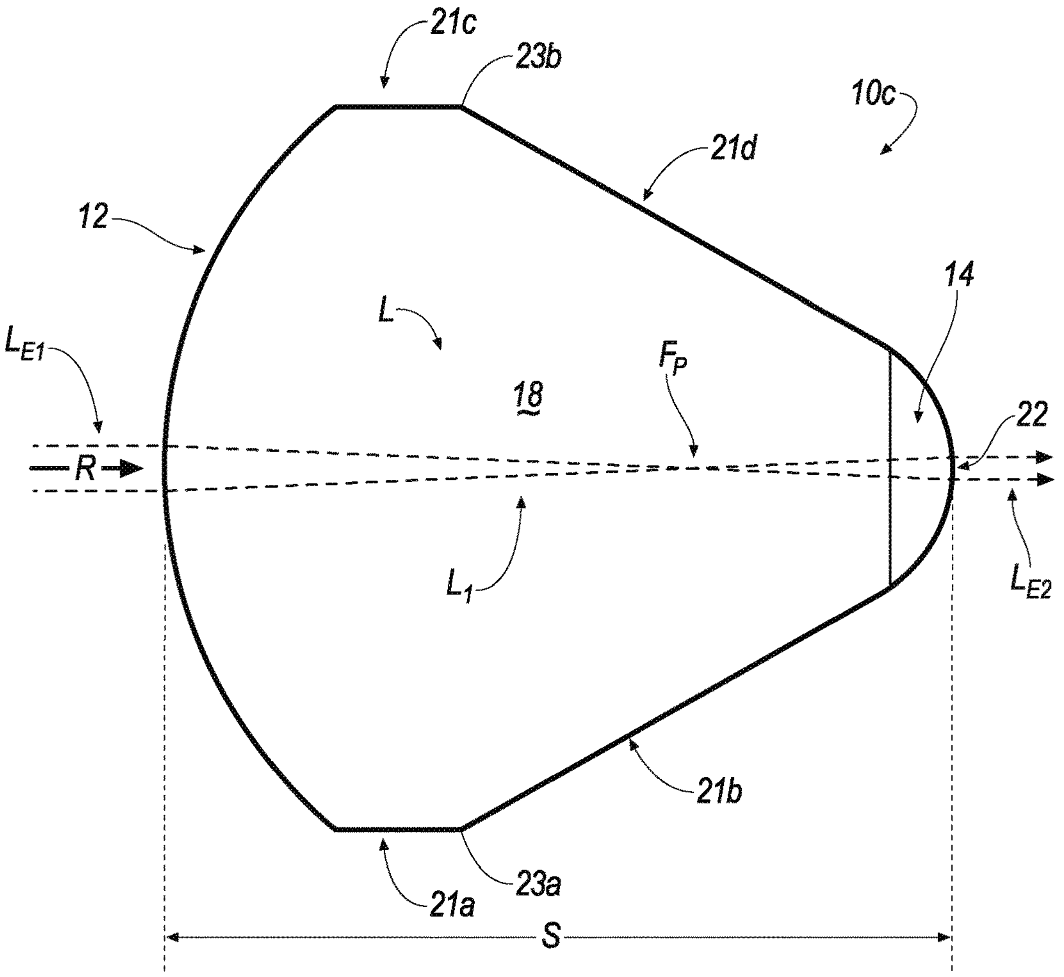
Figure 6D:
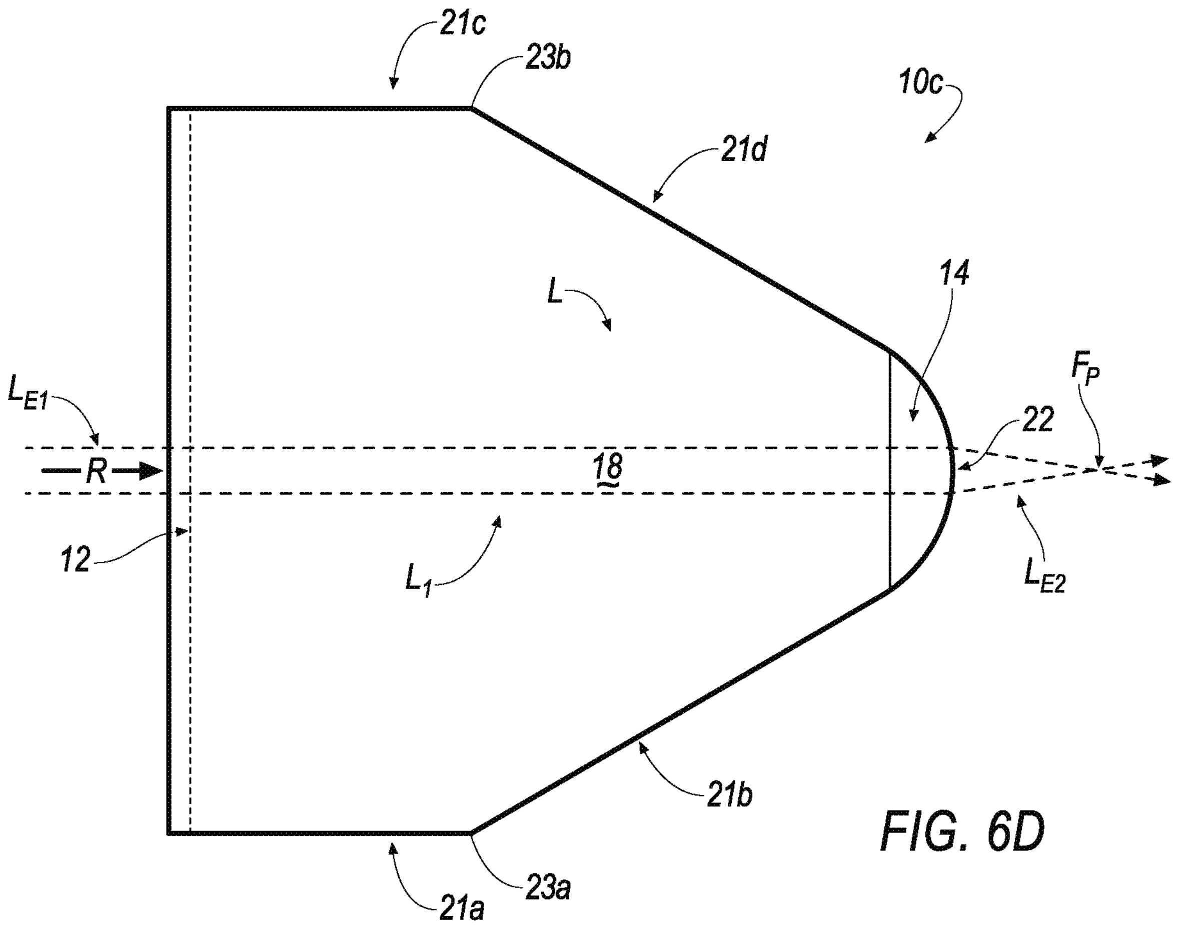
Figure 6E:
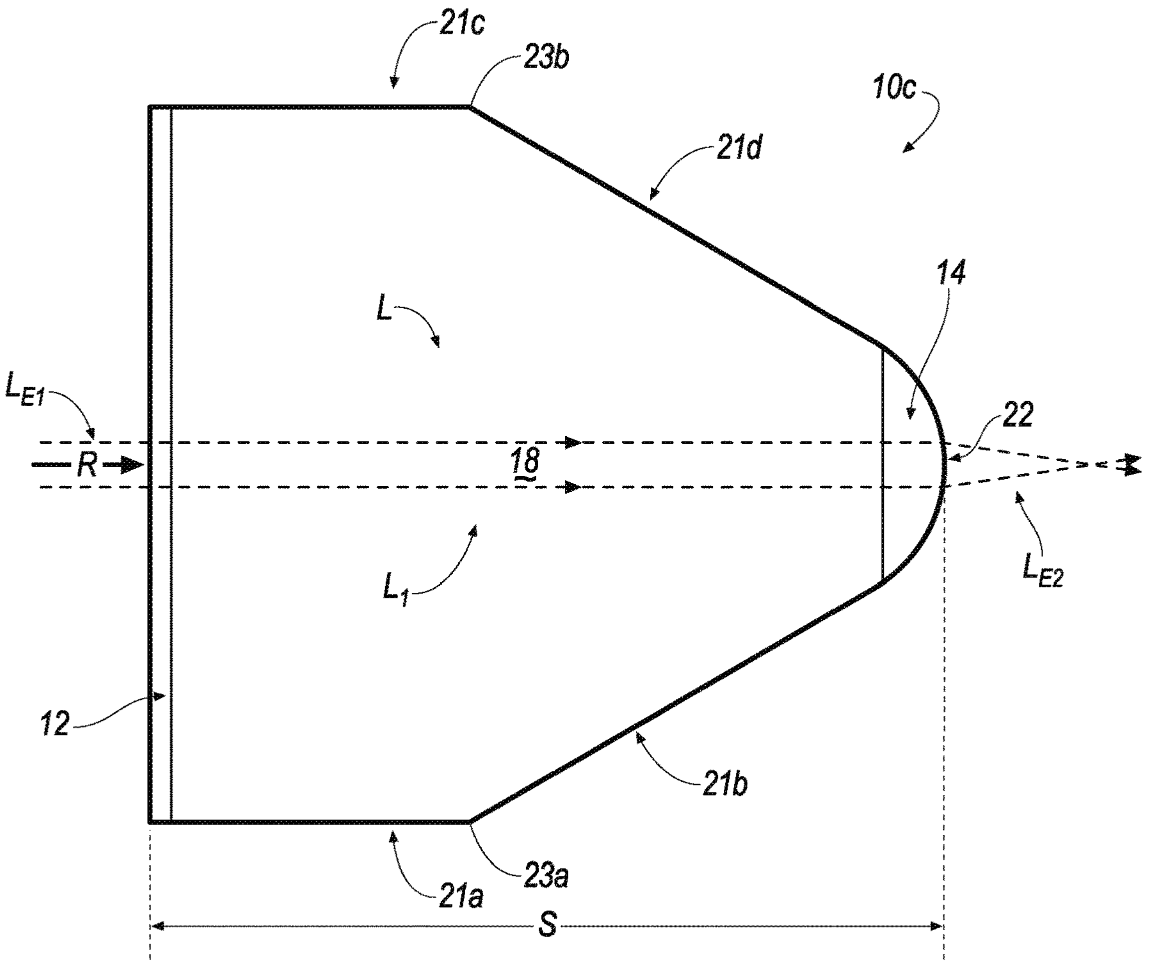
Figure 6F:
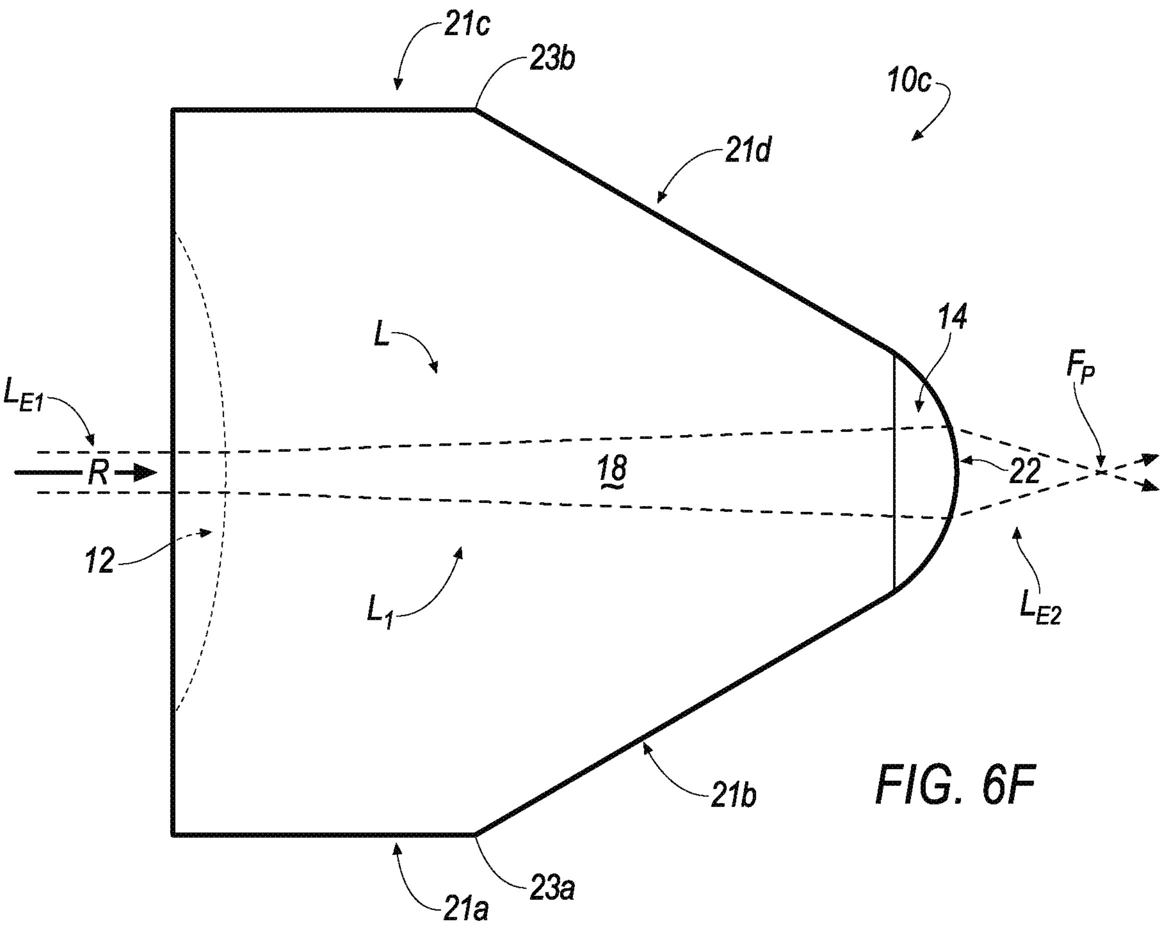
Figure 6G:
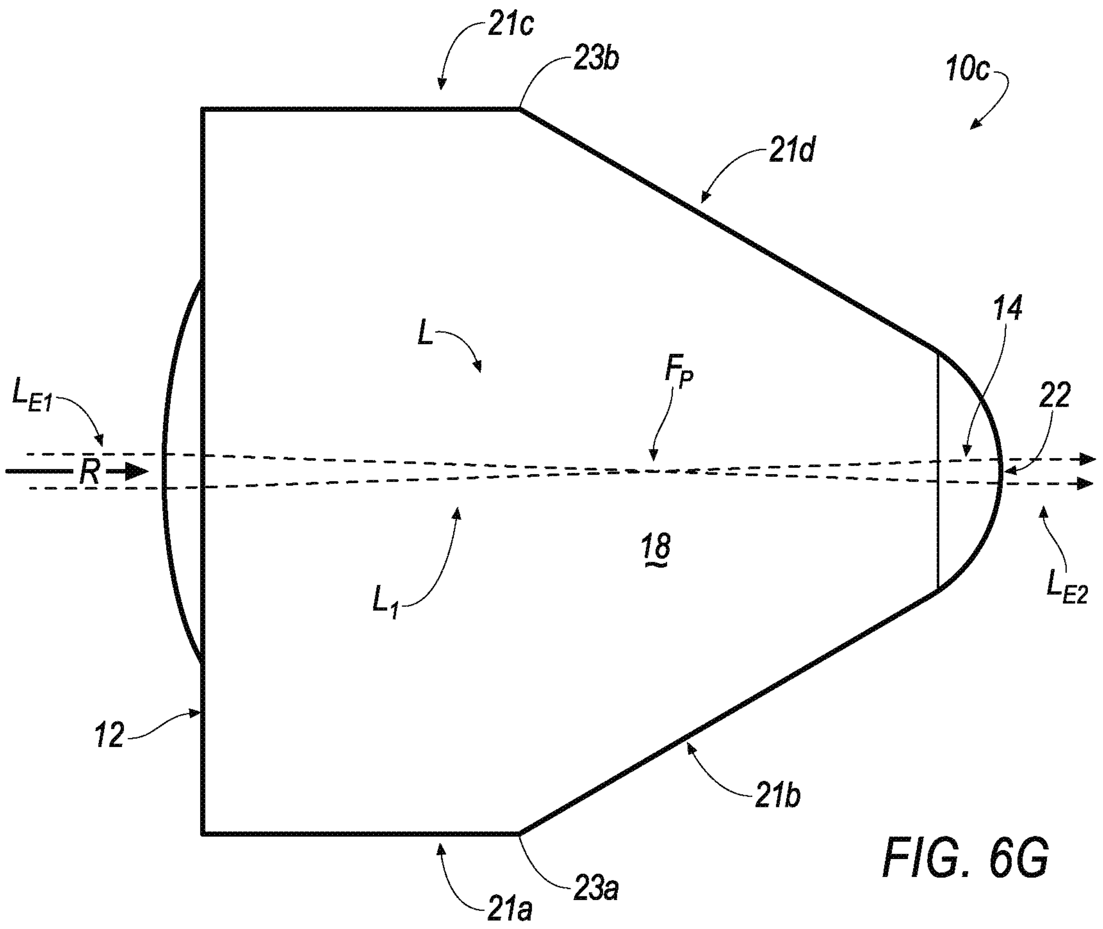
Figure 5G:
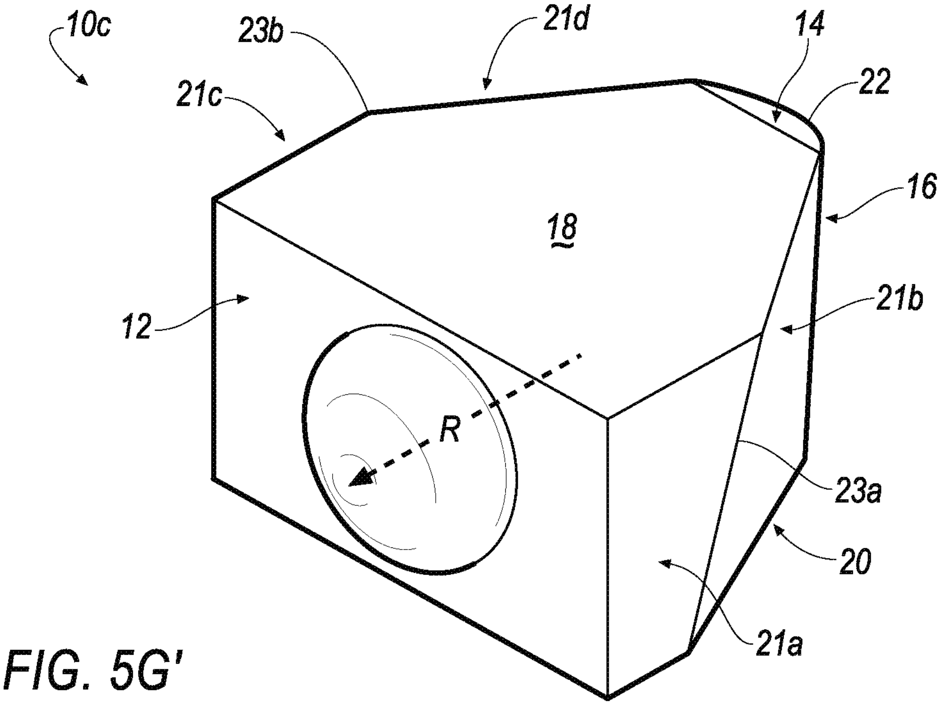
Figure 6A:
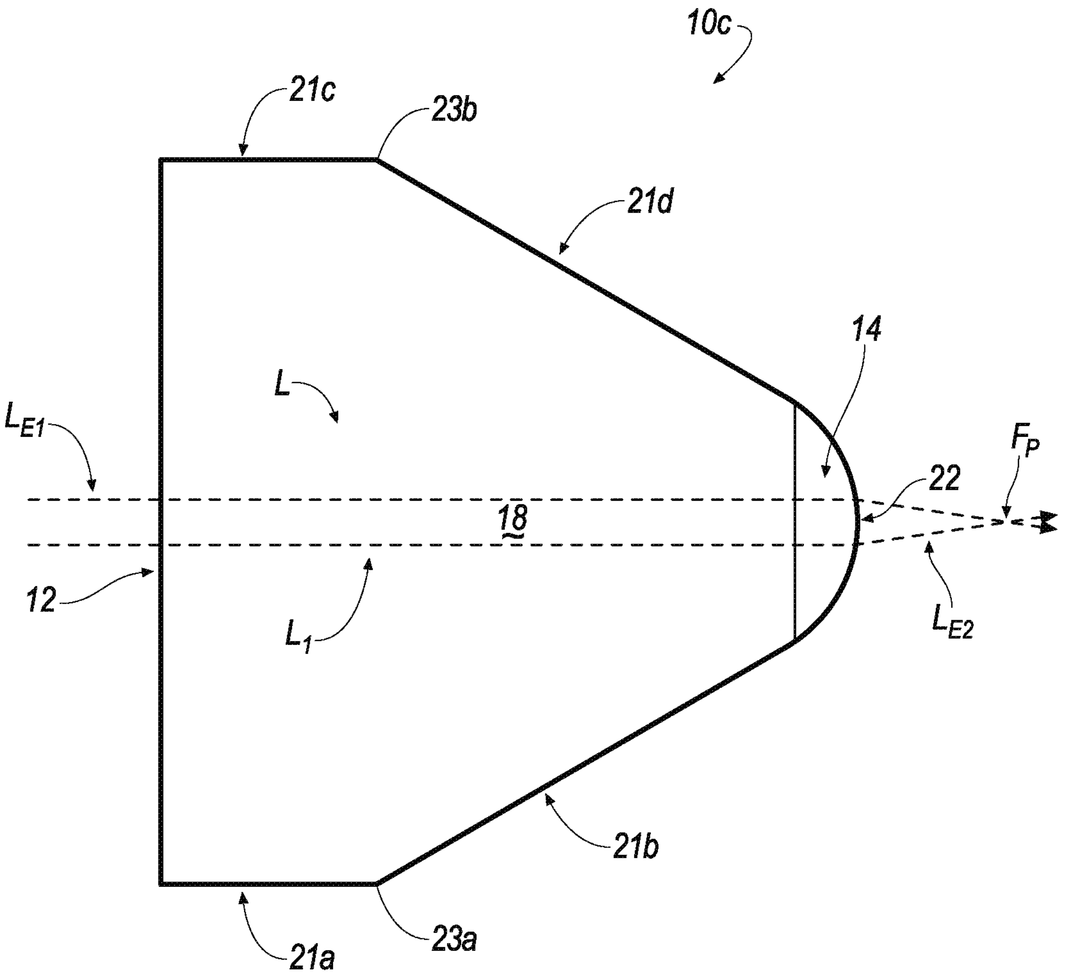

FIG. 6A is a top view of the optomechanical tool of FIG. 5A.

FIG. 6B is a top view of the optomechanical tool of FIG. 5B.

FIG. 6C is a top view of the optomechanical tool of FIG. 5C.

FIG. 6D is a top view of the optomechanical tool of FIG. 5D.

FIG. 6E is a top view of the optomechanical tool of FIG. 5E.

FIG. 6F is a top view of the optomechanical tool of FIG. 5F.

FIG. 6G is a top view of the optomechanical tool of FIG. 5G.

Figure 6H:
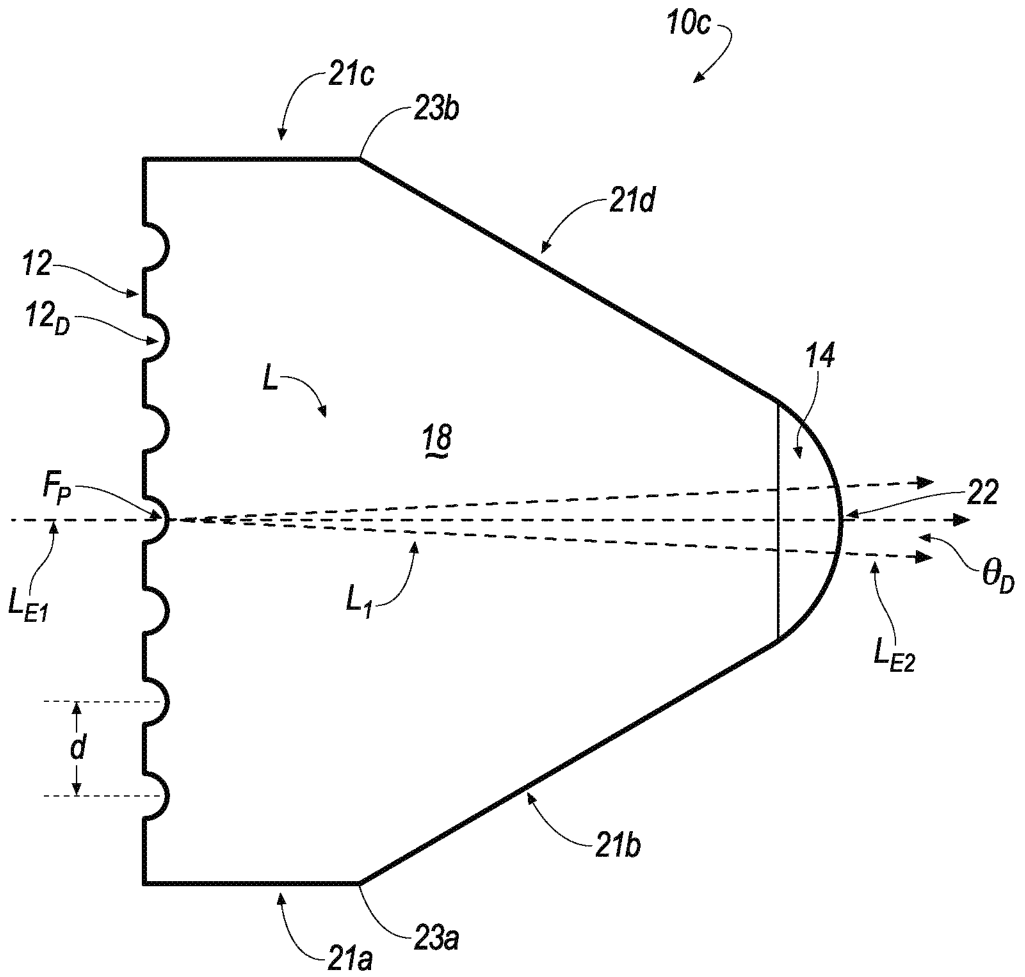

FIG. 6H is a top view of an exemplary optomechanical tool including a light beam entrance face arranged at a perpendicular or right back-relief angle defining one or more diffractive surface portions.

Figure 6I:
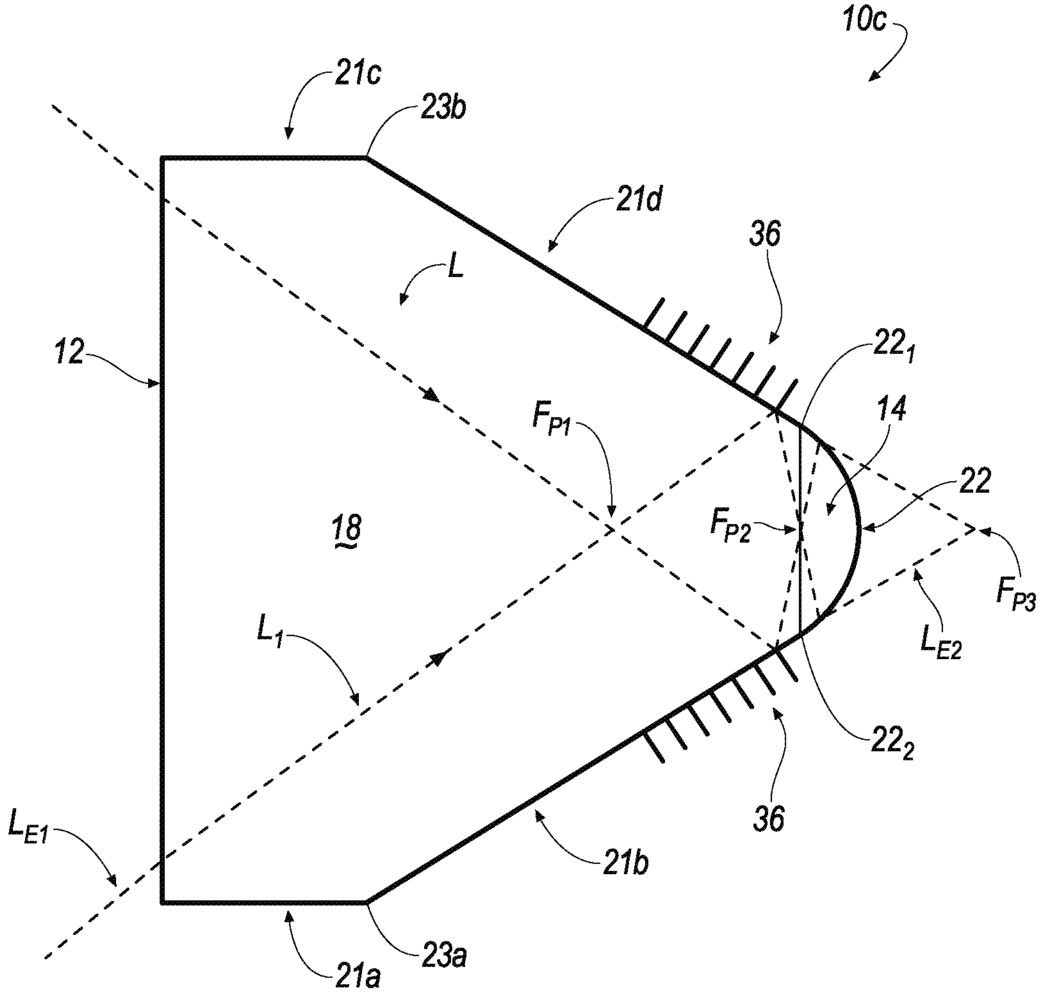

FIG. 6I is a top view of an exemplary optomechanical tool including a light so beam entrance face arranged at a perpendicular or right back-relief angle and a reflection-enhancing coating applied to one or more outer surfaces of the optomechanical tool.

Figure 7A:
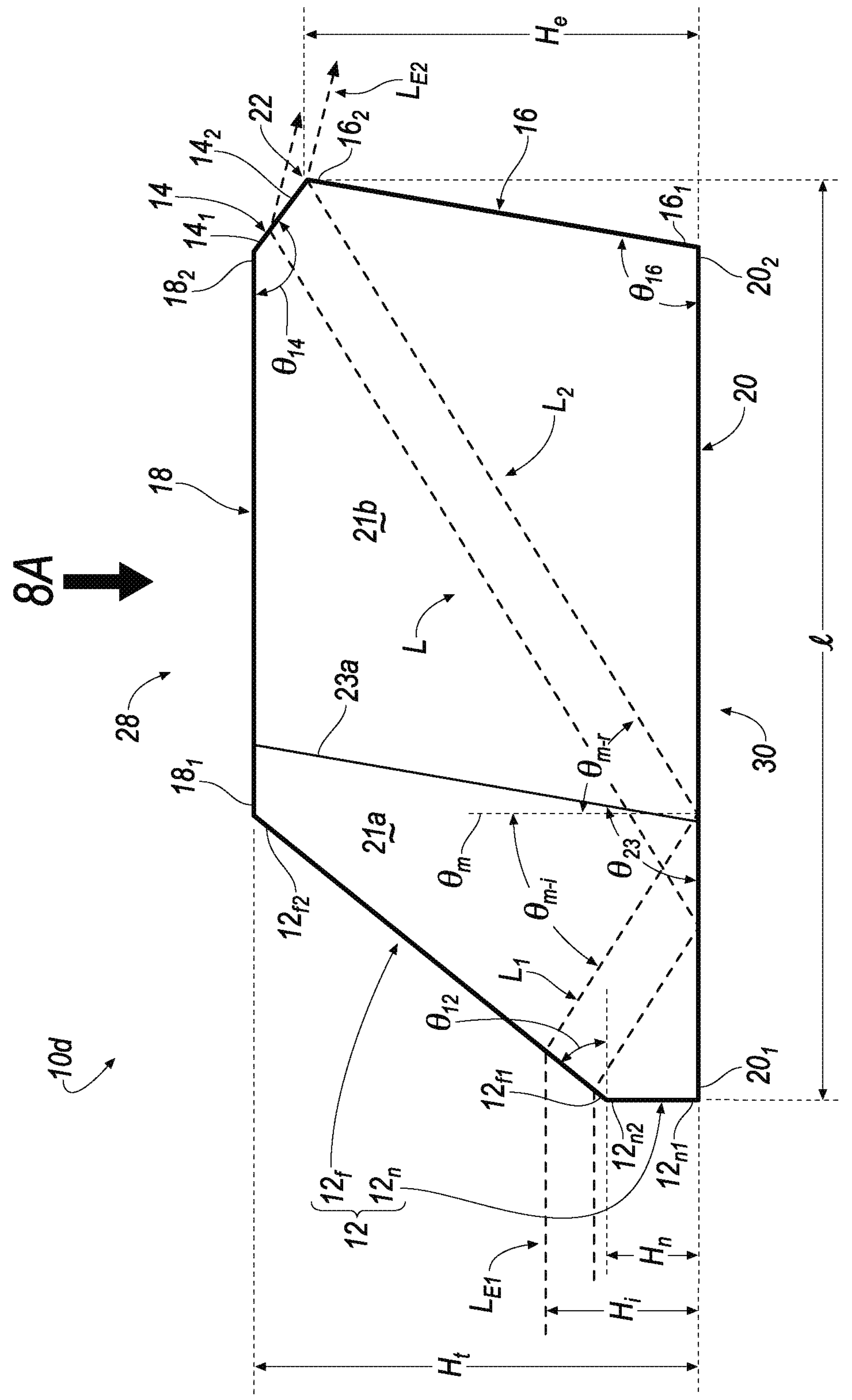

FIG. 7A is a side view of an exemplary optomechanical tool that receives a collimated light beam at a substantially linear, flat or planar functional entrance face segment of a light beam entrance face arranged at an acute back-relief angle.

Figure 7B:
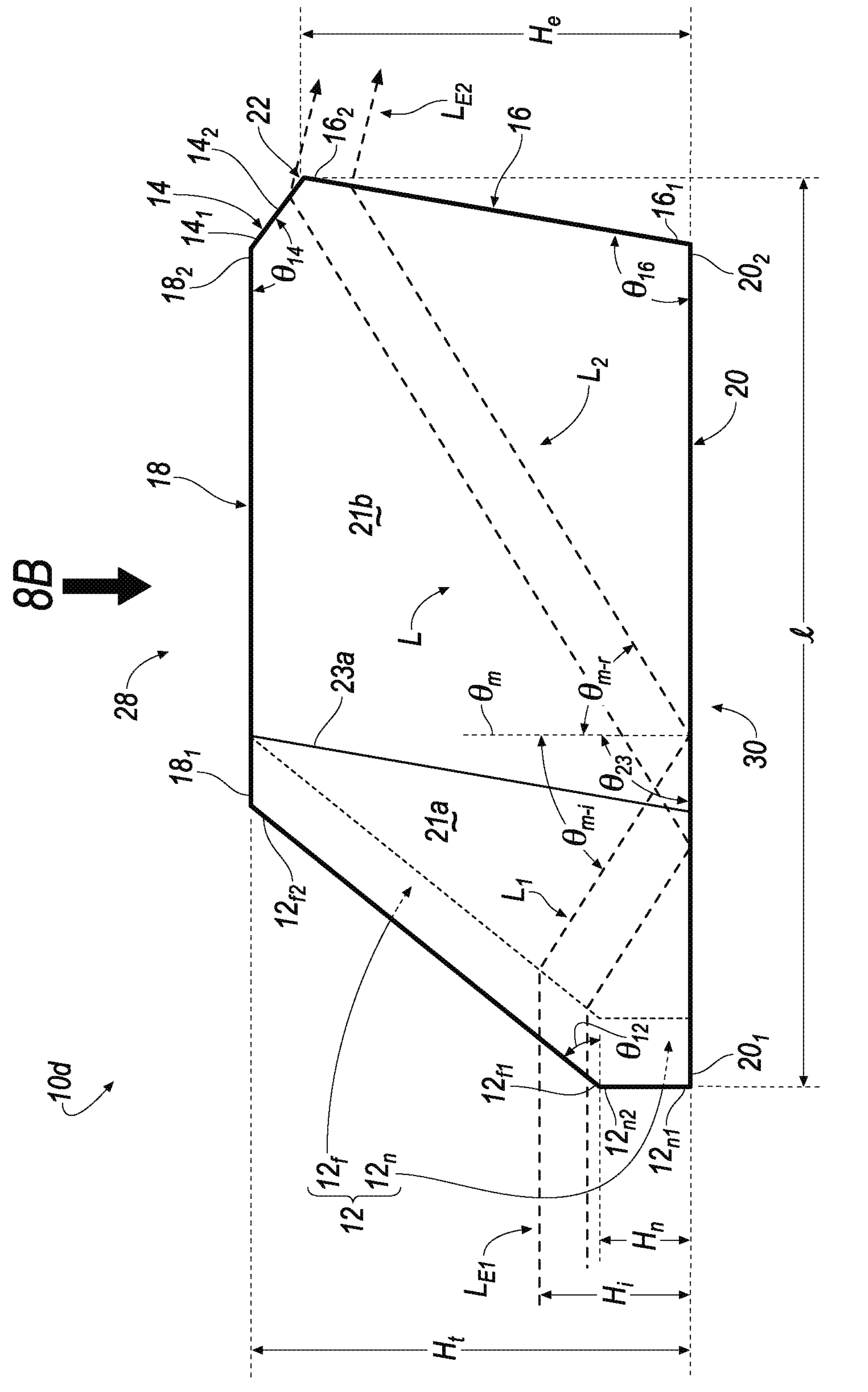

FIG. 7B is a side view of an exemplary optomechanical tool that receives a collimated light beam at an inwardly-projecting axially cylindrical functional entrance face segment of a light beam entrance face arranged at an acute back-relief angle.

FIG. 7B' is a perspective view of the optomechanical tool of FIG. 7B.

Figure 7B:
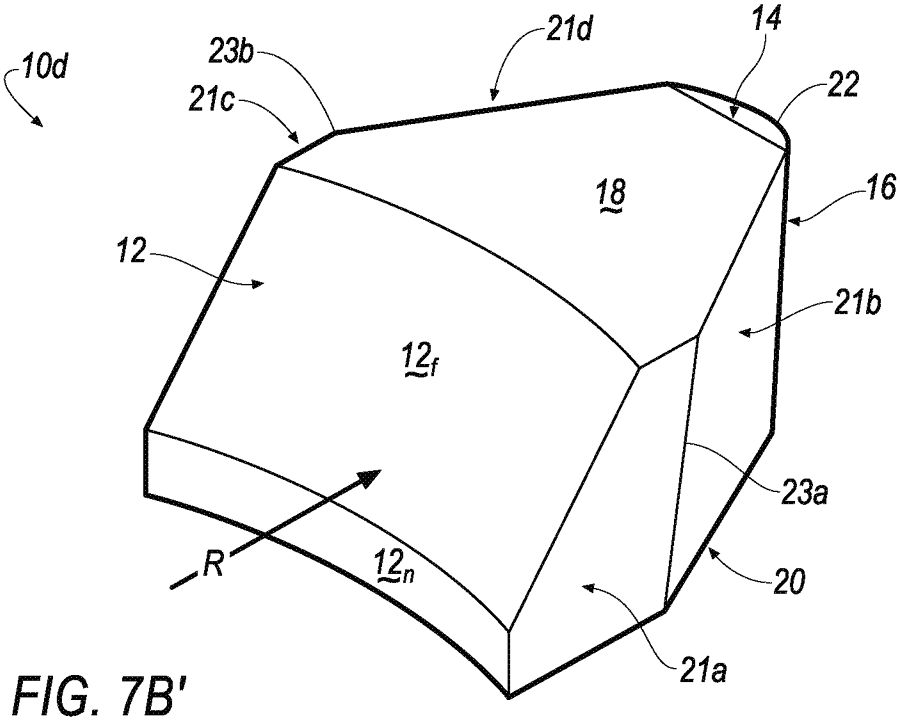
Figure 7C:
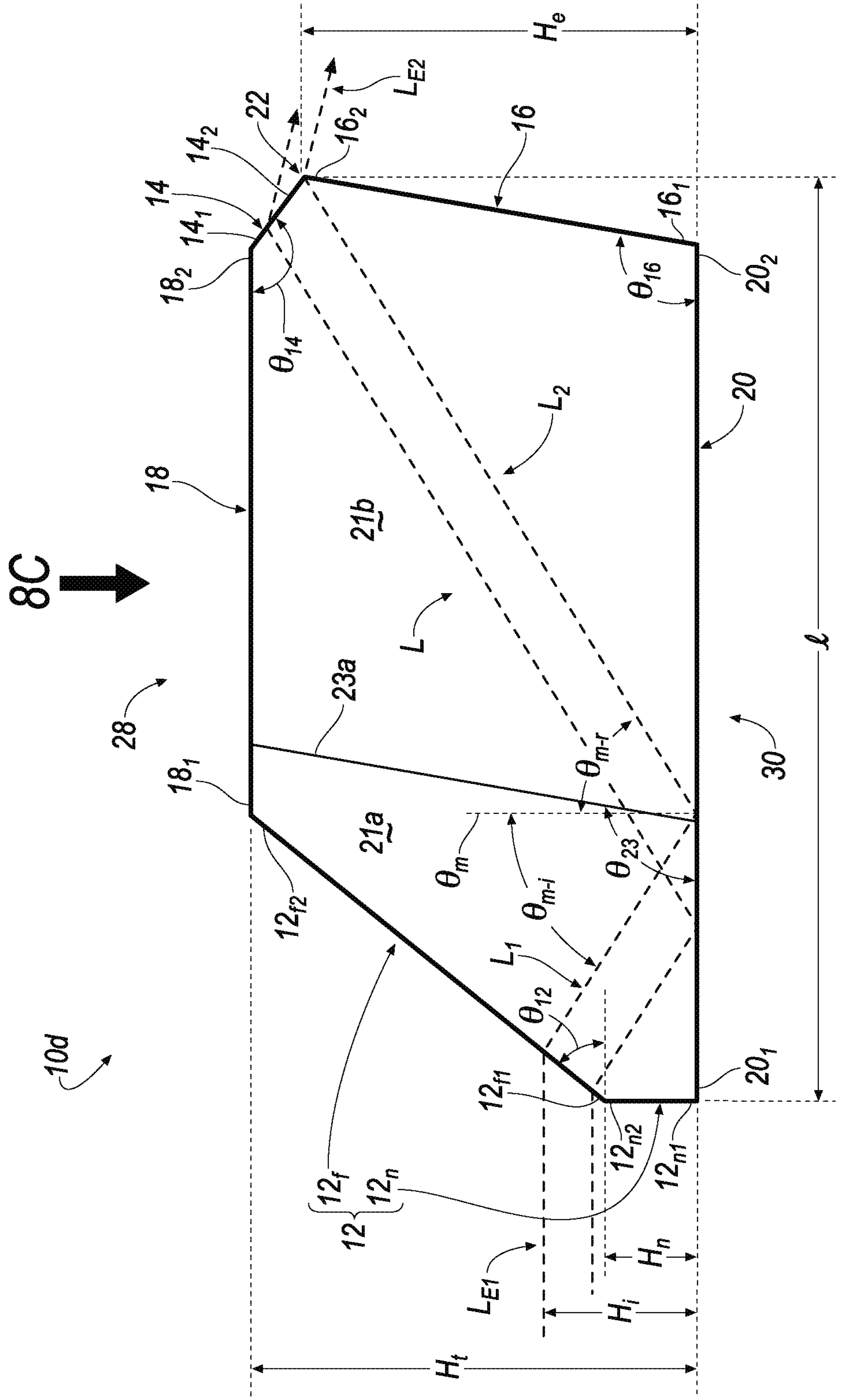

FIG. 7C is a side view of an exemplary optomechanical tool that receives a collimated light beam at an outwardly-projecting axially cylindrical functional entrance face segment of a light beam entrance face arranged at an acute back-relief angle.

FIG. 7C' is a perspective view of the optomechanical tool of FIG. 7C.

Figure 7C:
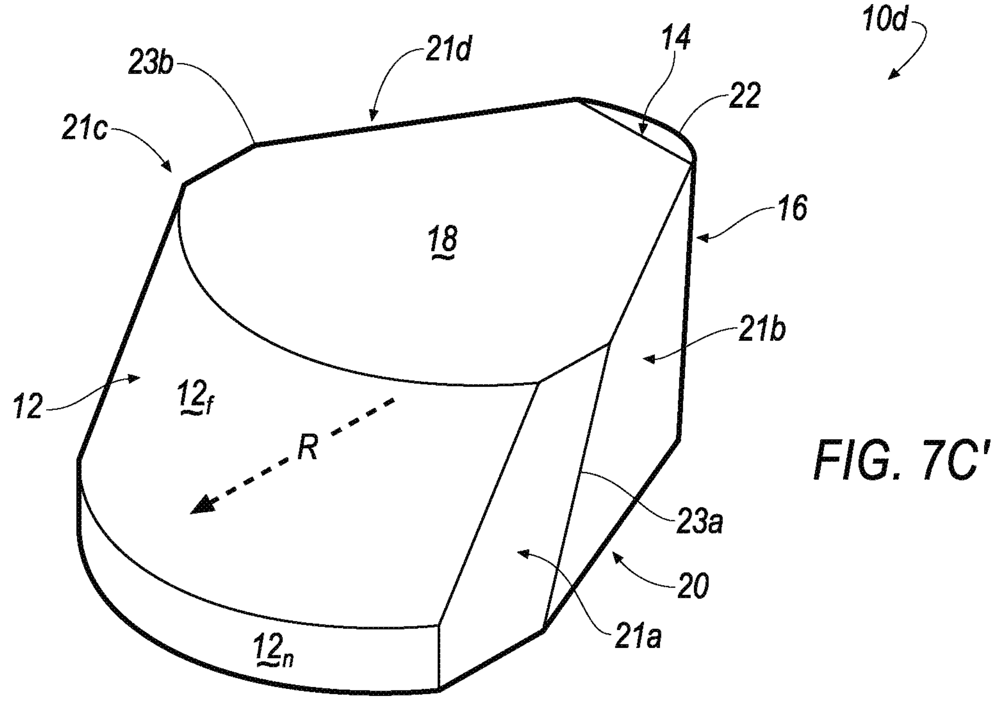
Figure 7D:
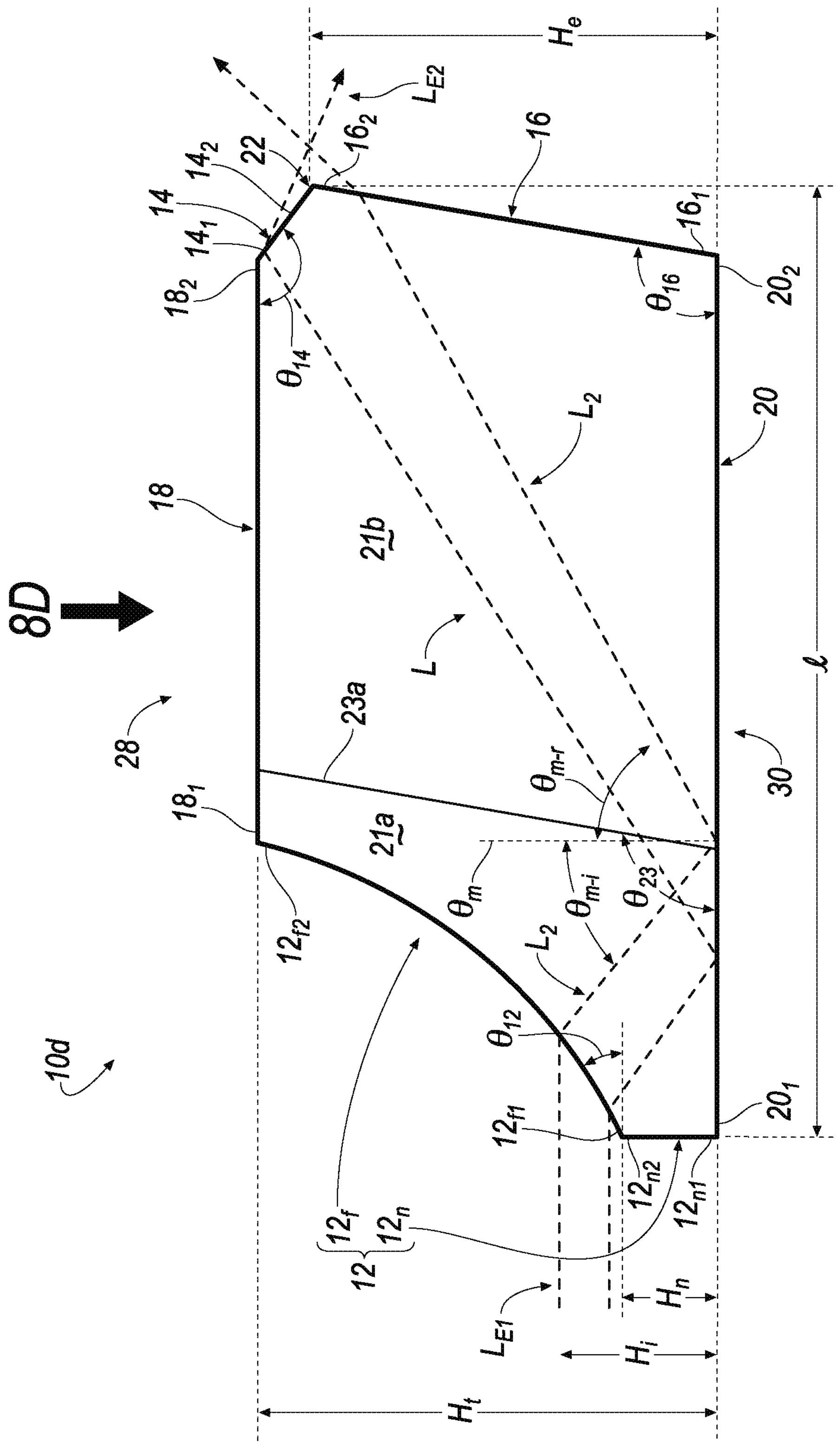

FIG. 7D is a side view of an exemplary optomechanical tool that receives a collimated light beam at an inwardly-projecting laterally cylindrical functional entrance face segment of a light beam entrance face arranged at an acute back-relief angle.

FIG. 7D' is a perspective view of the optomechanical tool of FIG. 7D.

Figure 7D:
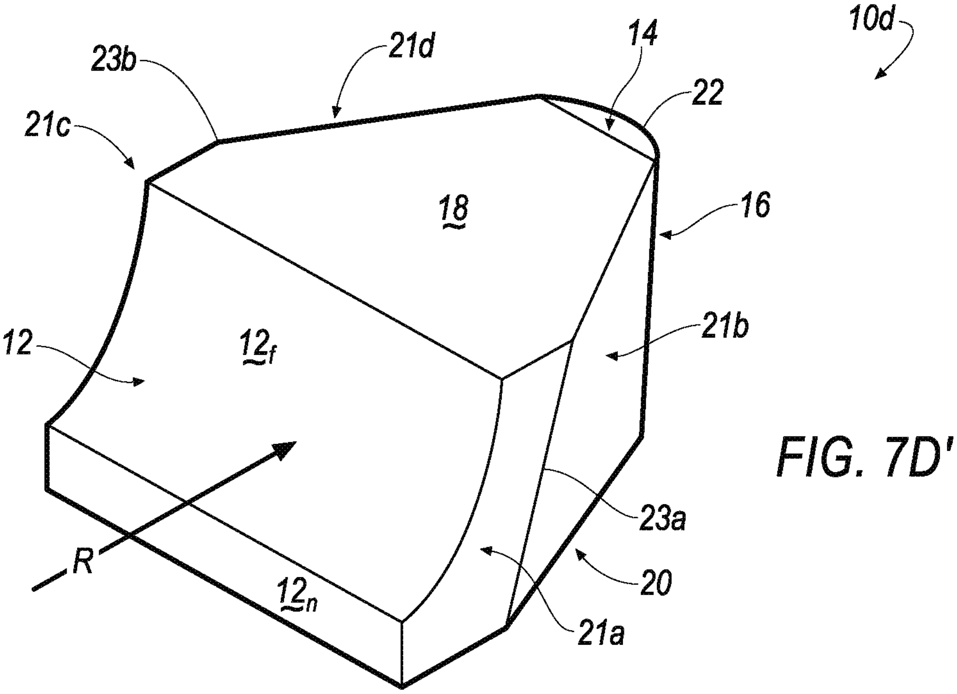
Figure 7E:
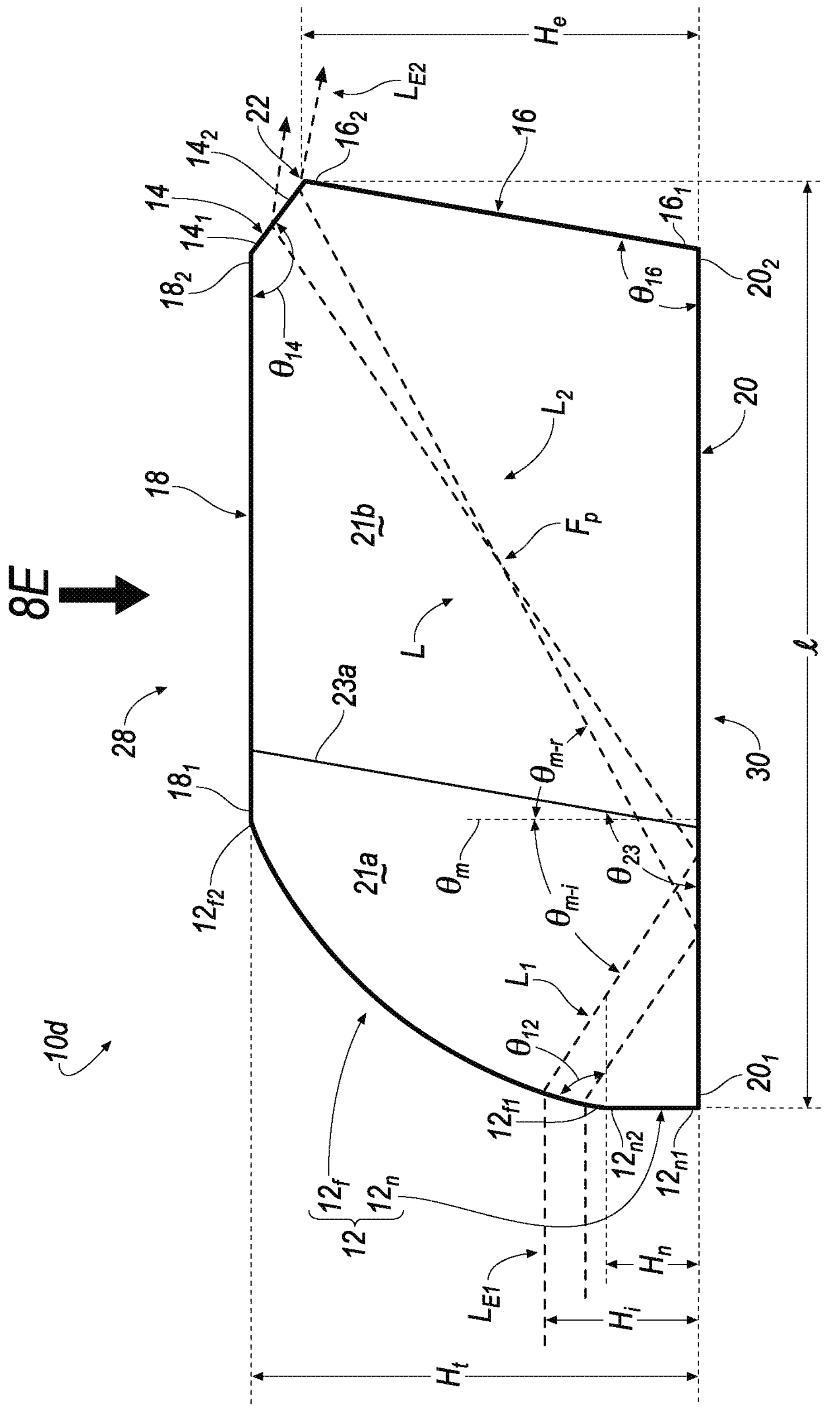

FIG. 7E is a side view of an exemplary optomechanical tool that receives a collimated light beam at an outwardly-projecting laterally cylindrical functional entrance face segment of a light beam entrance face arranged at an acute back-relief angle.

FIG. 7E' is a perspective view of the optomechanical tool of FIG. 7E.

Figure 7E:
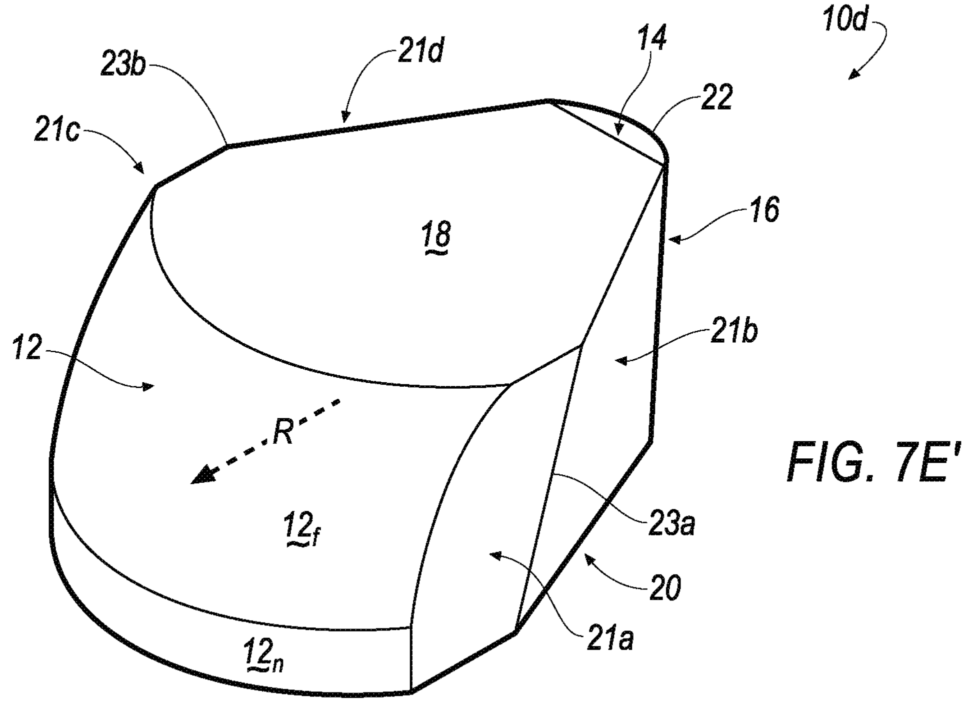
Figure 7F:
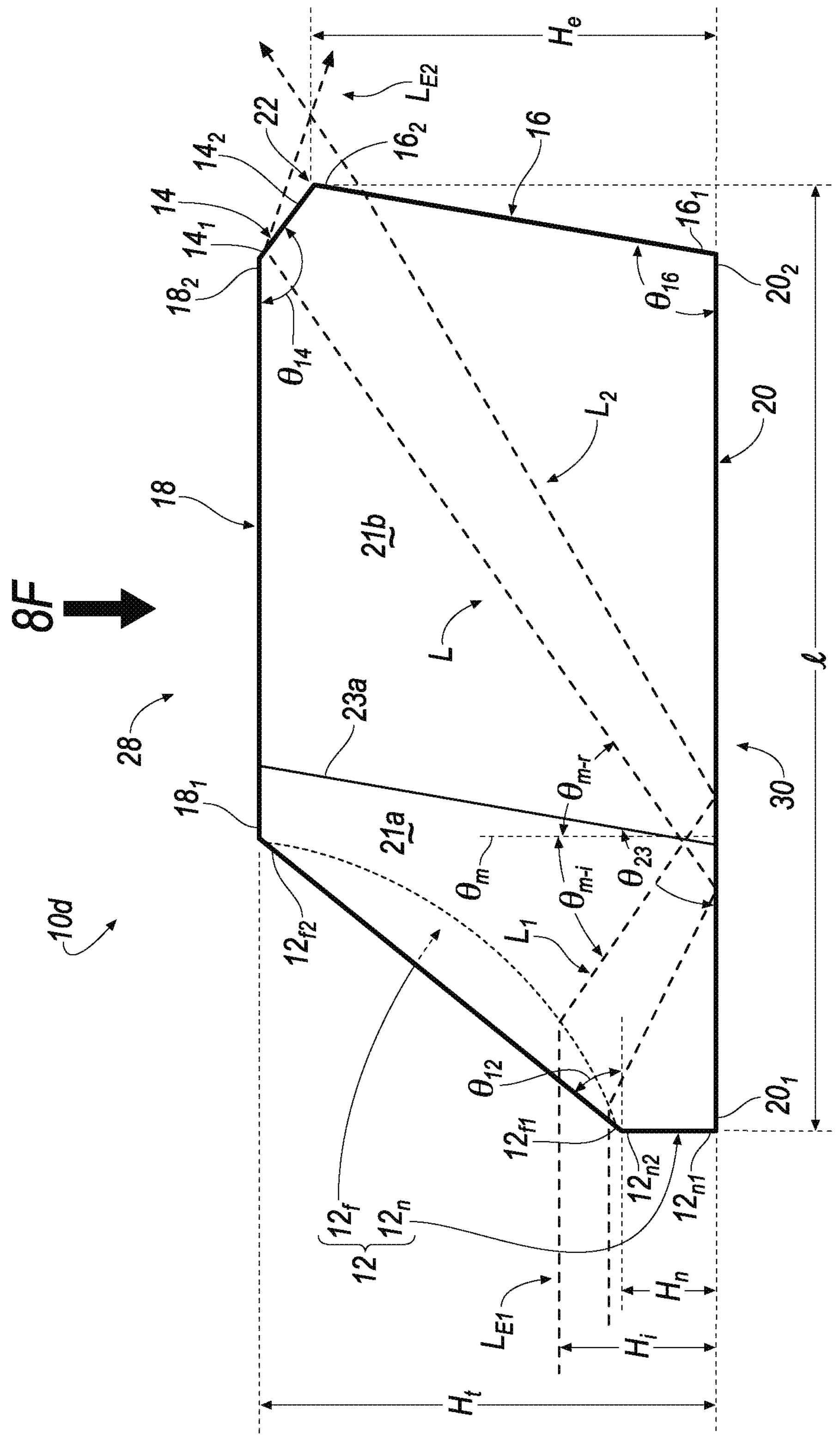

FIG. 7F is a side view of an exemplary optomechanical tool that receives a collimated light beam at an inwardly-projecting spherical functional entrance face segment of a light beam entrance face arranged at an acute back-relief angle.

FIG. 7F' is a perspective view of the optomechanical tool of FIG. 7F.

Figure 7F:
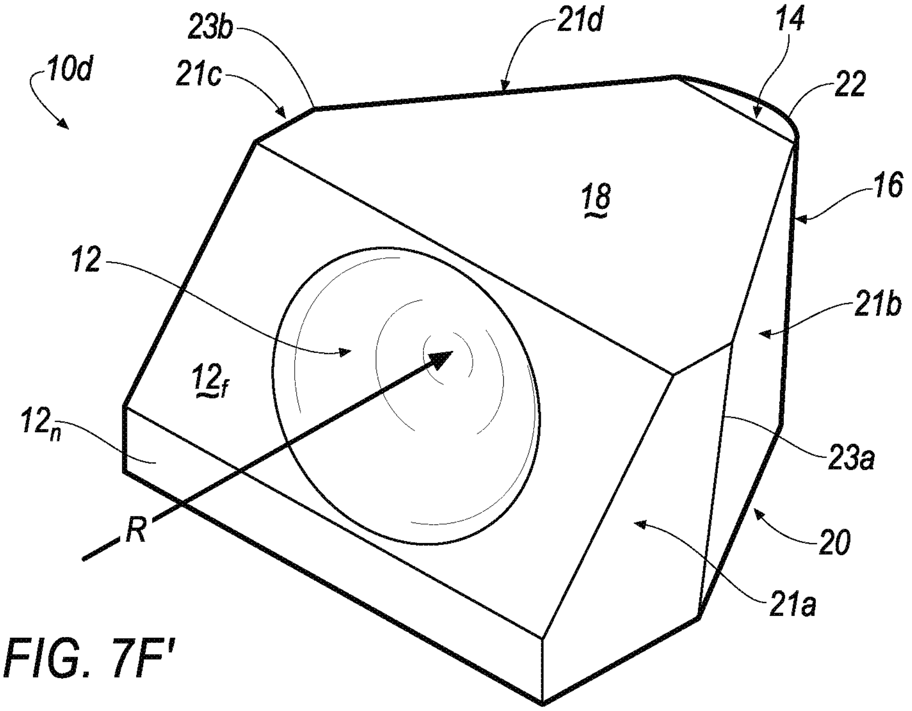
Figure 7G:
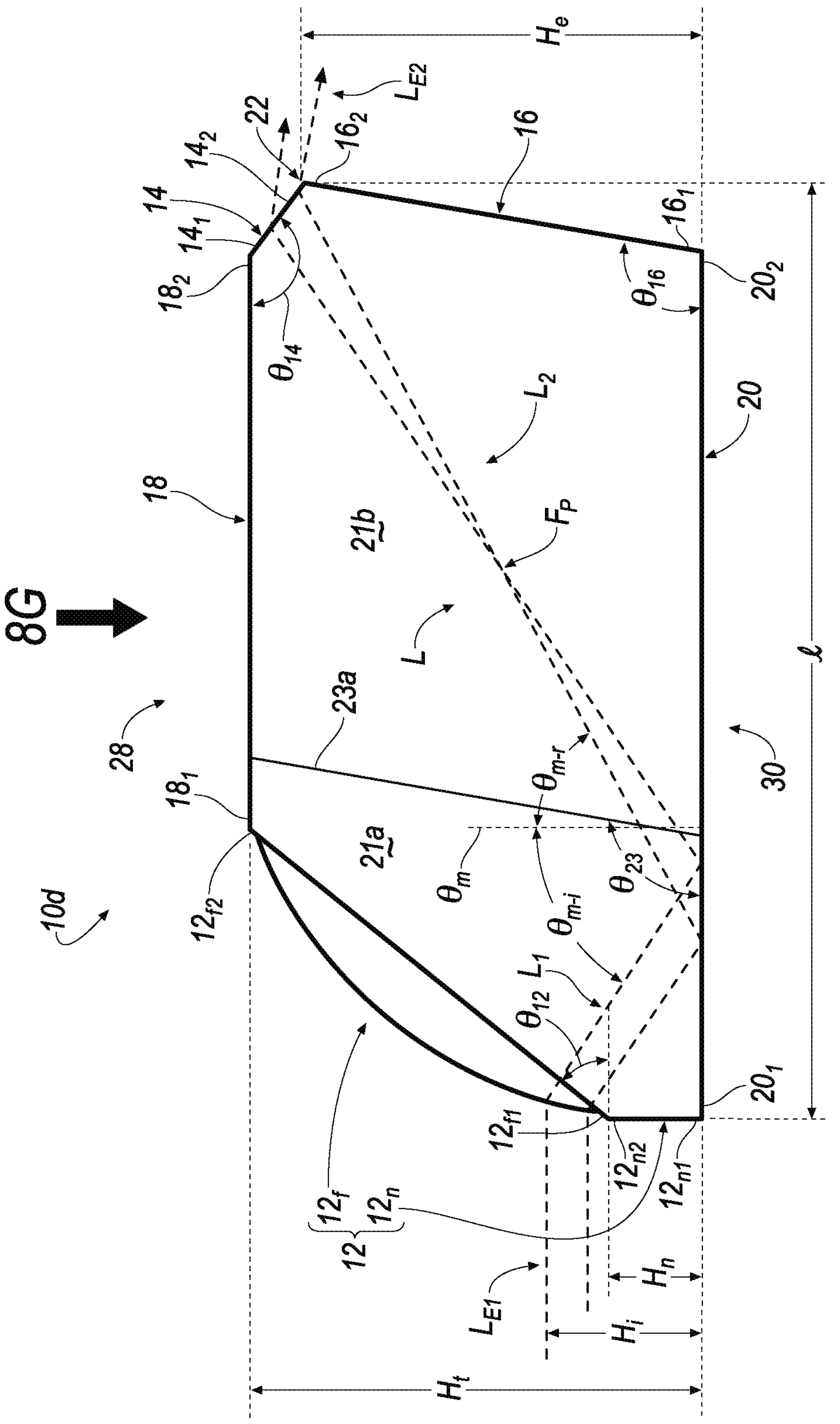

FIG. 7G is a side view of an exemplary optomechanical tool that receives a collimated light beam at an outwardly-projecting spherical functional entrance face segment of a light beam entrance face arranged at an acute back-relief angle.

FIG. 7G' is a perspective view of the optomechanical tool of FIG. 7G.

Figure 8B:
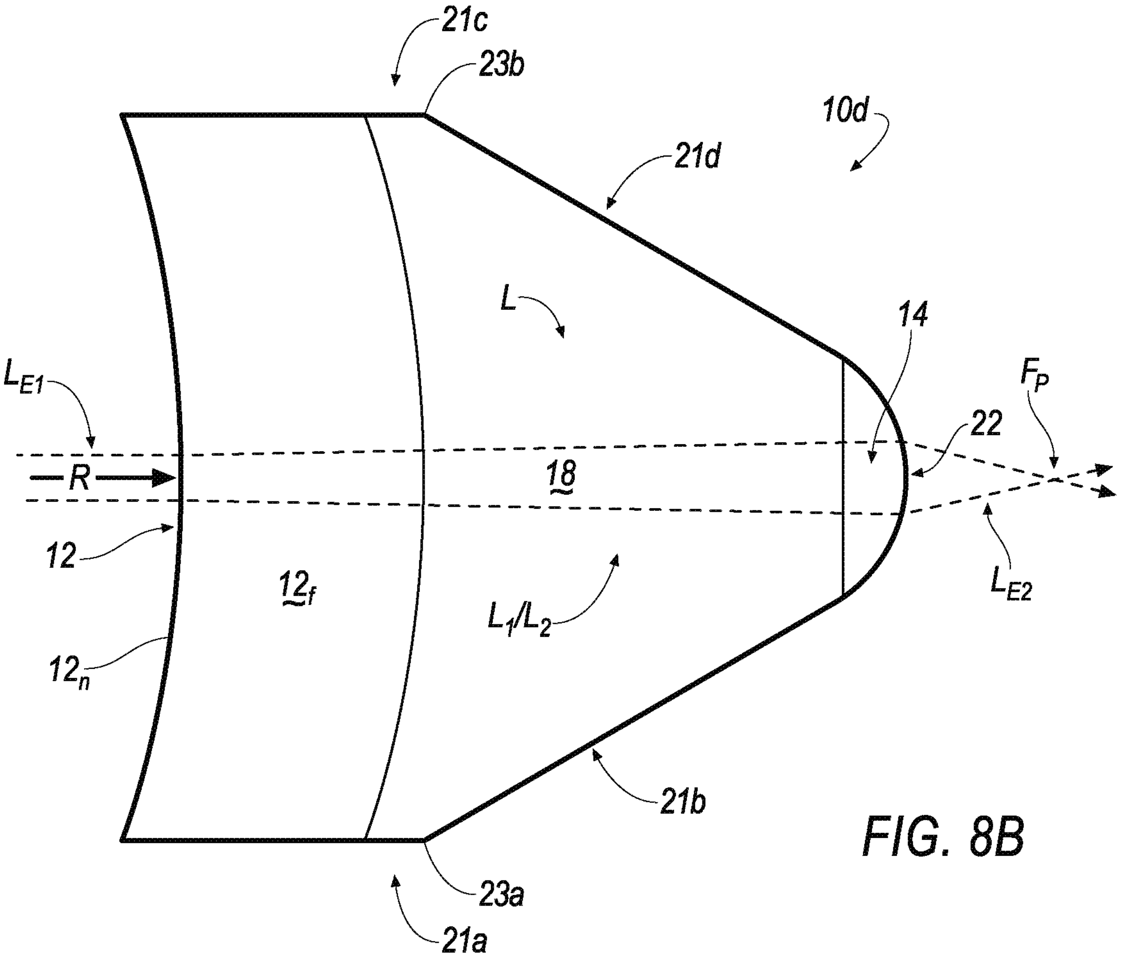
Figure 8C:
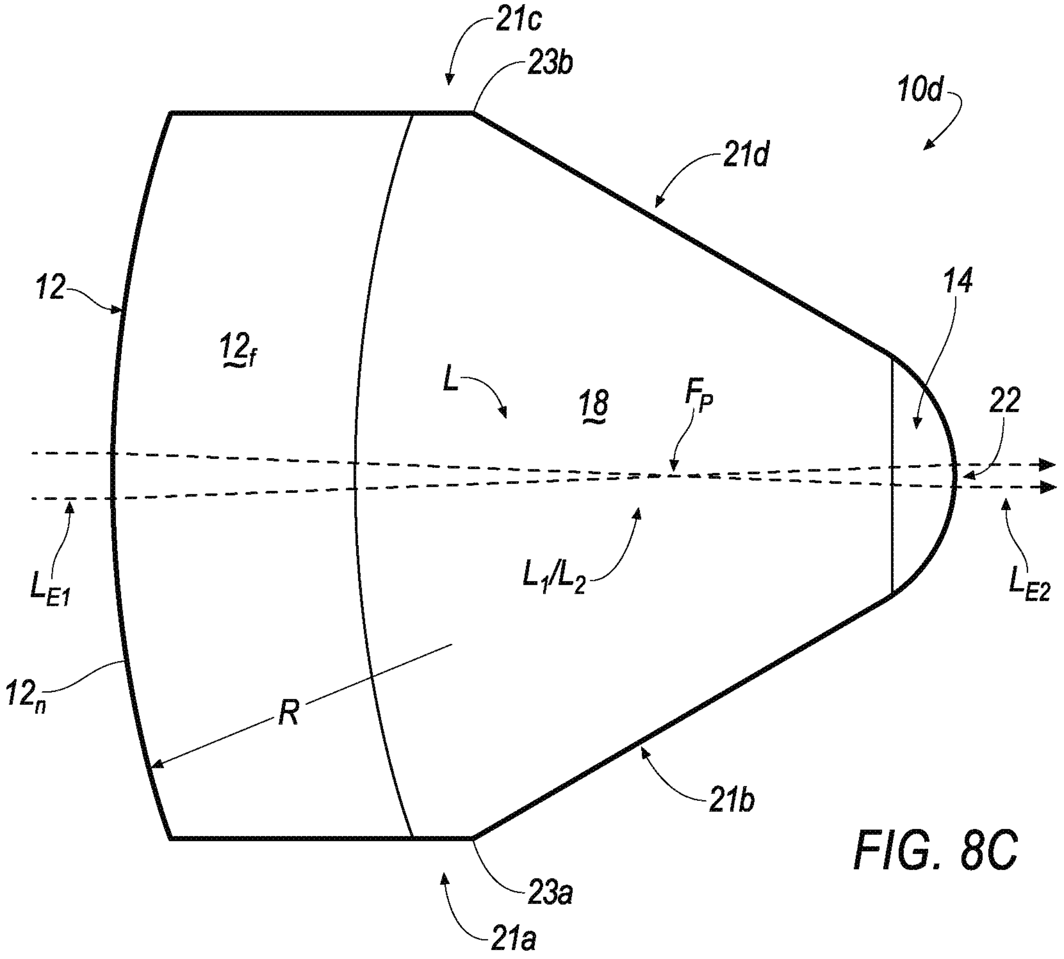
Figure 8D:
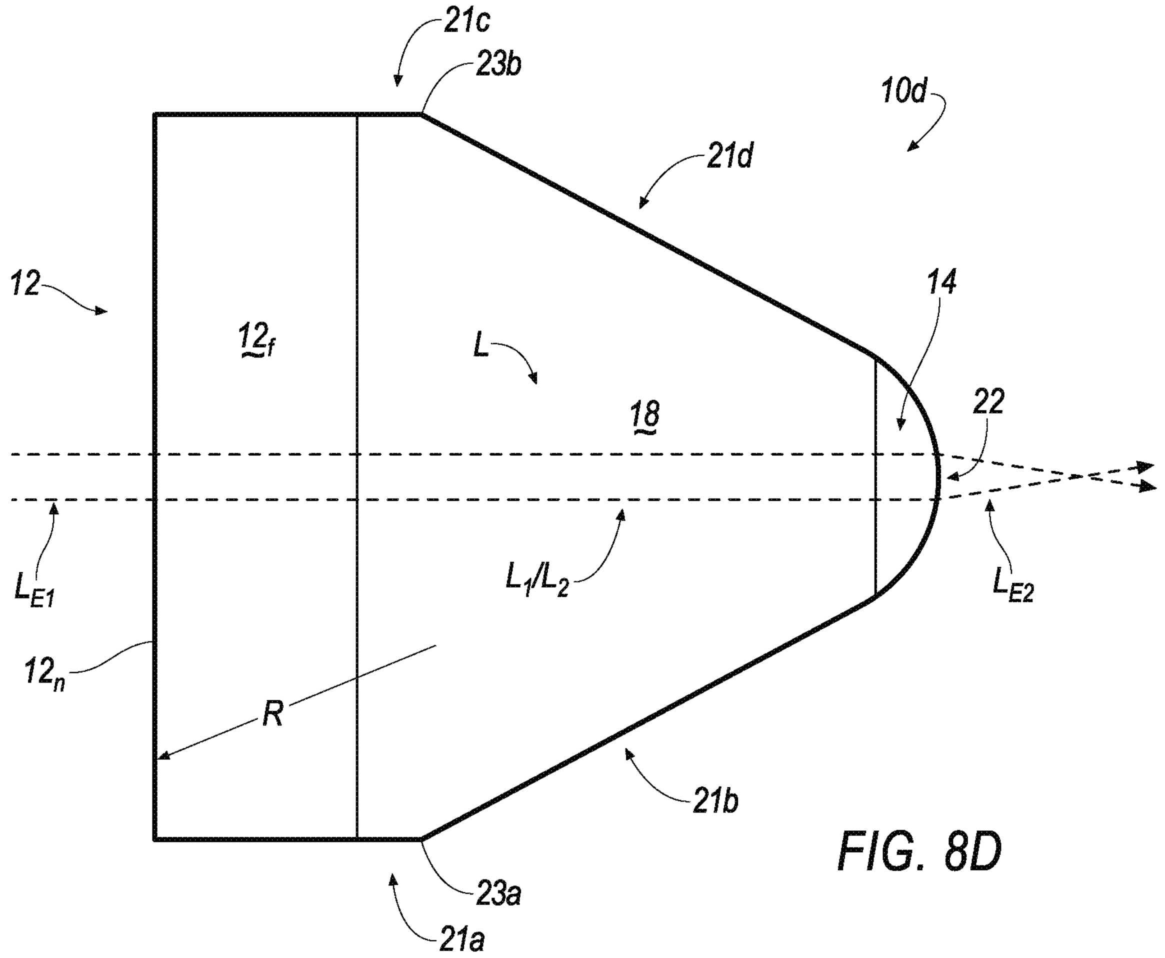
Figure 8E:
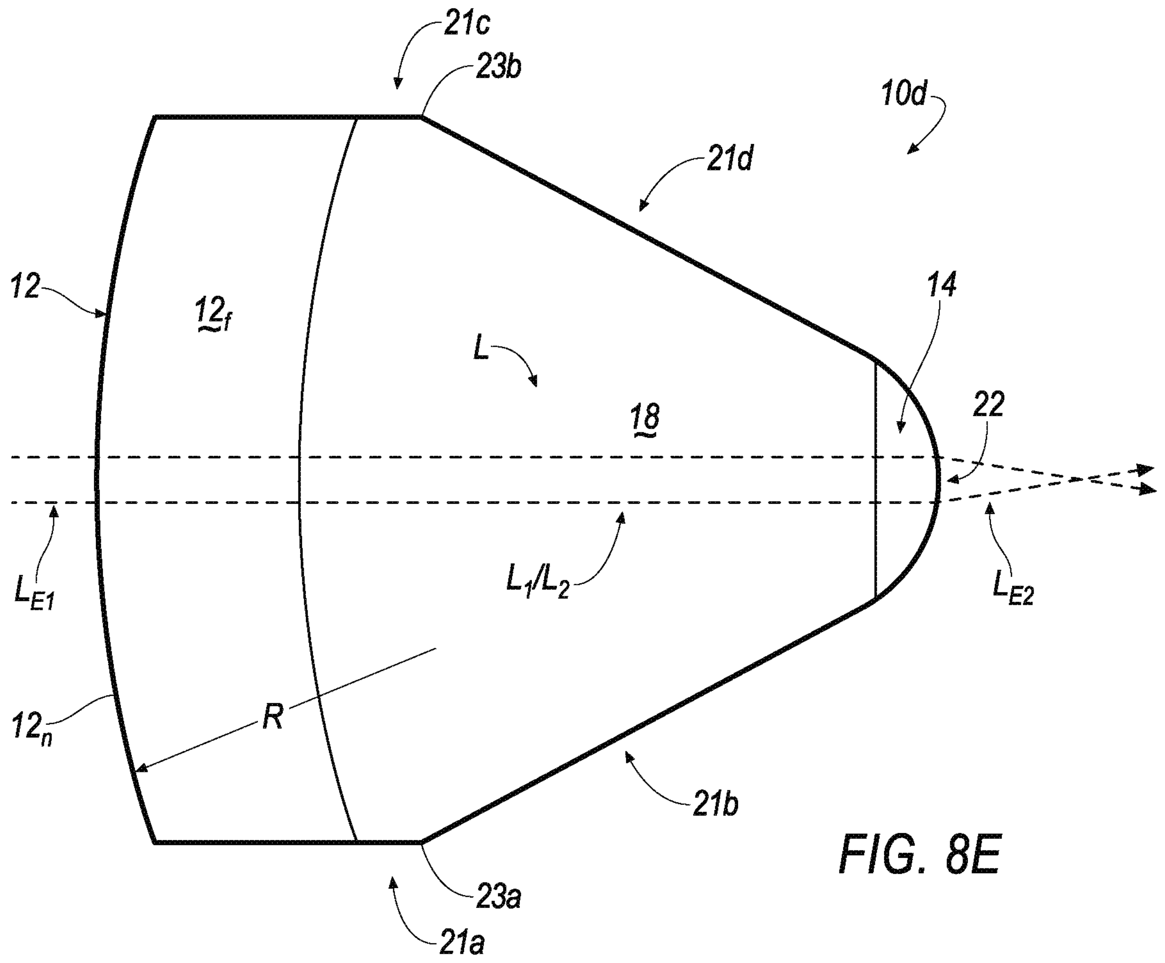
Figure 8F:
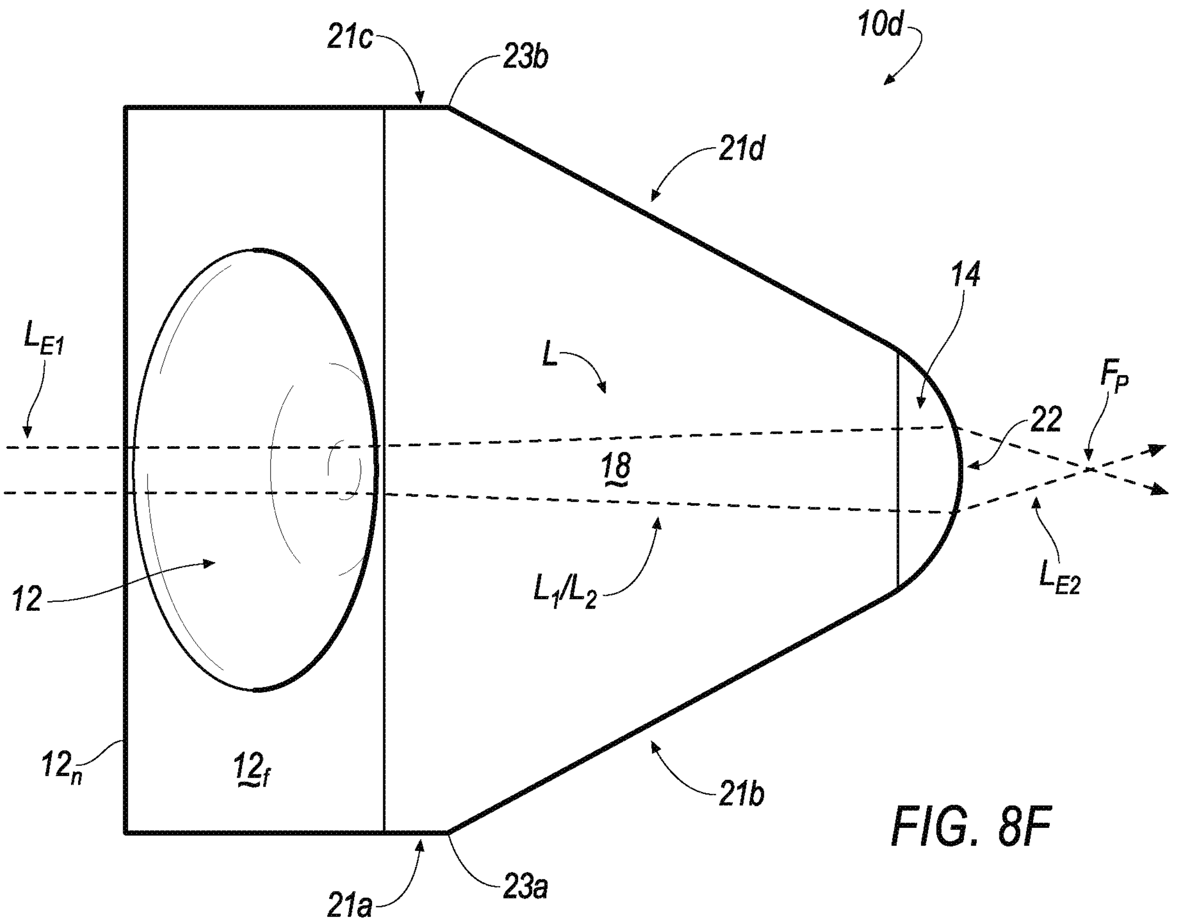
Figure 8G:
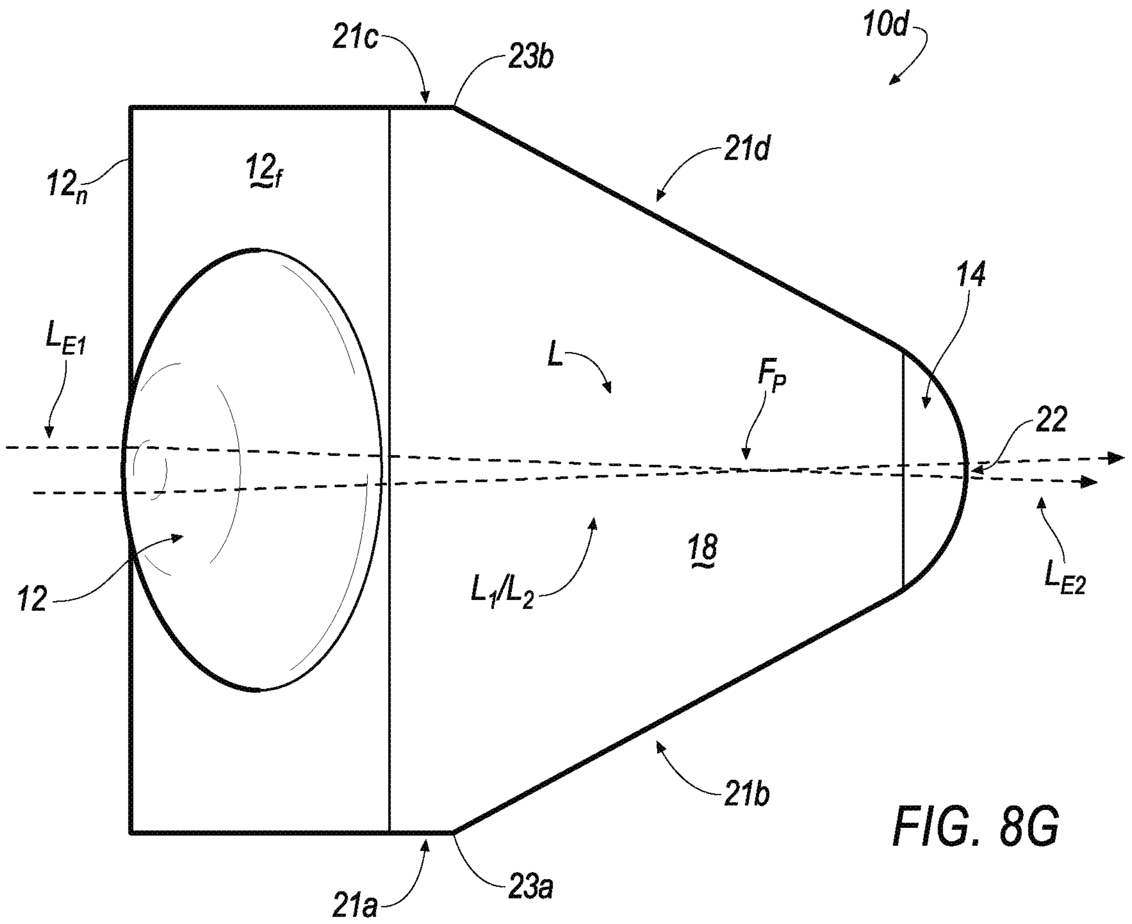
Figure 7G:
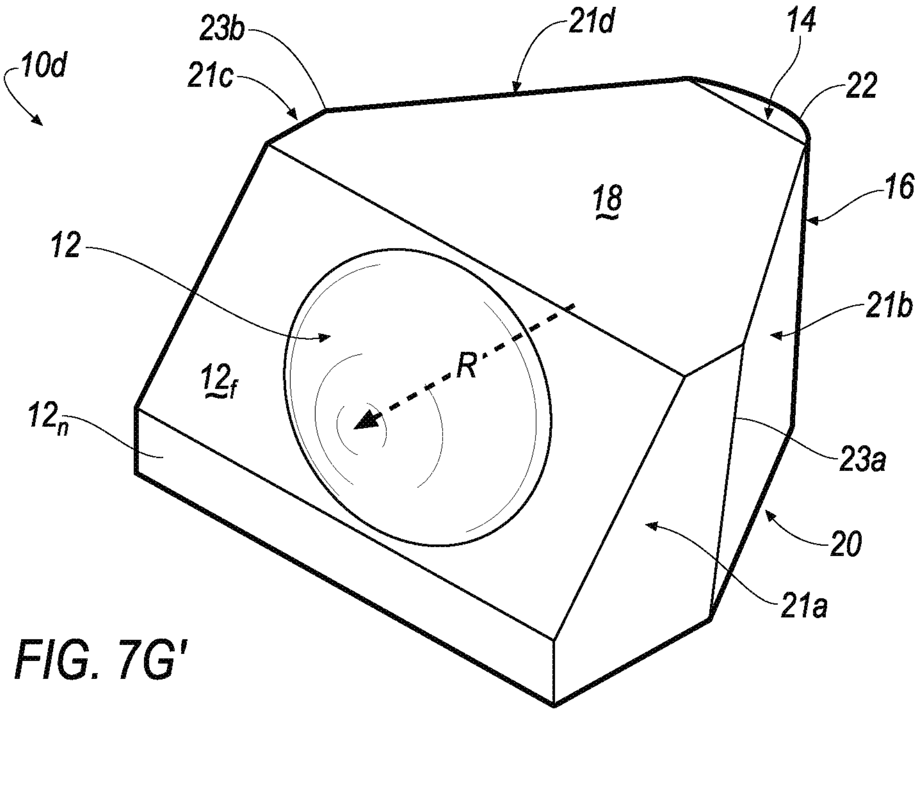
Figure 8A:
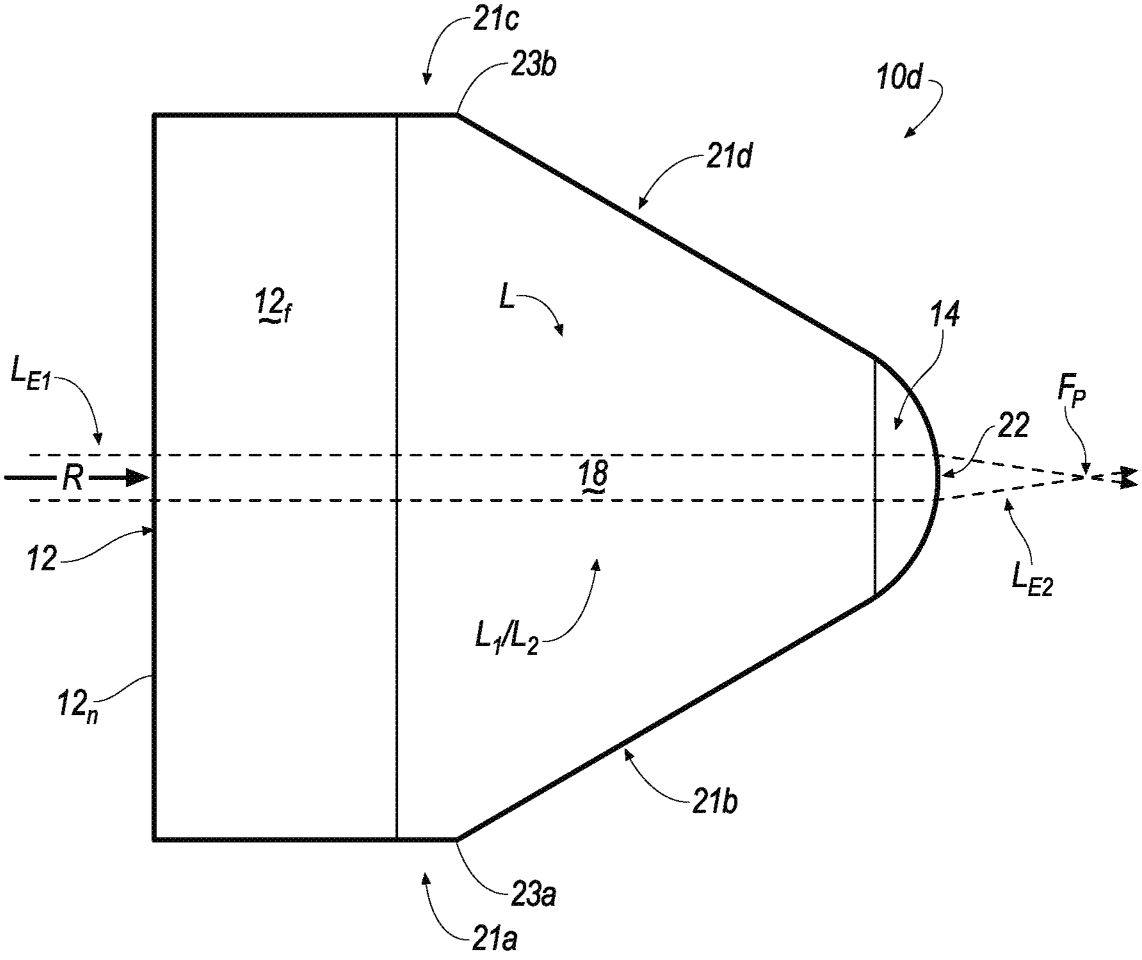

FIG. 8A is a top view of the optomechanical tool of FIG. 7A.

FIG. 8B is a top view of the optomechanical tool of FIG. 7B.

FIG. 8C is a top view of the optomechanical tool of FIG. 7C.

FIG. 8D is a top view of the optomechanical tool of FIG. 7D.

FIG. 8E is a top view of the optomechanical tool of FIG. 7E.

FIG. 8F is a top view of the optomechanical tool of FIG. 7F.

FIG. 8G is a top view of the optomechanical tool of FIG. 7G.

Figure 8H:
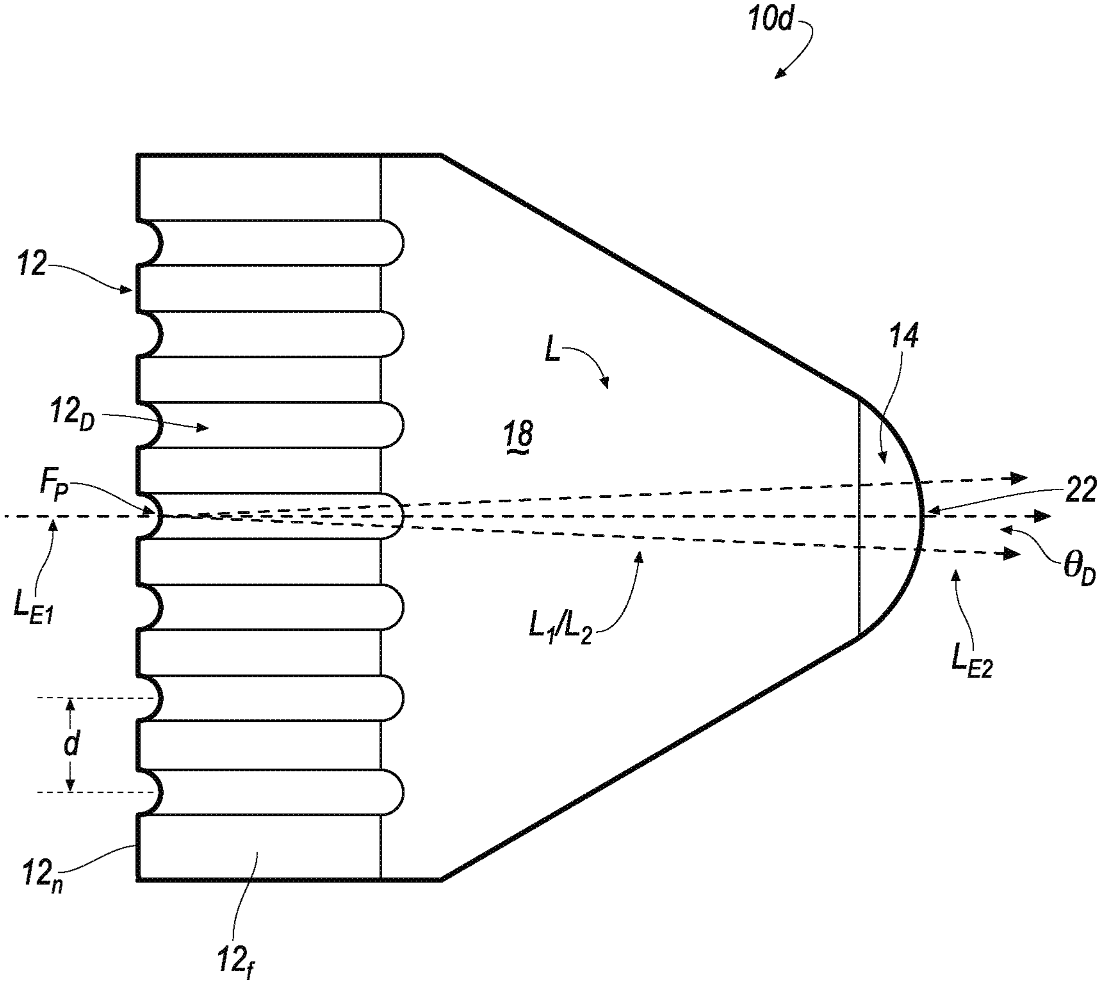

FIG. 8H is a top view of an exemplary optomechanical tool including a functional entrance face segment of a light beam entrance face arranged at an acute back-relief angle defining one or more diffractive surface portions.

Figure 8I:
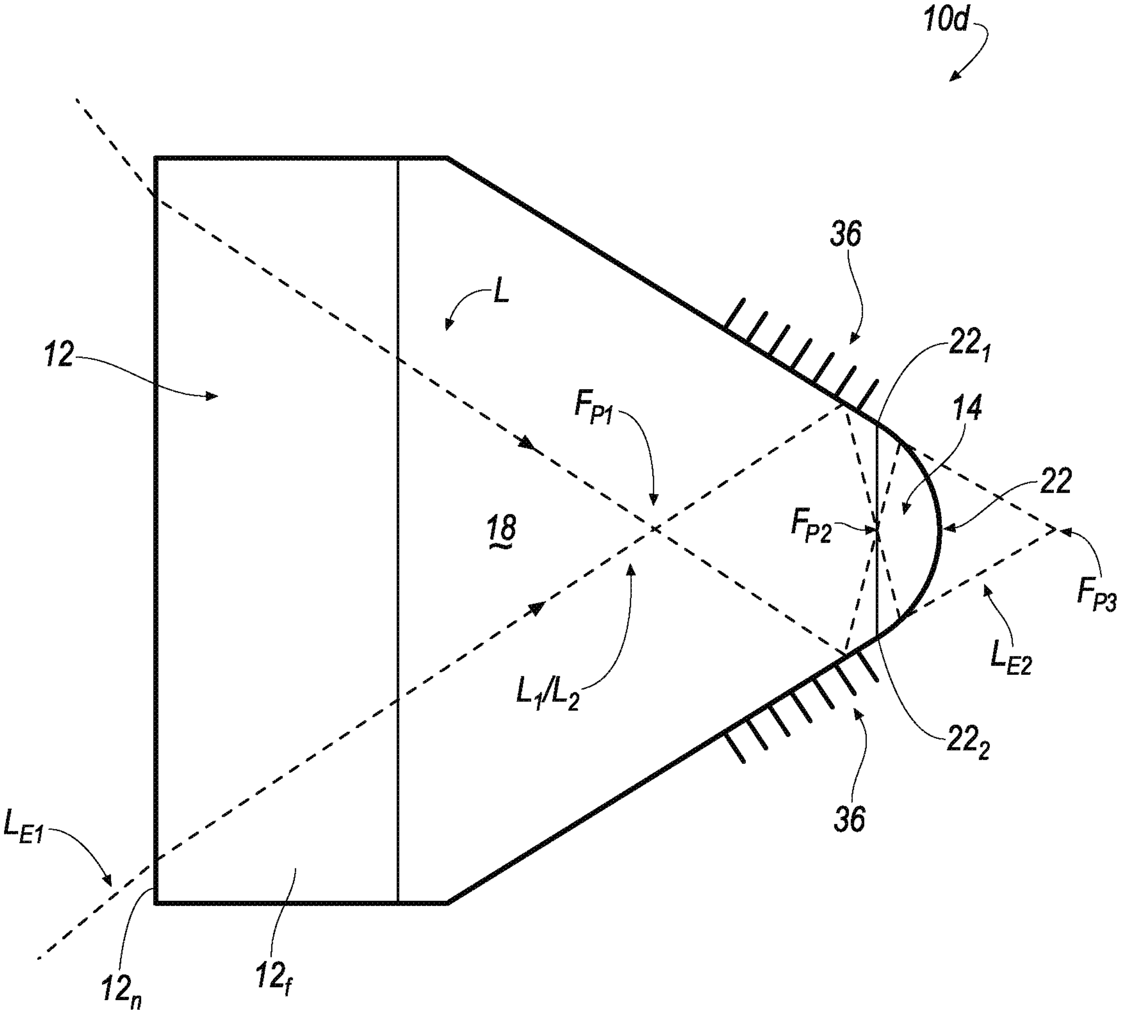

FIG. 8I is a top view of an exemplary optomechanical tool including a functional entrance face segment of a laser beam entrance face arranged at an acute back-relief angle and a reflection-enhancing coating applied to one or more outer surfaces of the optomechanical tool.

Figure 9:
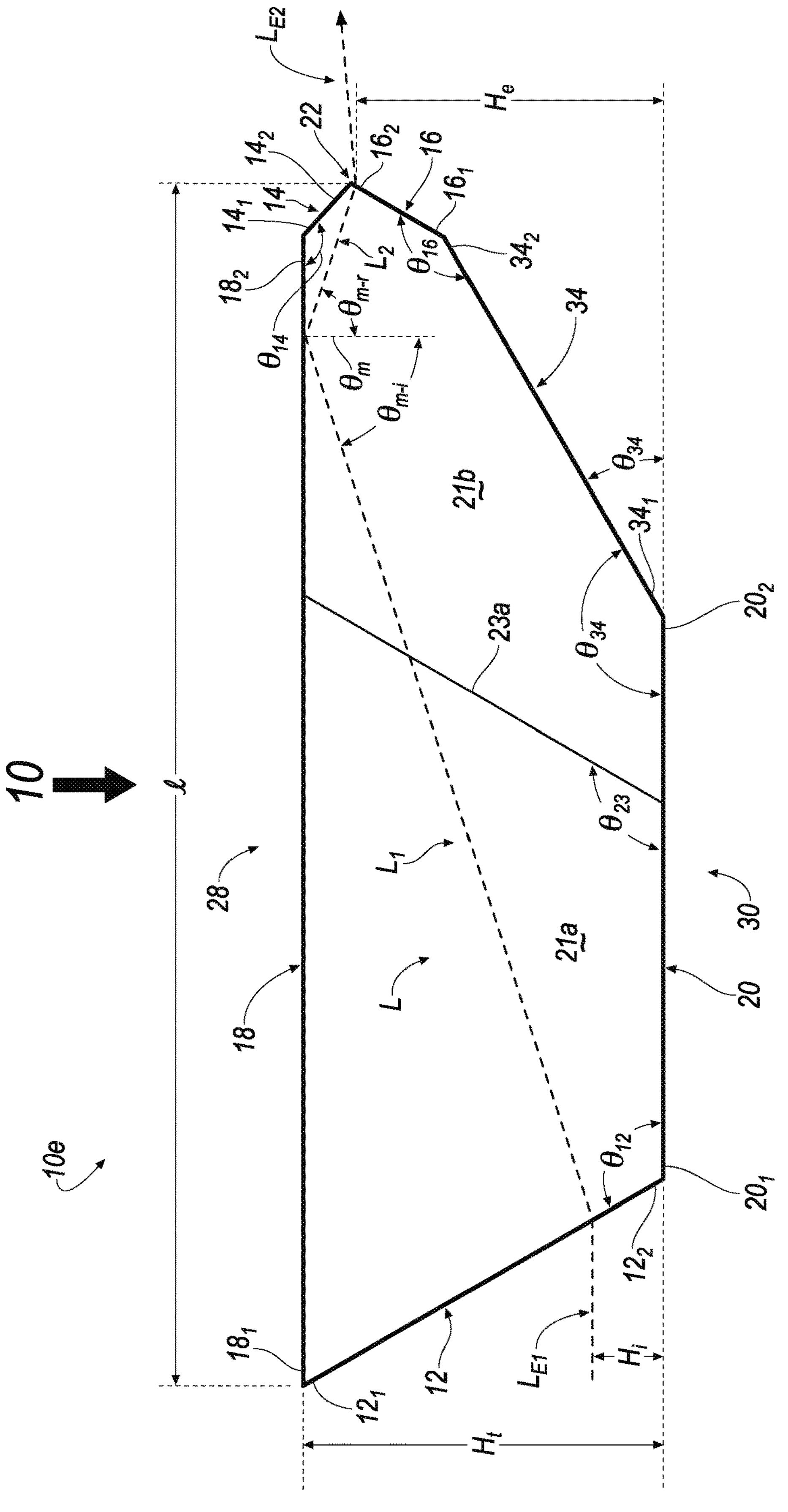

FIG. 9 is a side view of an exemplary optomechanical tool that receives a collimated light beam at a substantially linear, flat or planar light beam entrance face arranged at an obtuse back-relief angle and a secondary clearance face.

Figure 10:
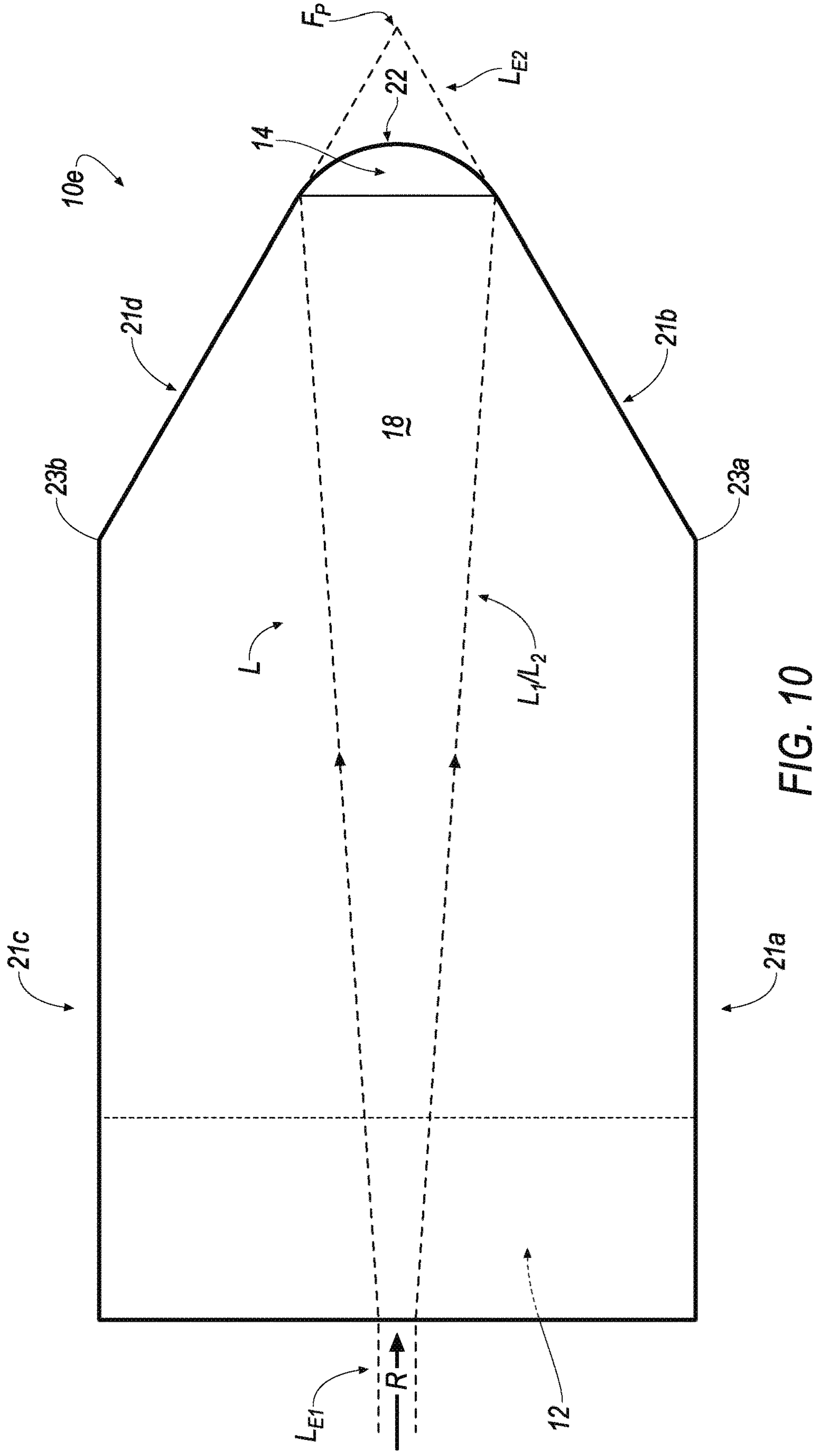

FIG. 10 is a top view of the optomechanical tool of FIG. 9.

Figure 11A:
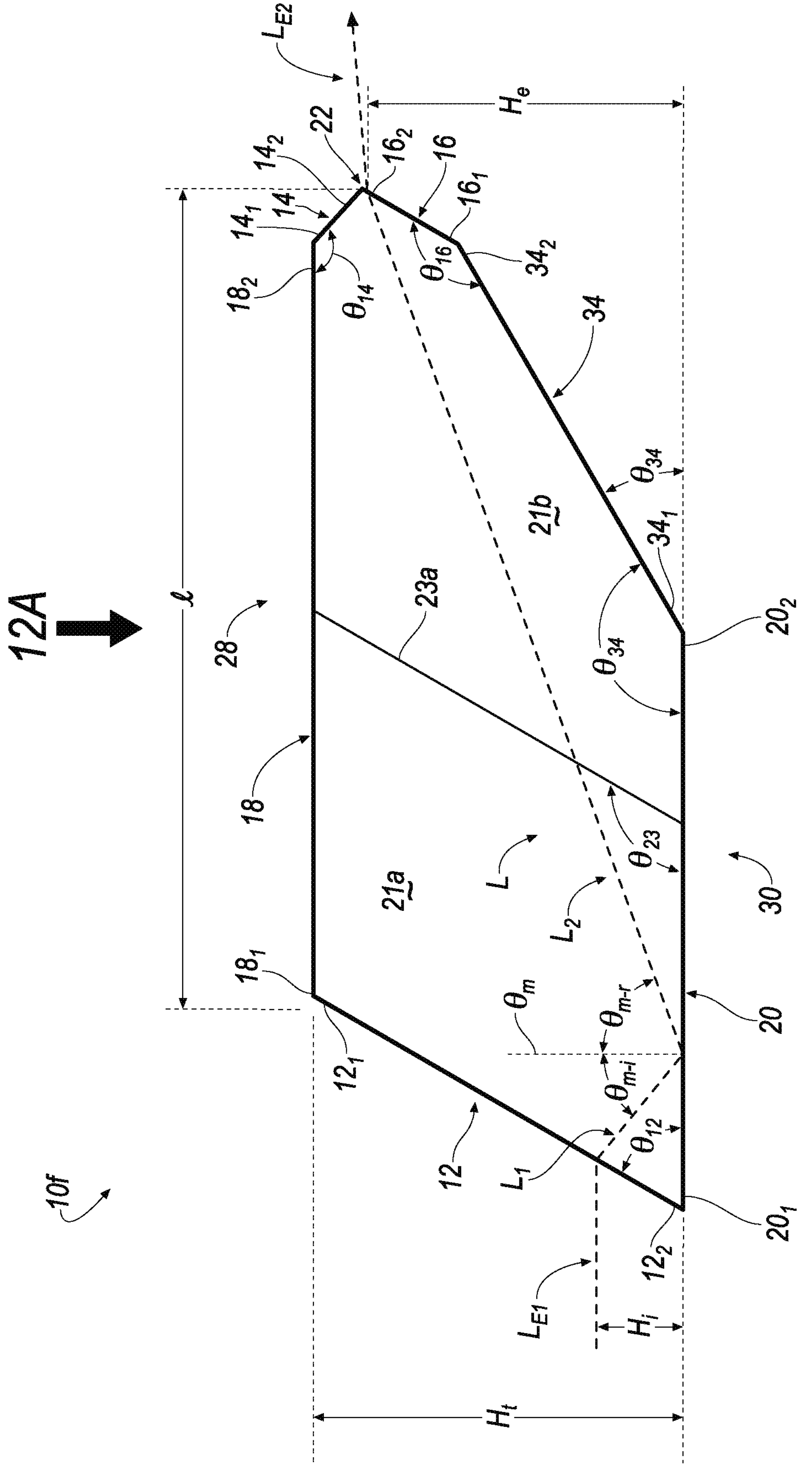

FIG. 11A is a side view of an exemplary optomechanical tool that receives a collimated light beam at a substantially linear, flat or planar light beam entrance face arranged at an acute back-relief angle and a secondary clearance face.

Figure 11B:
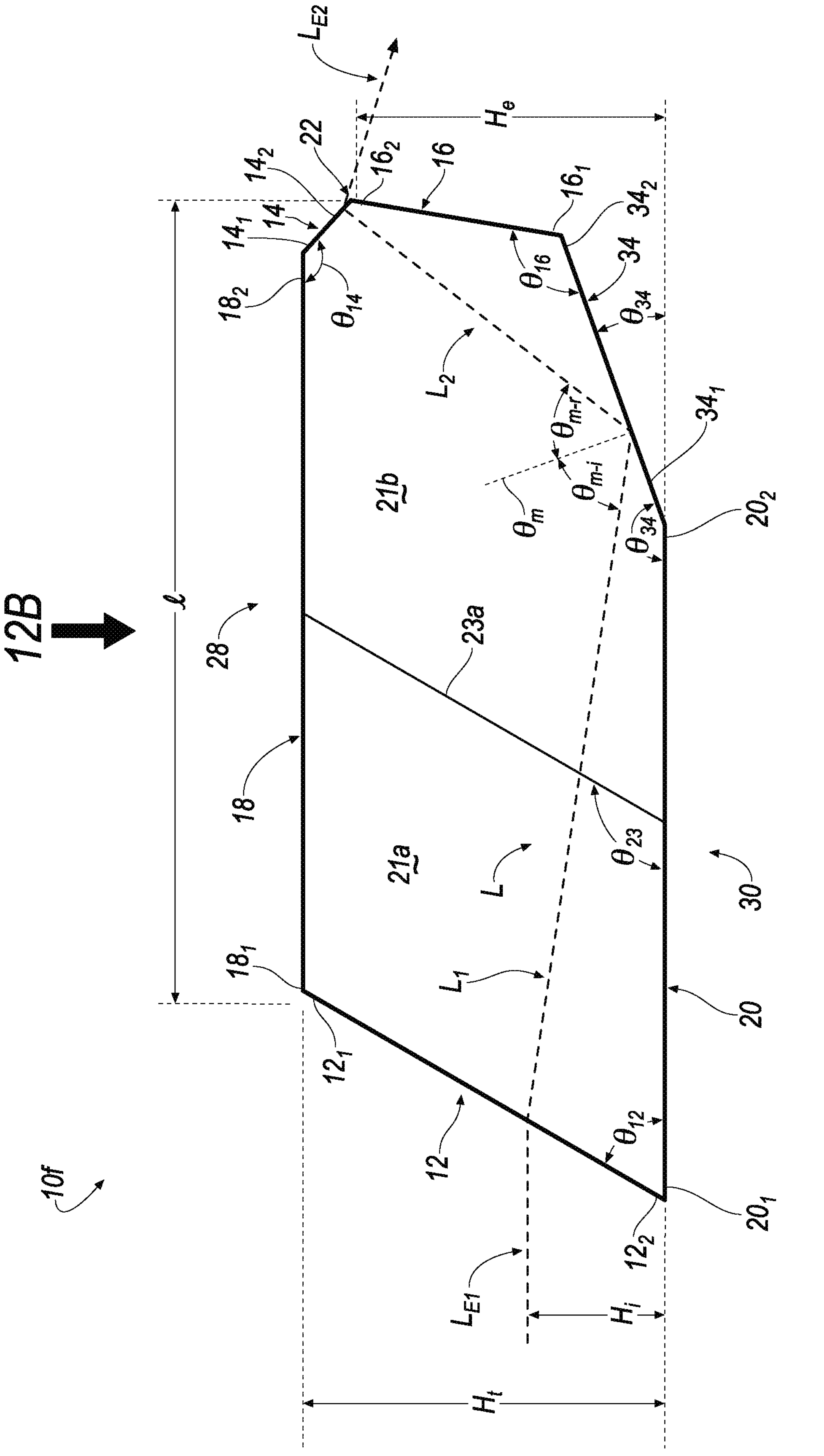

FIG. 11B is another side view of an exemplary optomechanical tool that receives a collimated light beam at a substantially linear, flat or planar light beam entrance face arranged at an acute back-relief angle and a secondary clearance face.

Figure 12A:
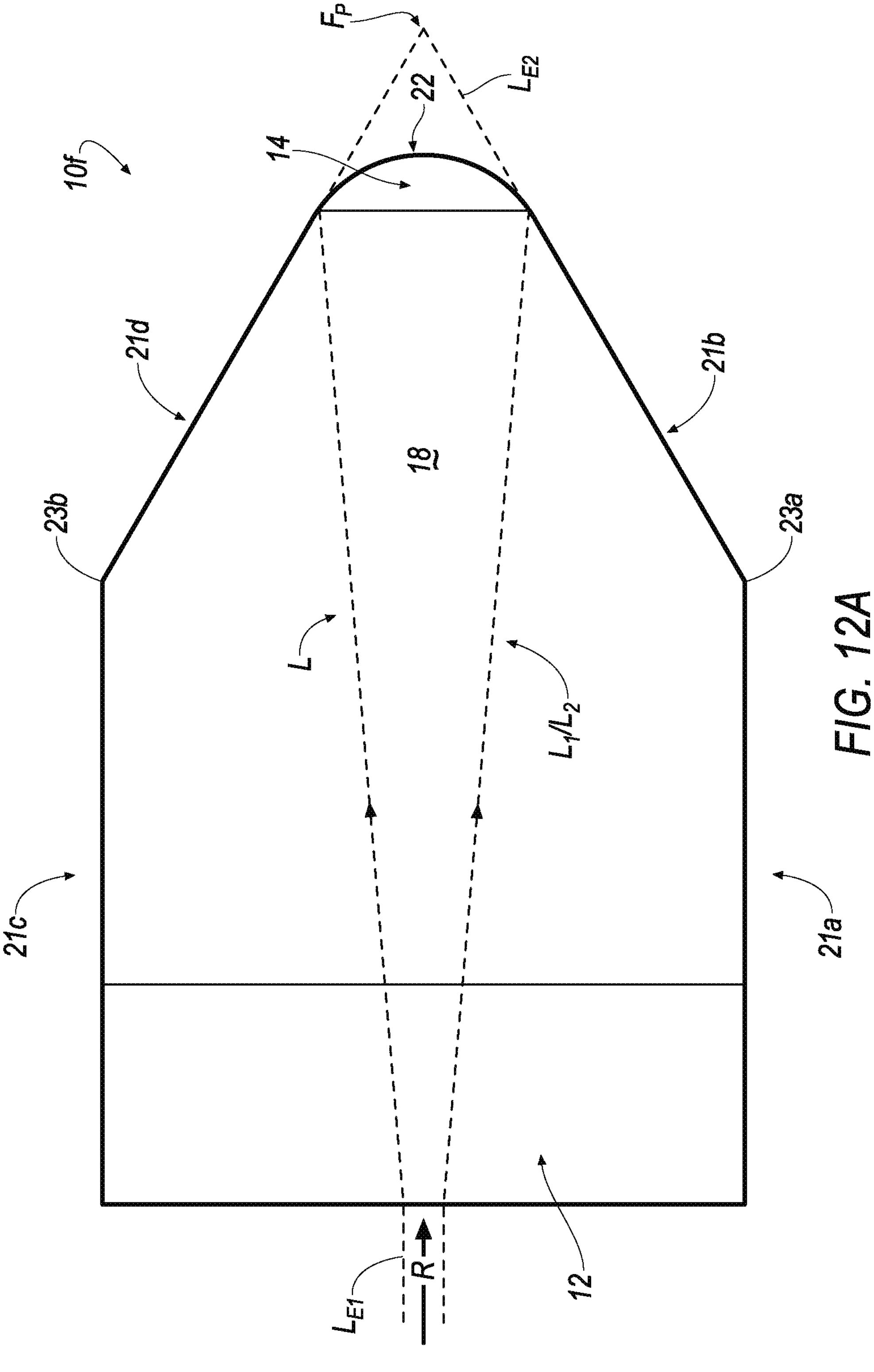

FIG. 12A is atop view of the optomechanical tool of FIG. 11A.

Figure 12B:
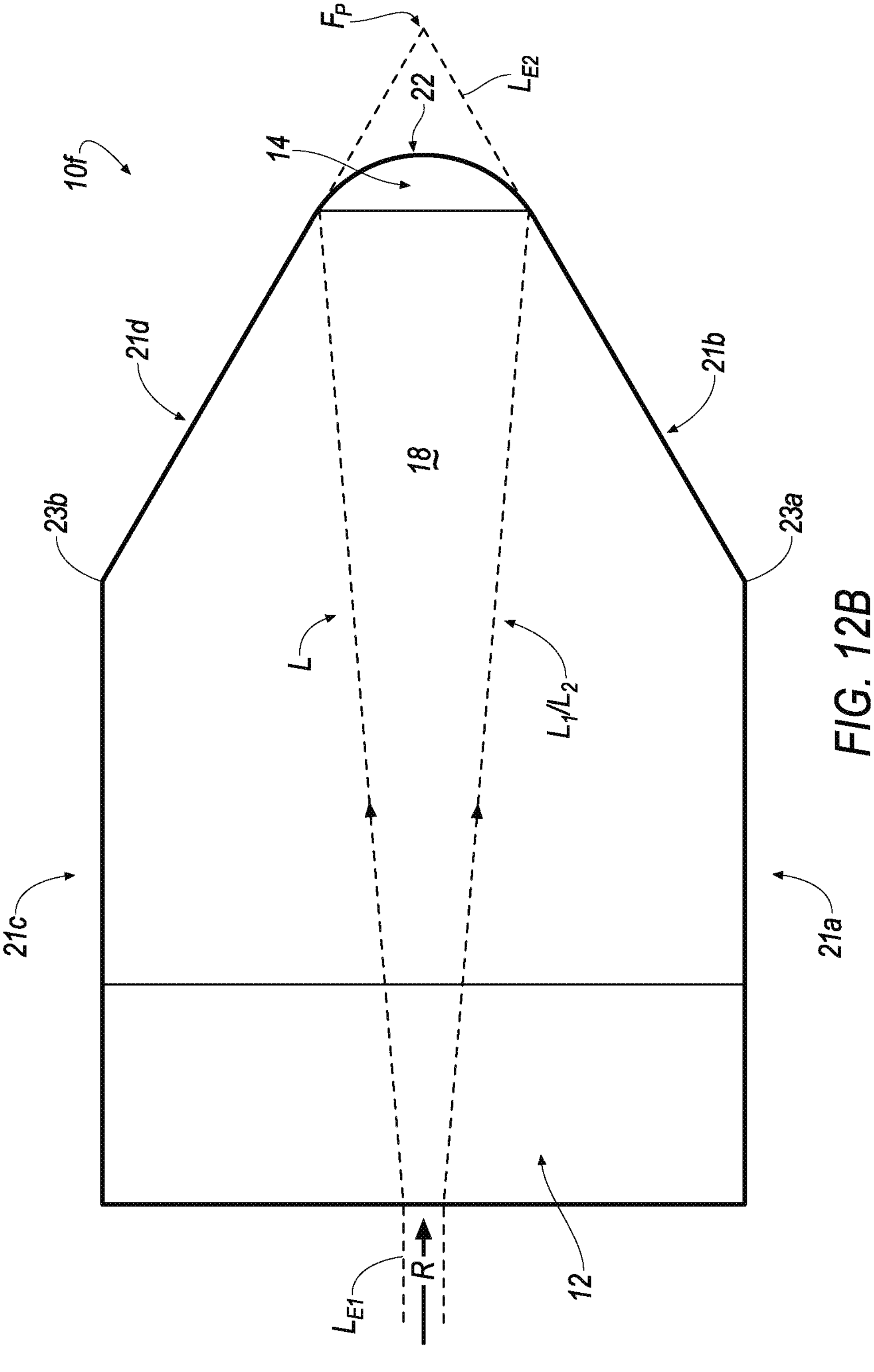

FIG. 12B is a top view of the optomechanical tool of FIG. 11B.

Figure 13:
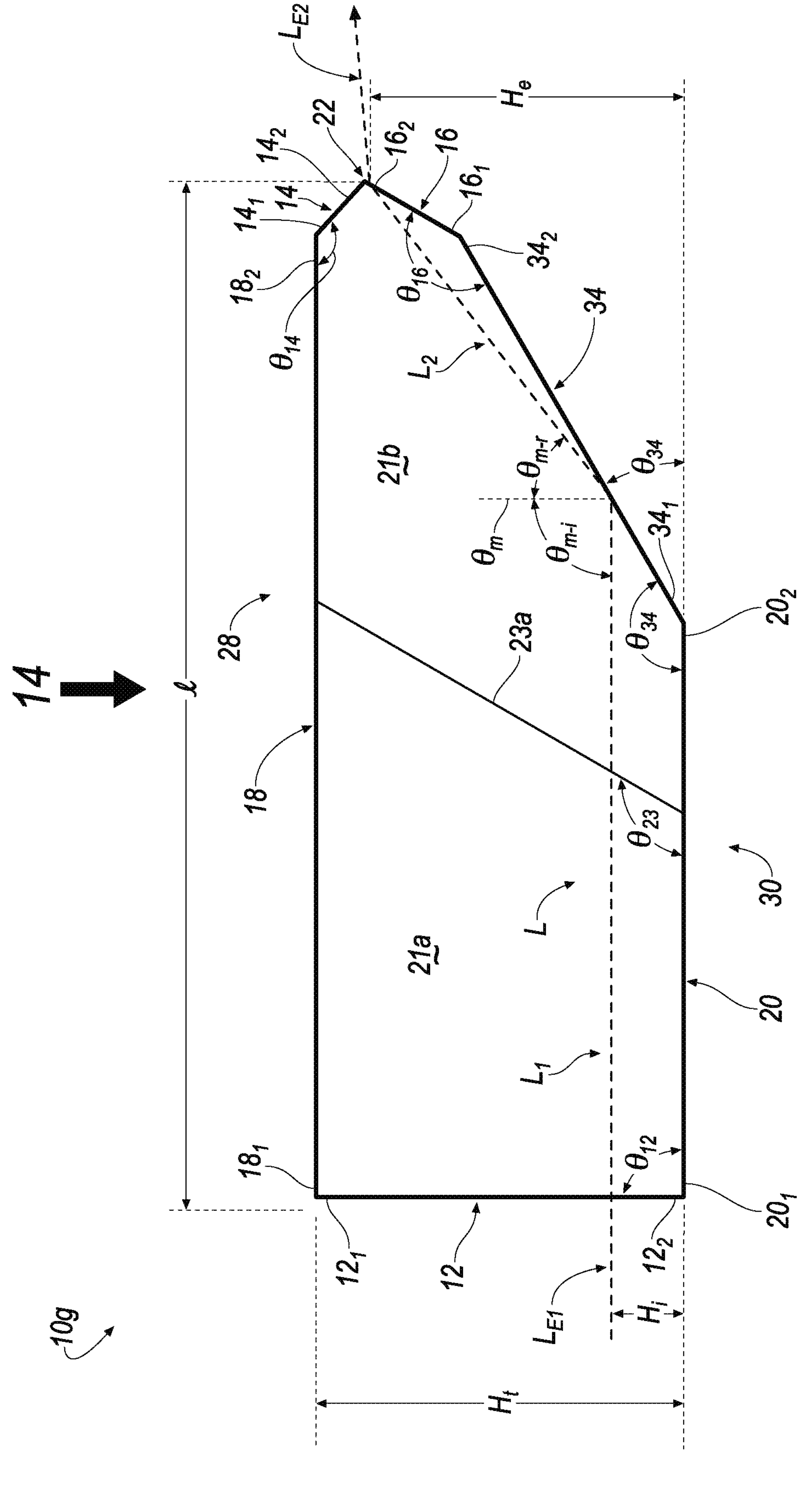

FIG. 13 is a side view of an exemplary optomechanical tool that receives a collimated light beam at a substantially linear, flat or planar light beam entrance face arranged at a perpendicular or right back-relief angle and a secondary clearance face.

Figure 14:
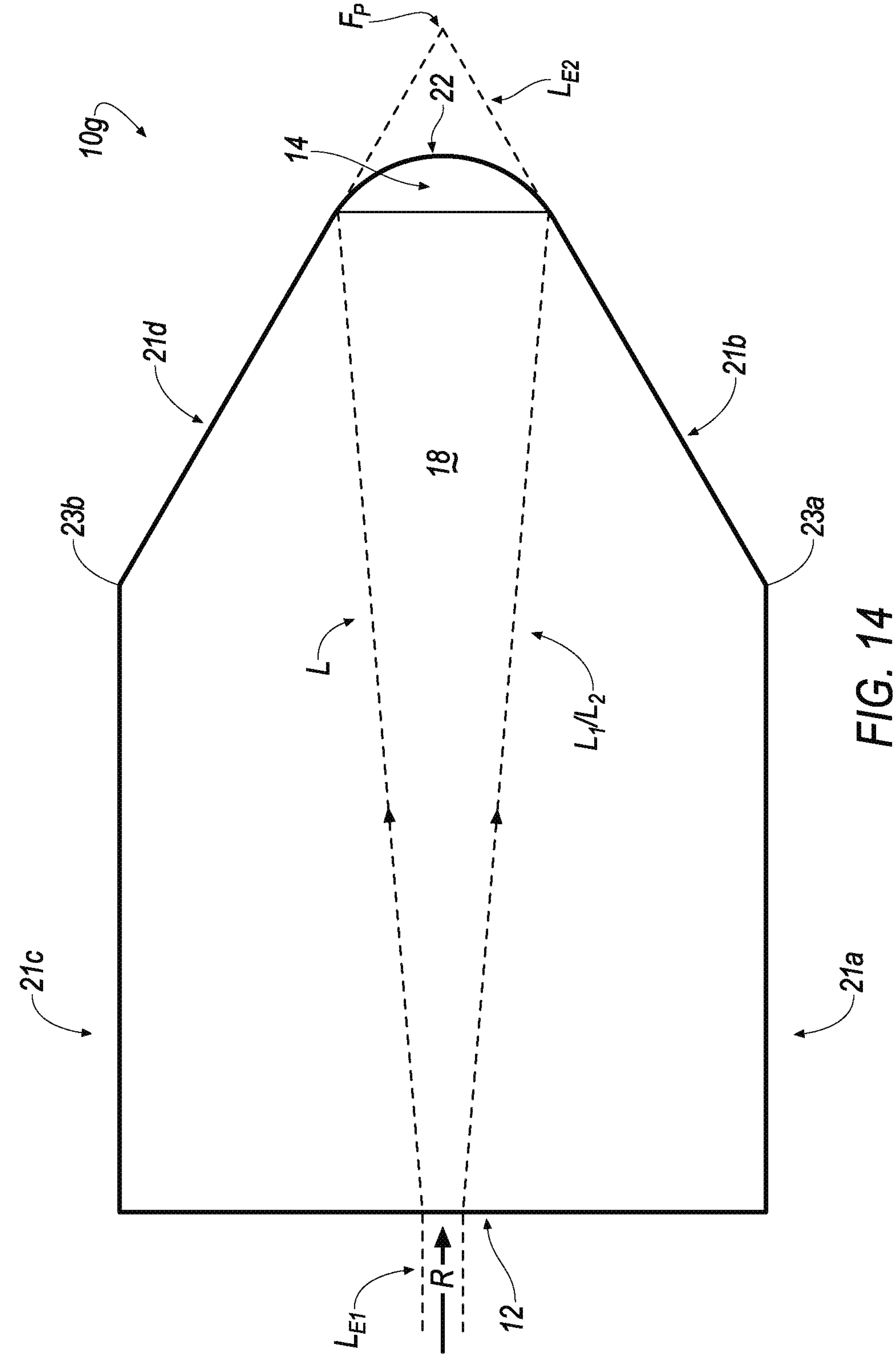

FIG. 14 is a top view of the optomechanical tool of FIG. 13.

Figure 15:
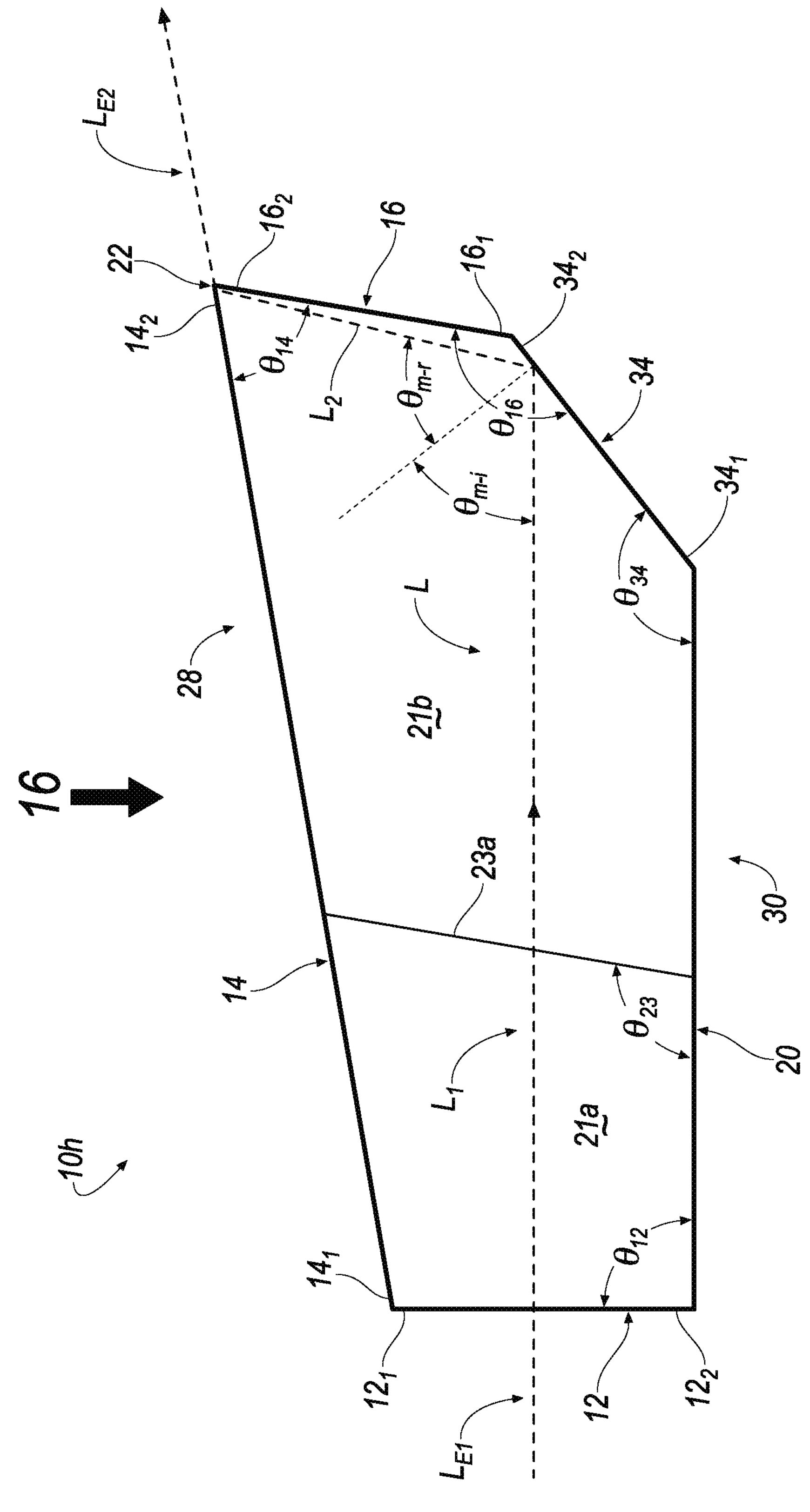

FIG. 15 is a side view of an exemplary optomechanical tool that receives a collimated light beam at a substantially linear, flat or planar light beam entrance face arranged at a perpendicular or right back-relief angle, a secondary clearance face, and no rake side face.

Figure 16:
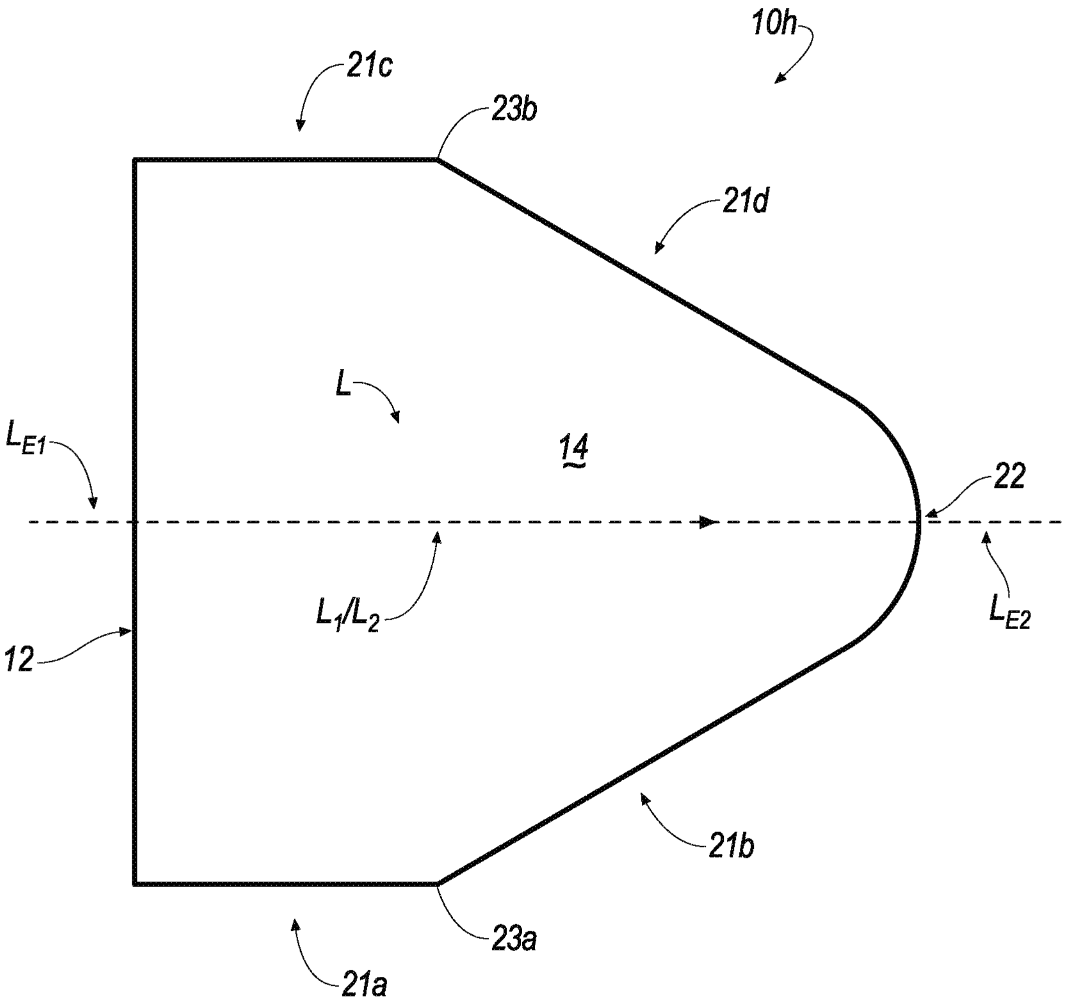

FIG. 16 is a top view of the optomechanical tool of FIG. 15.

Figure 17:
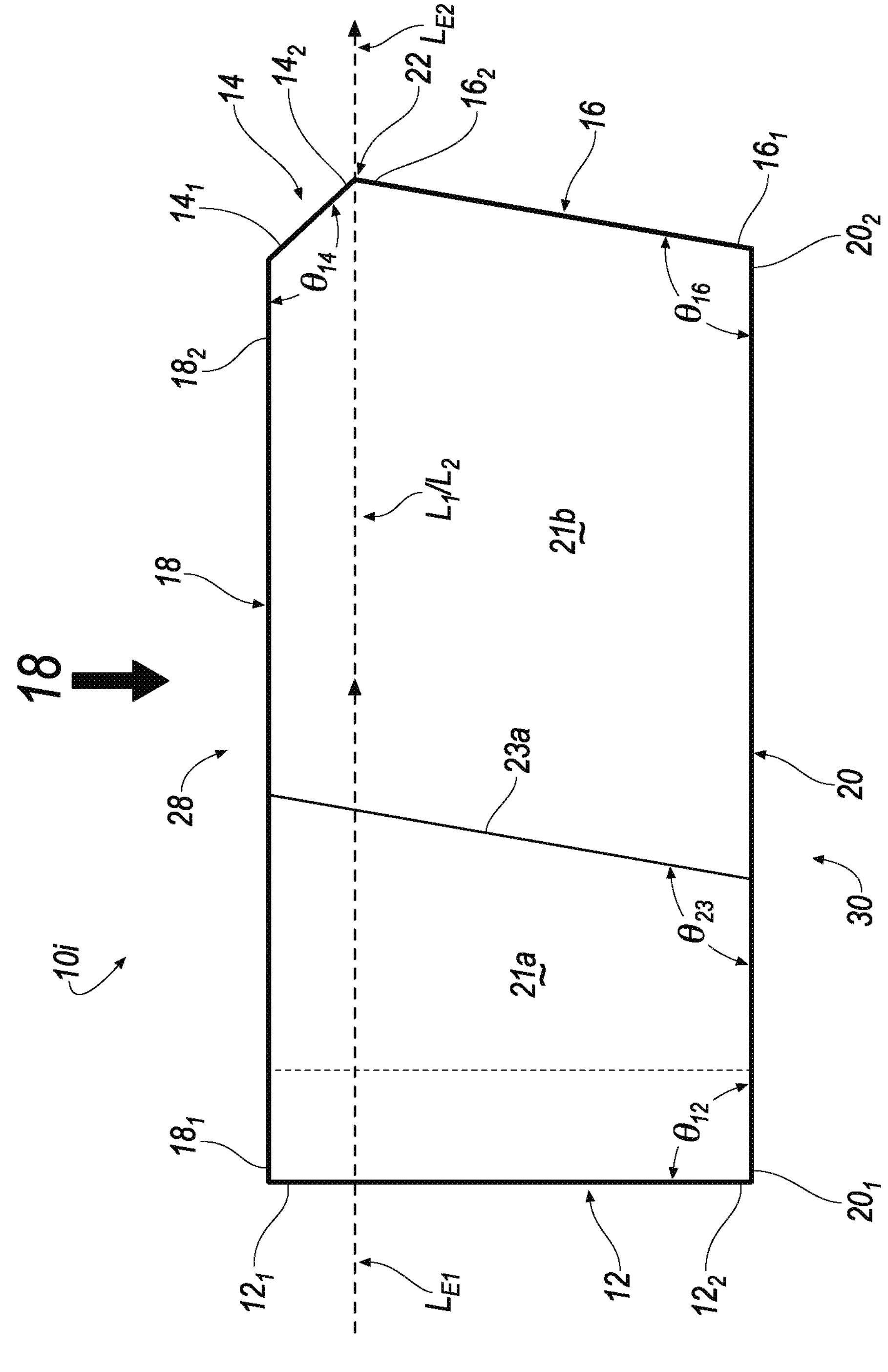

FIG. 17 is a side view of an exemplary optomechanical tool that receives a collimated light beam at an inwardly-projecting wedge shape light beam entrance face arranged at a perpendicular or right back-relief angle.

FIG. 17' is a perspective view of the optomechanical tool of FIG. 17.

Figure 18:
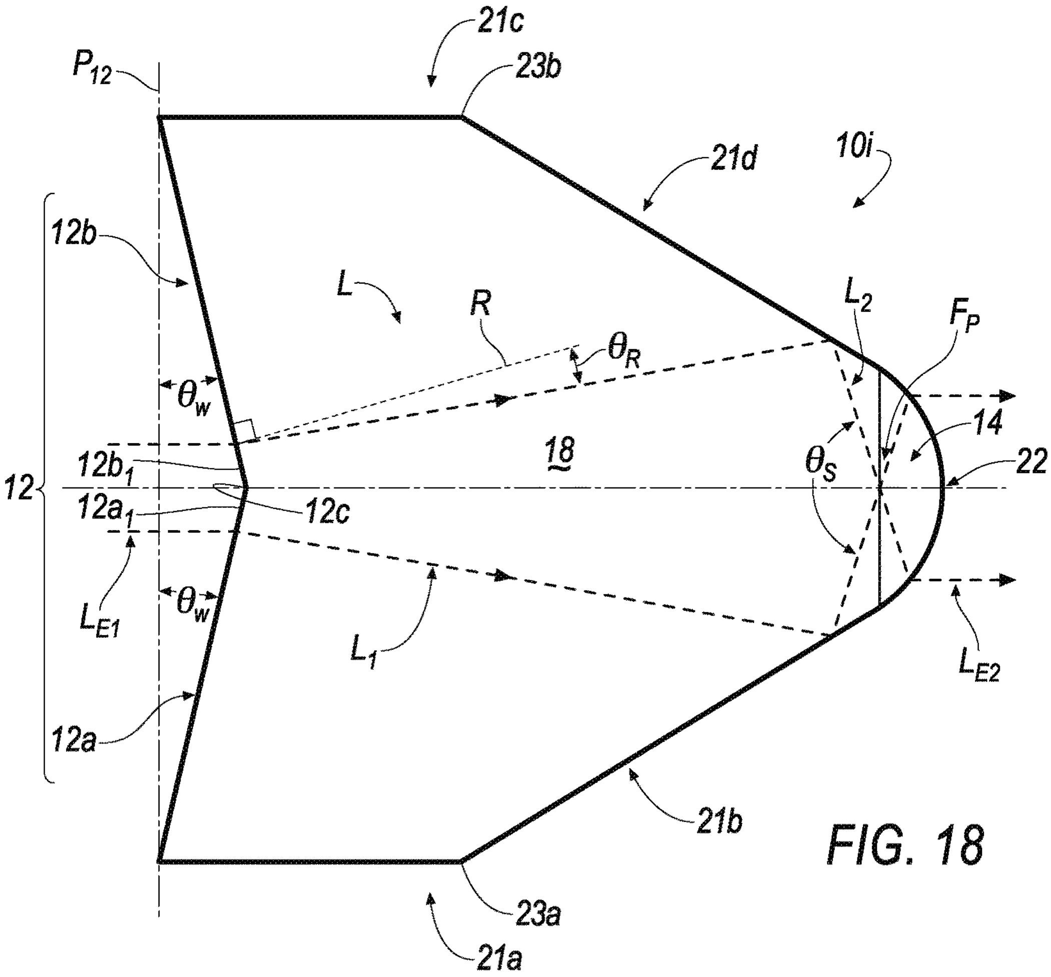
Figure 17:
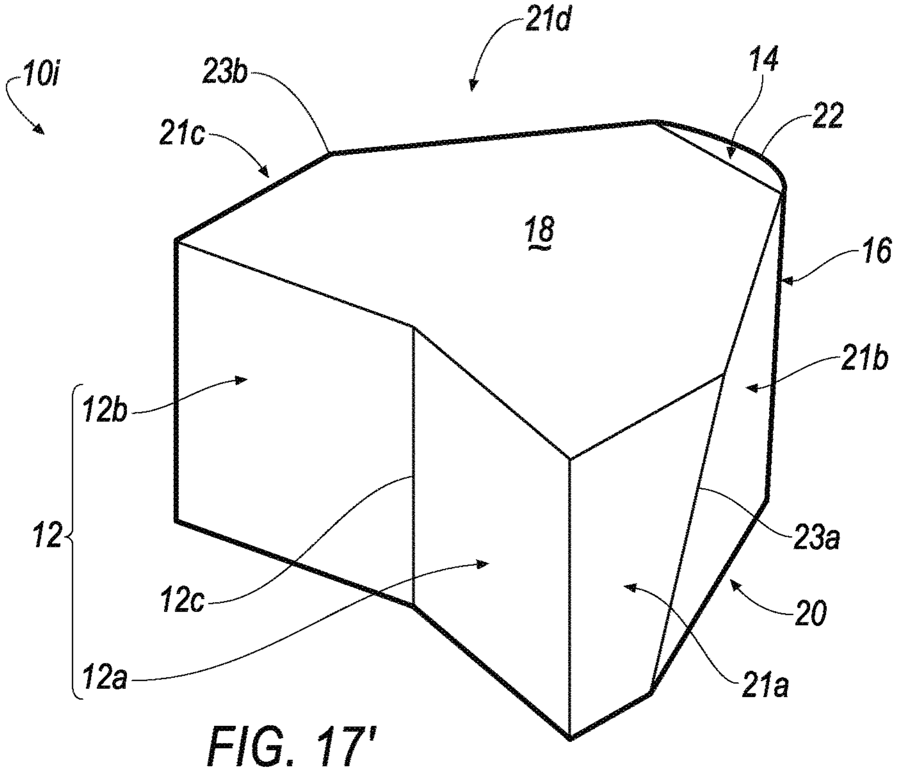

FIG. 18 is a top view of the optomechanical tool of FIG. 17.

Figure 19:
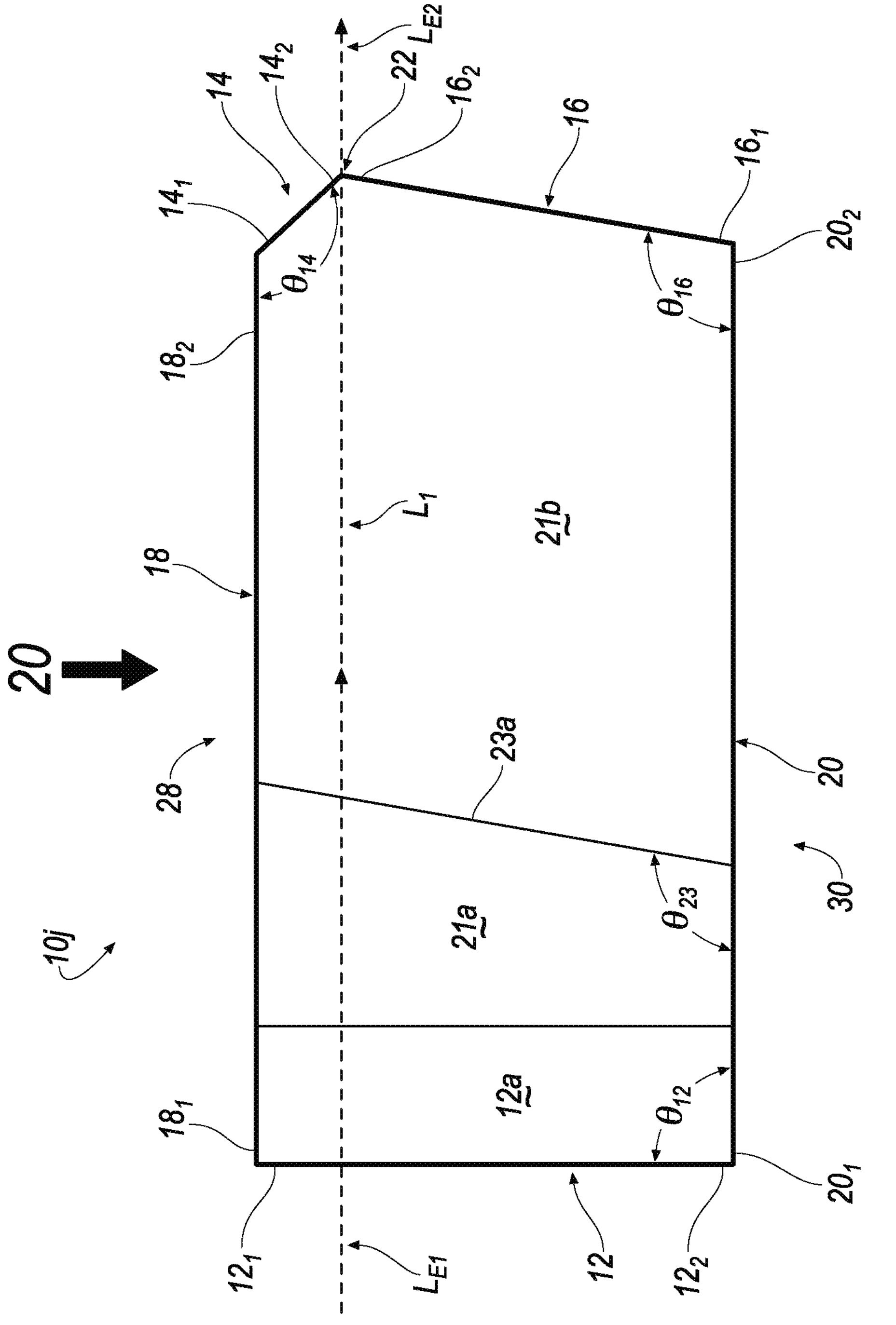

FIG. 19 is a side view of an exemplary optomechanical tool that receives a collimated light beam at an outwardly-projecting wedge shape light beam entrance face arranged at a perpendicular or right back-relief angle.

FIG. 19' is a perspective view of the optomechanical tool of FIG. 19.

Figure 20:
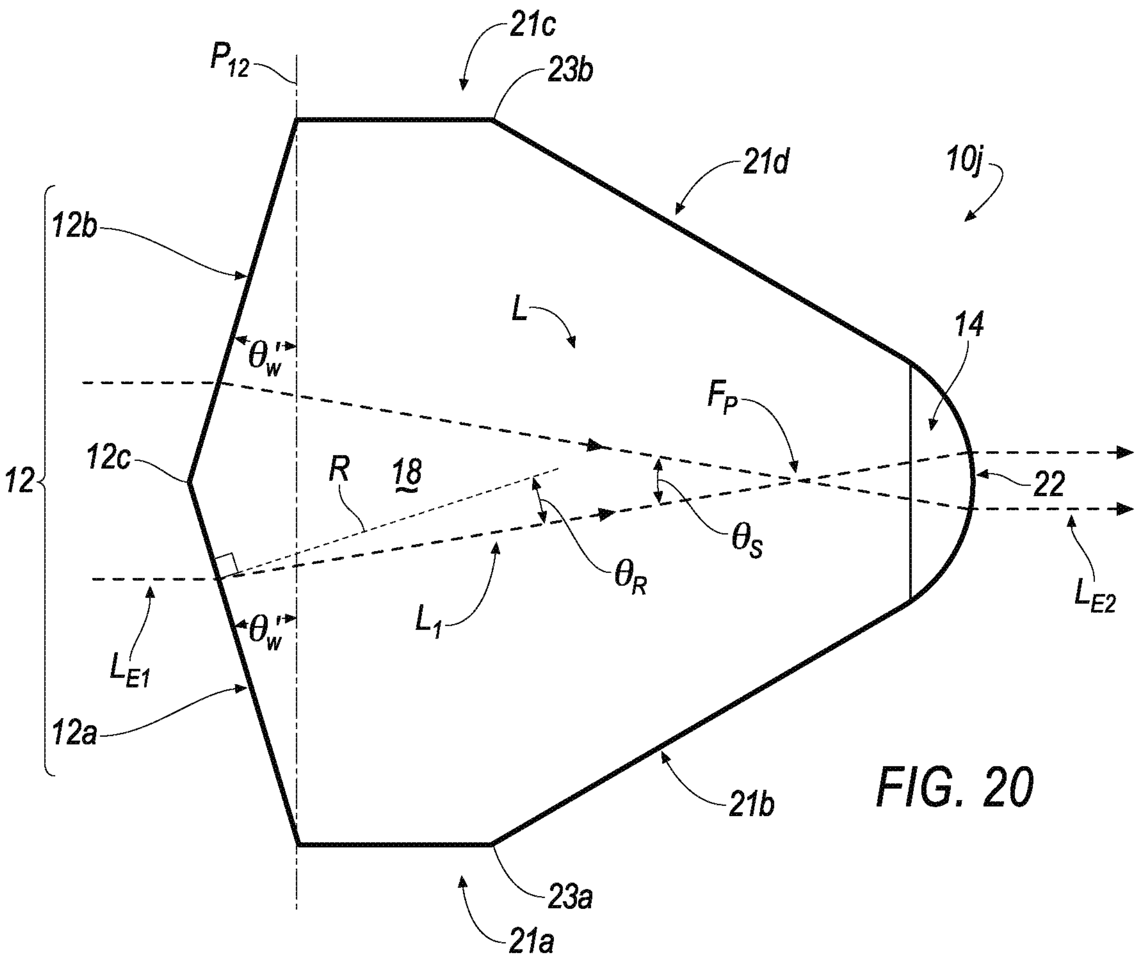
Figure 19:
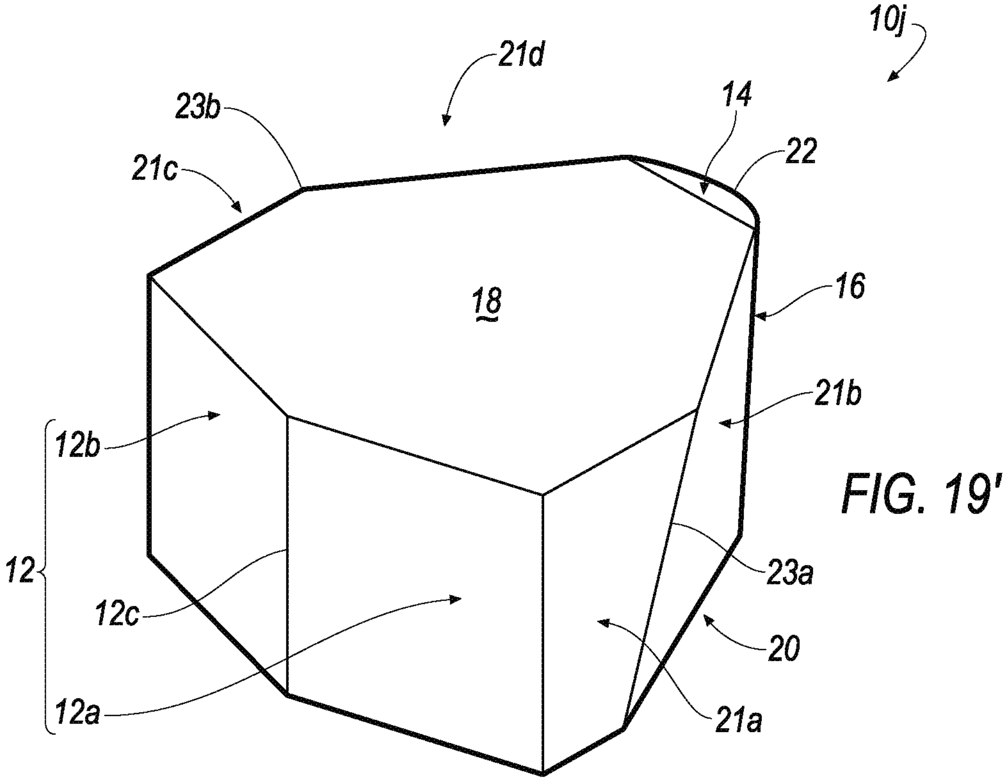

FIG. 20 is a top view of the optomechanical tool of FIG. 19.

Figure 21:
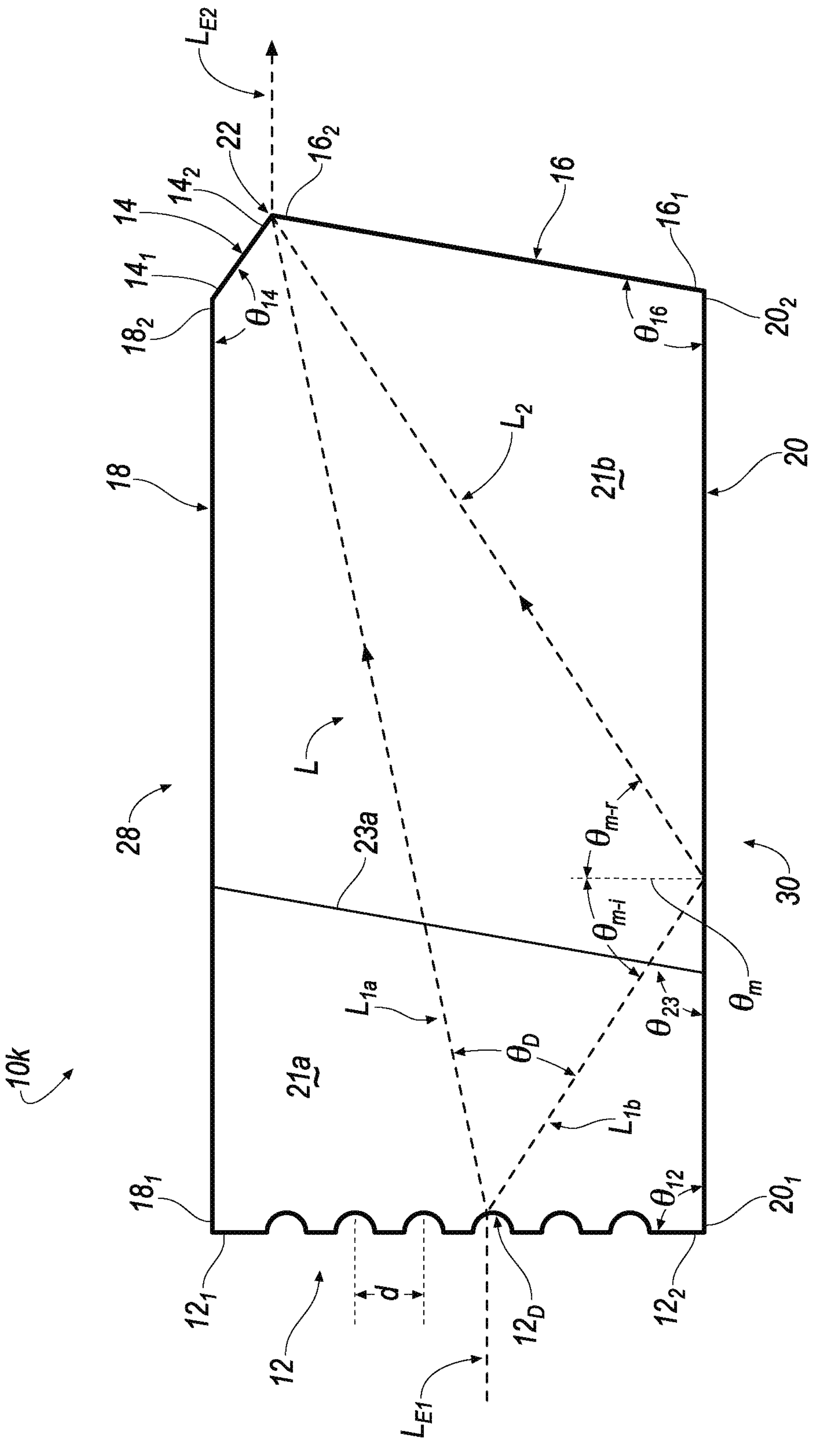

FIG. 21 is a side view of an exemplary optomechanical tool that receives a collimated light beam at a light beam entrance face including one or more diffractive surface portions arranged at a perpendicular or right back-relief angle.

Figure 22:
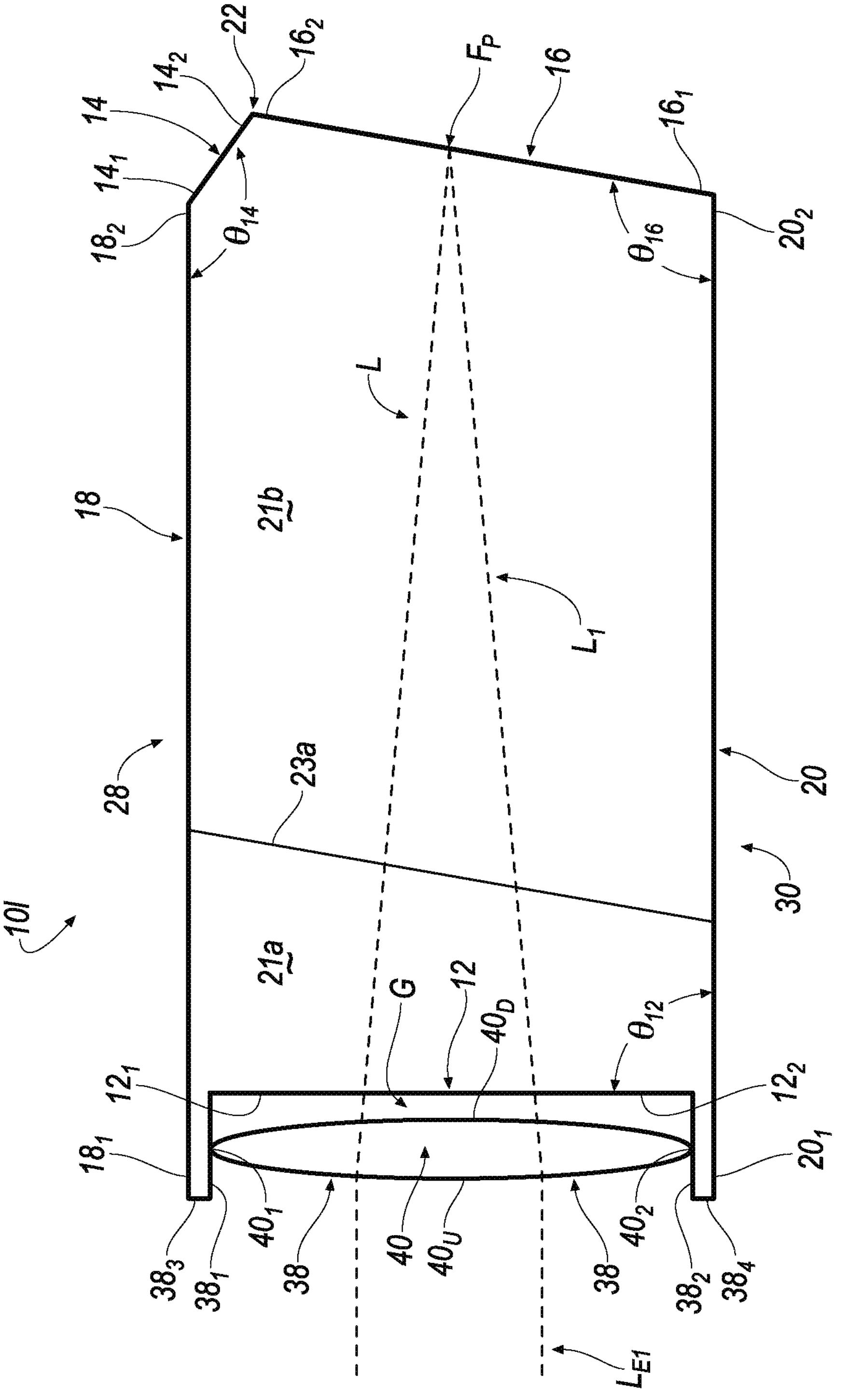

FIG. 22 is a side view of an exemplary optomechanical tool that receives a collimated light beam at a non-movable or fixed optical lens arranged within an optical lens recess formed by a light beam entrance face of the optomechanical tool.

Figure 23A:
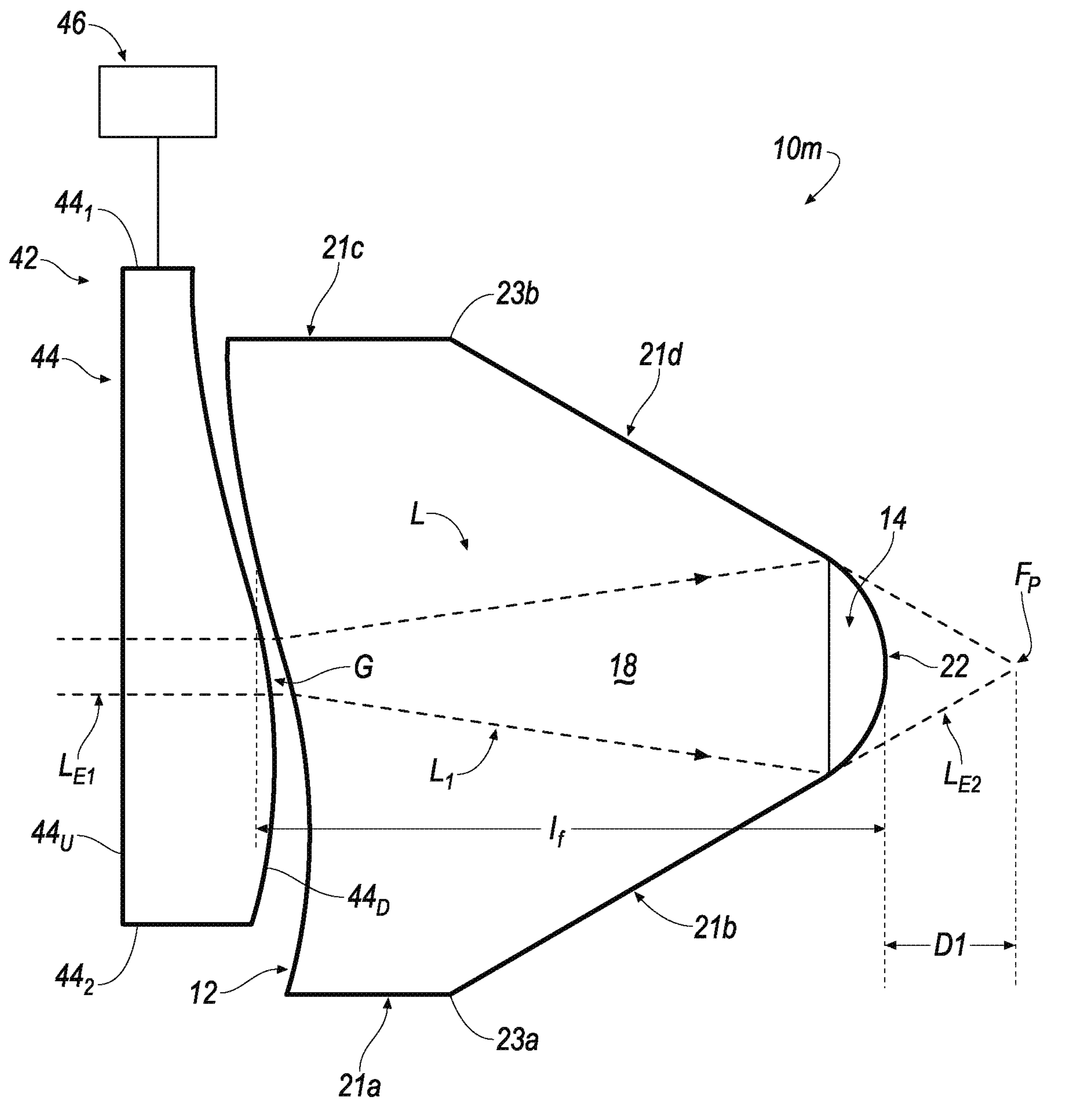
Figure 23B:
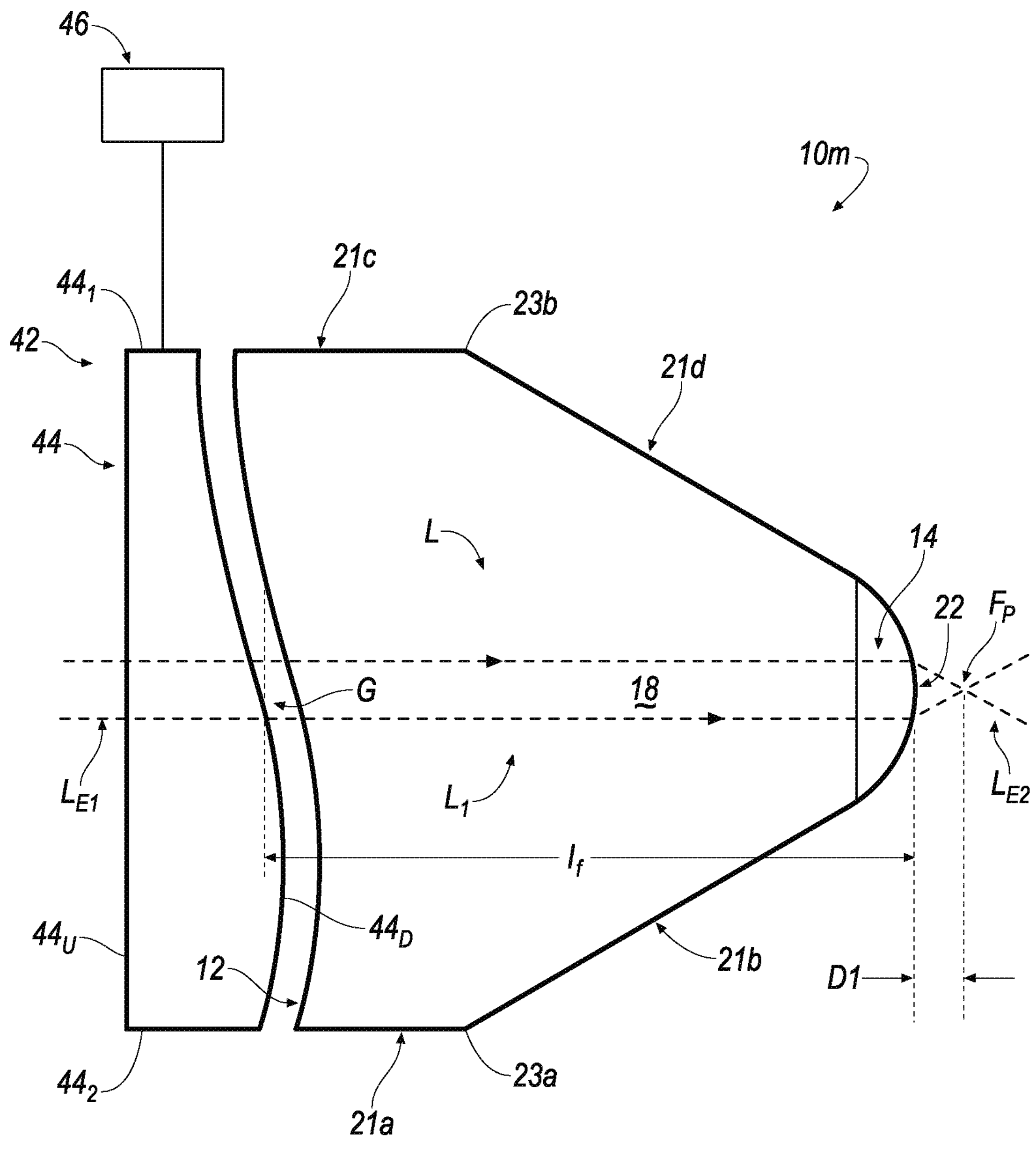
Figure 23C:
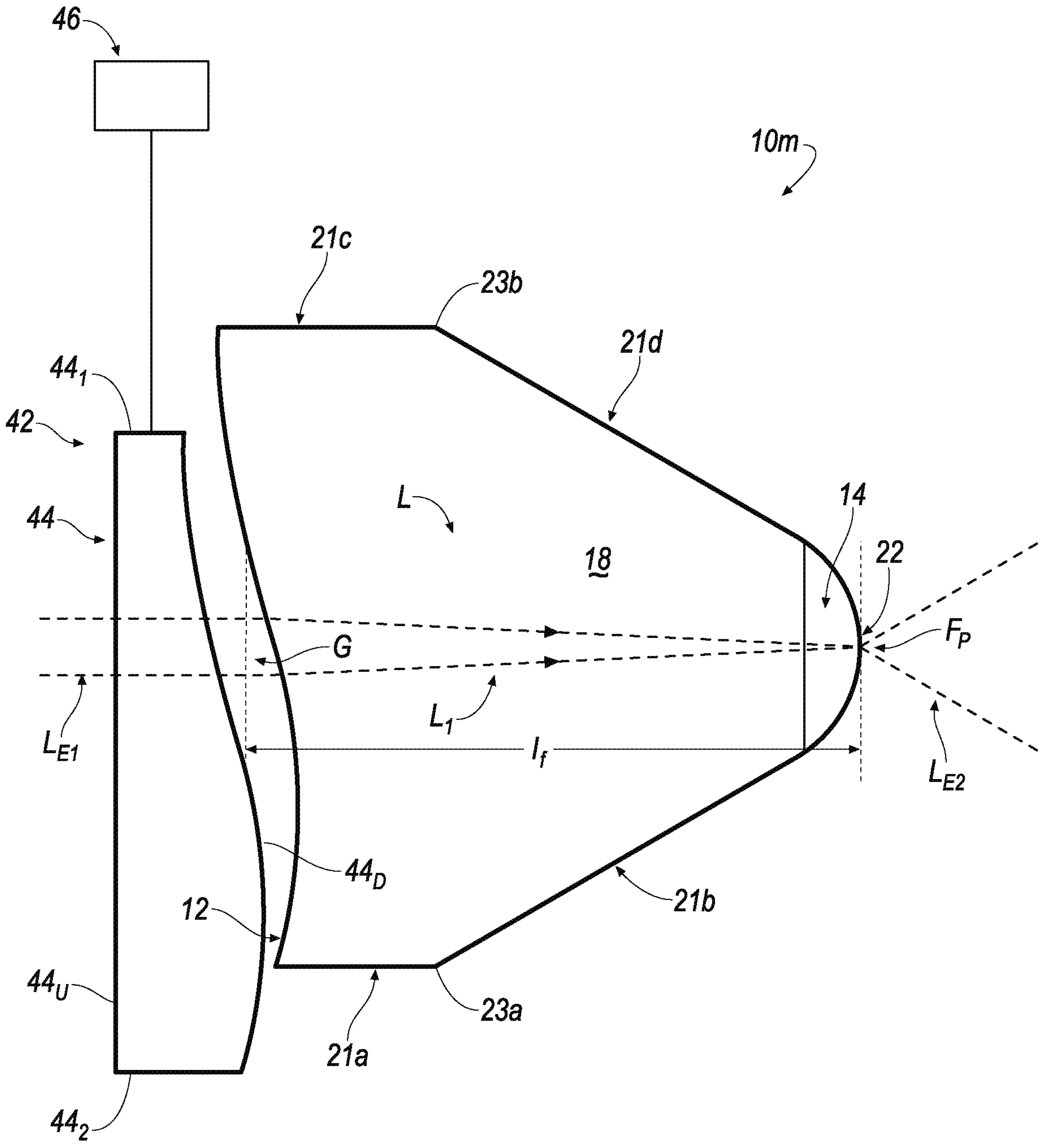

FIGS. 23A-23C are top views of an exemplary optomechanical tool that receives a collimated light beam at movable optical lens arranged near a light beam entrance face of the optomechanical tool.

Figure 24A:
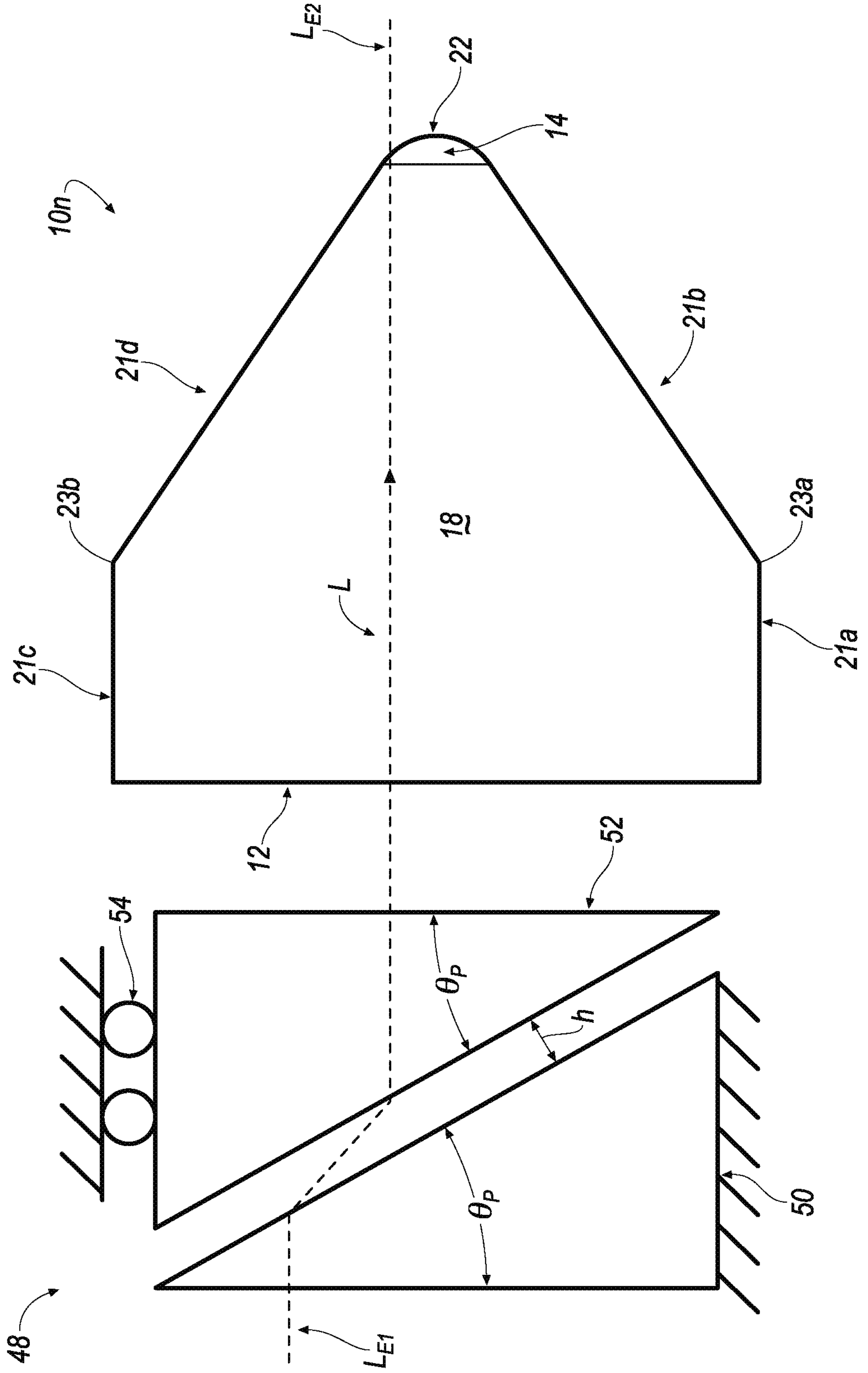
Figure 24B:
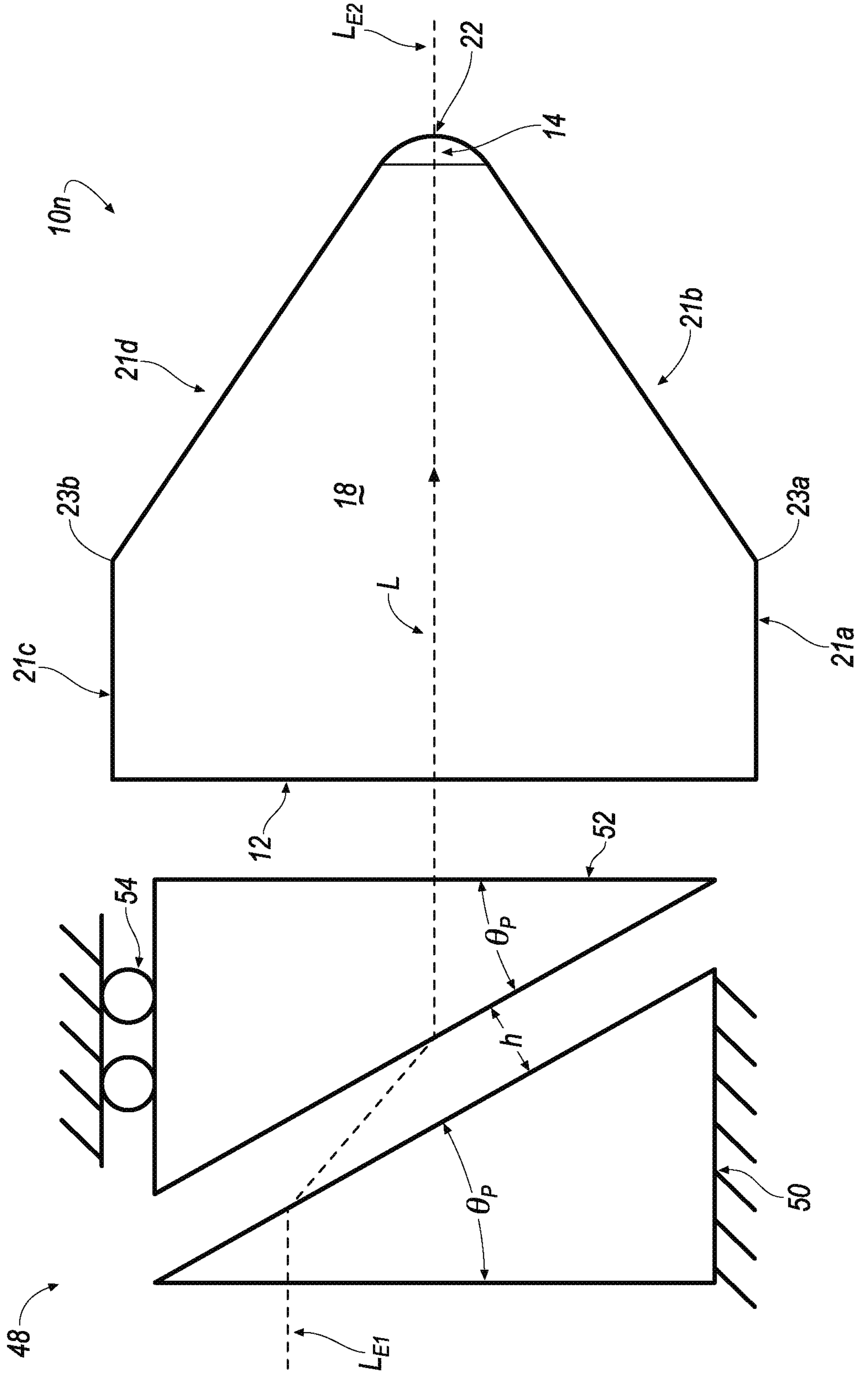
Figure 24C:
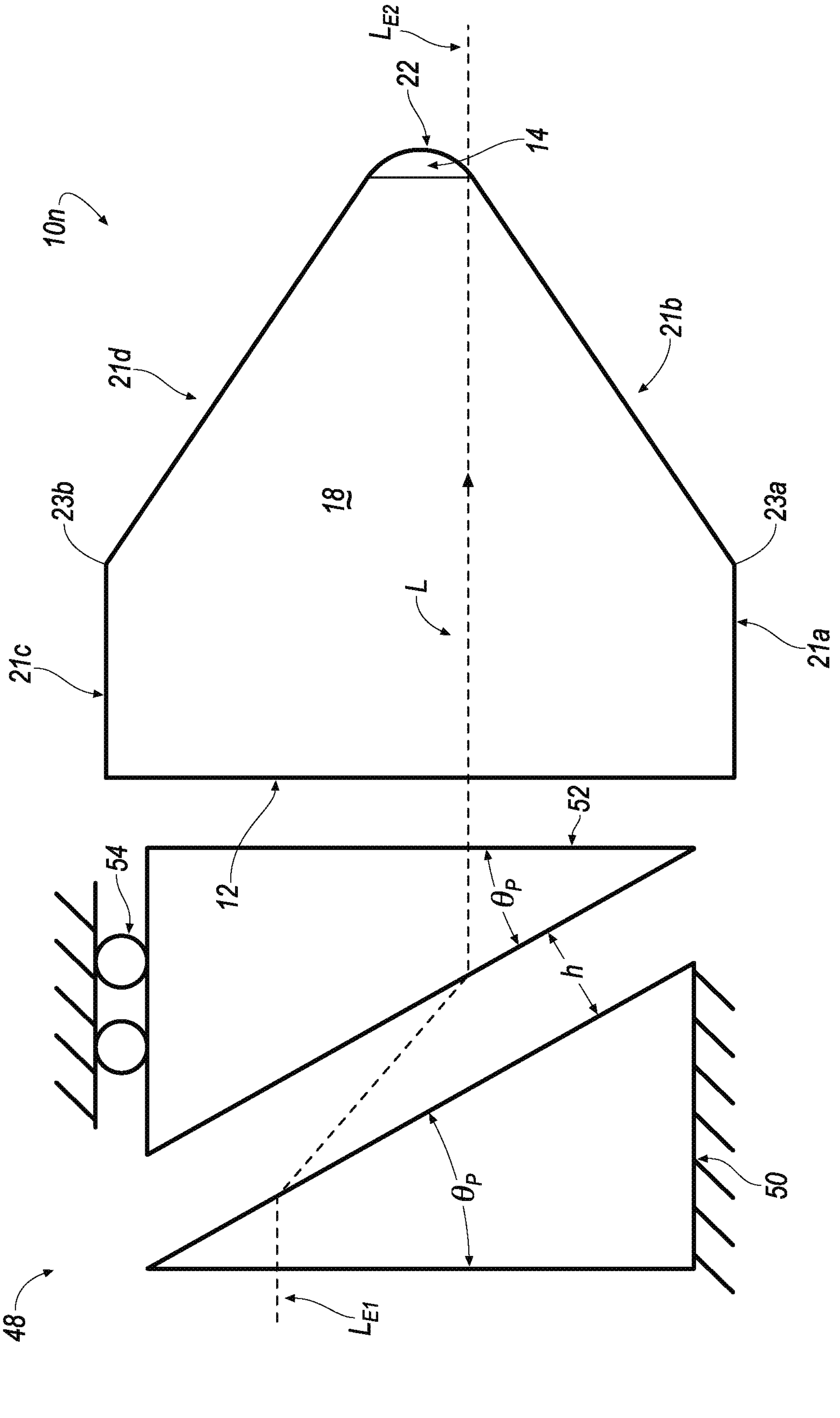

FIGS. 24A-24C are top views of an exemplary optomechanical tool that receives a collimated light beam at an optical prism system arranged near a light beam entrance face of the optomechanical tool.

Figure 25:
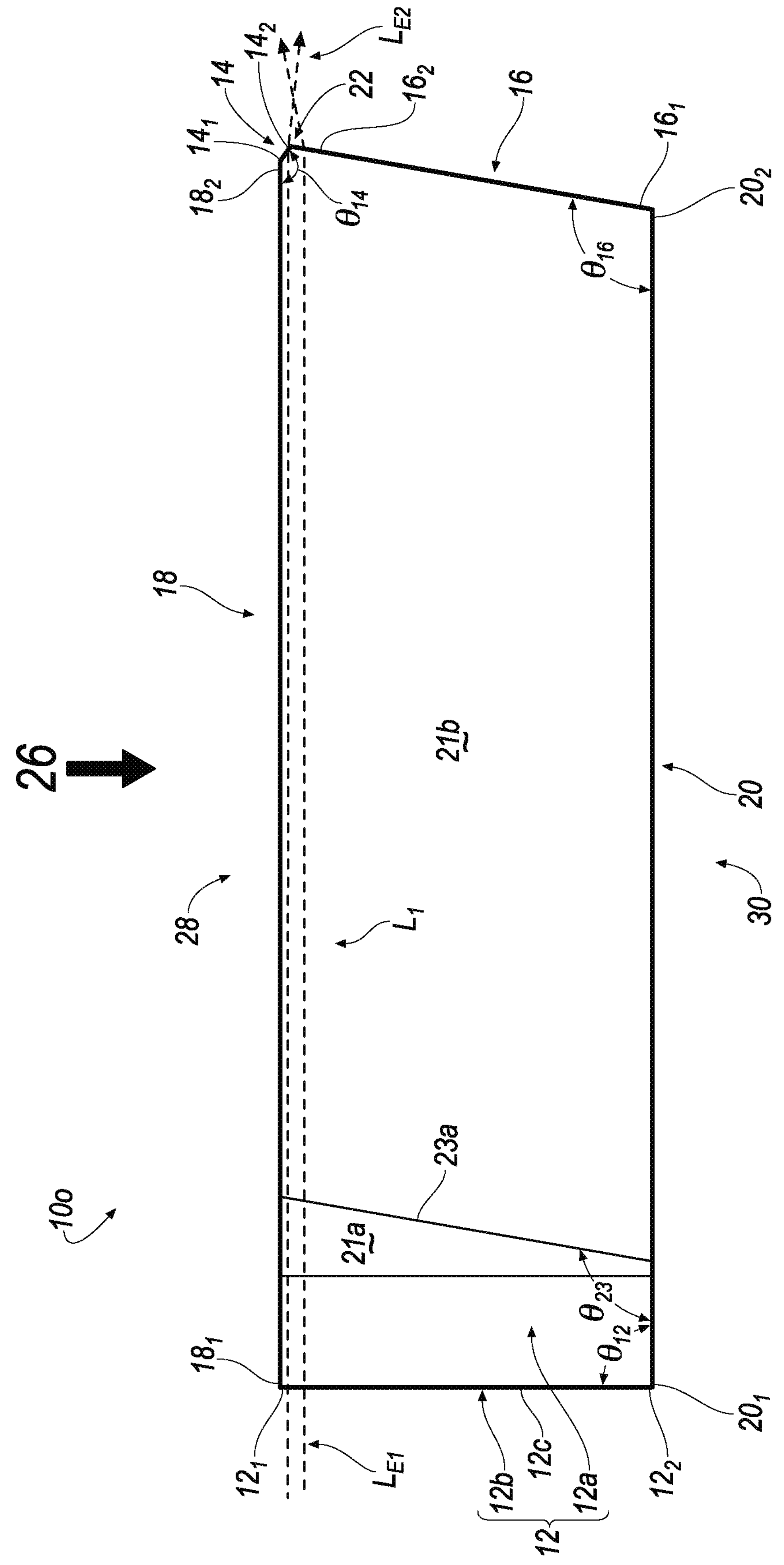
Figure 25:
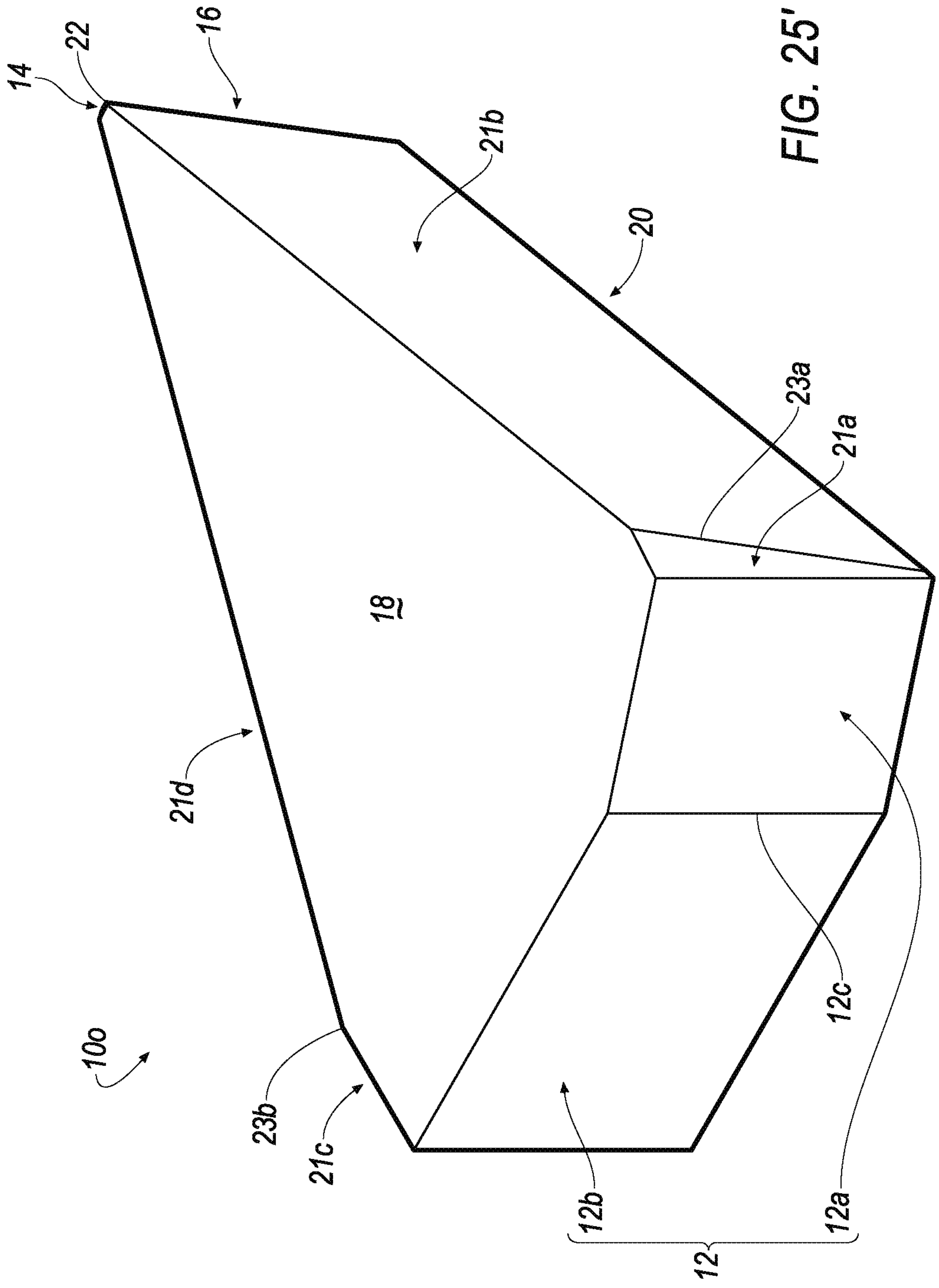

FIG. 25 is a side view of an exemplary optomechanical tool that receives a collimated light beam at an outwardly-projecting light beam entrance face arranged at a perpendicular or right back-relief angle.

FIG. 25' is a perspective view of the optomechanical tool of FIG. 25.

Figure 26:
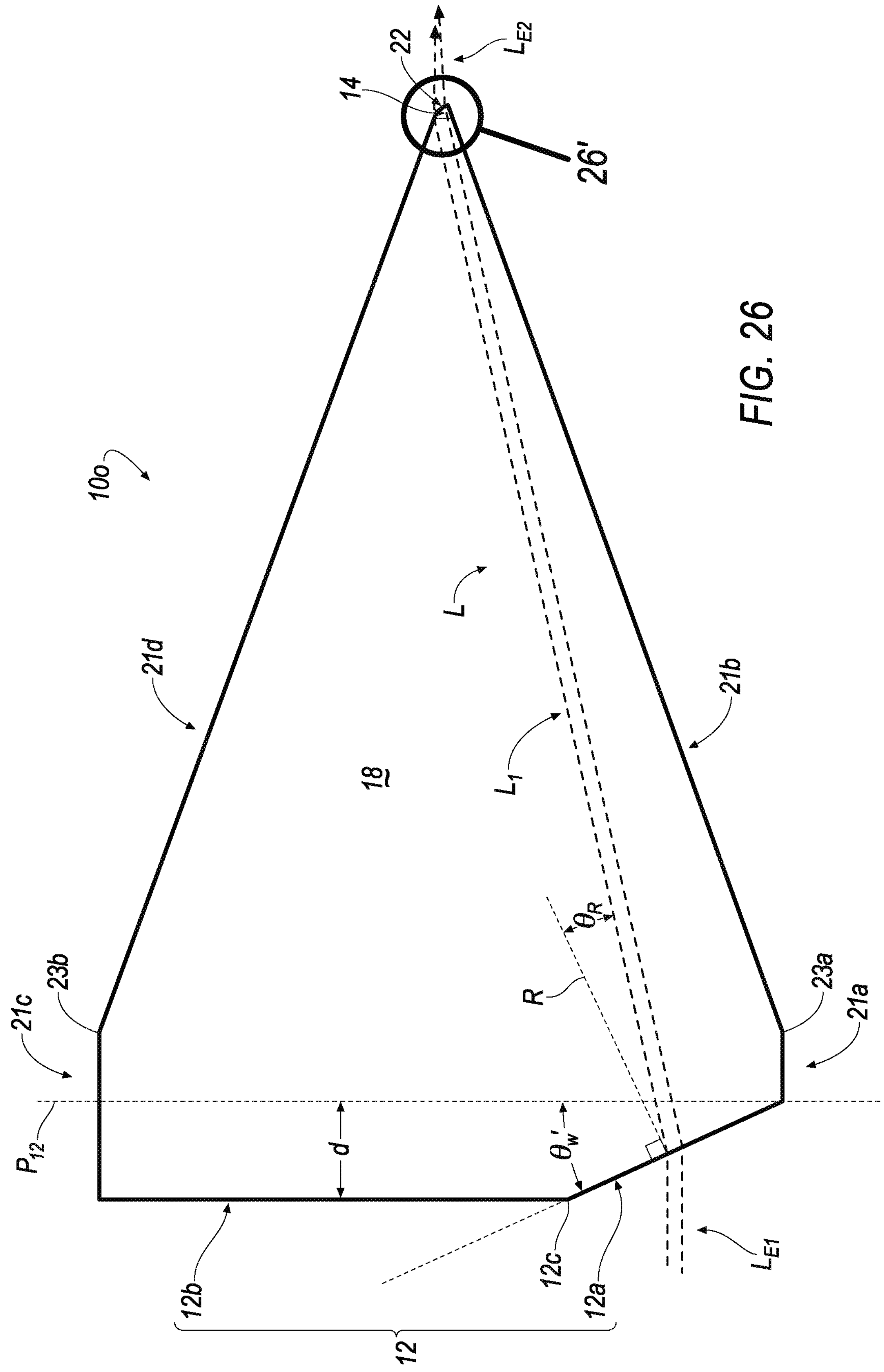
Figure 26:
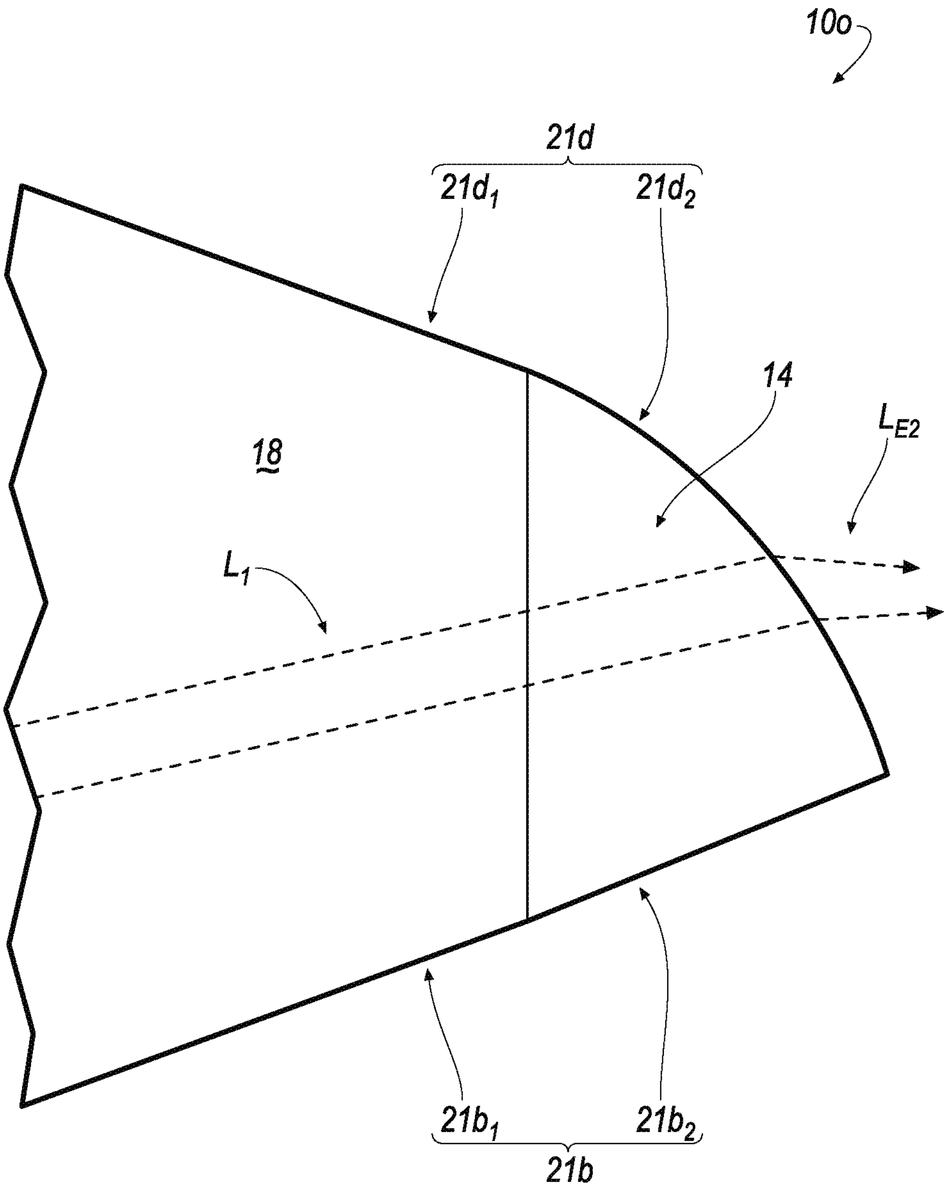

FIG. 26 is a top view of the optomechanical tool of FIG. 25.

FIG. 26' is an enlarged view according to line 26' of FIG. 26.

Figure 27:
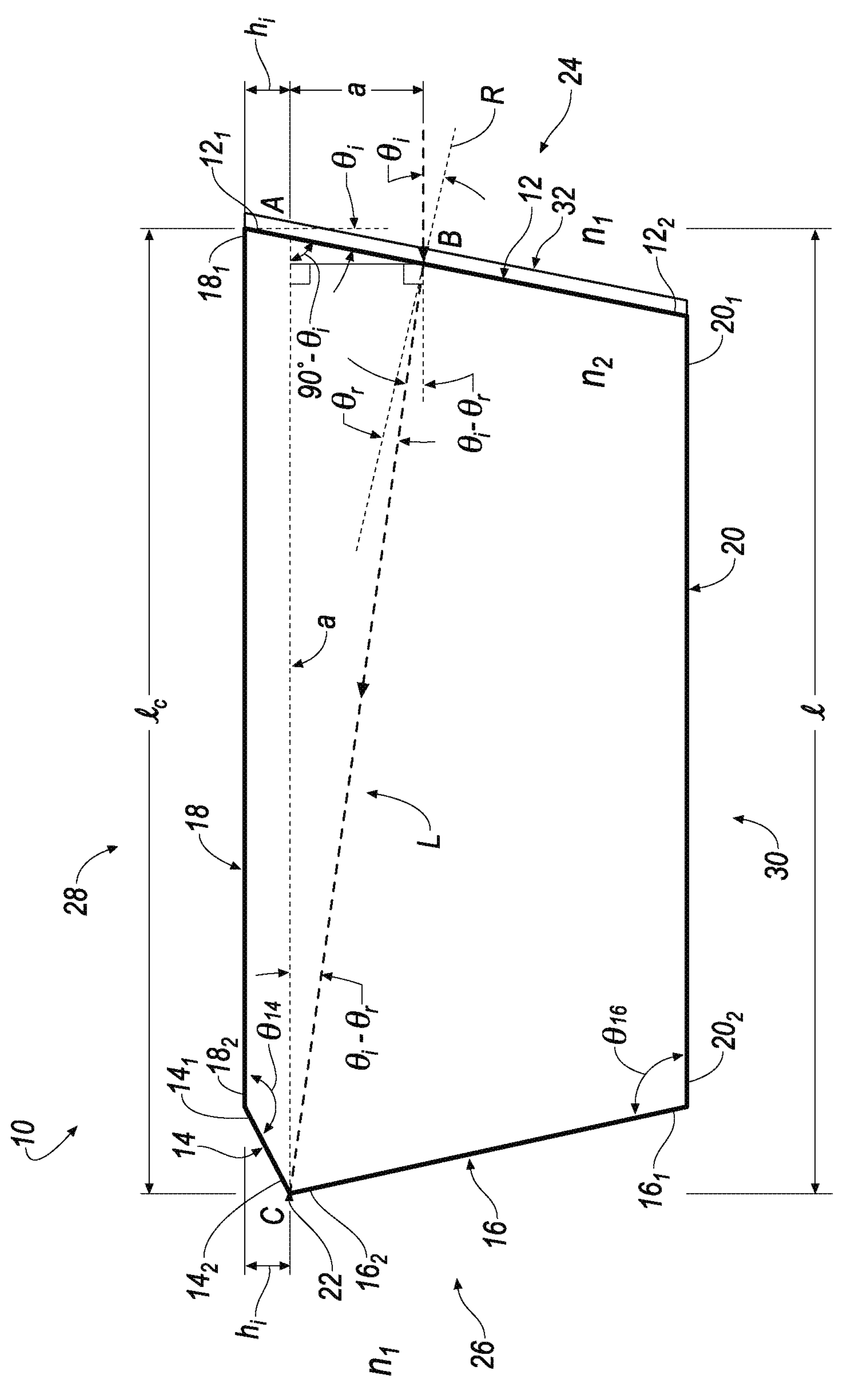

FIG. 27 is a plan view of an exemplary optomechanical tool.

Figure 28:
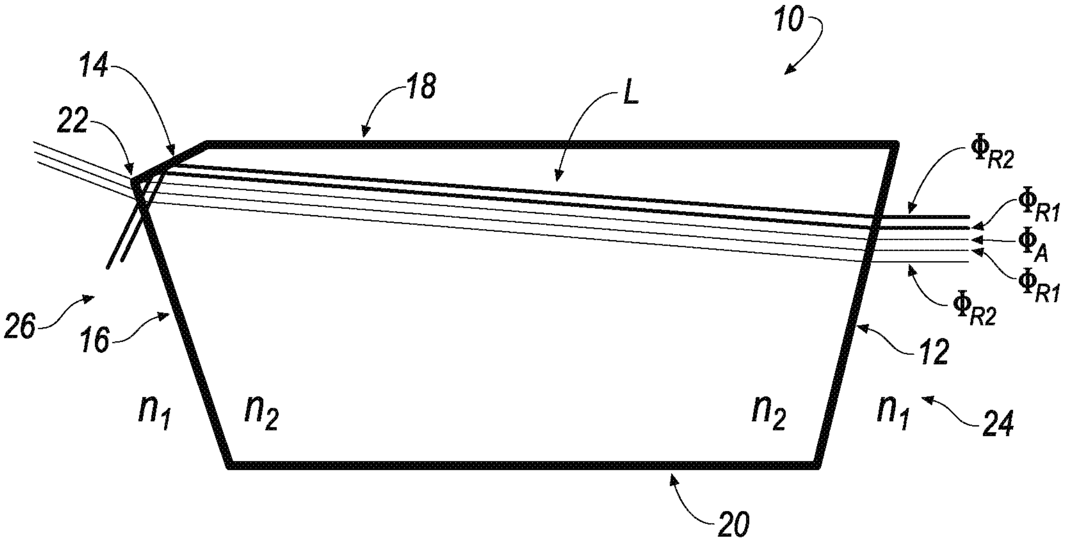

FIG. 28 is a side view of the optomechanical tool of FIG. 27 transmitting a light beam.

Figure 29:
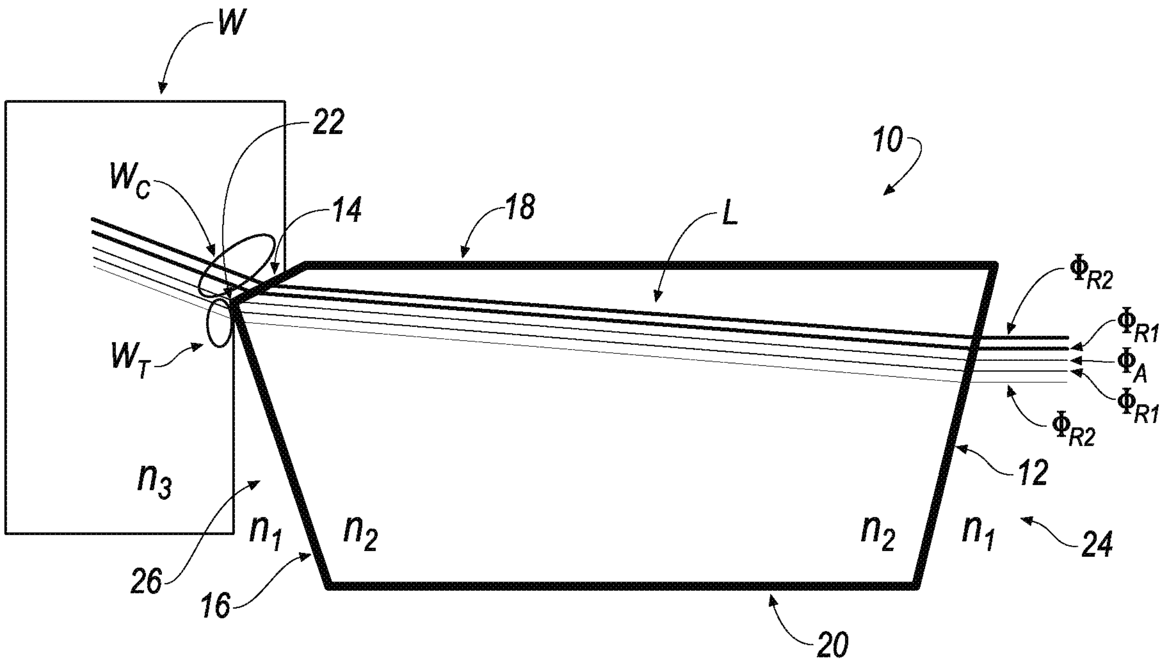

FIG. 29 is a view of the optomechanical tool of engaging a workpiece while transmitting the light beam.

Figure 30A:
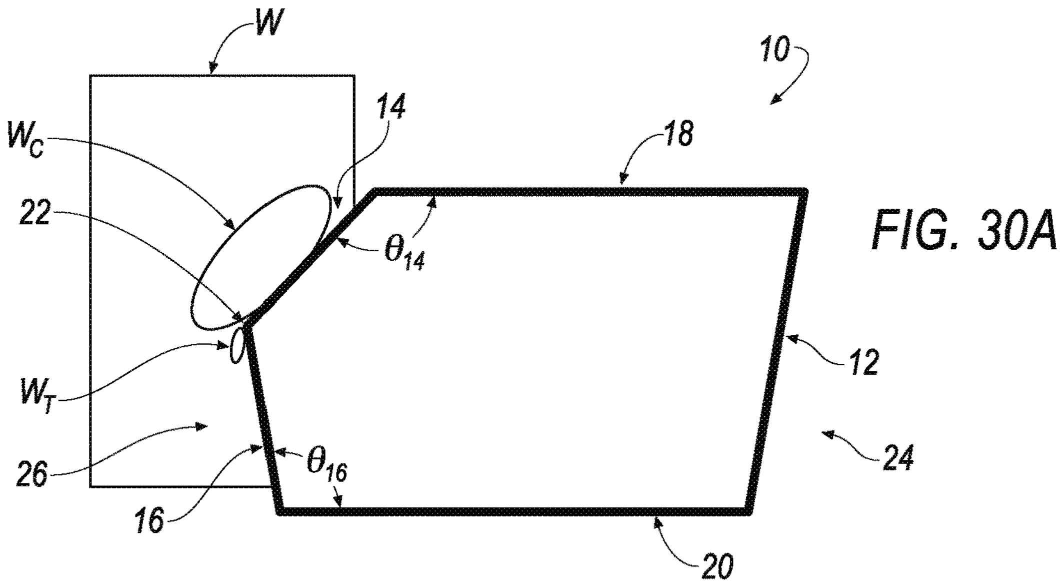

FIG. 30A is a side view of the optomechanical tool of FIG. 27 arranged relative a workpiece having a highest compression region extending along at least a rake face of the optomechanical tool and a lowest tensile region extending across a flank face of the optomechanical tool.

Figure 30B:
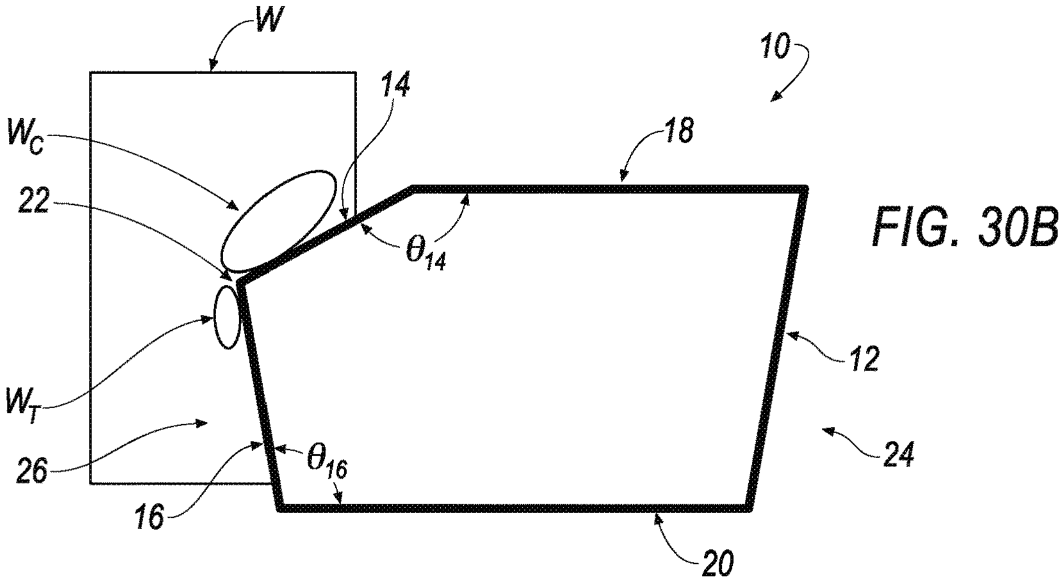

FIG. 30B is a side view of the optomechanical tool of FIG. 27 arranged relative a workpiece having a high compression region extending along at least a rake face of the optomechanical tool and a low tensile region extending across a flank face of the optomechanical tool.

Figure 30C:
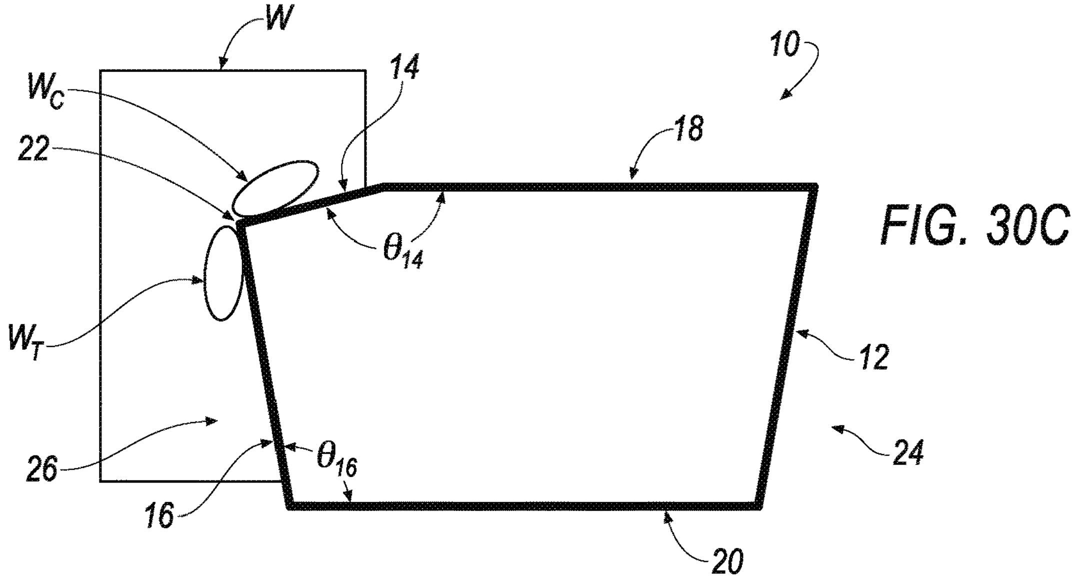

FIG. 30C is a side view of the optomechanical tool of FIG. 27 arranged relative a workpiece having a medium compression region extending along at least a rake face of the optomechanical tool and a medium tensile region extending across a flank face of the optomechanical tool.

Figure 30D:
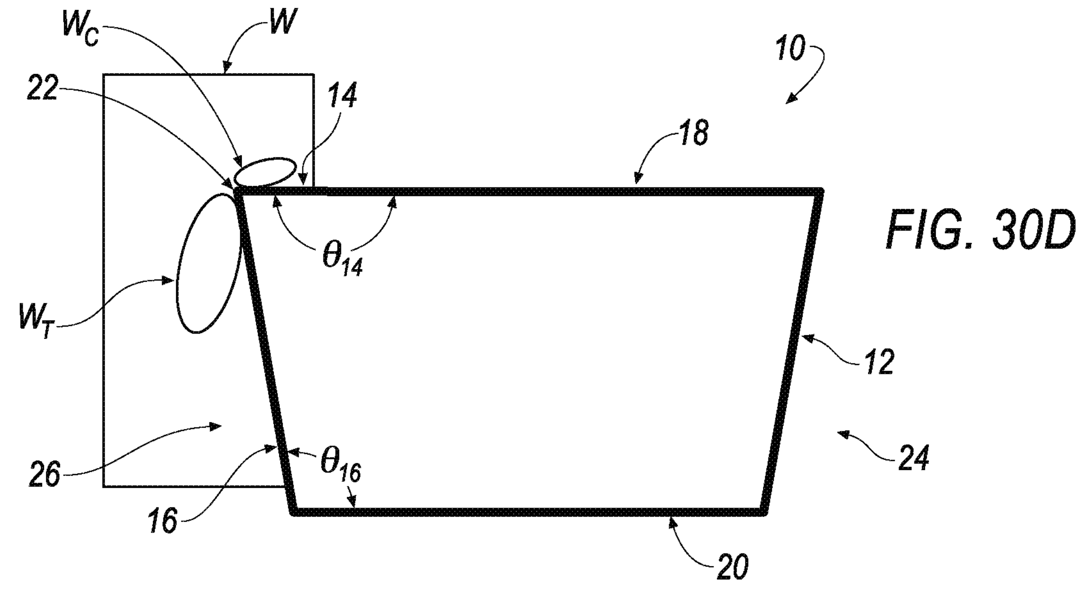

FIG. 30D is a side view of the optomechanical tool of FIG. 27 arranged relative a workpiece having a low compression region extending along at least a rake face of the optomechanical tool and a high tensile region extending across a flank face of the optomechanical tool.

Figure 30E:
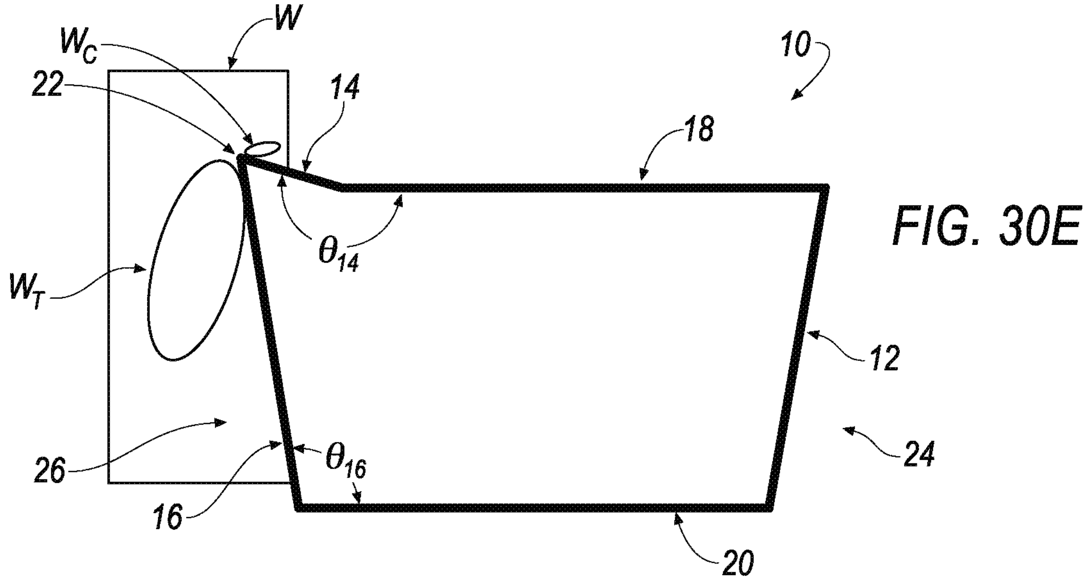

FIG. 30E is a side view of the optomechanical tool of FIG. 27 arranged relative a workpiece having a lowest compression region extending along at least a rake face of the optomechanical tool and a highest tensile region extending across a flank face of the optomechanical tool.

Figure 31A:
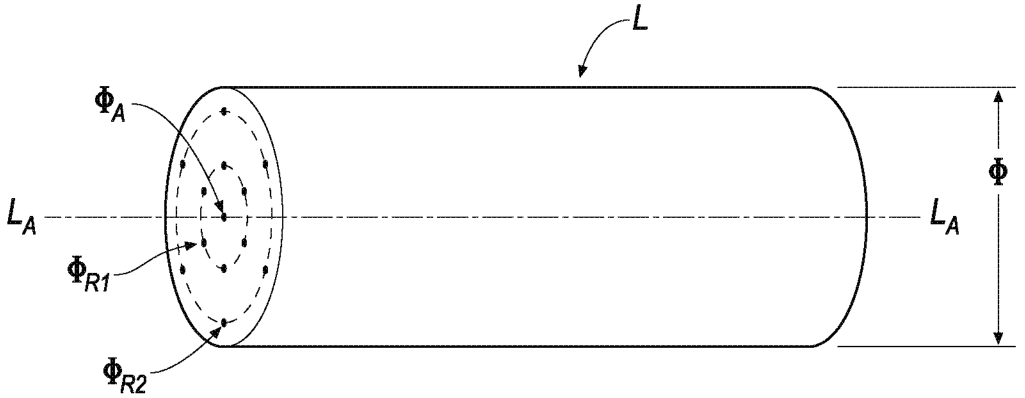

FIG. 31A is a perspective view of an exemplary light beam.

FIG. 31A is an end view of the light beam of FIG. 31A.

Figure 32:
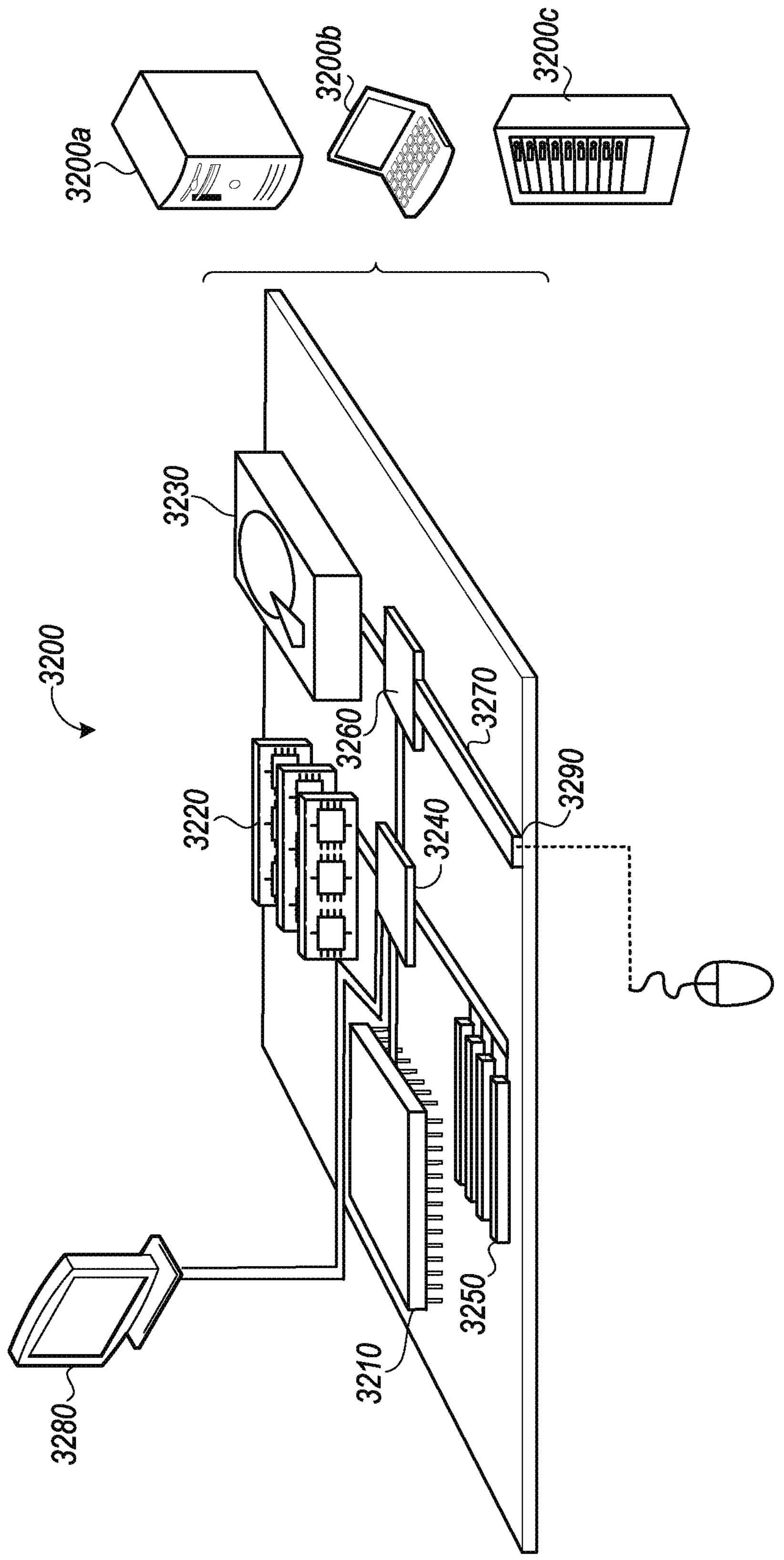

FIG. 32 is a schematic view of an exemplary computing device.

Like reference symbols in the various drawings indicate like elements.

DETAILED DESCRIPTION

Aspects of the present disclosure are directed to systems including a light (e.g., laser) generator and optomechanical tooling. The optomechanical tooling may so machine a workpiece defined by a material (e.g., ceramics, semiconductors, optical crystals, glass, metal alloys, plastics, composites, bone, teeth, and the like) that minimizes tooling forces while improving surface finish, aesthetics, form repeatability, and overall machinability of the workpiece.

Although the following disclosure describes a variety of configurations of optomechanical tooling, which may be alternatively referred to as, for example, a "laser-transmitting machining tool," that receives, for example, a laser light beam, the optomechanical tooling/laser-transmitting machining tool(s) is/are not limited to receiving a laser light beam; accordingly, the optomechanical tooling/laser-transmitting machining tool(s) may receive any type of light such as, for example, visible light (having a wavelength between 380 nm and 780 nm), infrared light (having a wavelength longer than 780 nm), ultraviolet light (having a wavelength shorter than 380 nm), laser light (having a wavelength between 150 nm and 1100 nm), and the like. Accordingly, although the term "laser" is utilized in the following disclosure in association with the optomechanical tooling/laser-transmitting machining tool(s), the term "laser" is utilized as an exemplary form of light, and, as such, the optomechanical tooling/laser-transmitting machining tool(s) described in the present disclosure is/are not limited to receiving one type of light beam, such as, for example a laser beam.

Other aspects of the present disclosure include methodologies for utilizing the systems including a laser-transmitting machining tool for machining the workpiece. In an example, after directly engaging the workpiece with the laser-transmitting machining tool, the laser-transmitting machining tool transmits laser radiation from the laser generator to the portions of the workpiece for the purpose of weakening the bonds of the workpiece and therefor softening the workpiece in order to ultimately plastically deform and/or thermally soften the workpiece.

Yet other aspects of the present disclosure include systems that may be interfaced with any of the laser-transmitting machining tool. In some instances, exemplary systems may be utilized for characterizing and qualifying the laser beam transmitted by the laser-transmitting tool. In other examples, systems may determine the laser power reflected, transmitted, and absorbed by the laser-transmitting machining tool while machining a workpiece. Even further, in other examples, exemplary the systems may also characterize and qualify the laser beam transmitted by the laser-transmitting tool when the laser-transmitting tool is not in contact with the workpiece. In yet other examples, exemplary systems may precisely measure the size, shape, and position of the laser beam transmitted by the laser-transmitting machining tool. In further examples, exemplary systems may further compare the laser size, shape, and position with a fiducial.

Prior to describing configurations of exemplary laser-transmitting machining tools 10$a$-10$o$ at FIGS. 1-26', reference is made to FIGS. 27-30E that are directed to exemplary laser-transmitting machining tools 10. Referring initially to FIG. 27, an exemplary laser-transmitting machining tool 10 defines a plurality of surfaces or faces 12-20. The surface 12 of the plurality of surfaces or faces 12-20 may be referred to as a laser beam entrance face. The surface 14 of the plurality of surfaces or faces 12-20 may be referred to as a rake face. The surface 16 of the plurality of surfaces or faces 12-20 may be referred to as a flank face or clearance face. The surface 18 of the plurality of surfaces or faces 12-20 may be referred to as a first side face or a rake side face. The surface 20 of the plurality of surfaces or faces 12-20 may be referred to as a second side face or a flank side face.

A first end $\mathbf{18}_1$ of the first side face 18 extends away from a first end $\mathbf{12}_1$ of the laser beam entrance face 12. A first end $\mathbf{20}_1$ of the second side face 20 extends away from a second end $\mathbf{12}_2$ of the laser beam entrance face 12.

A first end $\mathbf{14}_1$ of the rake face 14 extends away from a second end $\mathbf{18}_2$ of the first side face 18. A first end $\mathbf{16}_1$ of the flank face 16 extends away from a second end $\mathbf{20}_2$ of the second side face 20. A second end $\mathbf{14}_2$ of the rake face 14 is joined to a second end $\mathbf{16}_2$ of the flank face 16 to define a cutting edge 22. Furthermore, the first end $\mathbf{14}_1$ of the rake face 14 extends away from the second end $\mathbf{18}_2$ of the first side face 18 at a rake angle $\theta_{14}$, and the first end $\mathbf{16}_1$ of the flank face 16 extends away from the second end $\mathbf{20}_2$ of the second side face 20 at a flank angle or clearance angle $\theta_{16}$. The angle $\theta_{14}$ defined by the rake face 14 and the first side face 18 may be referred to as a rake angle. The angle $\theta_{16}$ defined by the flank face 16 and the second side face 20 may be referred to as a flank angle or clearance angle. As will be described in greater detail with respect to FIGS. 30A-30E, the rake angle $\theta_{14}$ and the flank angle $\theta_{16}$ are described in the context of the laser-transmitting machining tool 10 itself and not with respect to a surrounding environment relative the laser-transmitting machining tool 10 such as, for example, how the laser-transmitting machining tool 10 is positioned relative to a workpiece (see, e.g., W in FIG. 29).

One or more surfaces (see, e.g., laser beam entrance face 12) of the plurality of surfaces or faces 12-20 may define a laser beam entrance end 24 of the laser-transmitting machining tool 10. Further, one or more surfaces (see, e.g., rake face 14 and flank face 16) of the plurality of surfaces or faces 12-20 may define a laser beam exit end 26 of the laser-transmitting machining tool 10.

Furthermore, one or more surfaces (see, e.g. rake face 14 and first side face 18) of the plurality of surfaces or faces 12-20 may define a first side 28 of the laser-transmitting machining tool 10. Furthermore, one or more surfaces (see, e.g. laser beam entrance face 12, flank face 16, and second side face 20) of the plurality of surfaces or faces 12-20 may define a second side 30 of the laser-transmitting machining tool 10.

The laser-transmitting machining tool 10 defines a tool length l. In an example, the tool length l is bound by the first end $\mathbf{18}_1$ of the first side face 18 and the cutting edge 22.

Furthermore, the laser-transmitting machining tool 10 may also include an anti-reflective coating 32 applied to at least one of the plurality of surfaces or faces 12-20 of the laser-transmitting machining tool 10. In an example, the anti-reflective coating 32 may be applied to the laser beam entrance face 12

Inclusion of a heat-activated/laser-activated cutting fluid/slurry/etchant upon one or both of the cutting edge 22, rake face 14, and flank face 16, permits the laser-transmitting machining tool 10 to chemically react in response to being subjected to heat or exposure of a laser beam L when the laser beam L exits the exit end 26 of the laser-transmitting machining tool 10. After reaction of the heat-activated/laser-activated cutting fluid/slurry/etchant and arranging the laser-transmitting machining tool 10 adjacent the workpiece W, a more ductile regime of material removal is promoted. Accordingly, the removal rate of material from the workpiece W may be increased while also using less tooling forces imparted from the laser-transmitting machining tool 10.

As seen in FIG. 27, the laser beam L is transmitted through the laser-transmitting machining tool 10. The laser beam L is directed from a laser generator toward the laser beam entrance end 24 of the laser-transmitting machining tool 10. The laser beam L enters the laser-transmitting machining tool 10 at the laser beam entrance face 12 at a relief angle $\theta_i$ relative to a line R that is normal to the laser beam entrance face 12. The laser beam L is then refracted within the laser-transmitting machining tool 10 at an angle $\theta_r$ and travels along the length l of the laser-transmitting machining tool 10 from the laser beam entrance end 24 of the laser-transmitting machining tool 10 to the laser beam exit end 26 of the laser-transmitting machining tool 10.

Figure 31B:
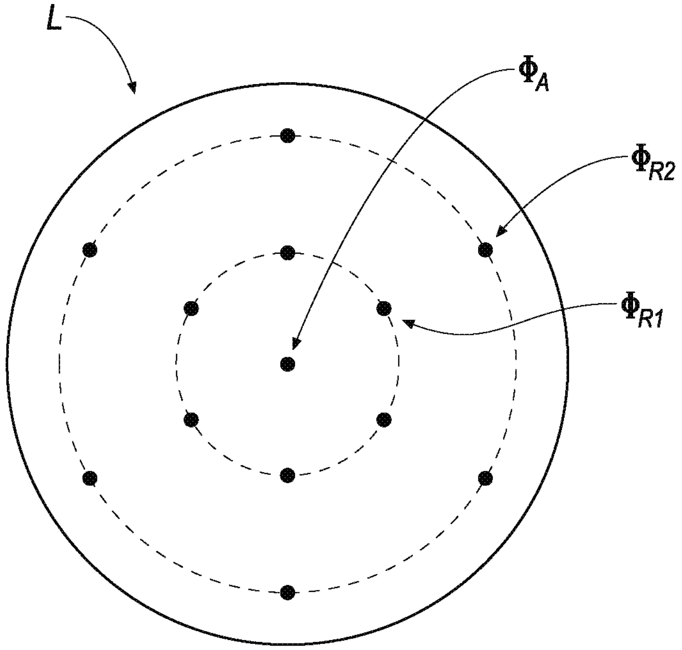

With reference to FIGS. 31A and 31B, the laser beam L defines a laser beam diameter Φ. The laser beam diameter Φ may further define: a central ray $\Phi_A$ extending along a central axis $L_A$-$L_A$ (see, e.g., FIG. 31A) of the laser beam L; a first circumferential array of rays $\Phi_{R1}$ arranged at a first radial distance away from the central axis $L_A$-$L_A$ of the laser beam L; and at least one second circumferential array of rays $\Phi_{R2}$ arranged at a second radial distance away from the central axis $L_A$-$L_A$ of the laser beam L whereby the second radial distance is greater than the first radial distance.

With reference to FIG. 28, according to the refraction principles of light, the laser beam L will undergo another refraction when exiting the laser-transmitting machining tool 10 provided that the laser beam L strikes the laser beam flank face 16 with less than a critical angle (see, e.g., $\theta_c$ in Equation 3) when going from a first medium (e.g., a diamond material) of a higher refractive index m to a second medium (e.g., air) of a lower refractive index $n_1$. Assuming $n_1$=1 for air, the governing relationship is given by:

$$\sin\theta_C = \frac{1}{n_2} \tag{1}$$

The general governing relationship is given by:

$$\sin\theta_C = \frac{n_1}{n_2} \tag{2}$$

Accordingly, the critical angle $\theta_C$ is governed by the following equation:

$$\theta_C = \sin^{-1}\left(\frac{n_1}{n_2}\right) \tag{3}$$

In an example, for a laser beam L transitioning from diamond to air, a diamond material may have a critical angle of 24.4°; any incident laser beam L striking a surface greater than this angle will reflect internally in the diamond. In an example, FIG. 28 illustrates exemplary reflected rays $\Phi_{R1}$, $\Phi_{R2}$ exiting the laser beam exit end 26 that are directed from the laser beam entrance face 12 to the rake face 14.

With reference to FIG. 29, at least a portion of the laser beam exit end 26 of the laser-transmitting machining tool 10 contacts, is disposed adjacent, or is immersed into a workpiece W during the machining process. The material defining the workpiece W may include but not limited to ceramics, semiconductors, optical crystals, glass, metal alloys, plastics, composites, bone, teeth, and the like. Arranging the laser-transmitting machining tool 10 adjacent or immersing the laser-transmitting machining tool 10 into a volume of the workpiece W allow the rays $\Phi_A$, $\Phi_{R1}$, $\Phi_{R2}$ of laser beam L to be transmitted into and absorbed by selected portions of the workpiece W as the index of refraction n of the workpiece W is higher than the index of refraction $n_1$ of air, which results in an increase of the critical angle for internal reflection.

In an example, an exemplary laser-transmitting machining tool 10 composed of silicon may be defined by an index of refraction u equal to 3.4 such that no limitation for internal reflection exists as the workpiece W being machined has a higher index of refraction m compared to the index of refraction n of an exemplary laser-transmitting machining tool 10 composed of a diamond. The rays $\Phi_A$, $\Phi_{R1}$, $\Phi_{R2}$ of a laser beam L will enter the immersed area of a workpiece W, allowing the laser beam L to treat a selected region of the workpiece W undergoing compressive stresses effectively. Accordingly, as seen in FIG. 29, the rays $\Phi_{R1}$, $\Phi_{R2}$ of the laser beam L exiting the rake face 14 are allowed to propagate into the workpiece W of similar or higher index of refraction whereas the rays $\Phi_{R1}$, $\Phi_{R2}$ of the laser beam L exiting the flank face 16 represent a portion of the laser beam L affecting the workpiece W that had already been machined by the flank face 16 and the cutting edge 22 (i.e., the flank face 16 anneals the workpiece W so as the flank face 16 contacts the workpiece W).

As seen in FIG. 29, the central ray $\Phi_A$ of the laser beam L is focused on and exits the cutting edge 22 of the laser-beam exit end 26 of the laser-transmitting machining tool 10. As explained above, in addition to the laser beam L exiting the cutting edge 22 of the laser beam exit end 26 of the laser-transmitting machining tool 10, the laser beam L also exits one or both of the rake face 14 of the laser beam exit end 26 of the laser-transmitting machining tool 10 and the flank face 16 of the laser beam exit end 26 of the laser-transmitting machining tool 10. In an example, some of the first and second circumferential array of rays $\Phi_{R1}$, $\Phi_{R2}$ may exit the rake face 14 and some of the first and second circumferential army of rays $\Phi_{R1}$, $\Phi_{R2}$ may exit the flank face 16.

With continued reference to FIG. 29, the laser beam exit end 26 of the laser-transmitting machining tool 10 may be disposed adjacent a workpiece W that is plastically deformed and/or thermally softened by the laser-transmitting machining tool 10. The workpiece W may generally define a compressive region $W_C$ and a tensile region $W_T$.

In some instances, the compression region $W_C$ of the workpiece W may generally extend across the rake face 14 and a portion of the flank face 16 near the second end $\mathbf{16}_2$ of the flank face 16 (i.e., the compression region $W_C$ of the workpiece W extends across the cutting edge 22 of the laser-transmitting machining tool 10). In some examples, the tensile region $W_T$ of the workpiece W may generally extend across the flank face 16 of the laser-transmitting machining tool 10 near the second end $\mathbf{16}_2$ of the flank face 16 without extending across the cutting edge 22 of the laser-transmitting machining tool 10. In other examples, the tensile region $W_T$ of the workpiece W may generally extend from the flank face 16 and across the cutting edge 22 such that the tensile region $W_T$ of the workpiece W extends slightly across the rake face 14 of the laser-transmitting machining tool 10 near the second end $\mathbf{14}_2$ of the rake face 14. In some instances, the tensile region $W_T$ may extend slightly across the rake face 14, and, in such instances, the tensile region $W_T$ extending slightly across the rake face 14 is not limited to the geometry of the laser-transmitting tool 10, the material of the workpiece W, processing parameters, and the like.

Referring to FIGS. 30A-30E, one, or both of the rake angle $\theta_{14}$ and the flank angle $\theta_{16}$ may correspond to one or more qualities of a material of a workpiece W that is to be machined by the laser-transmitting machining tool 10. In an example, the rake angle $\theta_{14}$ may range between approximately about 91° and 195° the flank angle $\theta_{16}$ may range between approximately about 93° and 120°. The one or more qualities of the material of a workpiece W may be related to different levels of a compressive force imparted from the laser-transmitting machining tool 10 to the compression region $W_C$ of the workpiece W and a tensile force imparted from the laser-transmitting machining tool 10 to the tensile region $W_T$ of the workpiece W.

In an example, the rake angle $\theta_{14}$ of FIG. 30A may be referred to as a highly negative rake angle and may be greater than 90° less than about 135°. The rake angle $\theta_{14}$ of FIG. 30B may be referred to as a midrange negative rake angle, which may be greater than the highly negative rake angle $\theta_{14}$ of FIG. 30A; in an example, the midrange negative rake angle $\theta_{14}$ may be greater than about 136° and less than about 165°. The rake angle $\theta_{14}$ of FIG. 30C may be referred to as a low-range negative rake angle, which may be greater than the midrange negative rake angle $\theta_{14}$ of FIG. 30B; in an example, the low-range negative rake angle $\theta_{14}$ may be greater than about 166° and less than about 179°. The rake angle $\theta_{14}$ of FIG. 30D may be referred to as a zero rake angle, which is greater than the low-range negative rake angle $\theta_{14}$ of FIG. 30C; in an example, the zero rake angle may be approximately equal to 180°. The rake angle $\theta_{14}$ of FIG. 30E may be referred to as a positive rake angle, which may be greater than the zero rake angle $\theta_{14}$ of FIG. 30D; in an example, the positive rake angle $\theta_{14}$ may be greater than about 181° and less than about 210°. With reference to Table 1, exemplary materials and corresponding exemplary ranges of rake angles $\theta_{14}$ are shown below.

TABLE 1

| Material Of The Workpiece W | Rake Angle $\theta_{14}$ Range |
|---|---|
| Silicon | About 135° to About 155° |
| Zinc Selenide | About 145° to About 165° |
| Zinc Sulfide | About 145° to About 165° |
| Calcium Fluoride | About 145° to About 165° |
| Tungsten Carbide | About 145° to About 180° |
| Aluminum | About 175° to About 190° |
| Steel or Stainless Steel | About 91° to About 135° |

TABLE 1-continued

| Material Of The Workpiece W | Rake Angle $\theta_{14}$ Range |
|---|---|
| Germanium | About 91° to About 135° |
| Glass | About 91° to About 135° |
| Sapphire | About 91° to About 135° |
| Spinel | About 135° to About 165° |
| Barium Fluoride | About 135° to About 165° |

In an example, the highly negative rake angle $\theta_{14}$ of FIG. 30A of the midrange negative rake angle $\theta_{14}$ of FIG. 30B may be a preferable configuration of the laser-transmitting machining tool 10 when the material defining the workpiece W is, for example, a ceramic or optical crystal material that is stronger in compression with respect to tension (i.e., the forces involved in machining the compression region $W_C$ are comparatively greater the tensile region $W_T$). In addition to design consideration of one or both of the rake angle $\theta_{14}$ and the flank angle $\theta_{16}$, the laser beam L radiated from the laser beam exit end 26 of the laser-transmitting machining tool 10 may also be selectively adjusted in order to compensate for known compressive and tensile qualities of the workpiece W.

In another example, the highly negative rake angle $\theta_{14}$ may be an angle ranging between about 135° and about 155° for machining a workpiece W (see, e.g., any of FIGS. 29, and 30A-30E) derived from a silicon material with a laser beam L focused on the cutting edge 22 but also biased toward the rake face 14 in order to promote plastic deformation, thermal softening and ductile removal of material in the compression region $W_C$ of the workpiece W. Alternatively, if desired, the laser beam B may be focused on the cutting edge 22 but also biased toward the flank face 16 in order to minimize sub-surface damage to the tensile region $W_T$ of the workpiece W and promote an annealing or "healing" effect of the workpiece W. Accordingly, the act of biasing the laser beam L toward the rake face 14 promotes a more ductile cutting regime, allowing an increased cutting depth. Thus, the removal rate of material from the workpiece W may be increased while preserving the integrity of the laser-transmitting machining tool 10. Furthermore, post-processing (e.g., polishing) of the workpiece W may be minimized or eliminated if the laser beam L is biased toward the flank face 16.

In yet another example with reference to FIG. 30D, a zero rake angle $\theta_{14}$ may be selected for machining a workpiece W (see, e.g., any of FIGS. 29, and 30A-30E) derived from a metal or metal composition due to the fact that most metals (such as, e.g., aluminum) are stronger in tensile with respect to compression; therefore, positive rake angles $\theta_{14}$ (see, e.g., FIG. 30E) or rake angles $\theta_{14}$ close to 180° (see, e.g. FIG. 30C) may be utilized for machining metallic or polymeric materials. Composite materials, however, are of many types and therefore material composition will control tool geometry. Accordingly, in order to promote the machinability in the tensile region for a material having a strong tensile quality, the laser beam L may be focused on the cutting edge 22 but also biased toward the flank face 16 or rake face 14 in order to promote plastic deformation, thermal softening, and removal of material in the tensile region $W_T$ of the workpiece W.

With reference to FIG. 27, the act of biasing of the laser beam to one of the rake face 14 and the flank face 16 of the laser-beam exit end 26 of the laser-transmitting machining tool 10 is described as follows. In an example, the laser-transmitting machining tool 10 of FIG. 27 may be defined by a midrange negative rake angle $\theta_{14}$, and based on Snell's law, the minimum relief angle $\theta_i$ can be calculated given a known length l of the laser-transmitting machining tool 10 and a desired location (see, e.g., horizontal line a) below the cutting edge 22.

When light (i.e., the laser beam L) enters a medium of a higher refractive index $n_2$ (i.e., the medium defined by the laser-transmitting machining tool 10), the beam of light will refract for incident beams not perpendicular to the laser beam entrance face 12. Exemplary materials defining the medium of the laser-transmitting machining tool 10 may include but are not limited to any type of single or poly crystal transmissive media including but not limited to: diamonds; sapphires; moissanites; chrysoberyls; alexandrite; and the like. In other configurations, exemplary materials defining the medium of the laser-transmitting machining tool 10 may include but are not limited to other transmissive media such as, for example: carbides; cubic boron nitride (CBN); silicon; nitrides; steels; alloys; ceramics; alumina; glass; glass composites; composites; and the like. The amount that light will refract is based on Snell's law, which states that the sines of the entry angles are constrained using the following relation:

$$\frac{\sin\theta_1}{\sin\theta_2} = \frac{n_2}{n_1} = \frac{\sin\theta_i}{\sin\theta_r} \tag{4}$$

Assuming $n_1=1$ for air, $\theta_2$ can be derived as follows:

$$\sin\theta_2 = \frac{\sin\theta_1}{n_2} \tag{5}$$

$$\theta_2 = \sin^{-1}\left(\frac{\sin\theta_1}{n_2}\right) \tag{6}$$

$$\text{For small angles, } \sin(x) \cong x,\ \therefore \theta_2 \cong \frac{\theta_1}{n_2}, \text{ or } \theta_r \cong \frac{\theta_i}{n_2} \tag{7}$$

For the triangle ABC identified at angles A, B, and C in FIG. 27, where angle A is 90°-$\theta_i$ and angle C is $\theta_i$-$\theta_r$ using the alternate interior angle relationship. Using the rewritten form for Snell's law, angle C may also be rewritten as:

$$\theta_i - \frac{\theta_i}{n_2} \tag{8}$$

For a desired location of the laser beam L below the line a of the cutting edge 22, the triangle ABC can be solved for the minimum back angle required to refract the laser beam upward into the cutting edge 22 using the following formula provided that the index of refraction n of the laser-transmitting machining tool 10 and length l of the laser-transmitting machining tool 10 is known (noting that that length $l_c$ is the compensated length of the triangle for a reduction in length due to the back-relief angle $\theta_i$). In an example, a diamond-based laser-transmitting machining tools 10 may be defined by an initial lap amount $h_i$ ranging between 0.050 mm to 0.100 mm. Therefore the corresponding inverse tangent for the length l shortened is small for $$\theta_i < 20° \text{ and when } \frac{l}{h_i} \geq 20 \tag{9}$$

and it can be assumed that $$l_c \cong l \tag{10}$$

Combining the approximation of equation 10 with the small-angle approximation of equation 8, equation 11, which is shown below, can be solved for known values a and l in order to obtain $\theta_i$.

$$a = l\frac{\tan\left(\theta_i - \frac{\theta_i}{n_2}\right)\cdot\tan(90° - \theta_i)}{\tan\left(\theta_i - \frac{\theta_i}{n_2}\right) + \tan(90° - \theta_i)} \text{ for } 0 < \theta_i < 20° \tag{11}$$

Where.

$l_c \cong l$=length of the diamond a=desired location of beam below cutting edge line $\theta_i$=minimum angle of incidence to achieve refraction of beam to cutting edge With reference to FIGS. 31A and 31B, the desired location of the laser beam may correspond to the light (i.e., laser) beam diameter Φ. In an example, the desired location of the beam may directly correspond to the laser beam diameter Φ according to Equation 12, which is shown below $$a = \frac{\Phi}{2}(1 + R\ \%) \tag{12}$$

where R % corresponds to the extra margin of safety to ensure the entire laser beam L is below the line of the cutting edge 22.

Utilizing Equation 11 and Equation 12 above, the following Examples and associated Tables represent a plurality of exemplary laser-transmitting machining tools 10. As seen below, each of the exemplary laser-transmitting machining tools 10 may be defined by, for example, different rake angles $\theta_{14}$ and materials (e.g., single or poly crystal transmissive media such as diamonds, sapphires, moissanites, chrysoberyls, alexandrite, and the like, or, alternatively, other transmissive media such as carbides, cubic boron nitride (CBN), silicon, nitrides, steels, alloys, ceramics, alumina, glass, glass composites, composites, and the like) defining the medium of the laser-transmitting machining tool 10.

The following exemplary laser-transmitting machining tool 10 is directed to a negative rake angle $\theta_{14}$ (see, e.g., FIG. 30A, 30B or 30C) and a diamond material.

Example 1

TABLE 2

| | |
|---|---|
| R % | 20% |
| l | 2.4 mm |
| $n_2$ | 2.417 |
| Φ | 0.200 mm |
| $h_i$ | 0.050 mm |

Applying the variable data of Table 2 to Equation 12, a (i.e., the desired location of the light beam below the cutting edge 22) is solved as follows:

$$a = \frac{\Phi}{2}(1 + R\ \%) \tag{13}$$

-continued $$a = \frac{0.200}{2}(1 + 0.20) \quad (14)$$

$$a = 0.12 \text{ mm} \quad (15)$$

Whereby the effective beam position below the first side face 18 of the laser-transmitting machining tool 10 is: $(h_i+a)=(0.050\text{ mm}+0.12\text{ mm})=0.17$ mm.

Then, applying solved a (i.e., the desired location of the light beam below the cutting edge 22) and the variable data of Table 2 to Equation 11, the minimum relief angle, $\theta_i$, is solved, as follows.

$$a = l\frac{\tan\left(\theta_i - \frac{\theta_i}{n_2}\right)\cdot\tan(90° - \theta_i)}{\tan\left(\theta_i - \frac{\theta_i}{n_2}\right) + \tan(90° - \theta_i)} \text{ for } 0 < \theta_i < 20° \quad (16)$$

$$0.12 = 2.4\frac{\tan\left(\theta_i - \frac{\theta_i}{2.417}\right)\cdot\tan(90° - \theta_i)}{\tan\left(\theta_i - \frac{\theta_i}{2.417}\right) + \tan(90° - \theta_i)} \text{ for } 0 < \theta_i < 20° \quad (17)$$

$$\theta_i = 5° \quad (18)$$

The following exemplary laser-transmitting machining tool 10 is directed to a negative rake angle $\theta_{14}$ (see. e.g., FIG. 30A, 30B, or 30C) and a sapphire material.

Example 2

TABLE 3

| | |
|---|---|
| R % | 20% |
| l | 2.4 mm |
| $n_2$ | 1.7 |
| Φ | 0.200 mm |
| $h_i$ | 0.050 mm |

Applying the variable data of Table 3 to Equation 12, a (i.e., the desired location of the light beam below the cutting edge 22) is solved as follows:

$$a = \frac{\Phi}{2}(1 + R\ \%) \quad (19)$$

$$a = \frac{0.200}{2}(1 + 0.20) \quad (20)$$

$$a = 0.12 \text{ mm} \quad (21)$$

Whereby the effective beam position below the first side face 18 of the laser-transmitting machining tool 10 is: $(h_i+a)=(0.050\text{ mm}+0.12\text{ mm})=0.17$ mm.

Then, applying solved a (i.e., the desired location of the light beam below the cutting edge 22) and the variable data of Table 3 to Equation 11, the minimum relief angle, $\theta_i$, is solved, as follows:

$$a = l\frac{\tan\left(\theta_i - \frac{\theta_i}{n_2}\right)\cdot\tan(90° - \theta_i)}{\tan\left(\theta_i - \frac{\theta_i}{n_2}\right) + \tan(90° - \theta_i)} \text{ for } 0 < \theta_i < 20° \quad (22)$$

-continued $$0.12 = 2.4\frac{\tan\left(\theta_i - \frac{\theta_i}{1.7}\right)\cdot\tan(90° - \theta_i)}{\tan\left(\theta_i - \frac{\theta_i}{1.7}\right) + \tan(90° - \theta_i)} \text{ for } 0 < \theta_i < 20° \quad (23)$$

$$\theta_i = 7° \quad (24)$$

Comparatively, as seen above, the lower index of refraction $n_2$ defined by sapphire of EXAMPLE 2 results in a greater back-relief angle $\theta_i$ to direct the laser beam L to the cutting edge 22, given the same entry position of the laser beam L below the first side face 18 of the diamond-based laser-transmitting machining tool 10 of EXAMPLE 1.

The following exemplary laser-transmitting machining tool 10 is directed to a zero rake angle $\theta_{14}$ (see, e.g., FIG. 30D) and a diamond material.

Example 3

TABLE 4

| | |
|---|---|
| R % | 70% |
| l | 2.4 mm |
| n2 | 2.417 |
| Φ | 0.200 mm |
| $h_i$ | 0 mm |

Applying the variable data of Table 4 to Equation 12, a (i.e., the desired location of the light beam below the cutting edge 22) is solved as follows:

$$a = \frac{\Phi}{2}(1 + R\ \%) \quad (25)$$

$$a = \frac{0.200}{2}(1 + 0.70) \quad (26)$$

$$a = 0.17 \text{ mm} \quad (27)$$

Whereby the effective beam position below the first side face 18 of the laser-transmitting machining tool 10 is: $(h_i+a)=(0\text{ mm}+0.17\text{ mm})=0.17$ mm.

Then, applying solved a (i.e., the desired location of the light beam below the cutting edge 22) and the variable data of Table 4 to Equation 11, the minimum relief angle, $\theta_i$, is solved, as follows:

$$a = l\frac{\tan\left(\theta_i - \frac{\theta_i}{n_2}\right)\cdot\tan(90° - \theta_i)}{\tan\left(\theta_i - \frac{\theta_i}{n_2}\right) + \tan(90° - \theta_i)} \text{ for } 0 < \theta_i < 20° \quad (28)$$

$$0.17 = 2.4\frac{\tan\left(\theta_i - \frac{\theta_i}{2.417}\right)\cdot\tan(90° - \theta_i)}{\tan\left(\theta_i - \frac{\theta_i}{2.417}\right) + \tan(90° - \theta_i)} \text{ for } 0 < \theta_i < 20° \quad (29)$$

$$\theta_i = 7° \quad (30)$$

Referring now to FIGS. 1A-26', a plurality of exemplary optomechanical laser-transmitting machining tools are shown generally at 10*a*-10*o*. Each laser-transmitting machining tool 10*a*-10*o* includes a plurality of surfaces (at least, e.g.: a laser beam entrance face 12; a rake face 14, a flank face or clearance face 16; a first side face or a rake side face 18; and a second side face or a flank side face 20). Although each laser-transmitting machining tool 10*a*-10*o* includes the plurality of surfaces 12-20, some of the laser-transmitting machining tool 10*a*-10*o* may be further defined to include one or more additional surfaces (see, e.g., secondary clearance face 34 at FIGS. 9, 11, 13, and 15). Alternatively, in some instance, some of the laser-transmitting machining tool 10*a*-10*o* may not include one or more of the plurality of surfaces 12-20 (see, e.g., FIG. 15 where the laser-transmitting machining tool 10*h* does not include a rake side face 18). Accordingly, each laser-transmitting machining tool 10*a*-10*o* is configured to provide high efficiency of laser guidance through the medium defining each laser-transmitting machining tool 10*a*-10*o* with minimal losses and internal reflections such that each laser-transmitting machining tool 10*a*-10*o*. (1) increases in determinism of cutting a workpiece W as a result of smaller losses; and (2) increases in ductility of the surface of the workpiece W being machined as a consequence of localized heating of the laser emitted from the laser-transmitting machining tool 10*a*-10*o*.

In some examples, the medium defining each laser-transmitting machining tool 10*a*-10*o* may include a single or poly crystal transmissive media such as diamonds, sapphires, moissanites, chrysoberyls, alexandrite, and the like. In other examples, the medium defining each laser-transmitting machining tool 10*a*-10*o* may include other transmissive media such as carbides, cubic boron nitride (CBN), silicon, nitrides, steels, alloys, ceramics, alumina, glass, glass composites, composites, and the like.

Each medium provides a different transmission rate for different wavelengths in addition to a chemical inertness to the material of the workpiece W. Therefore, the optical, chemical, and mechanical properties of a selected medium of a laser-transmitting machining tool 10*a*-10*o* may be exploited so that the laser-transmitting machining tool 10*a*-10*o* is: (1) optically transparent to the wavelength of the light source used as an assistance to a machining process; (2) mechanically harder than the material of the workpiece W; and (3) chemically inert toward the material of the workpiece W (and, if also applicable, a cutting fluid applied to the laser-transmitting machining tool 10*a*-10*o*).

Referring now to FIGS. 1A-2I, exemplary laser-transmitting machining tools are shown generally at 10*a*. The medium of the laser-transmitting machining tools 10*a* may include any desirable material such as, for example any type of single or poly crystal transmissive media including but not limited to: diamonds; sapphires; moissanites, chrysoberyls; alexandrite; and the like. In other configurations, exemplary materials defining the medium of the laser-transmitting machining tools 10*a* may include but are not limited to other transmissive media such as, for example: carbides; cubic boron nitride (CBN); silicon; nitrides; steels; alloys; ceramics; alumina; glass; glass composites; composites, and the like.

The exemplary laser-transmitting machining tools 10*a* are defined by a substantially similar structural configuration with respect to the transmitting machining tool 10 of FIG. 27 described above and includes a plurality of surfaces or faces 12-20. The surface 12 of the plurality of surfaces or faces 12-20 may be referred to as a laser-beam entrance face. The surface 14 of the plurality of surfaces or faces 12-20 may be referred to as a rake face. The surface 16 of the plurality of surfaces or faces 12-20 may be referred to as a flank face or clearance face. The surface 18 of the plurality of surfaces or faces 12-20 may be referred to as a first side face or a rake side face. The surface 20 of the plurality of surfaces or faces 12-20 may be referred to as a second side face or a flank side face. In some instances, the laser-transmitting machining tool 10*a* may be utilized for machining a workpiece W (see, e.g., any of FIGS. 29, and 30A-30E).

Referring to FIGS. 1A-2I, the exemplary laser-transmitting machining tools 10*a* are also defined a plurality of sidewall surfaces or faces 21*a*-21*d*. The plurality of sidewall surfaces or faces 21*a*-21*d* includes a first upstream sidewall surface or face 21*a* (see, e.g., FIGS. 1A-G and 2A-2I), a first downstream sidewall surface or face 21*b* (see, e.g., FIGS. 1A-G and 2A-2I), a second upstream sidewall surface or face 21*c* (see, e.g., FIGS. 2A-2I), and a second downstream sidewall surface or face 21*d* (see, e.g., FIGS. 2A-2I).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* (see, e.g., FIGS. 1A-1G and 2A-2I) that is arranged at an angle $\theta_{23}$ (see, e.g., FIGS. 1A-G) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*a* to the second side 30 (i.e., one or both of the flank face 16 and the second side face 20) of the laser-transmitting machining tools 10*a*.

The second upstream sidewall surface or face 21*c* meets the second downstream sidewall surface or face 21*d* at a second side edge 23*b* (see, e.g., FIGS. 2A-2I) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*a* to the second side 30 (i.e., one or both of the flank face 16 and the second side face 20) of the laser-transmitting machining tools 10*a*.

A first end $\mathbf{18}_1$ of the rake side face 18 extends away from a first end $\mathbf{12}_1$ of the laser-beam entrance face 12. A first end $\mathbf{20}_1$ of the flank side face 20 extends away from a second end $\mathbf{12}_2$ of the laser-beam entrance face 12. A first end $\mathbf{14}_1$ of the rake face 14 extends away from a second end $\mathbf{18}_2$ of the rake side face 18. A first end $\mathbf{16}_1$ of the flank face 16 extends away from a second end 20 of the flank side face 20. A second end $\mathbf{14}_2$ of the rake face 14 is joined to a second end $\mathbf{16}_2$ of the flank face 16 to define a cutting edge 22 that may be non-linear, curved or arcuate (as seen in, e.g., FIGS. 2A-2I); although the cutting edge 22 may be non-linear, curved or arcuate, the cutting edge 22 may be defined to include other configurations, such as, for example, a linear, non-curved or non-arcuate shape. Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$.

In some examples, the second end $\mathbf{12}_2$ of the laser-beam entrance face 12 extends away from the first end $\mathbf{20}_1$ of the second side face 20 at a back-relief angle $\theta_{12}$. As seen at FIGS. 1A-1G, the back-relief angle $\theta_{12}$ is obtuse (i.e., greater than 90°). In some implementations, the obtuse back-relief angle $\theta_{12}$ of the laser-transmitting machining tool 10*a* is approximately equal to 102°. However, in other examples as seen at, e.g., FIGS. 3A-3G, exemplary laser-transmitting machining tools 10*b* include a back-relief angle $\theta_{12}$ that is acute (i.e., less than 90°). In yet other examples, as seen at, e.g., FIGS. 5A-5G, exemplary laser-transmitting machining tools 10*c* include a back-relief angle $\theta_{12}$, that may be a right angle (i.e., equal to 90°).

As seen at FIGS. 1A-1G, the laser beam L that enters and then exits the laser-transmitting machining tools 10*a* is shown being defined by a plurality of segments $L_{E1}$, $L_{E1}$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIGS. 1A-1G, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the laser beam entrance face 12 according to Snell's law. The obtuse back-relief angle $\theta_{12}$ results in the laser beam refracted segment $L_1$ being refracted in a direction away from the flank side face 20.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

In some instances, the negative rake angle $\theta_{14}$ and the clearance angle $\theta_{16}$ are configured so that both the rake face 14 and the flank face 16 receive the laser beam L at an angle less than a critical angle $\theta_C$, as defined in Equation 3. For instance, the negative rake angle $\theta_{14}$ may be an obtuse angle greater than 90 and less than 80°; in some instances, the rake angle $\theta_{14}$ may range between approximately 95° 115° and the clearance angle $\theta_{16}$ may be an obtuse angle less than 105°. The back-relief angle $\theta_{12}$ may be configured to cause the laser beam refracted segment $L_1$ to refract at entrance face 12 toward, respectively, the negative rake face 14 at an angle less than the critical angle or toward and the flank face 16 at an angle less than the critical angle, when the following relationship is satisfied for obtuse rake face angles $\theta_{14}$ and flank face angles $\theta_{16}$:

$$(\theta_{16} - 90°) + (\theta_{14} - 90°) < 2\theta_C \tag{31}$$

Figure 1A:
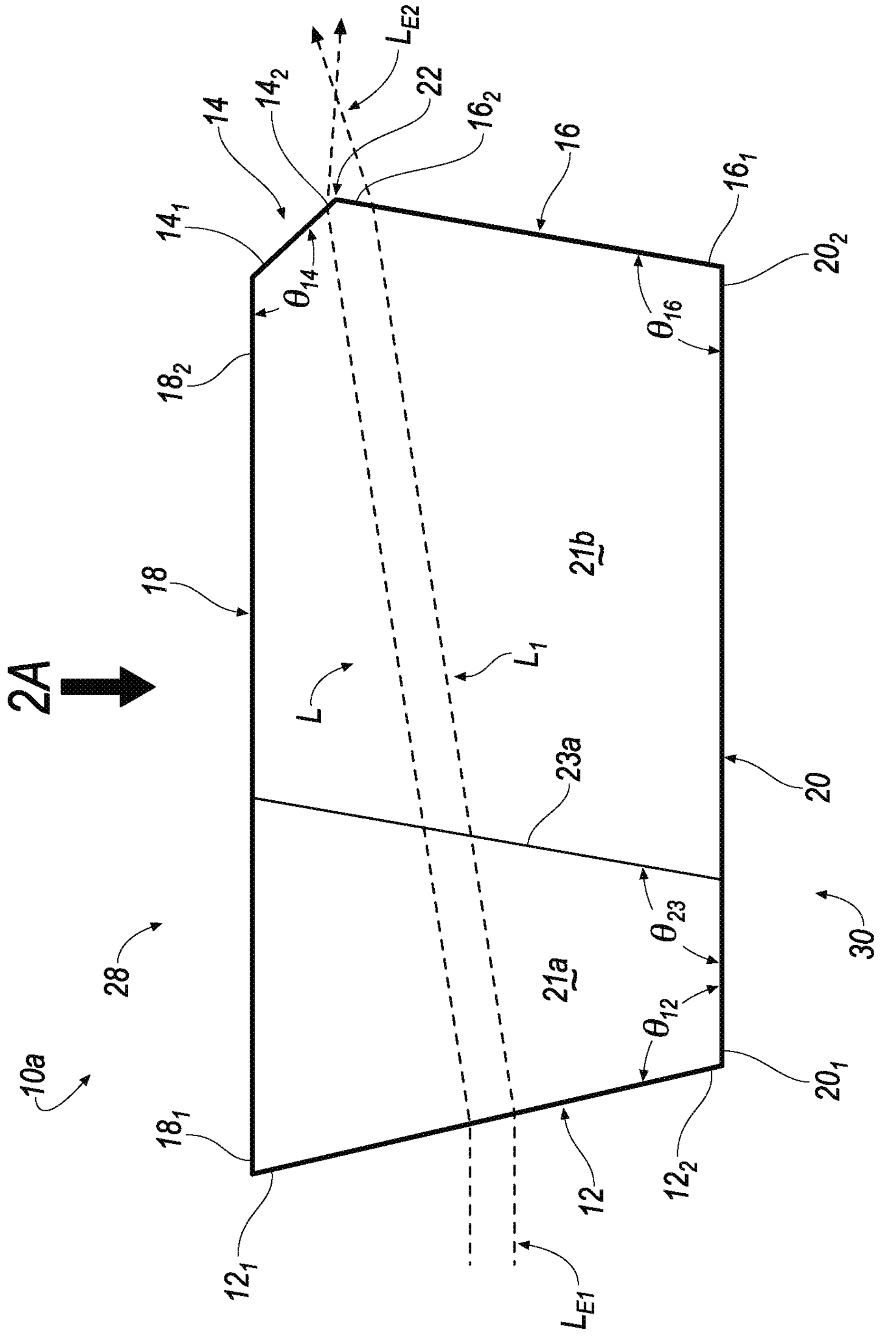
FIG. 1A is a side view of an exemplary optomechanical tool that receives a collimated light beam at a substantially linear, flat or planar light beam entrance face arranged at an obtuse back-relief angle.

Referring to FIGS. 1A-1G. 1B'-1G', and 2A-2I, a plurality of alternative laser beam entrance faces 12 defining the laser beam entrance end 24 of the laser-transmitting machining tool 10*a* are shown. Referring initially to FIGS. 1A and 2A, the laser beam entrance face 12 may be substantially linear, flat or planar as the laser beam entrance face 12 extends between the first end $\mathbf{12}_1$ of the laser-beam entrance face 12 and so the second end $\mathbf{12}_2$ of the laser-beam entrance face 12. After the collimated laser beam entrance segment $L_{E1}$ enters the laser-transmitting machining tool 10*a* at the substantially linear, flat or planar laser beam entrance face 12, the laser beam refracted segment $L_1$ of the laser beam L remains collimated as the laser beam refracted segment $L_1$ travels through the laser-transmitting machining tool 10*a*. After the laser beam refracted segment $L_1$ contacts and travels through one or more of: (1) the cutting edge 22 (causing the laser beam refracted segment $L_1$ to refract onto the workpiece W), (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent.

Figure 1B:
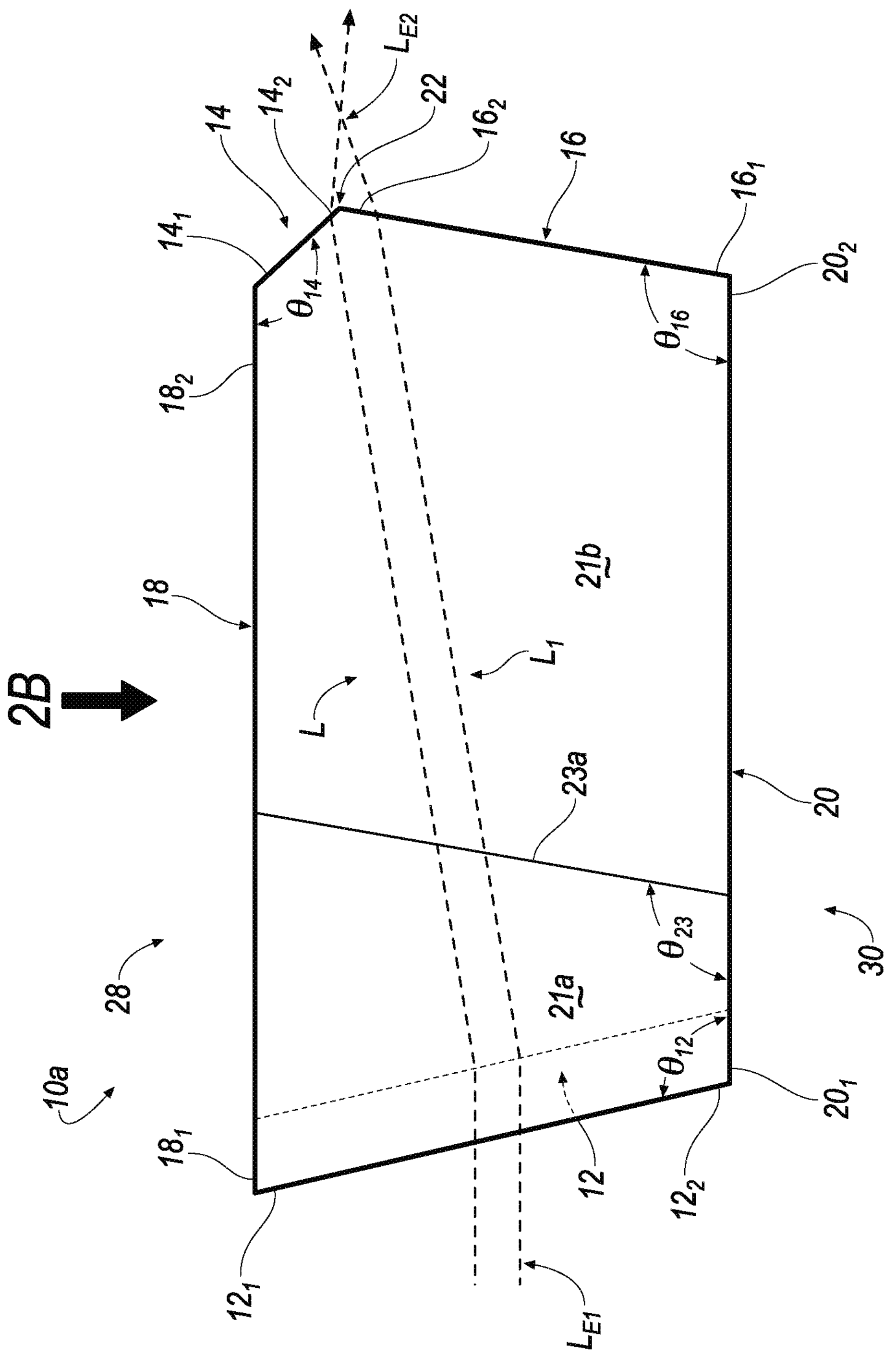
FIG. 1B is a side view of an exemplary optomechanical tool that receives a collimated light beam at an inwardly-projecting axially cylindrical light beam entrance face arranged at an obtuse back-relief angle.
Figure 2B:
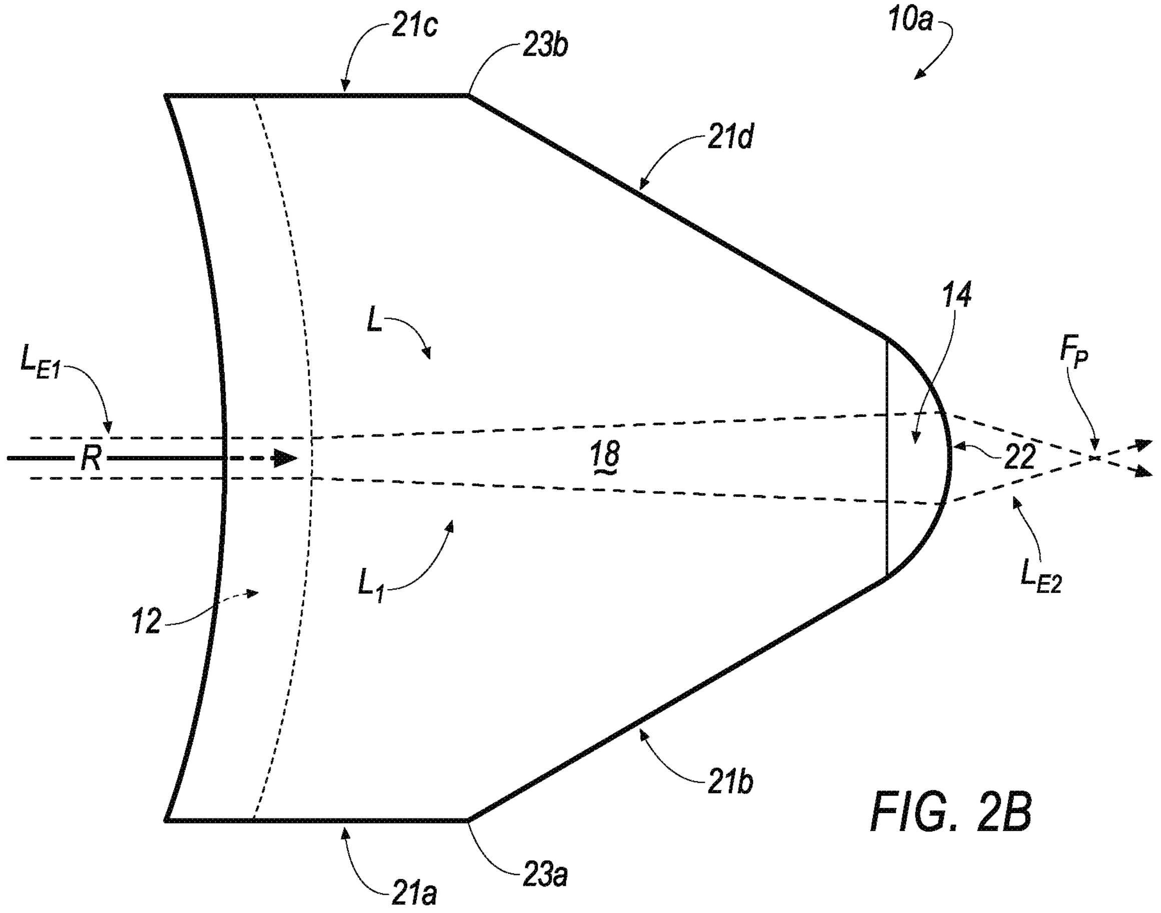
FIG. 2B is a top view of the optomechanical tool of FIG. 1B.
Figure 1B:
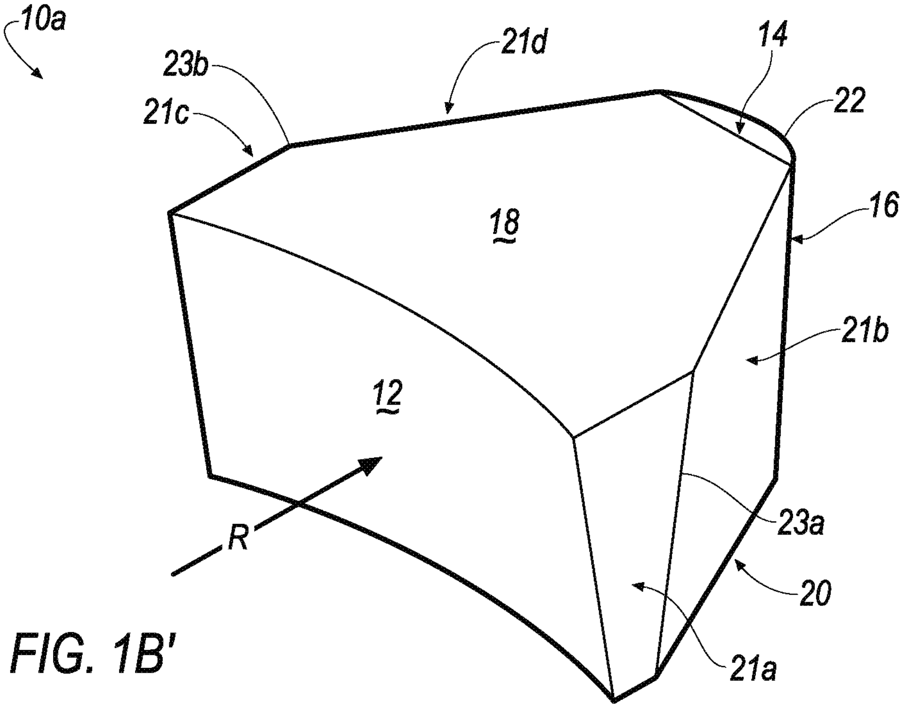
Figure 2G:
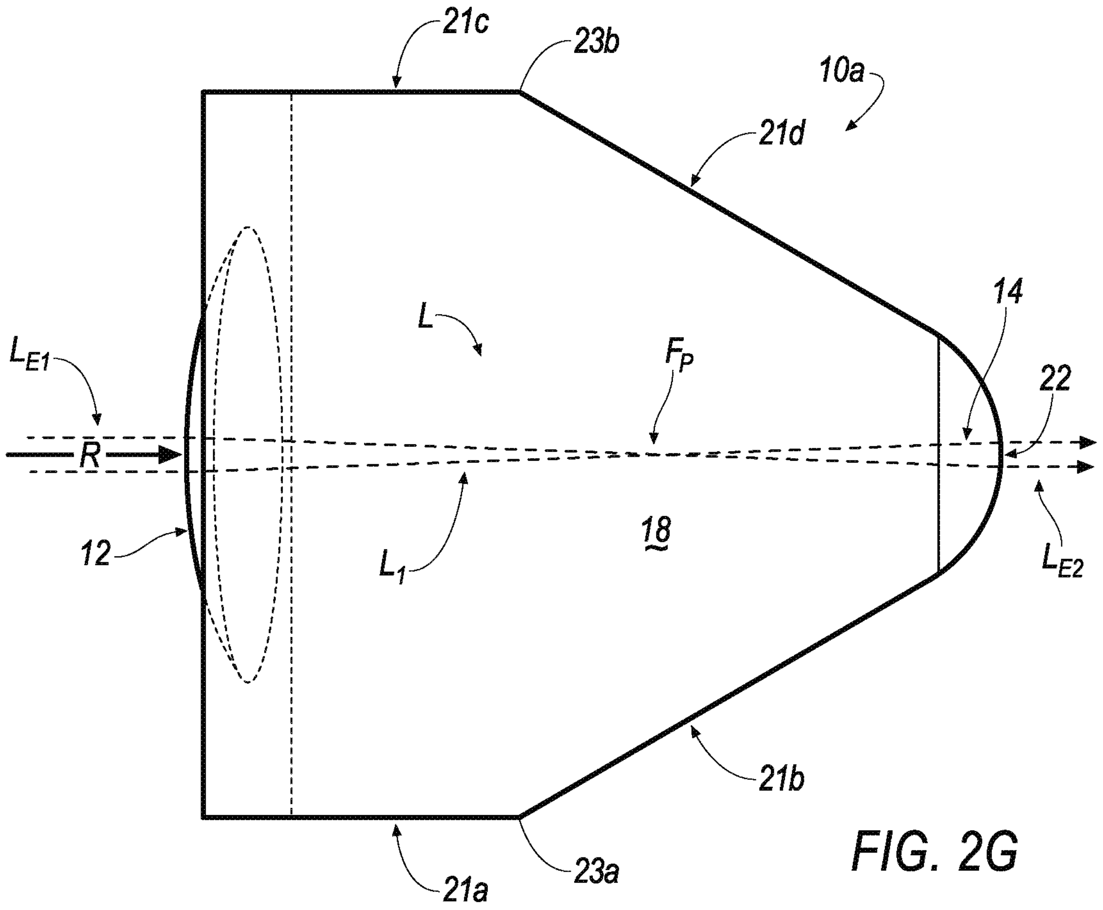
FIG. 2G is a top view of the optomechanical tool of FIG. 1G.
Figure 2A:
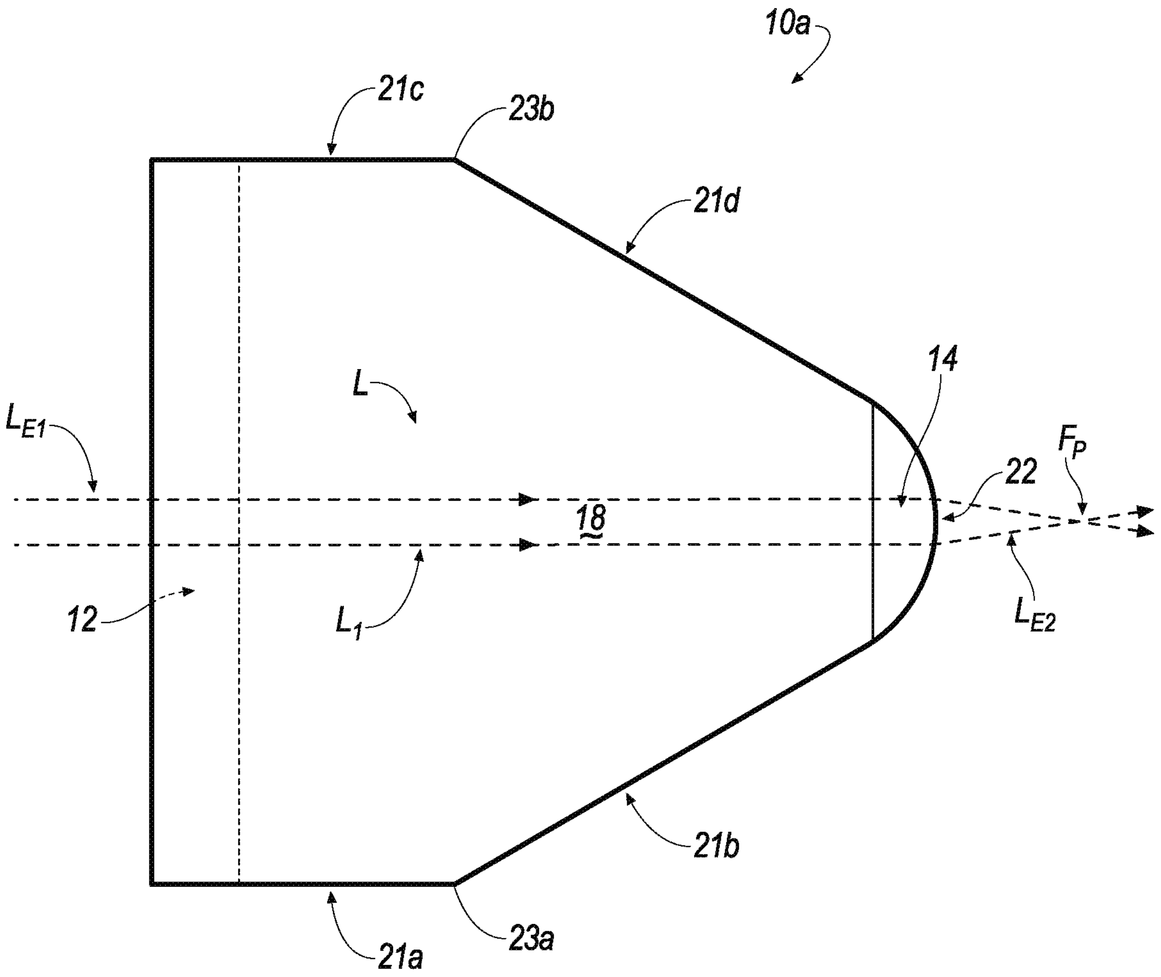
FIG. 2A is a top view of the optomechanical tool of FIG. 1A.

As seen at FIGS. 1B' and 2B, the laser beam entrance face 12 may be defined by an inwardly-projecting (e.g., concave) surface having a non-linear, curved or arcuate configuration such as, e.g., an inwardly-projecting axial cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*a* at the laser beam entrance face 12 defined by the inwardly-projecting axial cylindrical configuration, the laser beam refracted segment $L_1$ of the laser beam L becomes divergent (see, e.g., FIG. 2B) as the laser beam refracted segment $L_1$ travels through the laser-transmitting machining tool 10*a*. After the laser beam refracted segment $L_1$ contacts and travels through one or more of: (1) the cutting edge 22 (causing the laser beam refracted segment $L_1$ to refract onto the workpiece W), (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIGS. 1B and 2B).

Figure 1C:
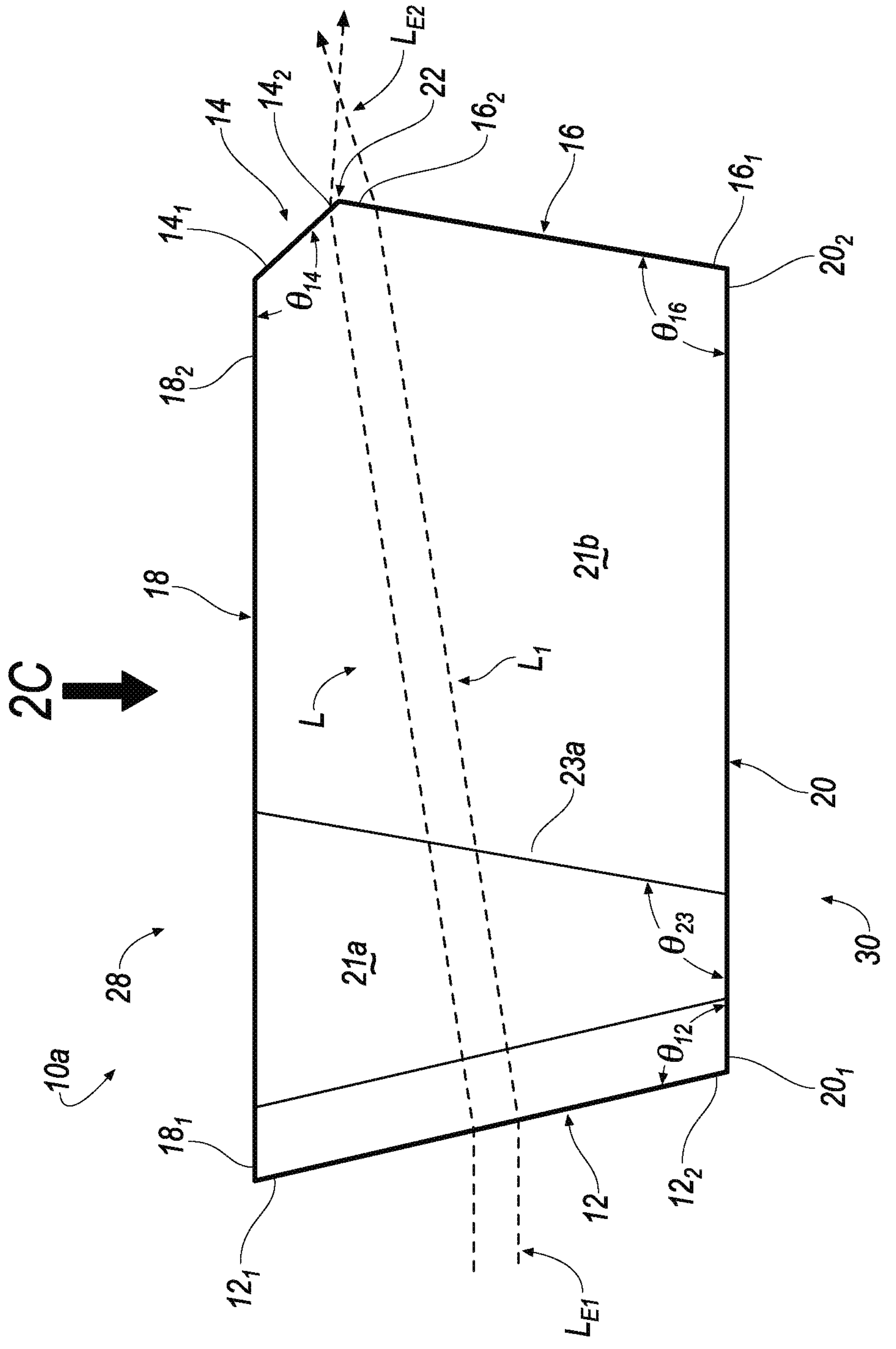
FIG. 1C is a side view of an exemplary optomechanical tool that receives a collimated light beam at an outwardly-projecting axially cylindrical light beam entrance face arranged at an obtuse back-relief angle.
Figure 2C:
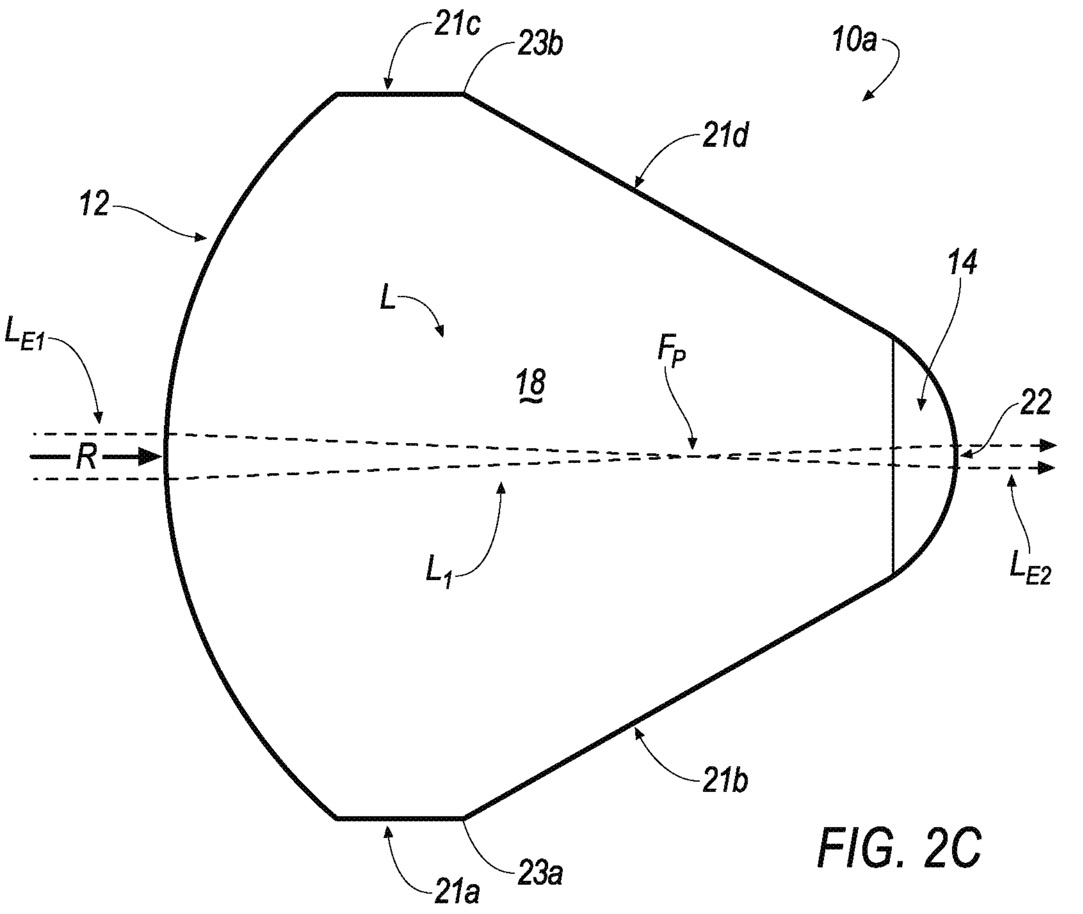
FIG. 2C is a top view of the optomechanical tool of FIG. 1C.
Figure 1C:
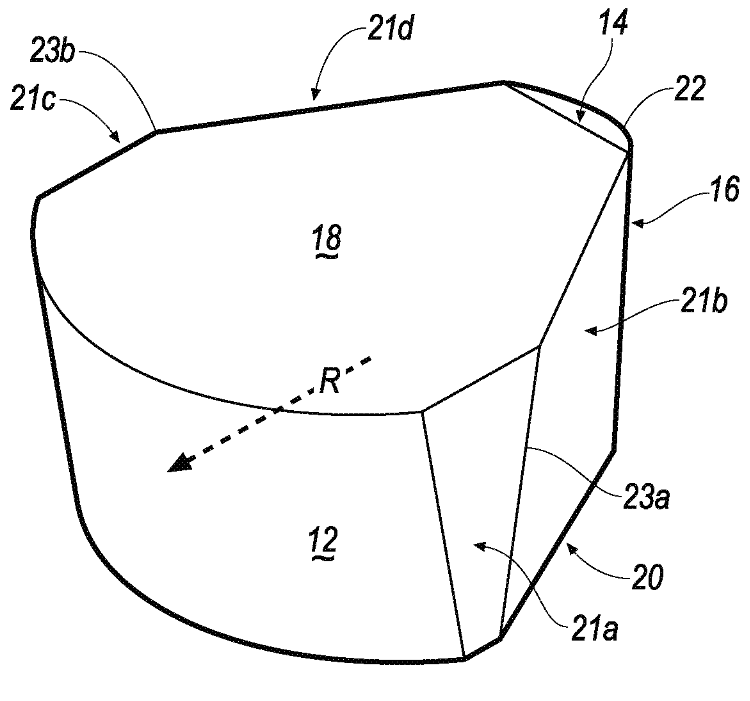

Referring to FIGS. 1C' and 2C, the laser beam entrance face 12 may be defined by an outwardly-projecting (e.g., convex) surface having a non-linear, curved or arcuate configuration such as, e.g., an axial cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*a* at the laser beam entrance face 12 defined by the outwardly-projecting axial cylindrical configuration, the laser beam refracted segment $L_1$ of the laser beam L becomes convergent (see, e.g., FIG. 2C) as the laser beam refracted segment $L_1$ travels through the laser-transmitting machining tool 10*a* and then diverges from a focal point $F_P$ (see, e.g., FIG. 2C) upstream up of the cutting edge 22. After the laser beam refracted segment $L_1$ contacts and travels through one or more of: one or more of: (1) the cutting edge 22 (causing the laser beam refracted segment $L_1$ to refract onto the workpiece W), (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIG. 1C).

Figure 1D:
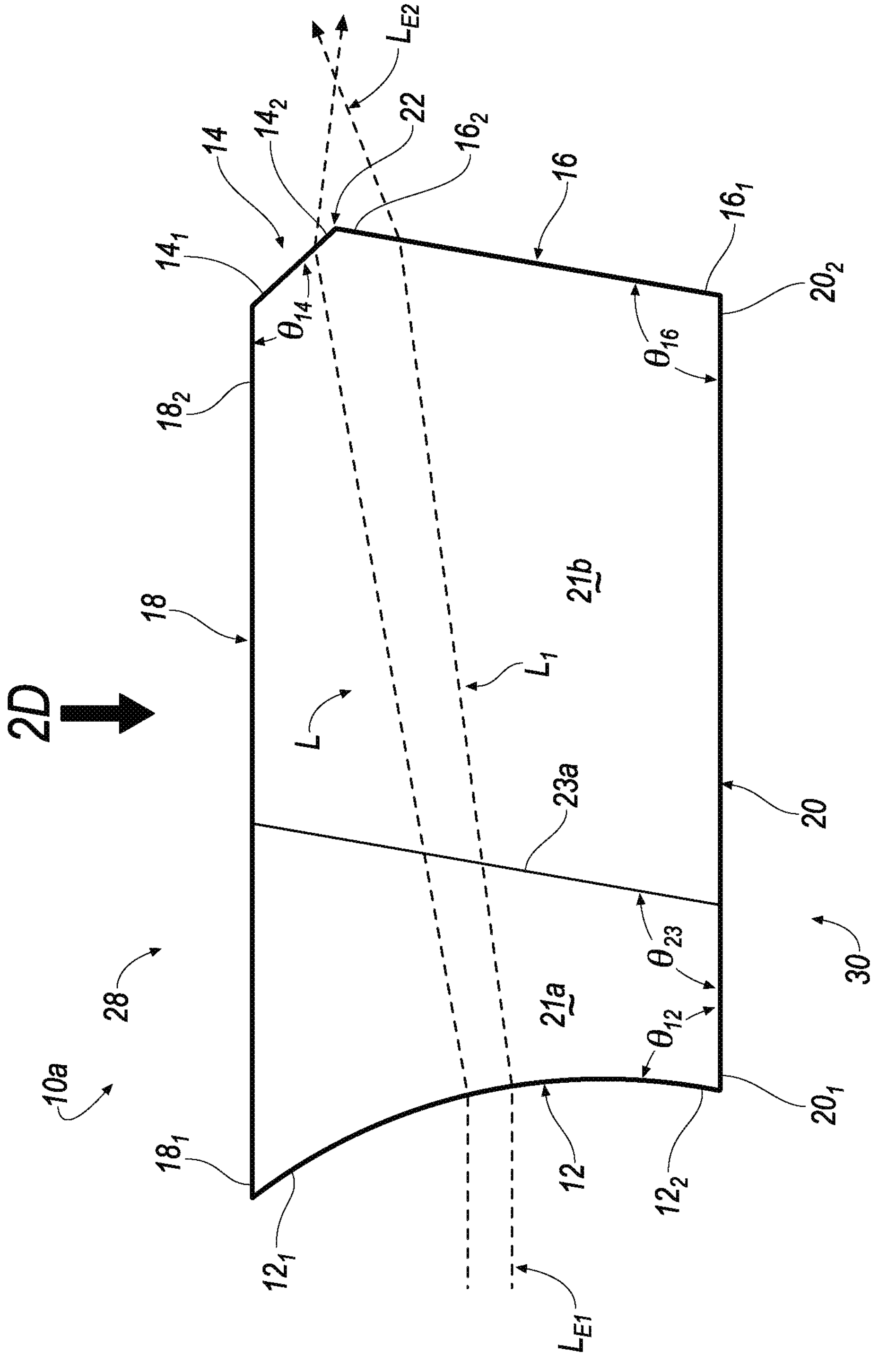
FIG. 1D is a side view of an exemplary optomechanical tool that receives a collimated light beam at an inwardly-projecting laterally cylindrical light beam entrance face arranged at an obtuse back-relief angle.
Figure 2D:
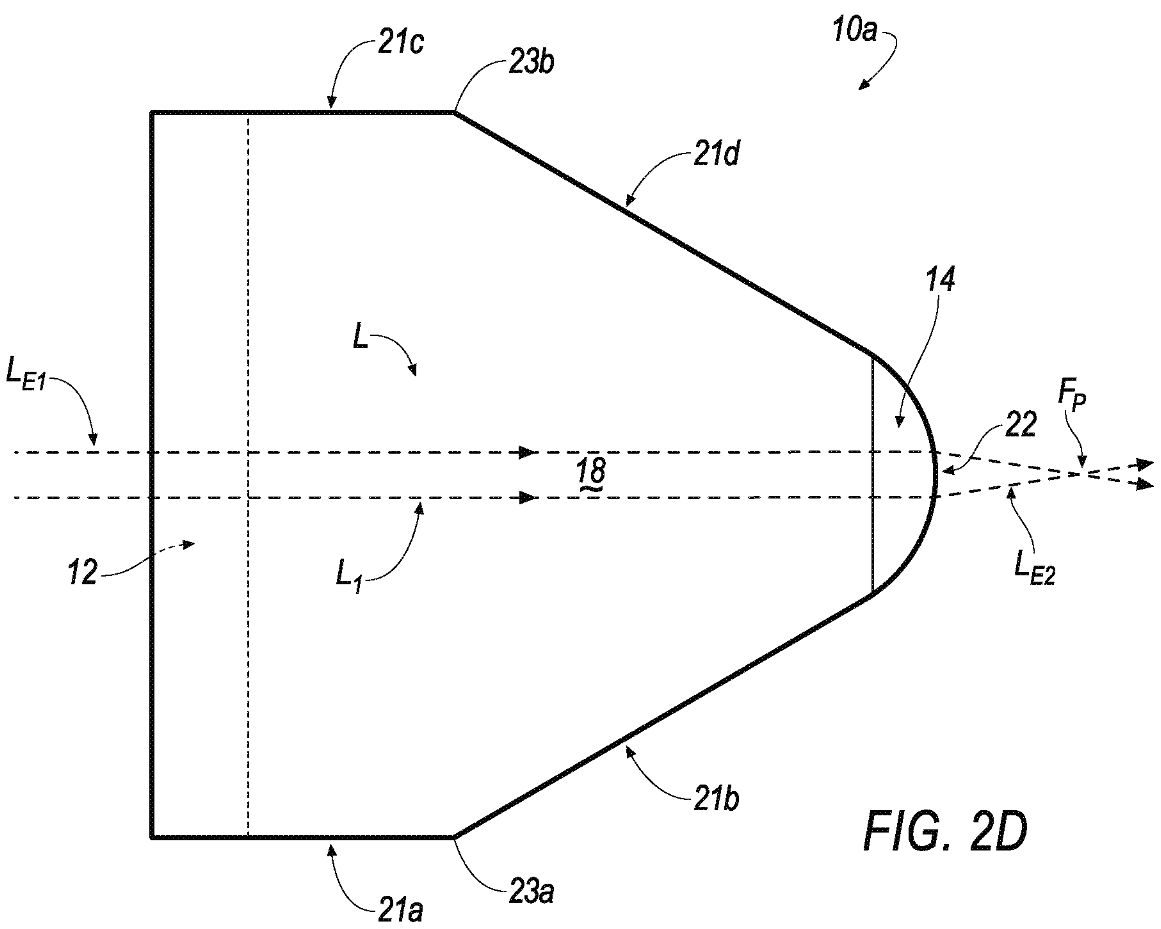
FIG. 2D is a top view of the optomechanical tool of FIG. 1D.
Figure 1D:
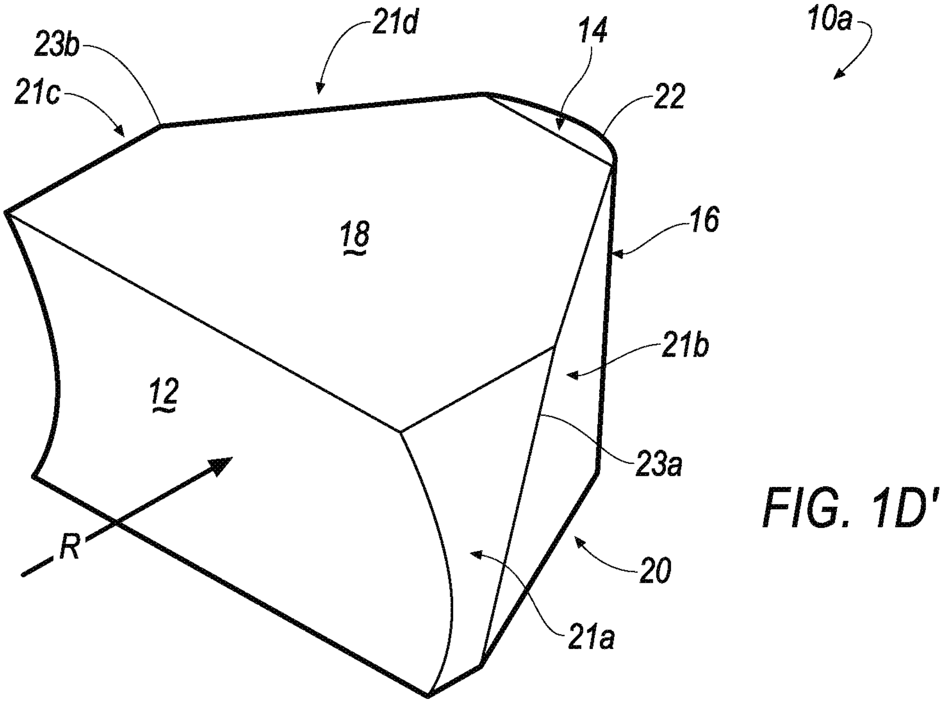

As seen at FIGS. 1D' and 2D, the laser beam entrance face 12 may be defined by an inwardly-projecting (e.g., concave) surface having a non-linear, curved or arcuate configuration such as, e.g., a lateral cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*a* at the laser beam entrance face 12 defined by the inwardly-projecting lateral cylindrical configuration, the laser beam refracted segment $L_1$ of the laser beam L becomes divergent (see, e.g., FIG. 1D) as the laser beam refracted segment $L_1$ travels through the laser-transmitting machining tool 10*a*. After the laser beam refracted segment $L_1$ contacts and travels through one or more of: (1) the cutting edge 22 (causing the laser beam refracted segment $L_1$ to refract onto the workpiece W); (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIGS. 1D and 2D).

Figure 1E:
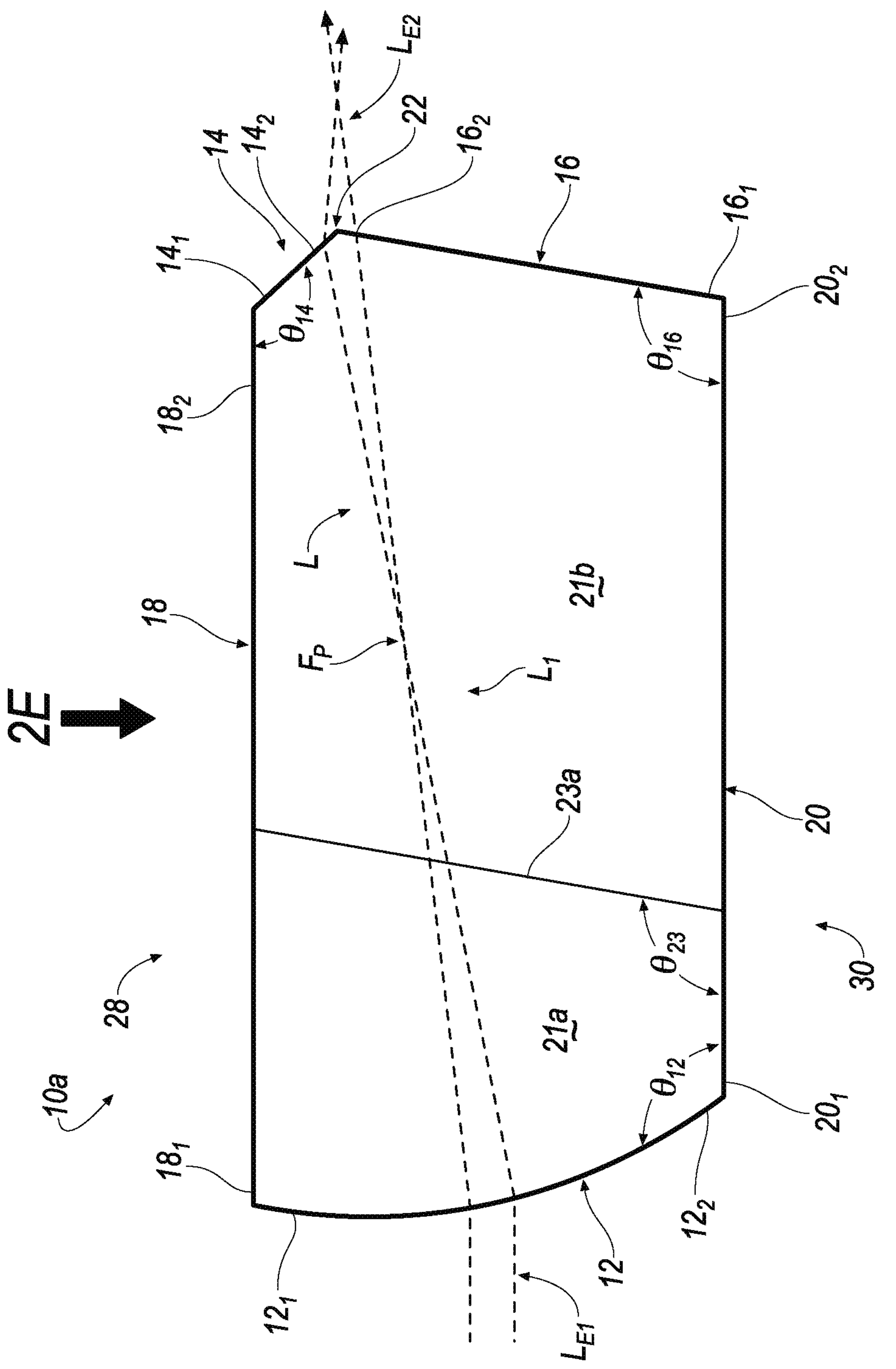
FIG. 1E is a side view of an exemplary optomechanical tool that receives a collimated light beam at an outwardly-projecting laterally cylindrical light beam entrance face arranged at an obtuse back-relief angle.
Figure 2E:
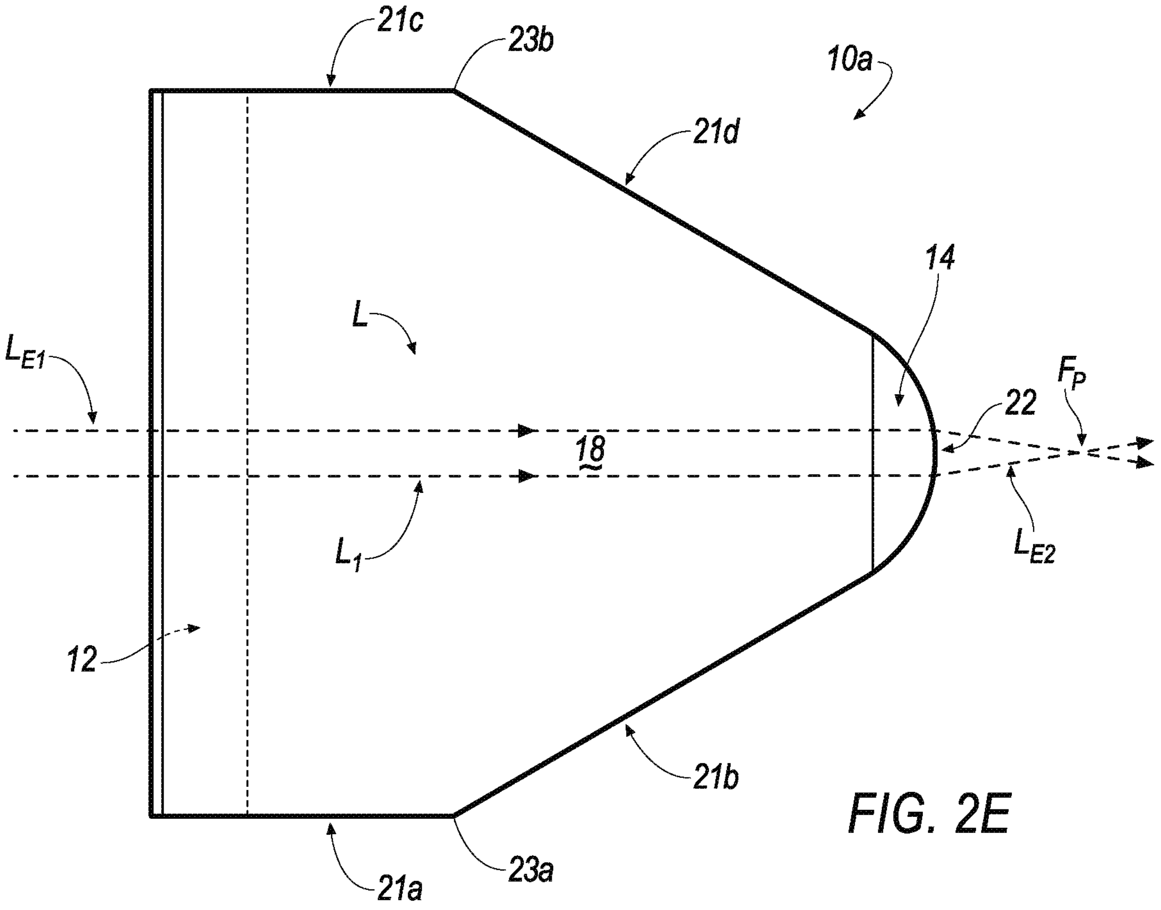
FIG. 2E is a top view of the optomechanical tool of FIG. 1E.
Figure 1E:
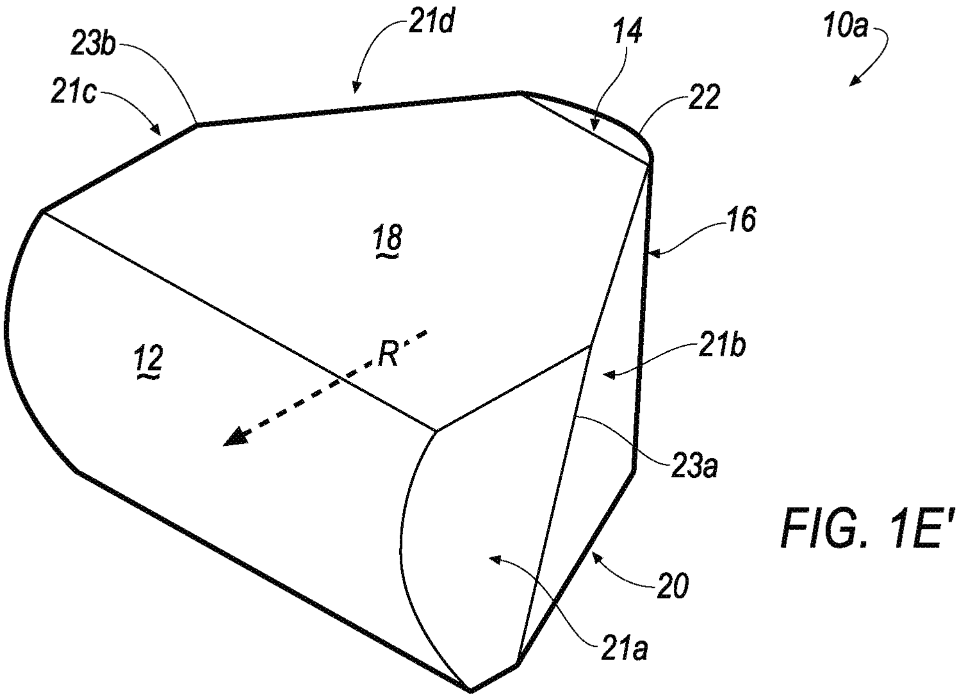

Referring to FIGS. 1E' and 2E, the laser beam entrance face 12 may be defined by an outwardly-projecting (e.g., convex) surface having a non-linear, curved or arcuate configuration such as, e.g., a lateral cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*a* at the laser beam entrance face 12 defined by the outwardly-projecting lateral cylindrical configuration, the laser beam refracted segment $L_1$ of the laser beam L becomes convergent (see, e.g., FIG. 1E) as the laser beam refracted segment $L_1$ travels through the laser-transmitting machining tool 10*a* and then diverges from a focal point $F_P$ (see, e.g., FIG. 1E) upstream up of the cutting edge 22. After the laser beam refracted segment L contacts and travels through one or more of: (1) the cutting edge 22 (causing the laser beam refracted segment $L_1$ to refract onto the workpiece W); (2) the negative rake face 14 near the cutting edge 22 (causing the laser beam refracted segment $L_1$ to refract onto the workpiece W), and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIGS. 1E and 2E).

Figure 1F:
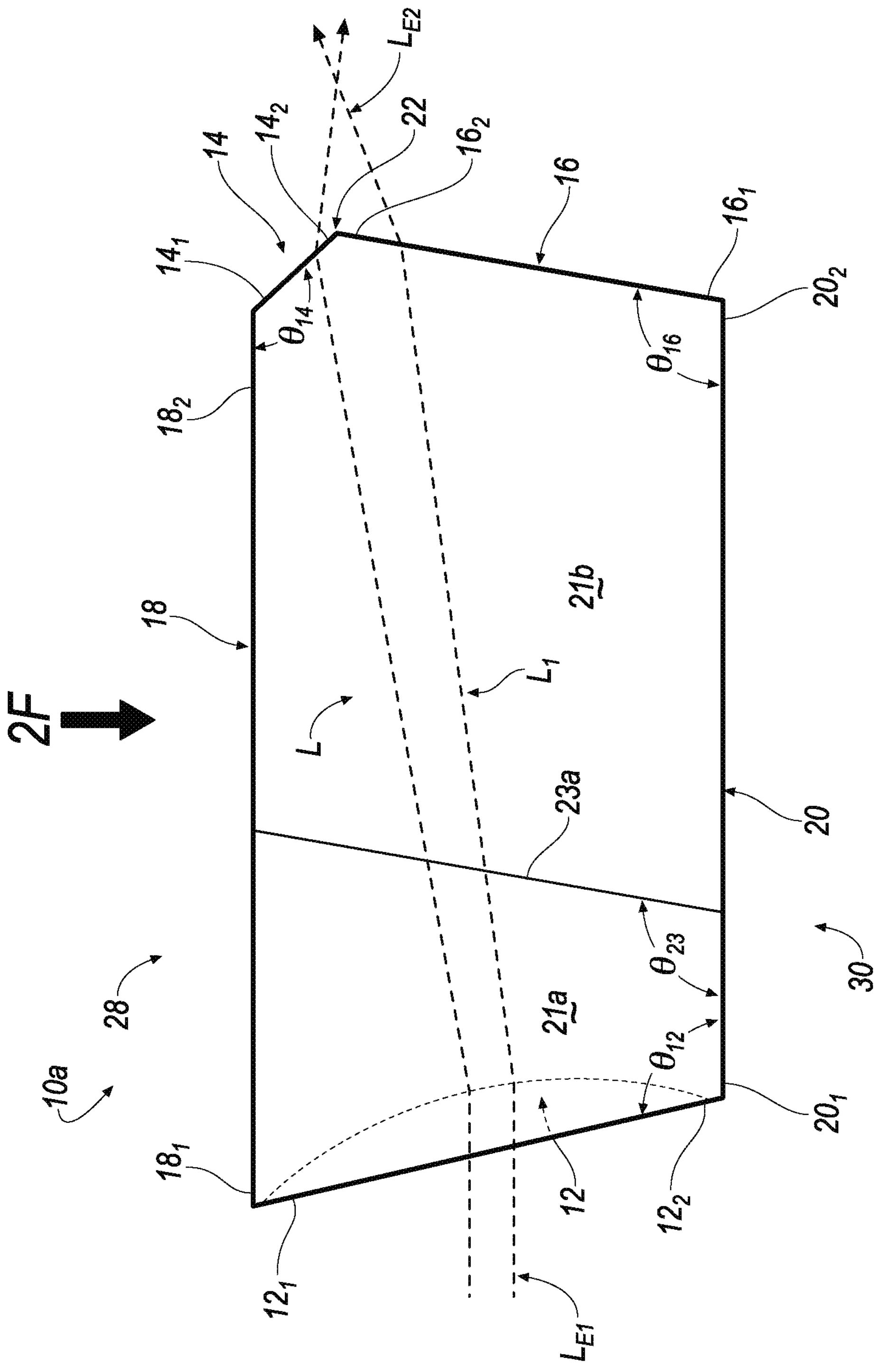
FIG. 1F is a side view of an exemplary optomechanical tool that receives a collimated light beam at an inwardly-projecting spherical light beam entrance face arranged at an obtuse back-relief angle.
Figure 2F:
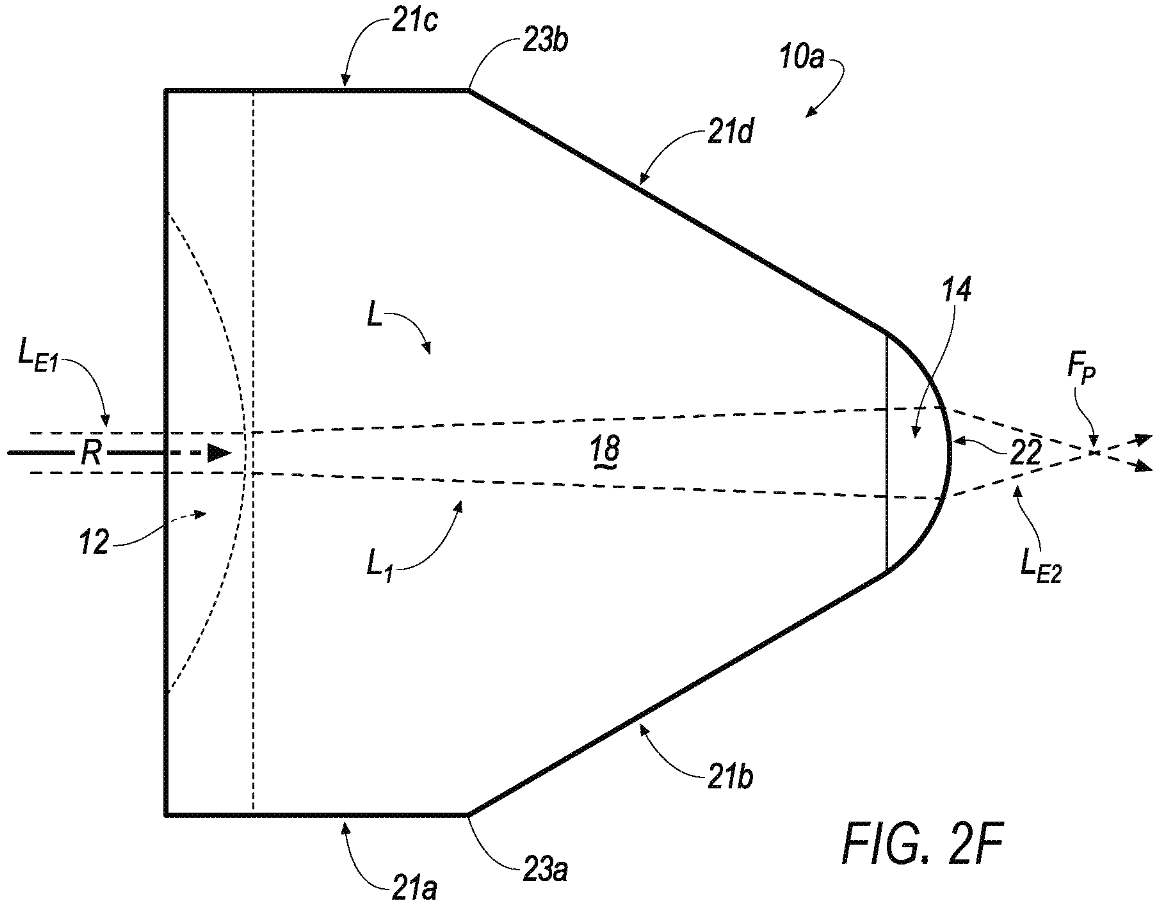
FIG. 2F is a top view of the optomechanical tool of FIG. 1F.
Figure 1F:
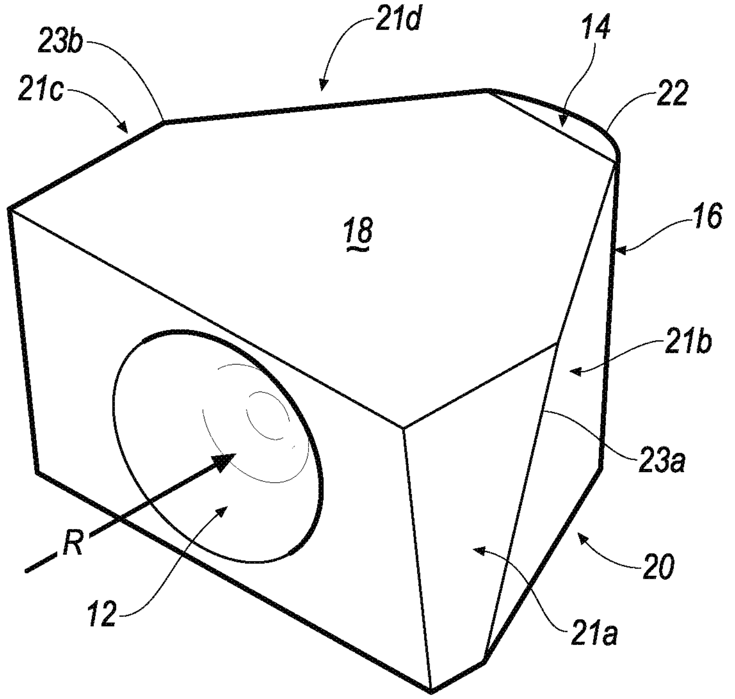

As seen at FIGS. 1F' and 2F, the laser beam entrance face 12 may be defined by an inwardly-projecting (e.g., concave) surface having a non-linear, curved or arcuate configuration such as, e.g., a spherical configuration that extends between the first end $\mathbf{12}_1$ of the laser-beam entrance face 12 and the second end $\mathbf{12}_2$ of the laser-beam entrance face 12. After the collimated laser beam entrance segment $L_{E2}$ enters the laser-transmitting machining tool 10*a* at the laser beam entrance face 12 defined by the inwardly-projecting spherical configuration, the laser beam refracted segment $L_1$ of the laser beam L becomes divergent (see, e.g., FIGS. 1F and 2F) as the laser beam refracted segment $L_1$ travels through the laser-transmitting machining tool 10*a*. After the laser beam refracted segment $L_1$ contacts and travels through one or more of (1) the cutting edge 22 (causing the laser beam refracted segment $L_1$ to refract onto the workpiece W); (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIGS. 1F and 2F).

Figure 1G:
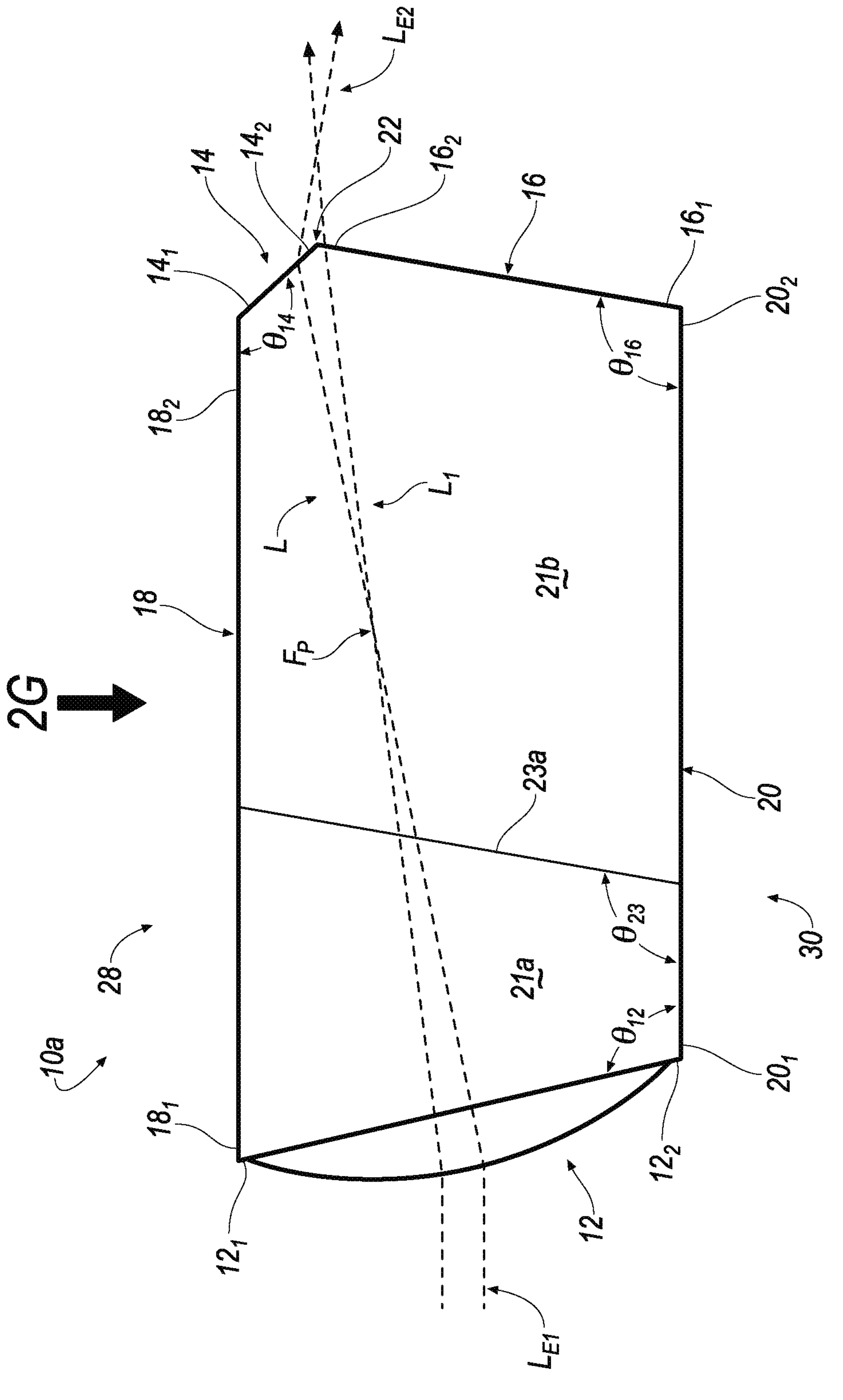
FIG. 1G is a side view of an exemplary optomechanical tool that receives a collimated light beam at an outwardly-projecting spherical light beam entrance face arranged at an obtuse back-relief angle.
Figure 1G:
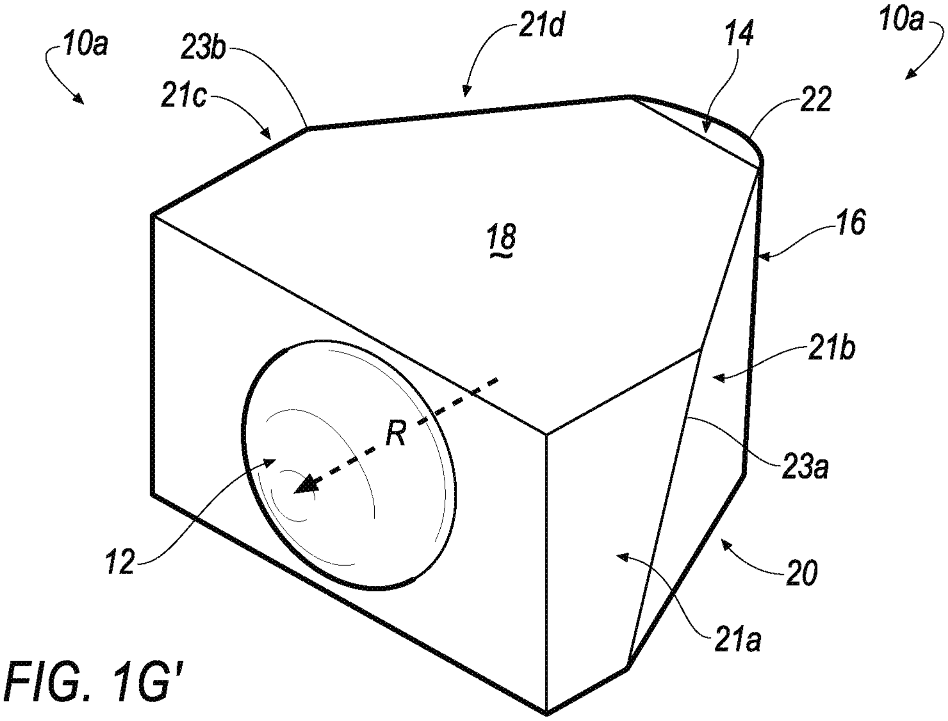

Referring to FIGS. 1G' and 2G, the laser beam entrance face 12 may be defined by an outwardly-projecting (e.g., convex) surface having a non-linear, curved or arcuate configuration such as, e.g., a spherical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*a* at the laser beam entrance face 12 defined by the outwardly-projecting spherical configuration, the laser beam refracted segment $L_1$ of the laser beam L becomes convergent as the laser beam refracted segment L travels through the laser-transmitting machining tool 10*a* and then diverges from a focal point $F_P$ (see, e.g., FIGS. 1G and 2G) upstream up of the cutting edge 22. After the laser beam refracted segment $L_1$ contacts and travels through one or more of: (1) the cutting edge 22 (causing the laser beam refracted segment $L_1$ to refract onto the workpiece W); (2) the negative rake face 14 near the cutting edge 22 (causing the laser beam refracted segment $L_1$ to refract onto the workpiece W); and (3) the flank face 16 near the cutting edge 22 (causing the laser beam refracted segment $L_1$ to refract onto the workpiece W), the laser beam exit segment $L_{E2}$ of the laser beam L becomes convergent (see, e.g., FIG. 1G).

Figure 2H:
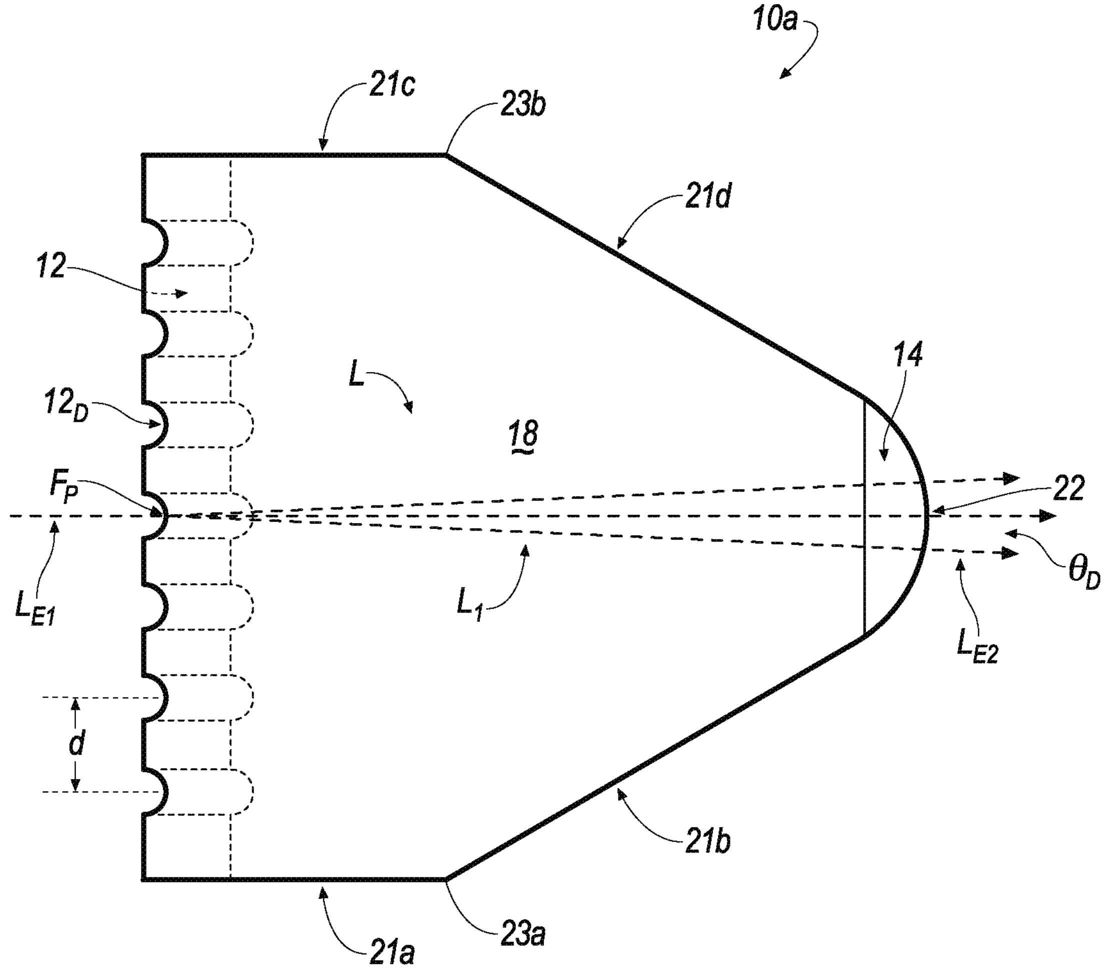
FIG. 2H is a top view of an exemplary optomechanical tool including a light beam entrance face arranged at an obtuse back-relief angle defining one or more diffractive surface portions.

Referring to FIG. 2H, the laser beam entrance face 12 may be defined by a combination of (1) a substantially linear, flat or planar as the laser beam entrance face 12 extends between the first end $\mathbf{12}_1$ of the laser-beam entrance face 12 and the second end $\mathbf{12}_2$ of the laser-beam entrance face 12; and (2) one or more diffractive surface portions $\mathbf{12}_D$ extending between the first end $\mathbf{12}_1$ of the laser-beam entrance face 12 and the second end $\mathbf{12}_2$ of the laser-beam entrance face 12. Adjacent diffractive surface portion $\mathbf{12}_D$ may be spaced apart by a distance, d. Although the laser beam entrance face 12 including the one or more diffractive surface portions $\mathbf{12}_D$ is shown being associated with a substantially linear, flat or planar as the laser beam entrance face 12 that is substantially similar to FIGS. 1A and 2A, any of the laser beam entrance faces 12 of FIGS. 1B-1G and 2B-2G may also include the one or more diffractive surface portions $\mathbf{12}_D$.

At least one of the one or more diffractive surface portions $\mathbf{12}_D$ of the laser beam entrance face 12 receives and diffracts the laser beam entrance segment $L_{E1}$ of the laser beam L, splitting the laser beam entrance segment $L_{E1}$ into the plurality of diffracted laser beam segments $L_1$ within the body of the laser-transmitting machining tool 10*a*. The plurality of diffracted laser beam segments $L_1$ may include three diffracted laser beam segments $L_1$. Each diffracted laser beam segment $L_1$ is separated by the diffraction angle $\theta_D$. The three diffracted laser beam segments $L_1$ distribute laser power over a total angle of 20D. Assuming $n_1=1$ for air, the total swept angle $2\theta_D$ of the diffracted laser beams L having a wavelength λ and passing through a diffractive surface portion $\mathbf{12}_D$ comprising a grating with distance d between slits may be given using the grating equation to compute $\theta_D$: $n2\lambda=d \sin \theta_D$ $$n_2\lambda = d\sin(\theta_D) \tag{32}$$

In some examples, at least one of the one or more diffractive surface portions $\mathbf{12}_D$ of the laser beam entrance face 12 is configured to diffract the laser beam entrance segment $L_{E1}$ from a diffraction point $F_P$ at a diffractive surface portion $\mathbf{12}_D$ of the one or more diffractive surface portions $\mathbf{12}_D$ such that the plurality of diffracted laser beam segments $L_1$ are directed toward and received by the arcuate or curved cutting edge 22.

In some examples, the one of the one or more diffractive surface portions $\mathbf{12}_D$ focuses or defocuses the laser beam L. or increases or decreases the focal length of the laser-transmitting machining tool 10*a*. Furthermore, in some configurations, two or more laser beams L may distribute laser power more broadly on the workpiece W than a single laser beam L.

Figure 2I:
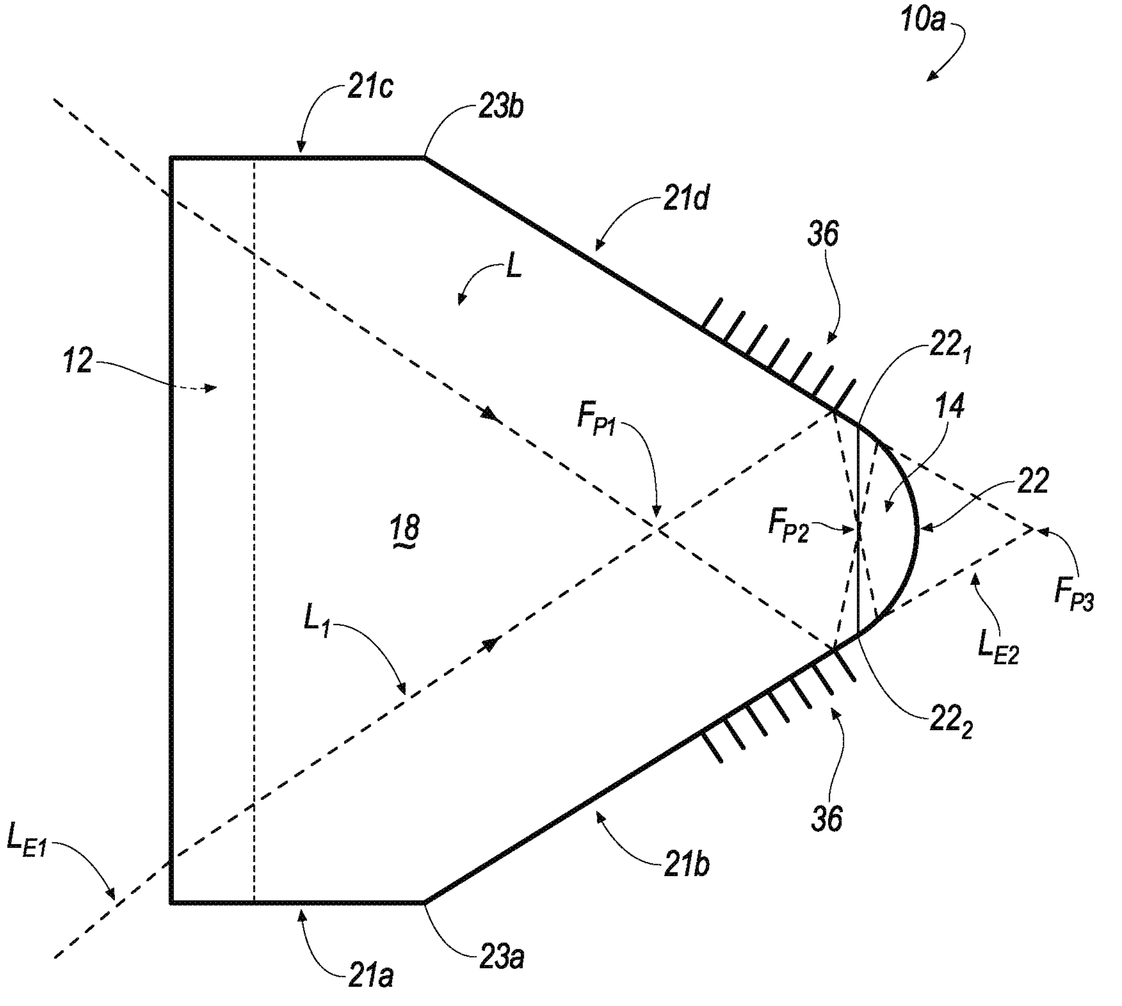
FIG. 2I is a top view of an exemplary optomechanical tool including a light beam entrance face arranged at an obtuse back-relief angle and a reflection-enhancing coating applied to one or more outer surfaces of the optomechanical tool.

Referring to FIG. 2I, the laser beam entrance face 12 may be substantially linear, flat or planar as the laser beam entrance face 12 extends between the first end $\mathbf{12}_1$ of the laser-beam entrance face 12 and the second end $\mathbf{12}_2$ of the laser-beam entrance face 12. Additionally, as seen at FIG. 2I, one or more surfaces of the plurality of surfaces 12-20 of the laser-transmitting machining tool 10*a* is partially or wholly coated with a reflection-enhancing coating 36. Although the reflection-enhancing coating 36 is shown being associated with a substantially linear, flat or planar as the laser beam entrance face 12 that is substantially similar to FIGS. 1A and 2A, any of the laser-transmitting machining tools 10*a* of FIGS. 1B-G and 2B-2G may also include the reflection-enhancing coating 36.

The coating 36 enhances reflection of the laser beam L (which may be defined by a converging laser beam entrance segment $L_{E1}$ as seen at FIG. 2I) by providing a mirror surface on the laser-transmitting machining tool 10*a* that reflects the laser beam L to desired zones of the laser-transmitting machining tool 10*a* with the goal of an increase in efficiency and tool coverage. In some instances, the coating 36 is applied to the laser-transmitting machining tool 10*a* when the ability of employing internal reflections is not feasible. In some implementations, the coating 36 includes a metallic material. Exemplary metallic materials that may be utilized for the coating 36 includes but is not limited to aluminum, silver, gold, INCONEL®, chrome, nickel, and titanium nitride. The coating 36 may be disposed over: (1) a portion of the rake face 14 near the first end $\mathbf{22}_1$ of the arcuate or curved cutting edge 22; (2) a portion of the flank face 16 near the second end $\mathbf{22}_2$ of the arcuate or curved cutting edge 22; and (3) one or both of the first downstream sidewall surface or face 21*b* and the second downstream sidewall surface or face 21*d* near the arcuate or curved cutting edge 22.

As seen at FIG. 2I, the laser-beam entrance face 12 is configured to receive a laser beam L. The laser beam L may be further defined by a plurality of segments $L_{E1}$, $L_1$, $L_{E2}$. The plurality of segments $L_{E1}$, $L_1$, $L_{E2}$ includes at least, for example, a converging laser beam entrance segment $L_{E1}$, a laser beam refracted segment $L_1$ and a laser beam exit segment $L_{E2}$ The laser beam entrance face 12 receives the converging laser beam entrance segment $L_{E1}$. The laser beam refracted segment $L_1$ converges at a first focal point $F_{P1}$ upstream of an outward-most portion of the arcuate or curved cutting edge 22. Thereafter the laser beam refracted segment $L_1$ diverges from the first focal point $F_{P1}$ and may be incident upon one or both of the first downstream sidewall surface or face 21*b* and the second downstream sidewall surface or face 21*d* that includes the coating 36. Thereafter, the laser beam refracted segment $L_1$ of the laser beam L converges at a second focal point $F_{P2}$ upstream of the outward-most portion of the arcuate or curved cutting edge 22. Thereafter the laser beam refracted segment $L_1$ diverges from the second focal point $F_{P2}$ and may be incident upon the arcuate or curved cutting edge 22. Thereafter, the laser beam refracted segment $L_1$ of the laser beam L is refracted off the arcuate or curved cutting edge 22 to define the laser beam exit segment $L_{E2}$ that will then subsequently converge at a third focal point $F_{P3}$ downstream of the outward-most portion of the arcuate or curved cutting edge 22.

Referring now to FIGS. 3A-3G and 4A-4I, exemplary laser-transmitting machining tools are shown generally at 10*b*. The medium of the laser-transmitting machining tool 10*b* may include any desirable material such as, for example any type of single or poly crystal transmissive media including but not limited to: diamonds; sapphires, moissanites; chrysoberyls; alexandrite; and the like. In other configurations, exemplary materials defining the medium of the laser-transmitting machining tool 10*b* may include but are not limited to other transmissive media such as, for example: carbides; cubic boron nitride (CBN); silicon; nitrides; steels; alloys; ceramics; alumina; glass; glass composites; composites; and the like.

The laser-transmitting machining tools 10*b* are substantially similar to the laser-transmitting machining tools 10*a* described above. Accordingly, the description associated with reference numerals of the laser-transmitting machining tools 10*b* shown at FIGS. 3A-3G and 4A-4I are similar to the laser-transmitting machining tools 10*a* at FIGS. 1A-G and 2A-2I; therefore, attention is directed to the written description associated with FIGS. 1A-1G and 2A-2I in order to identify structure associated with reference numerals of the laser-transmitting machining tools 10*b* of FIGS. 3A-3G and 4A-41.

Unlike the back-relief angle $\theta_{12}$ of the laser-transmitting machining tools 10*a* of FIGS. 1A-1G that are arranged at an obtuse (i.e., greater than 90°) angle, the back-relief angle $\theta_{12}$ of the laser-transmitting machining tools 10*b* of FIGS. 3A-3G are arranged at an acute (i.e., less than 90°) angle. In some implementations, the acute back-relief angle $\theta_{12}$ of the laser-transmitting machining tools 10*b* may be approximately equal to 40°.

As seen at FIGS. 3A-3G, the laser beam L that enters and then exits the laser-transmitting machining tools 10*b* is shown being defined by a plurality of segments $L_{E1}$, $L_1$, $L_2$, $L_{E2}$. The plurality of segments $L_{E1}$, $L_1$, $L_2$, $L_{E2}$ include a laser beam entrance segment $L_{E1}$, a laser beam refracted segment $L_1$, a laser beam reflected segment $L_2$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIGS. 3A-3G, the laser beam entrance face 12 is configured so to receive and refract the collimated laser beam entrance segment $L_{E1}$ such that the laser beam refracted segment $L_1$ (that is subsequently reflected by the flank side face 20 for defining the laser beam reflected segment $L_2$) is directed toward and through one or more of: (1) the arcuate or curved cutting edge 22 (causing, e.g., the laser beam exit segment $L_{E2}$ to refract onto the workpiece W), (2) the negative rake face 14 near the arcuate or curved cutting edge 22 (causing, e.g., the laser beam exit segment $L_{E2}$ to refract onto the workpiece W); and (3) the flank face 16 near the arcuate or curved cutting edge 22 (causing, e.g., the laser beam exit segment. $L_{E2}$ to refract onto the workpiece W). The back-relief angle $\theta_{12}$ is configured to refract the laser beam refracted segment $L_1$ (that is subsequently reflected by the flank side face 20 for defining the laser beam reflected segment $L_2$) at the laser beam entrance face 12 according to Snell's law. Although the cutting edge 22 may be non-linear, curved or arcuate, the cutting edge 22 may be defined to include other configurations, such as, for example, a linear, non-curved or non-arcuate shape. The acute back-relief angle $\theta_{12}$ results in the laser beam refracted segment $L_1$ being refracted in a direction toward the flank side face 20 for subsequently defining the laser beam reflected segment U that is reflected off of the flank side face 20.

The flank side face 20 receives the laser beam refracted segment $L_1$ at an incident mirror angle $\theta_{m-i}$ (that is referenced from a reference line $\theta_m$ extending perpendicularly away from the flank side face 20). The flank side face 20 reflects the laser beam refracted segment L to define the laser beam reflected segment $L_2$. The laser beam reflected segment $L_2$ extends away from the flank side face 20 at a reflected mirror angle $\theta_{m-r}$ (that is also referenced from the reference line $\theta_m$ extending perpendicularly away from the flank side face 20). The reflected mirror angle $\theta_{m-r}$ is equal to the incident mirror angle $\theta_{m-i}$.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5D$_C$ and 5E$_C$). In other examples, the laser beam entrance segment $L_{E1}$ may be defined by a diverging laser beam (as seen in, e.g., FIGS. 5D$_D$ and 5E$_D$).

In some instances, the negative rake angle $\theta_{14}$ and the clearance angle $\theta_{16}$ are configured so that both the rake face 14 and the flank face 16 receive the laser beam L at an angle less than a critical angle $\theta_C$, as defined in Equation 3. For instance, the negative rake angle $\theta_{14}$ may be an obtuse angle greater than 90° and less than 180°; in some instances, the rake angle $\theta_{14}$ may range between approximately 95° and 115° and the clearance angle $\theta_{16}$ may be an obtuse angle less than 105°. The back-relief angle $\theta_{12}$ may be configured to cause the laser beam refracted segment $L_1$ to refract at entrance face 12 toward, respectively, the negative rake face 14 at an angle less than the critical angle or toward and the flank face 16 at an angle less than the critical angle, when the following relationship is satisfied for obtuse rake face angles $\theta_{14}$ and flank face angles $\theta_{16}$:

$$(\theta_{16}-90°)+(\theta_{14}-90°)<2\theta_C \tag{33}$$

Figure 3A:
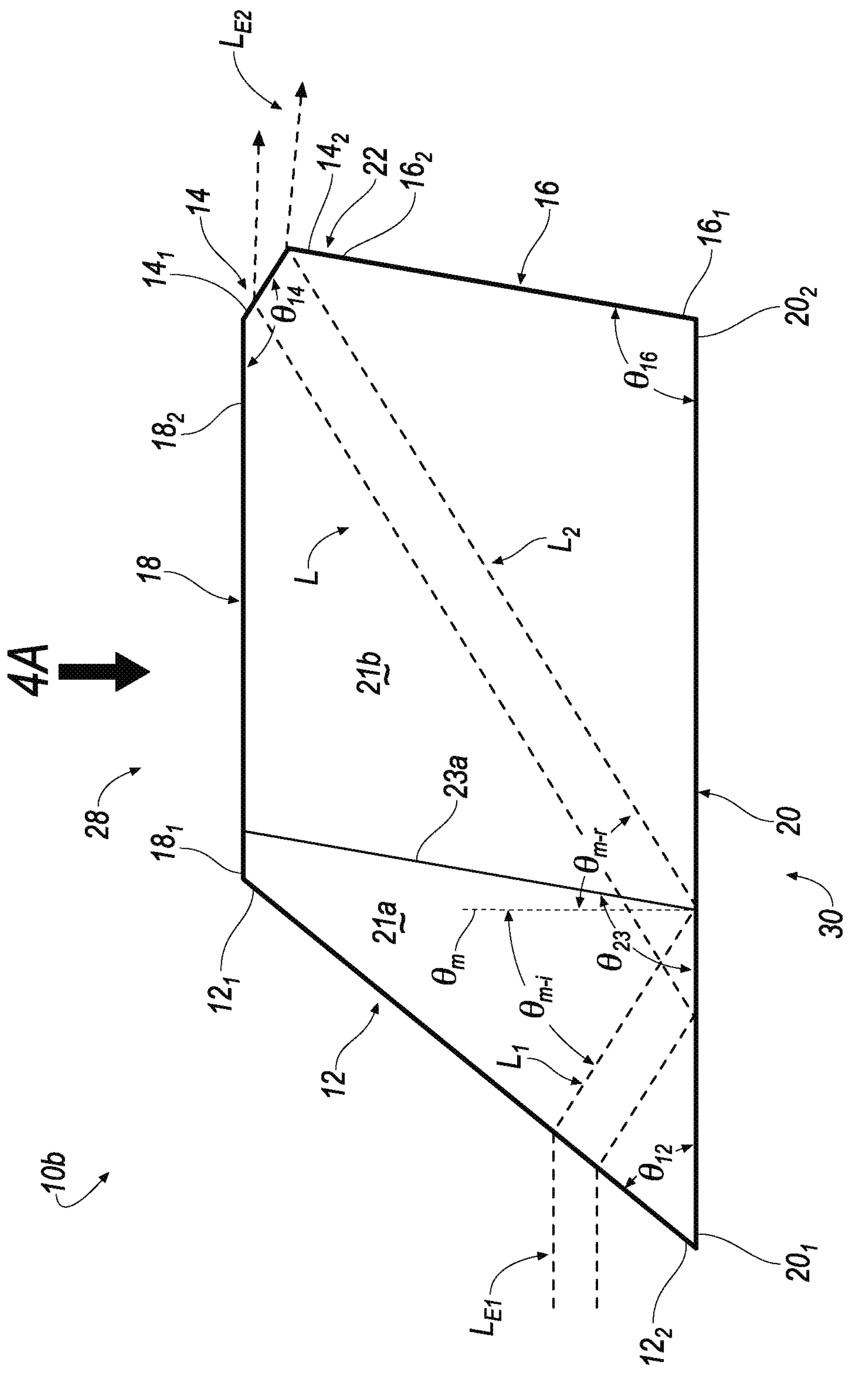
FIG. 3A is a side view of an exemplary optomechanical tool that receives a collimated light beam at a substantially linear, flat or planar light beam entrance face arranged at an acute back-relief angle.

Referring to FIGS. 3A-3G. 3B'-3G', and 4A-4I, a plurality of alternative laser beam entrance faces 12 defining the laser beam entrance end 24 of the laser-transmitting machining tool 10*b* are shown. Referring initially to FIGS. 3A and 4A, the laser beam entrance face 12 may be substantially linear, flat or planar as the laser beam entrance face 12 extends between the first end 12$_1$ of the laser-beam entrance face 12 and the second end 12$_2$ of the laser-beam entrance face 12. After the collimated laser beam entrance segment $L_{E1}$ enters the laser-transmitting machining tool 10*b* at the substantially linear, flat or planar laser beam entrance face 12, the laser beam refracted segment $L_1$ of the laser beam L remains collimated as the laser beam refracted segment $L_1$ travels through the laser-transmitting machining tool 10*b*. After the laser beam reflected segment $L_2$ is subsequently reflected by the flank side face 20 and contacts and travels through one or more of (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent.

Figure 3B:
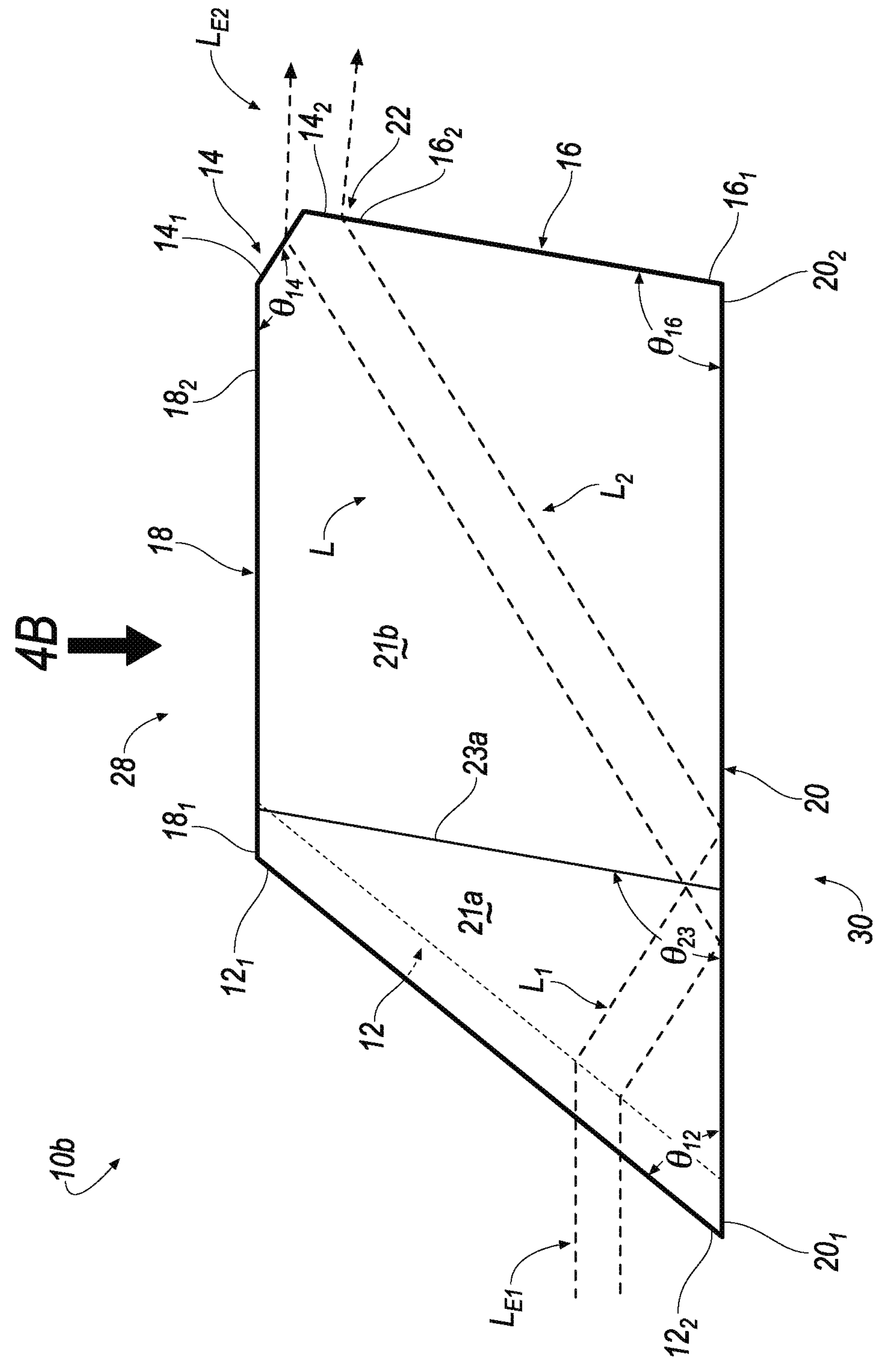
FIG. 3B is a side view of an exemplary optomechanical tool that receives a collimated light beam at an inwardly-projecting axially cylindrical light beam entrance face arranged at an acute back-relief angle.
Figure 4B:
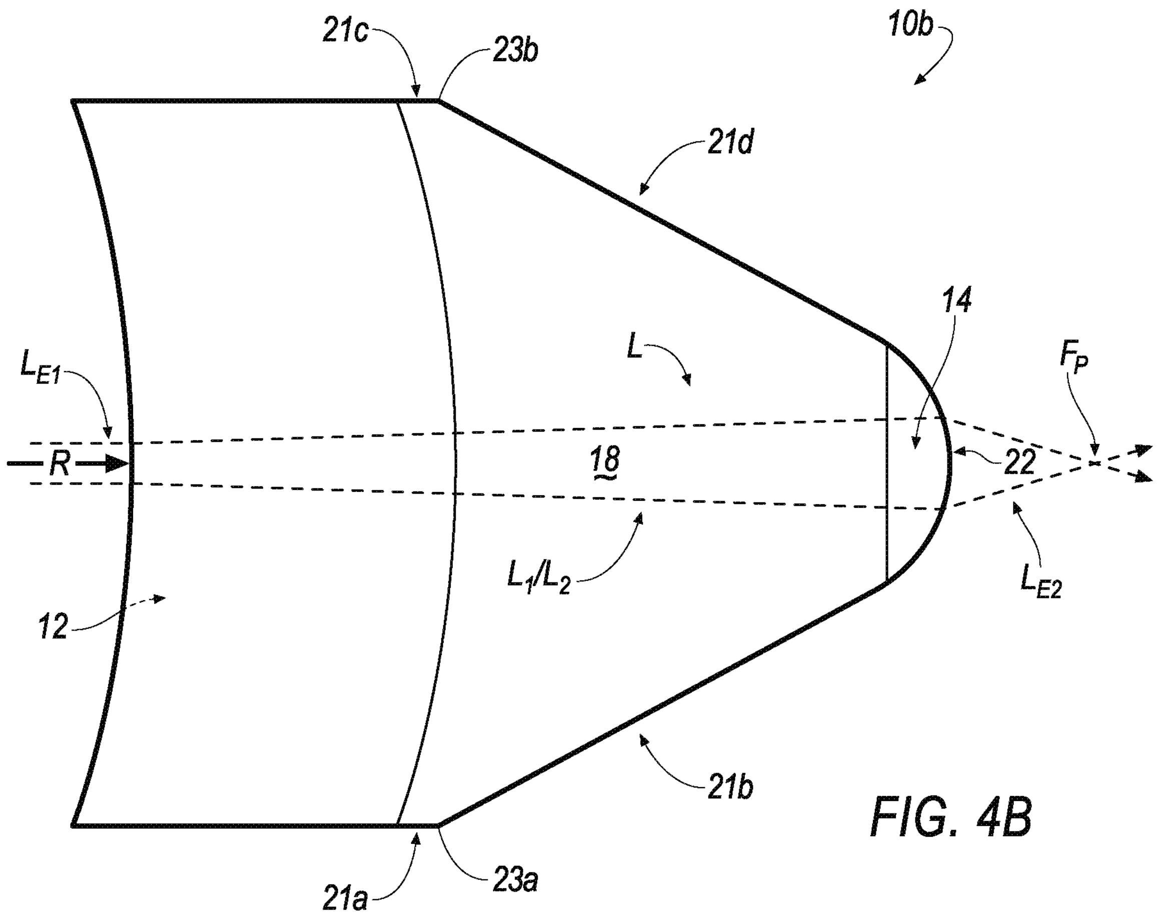
FIG. 4B is a top view of the optomechanical tool of FIG. 3B.
Figure 3B:
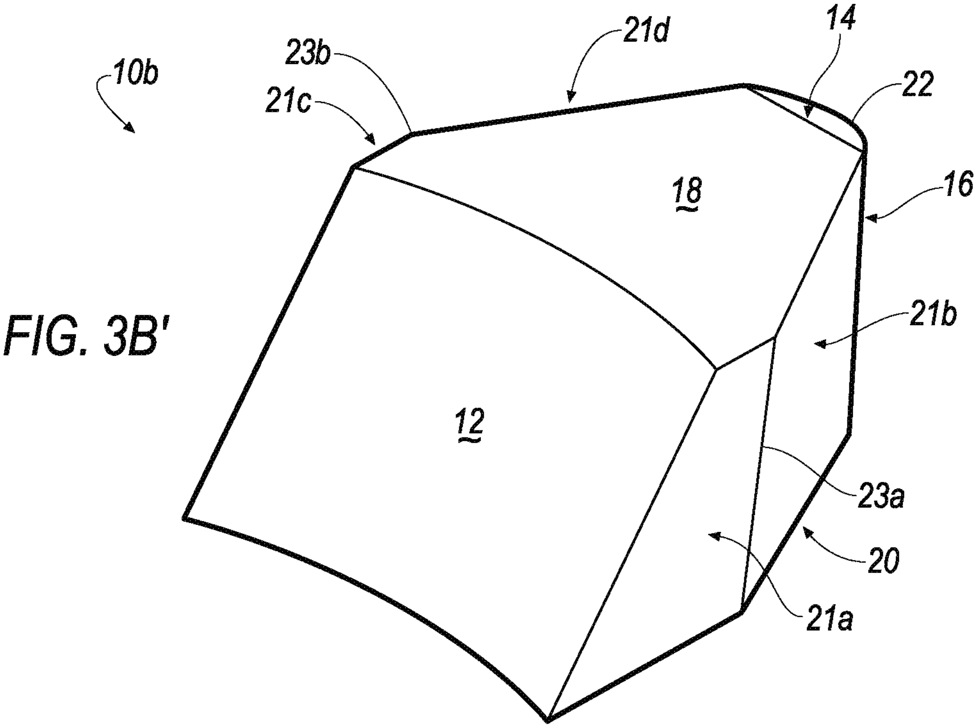
Figure 4G:
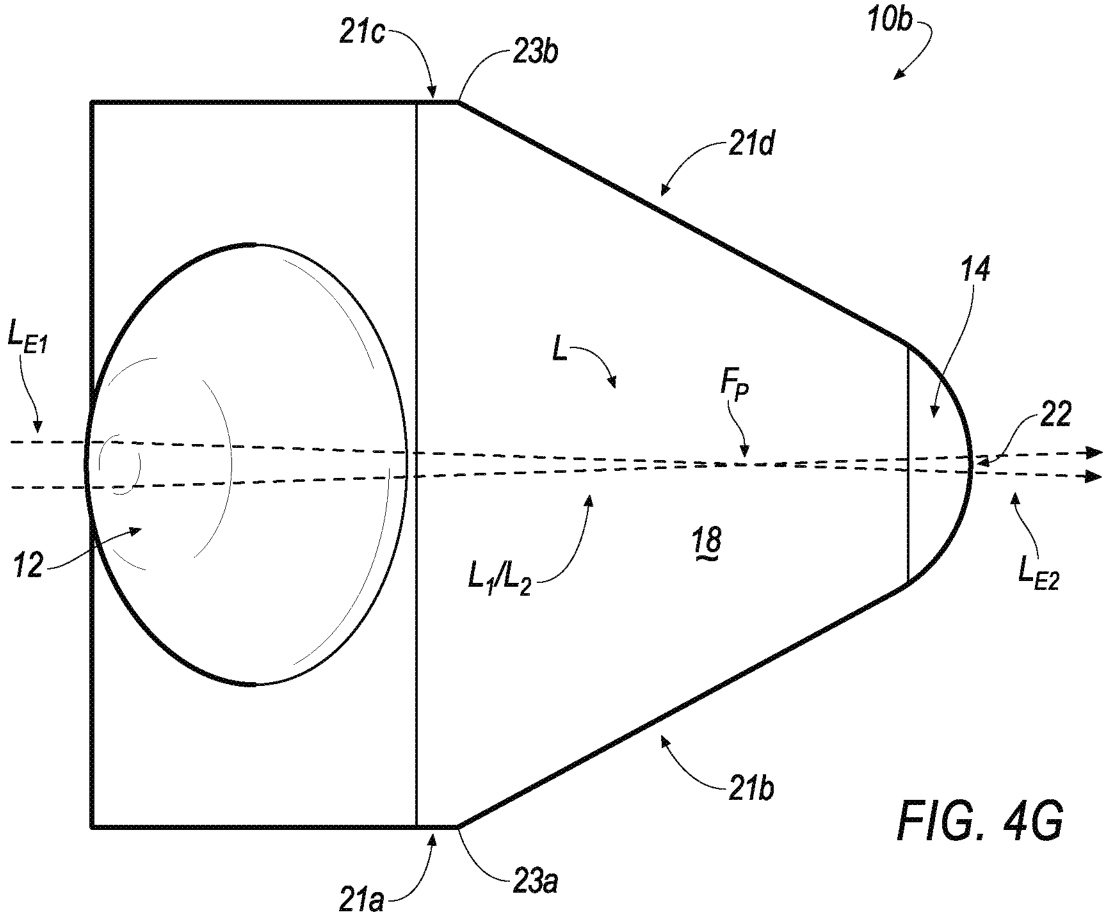
FIG. 4G is a top view of the optomechanical tool of FIG. 3G.
Figure 4A:
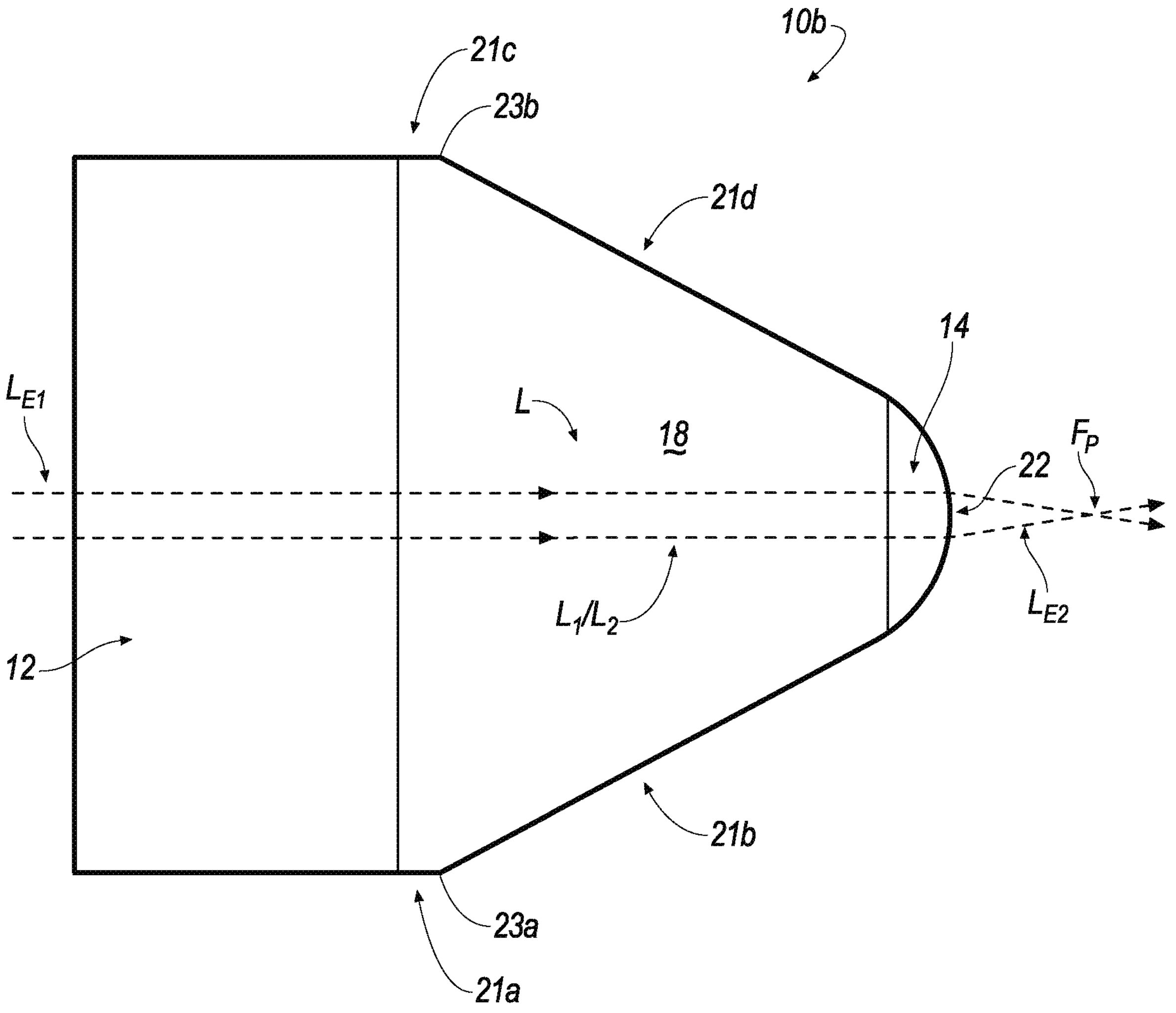
FIG. 4A is a top view of the optomechanical tool of FIG. 3A.

As seen at FIGS. 3B' and 4B, the laser beam entrance face 12 may be defined by an inwardly-projecting (e.g., concave) surface having a non-linear, curved or arcuate so configuration such as, e.g., an inwardly-projecting axial cylindrical configuration that extends between the first end 12$_1$ of the laser-beam entrance face 12 and the second end 12$_2$ of the laser-beam entrance face 12. After the collimated laser beam entrance segment $L_{E1}$ enters the laser-transmitting machining tool 10*b* at the laser beam entrance face 12 defined by the inwardly-projecting axial cylindrical configuration, the laser beam refracted segment $L_1$ of the laser beam L becomes divergent (see, e.g., FIG. 4B) as the laser beam refracted segment $L_1$ travels through the laser-transmitting machining tool 10*b*. After the laser beam reflected segment $L_2$ is subsequently reflected by the flank side face 20 and contacts and travels through one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W), and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent (see, e.g., FIGS. 3B and 4B).

Figure 3C:
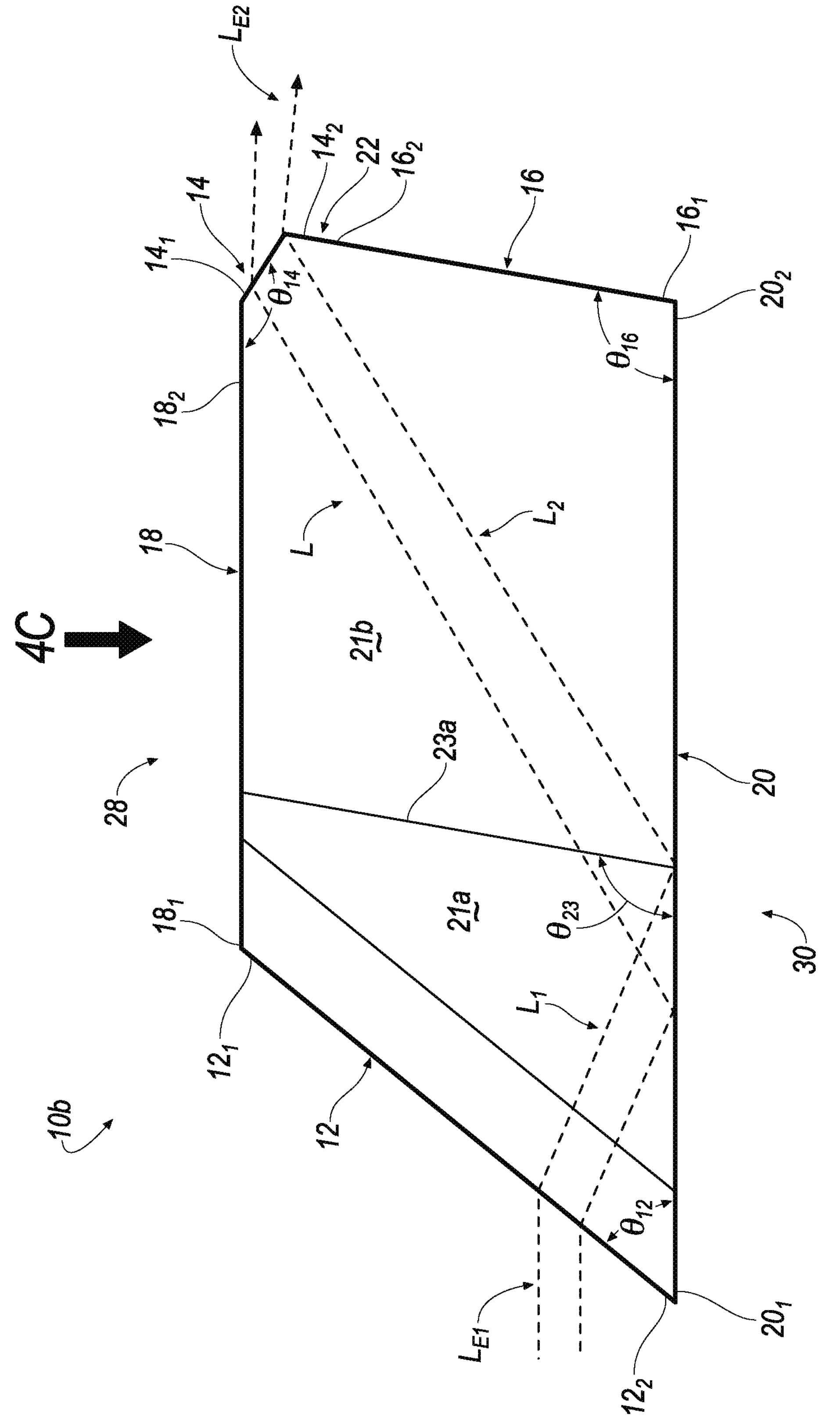
FIG. 3C is a side view of an exemplary optomechanical tool that receives a collimated light beam at an outwardly-projecting axially cylindrical light beam entrance face arranged at an acute back-relief angle.
Figure 4C:
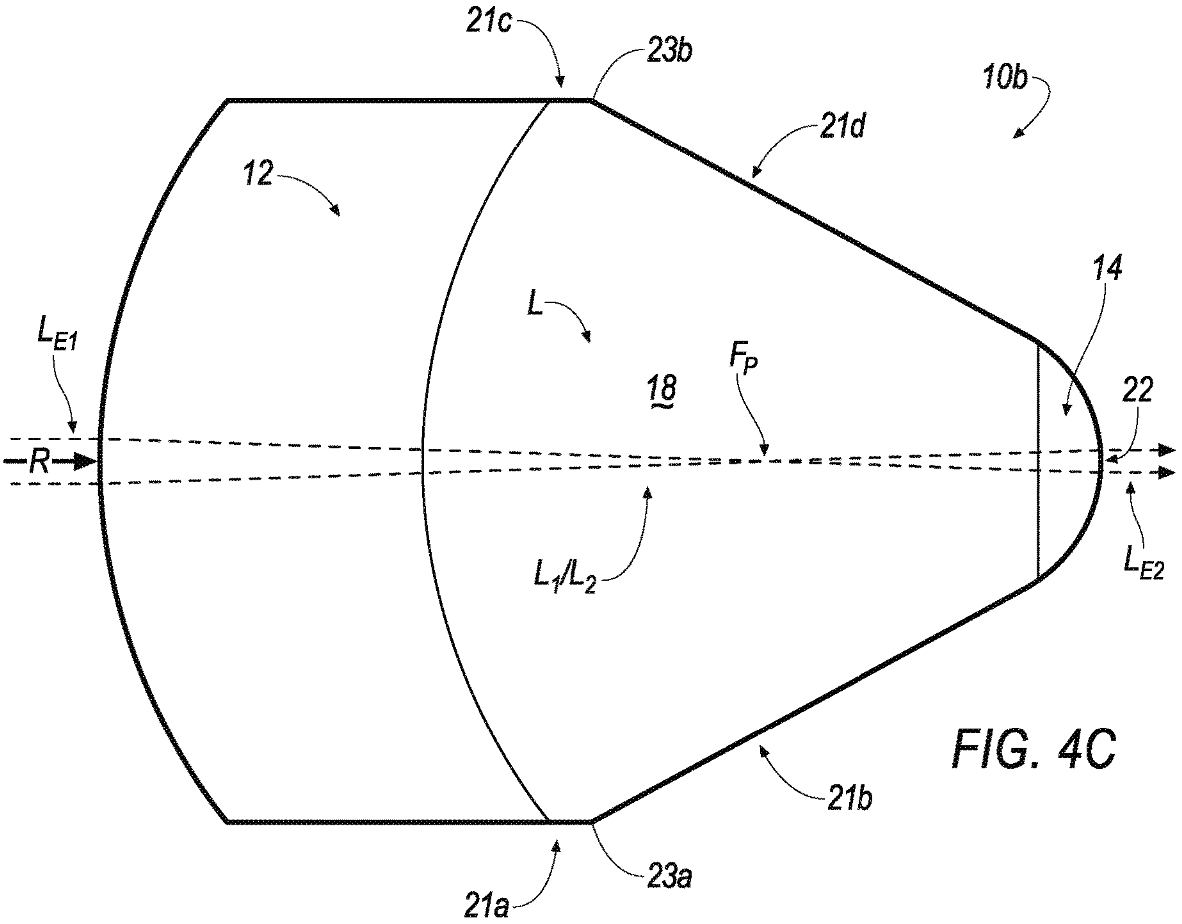
FIG. 4C is a top view of the optomechanical tool of FIG. 3C.
Figure 3C:
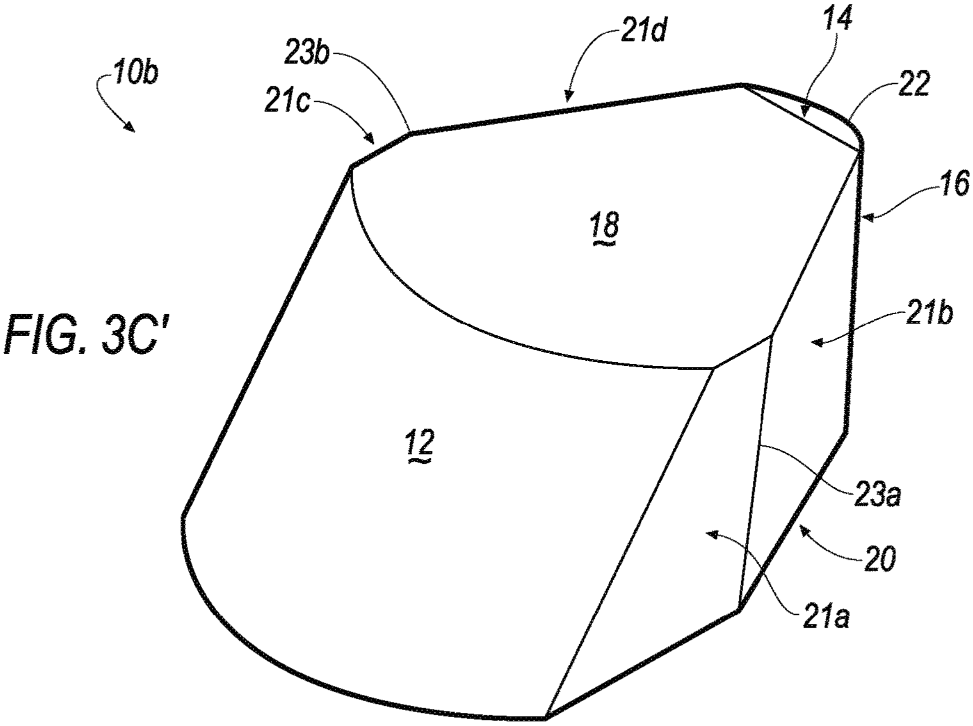

Referring to FIGS. 3C' and 4C, the laser beam entrance face 12 may be defined by an outwardly-projecting (e.g., convex) surface having a non-linear, curved or arcuate configuration such as, e.g., an axial cylindrical configuration that extends between the first end 12$_1$ of the laser-beam entrance face 12 and the second end 12$_2$ of the laser-beam entrance face 12. After the collimated laser beam entrance segment $L_{E1}$ enters the laser-transmitting machining tool 10*b* at the laser beam entrance face 12 defined by the outwardly-projecting axial cylindrical configuration, the laser beam refracted segment $L_1$ of the laser beam L becomes convergent (see, e.g., FIG. 4C) as the laser beam refracted segment $L_1$ travels through the laser-transmitting machining tool 10*b* and then diverges from a focal point $F_P$ (see, e.g., FIG. 4C) upstream up of the arcuate or curved cutting edge 22. After the laser beam reflected segment $L_2$ is subsequently reflected by the flank side face 20 and contacts and travels through one or more of: one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent (see, e.g., FIG. 3C.

Figure 3D:
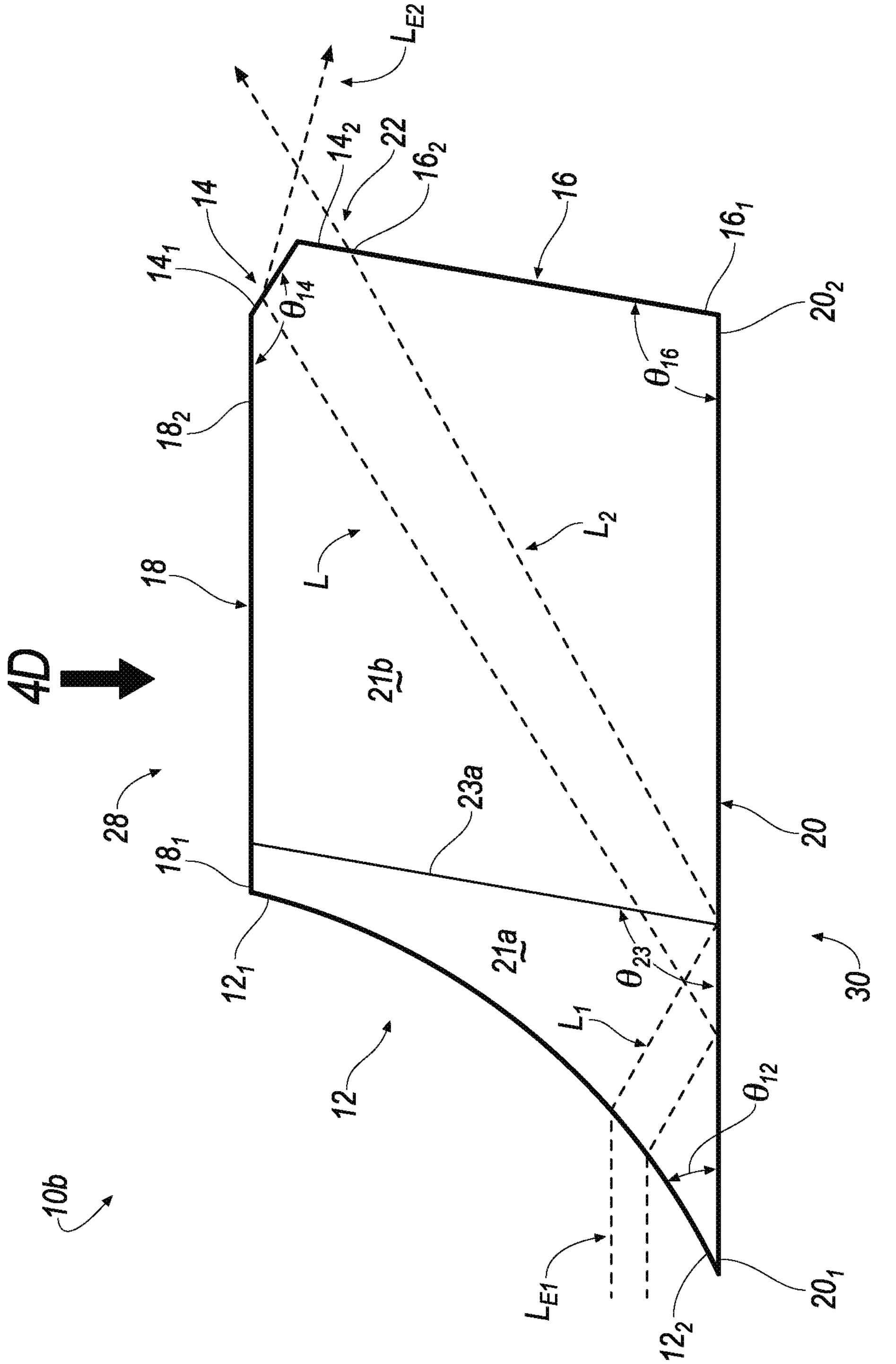
FIG. 3D is a side view of an exemplary optomechanical tool that receives a collimated light beam at an inwardly-projecting laterally cylindrical light beam entrance face arranged at an acute back-relief angle.
Figure 4D:
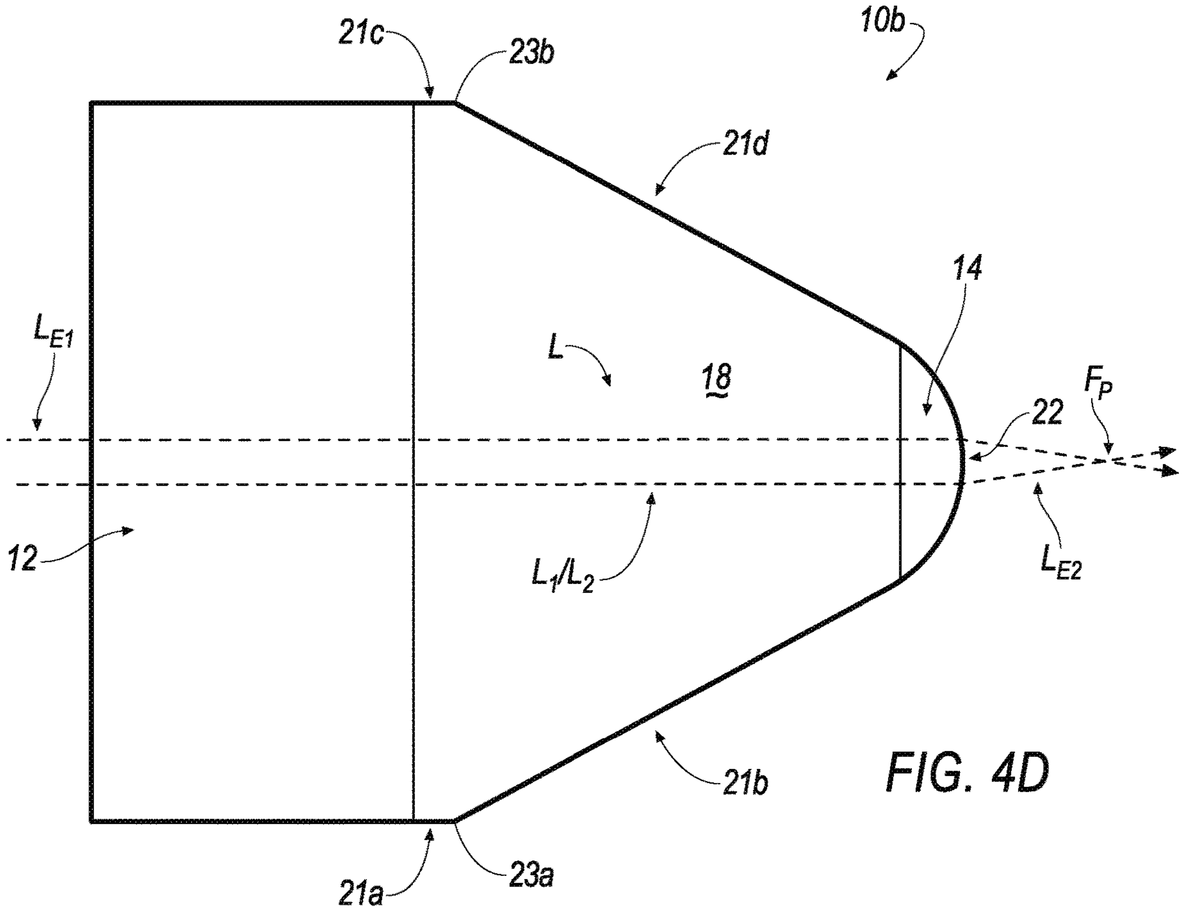
FIG. 4D is a top view of the optomechanical tool of FIG. 3D.
Figure 3D:
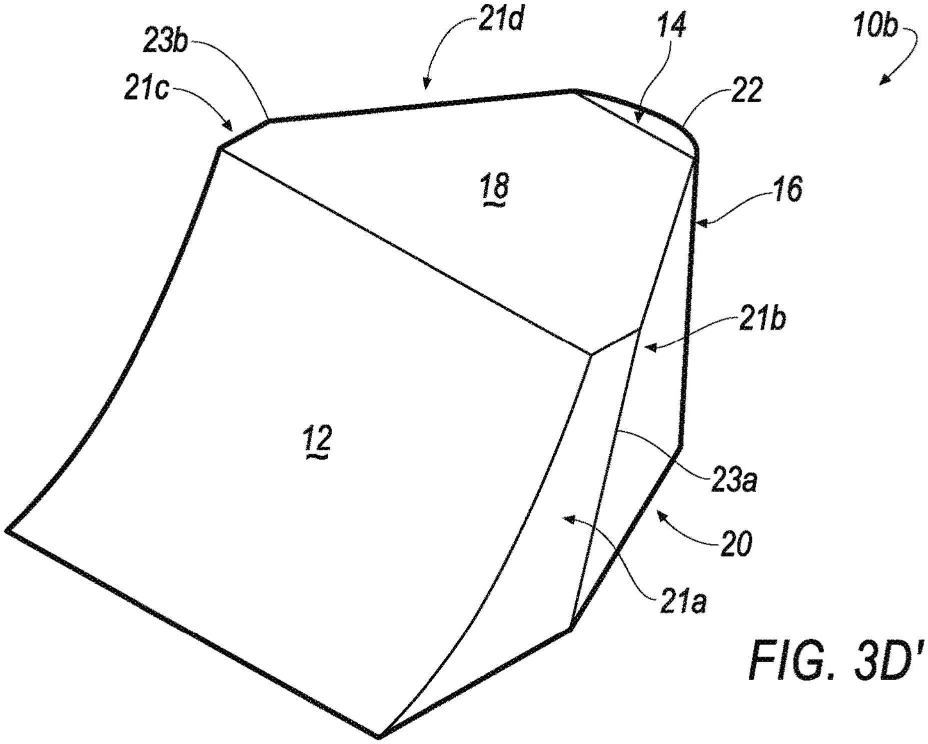

As seen at FIGS. 3D' and 4D, the laser beam entrance face 12 may be defined by an inwardly-projecting (e.g., concave) surface having a non-linear, curved or arcuate configuration such as, e.g., a lateral cylindrical configuration that extends between the first end 12$_1$ of the laser-beam entrance face 12 and the second end 12$_2$ of the laser-beam entrance face 12. After the collimated laser beam entrance segment $L_{E1}$ enters the laser-transmitting machining tool 10*b* at the laser beam entrance face 12 defined by the inwardly-projecting lateral cylindrical configuration, the laser beam refracted segment L of the laser beam L becomes divergent (see. e.g., FIG. 3D) as the laser beam refracted segment $L_1$ travels through the laser-transmitting machining tool 10*b*. After the laser beam reflected segment $L_2$ is subsequently reflected by the flank side face 20 and contacts and travels through one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent (see, e.g., FIGS. 3D and 4D).

Figure 3E:
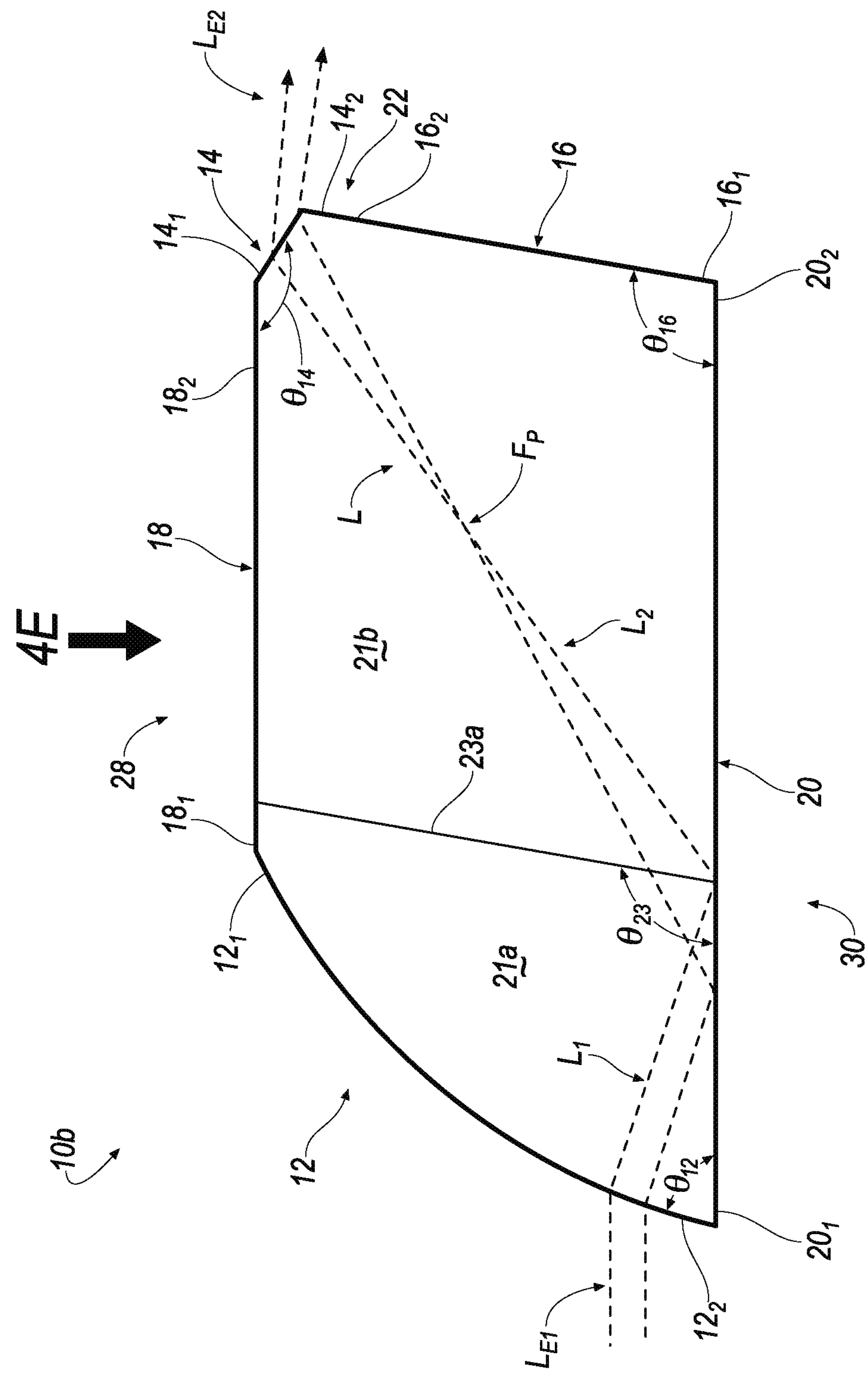
FIG. 3E is a side view of an exemplary optomechanical tool that receives a collimated light beam at an outwardly-projecting laterally cylindrical light beam entrance face arranged at an acute back-relief angle.
Figure 4E:
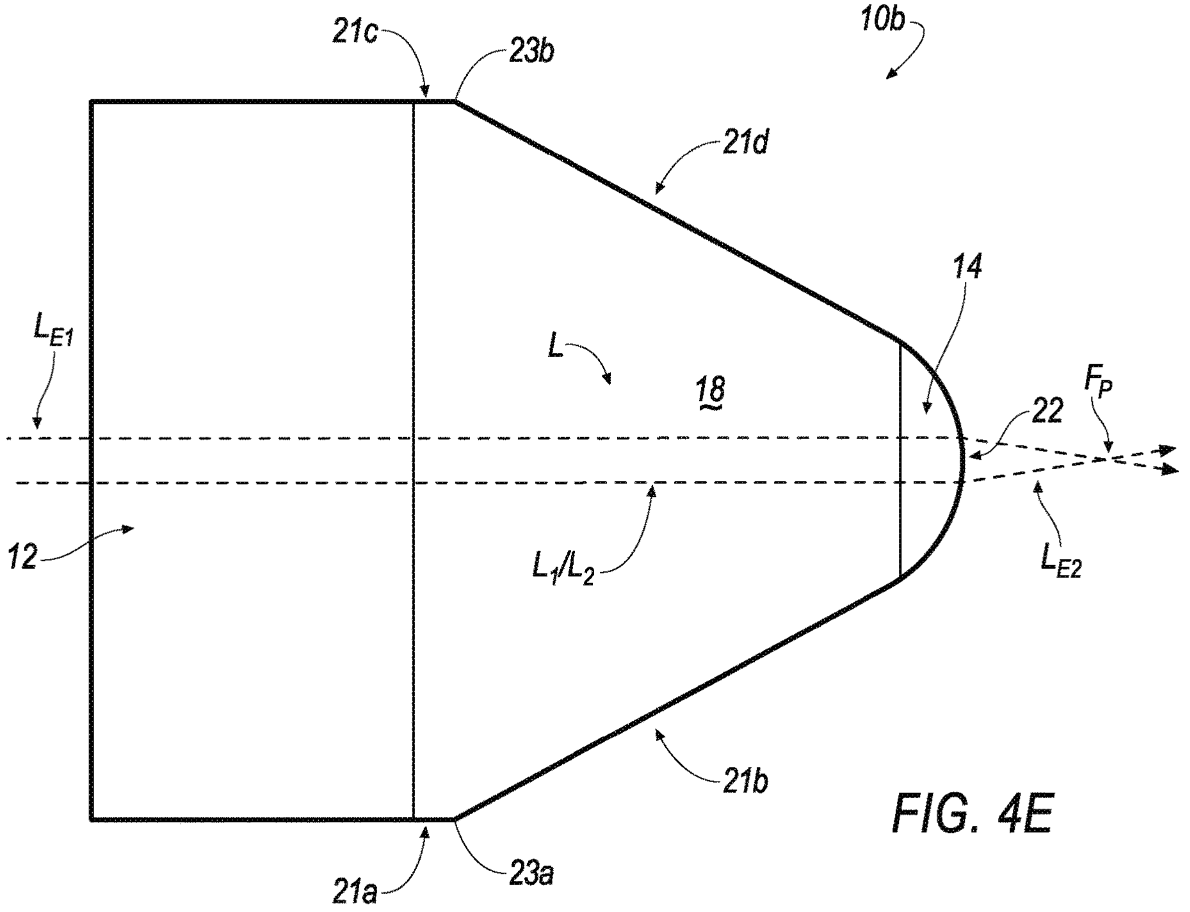
FIG. 4E is a top view of the optomechanical tool of FIG. 3E.
Figure 3E:
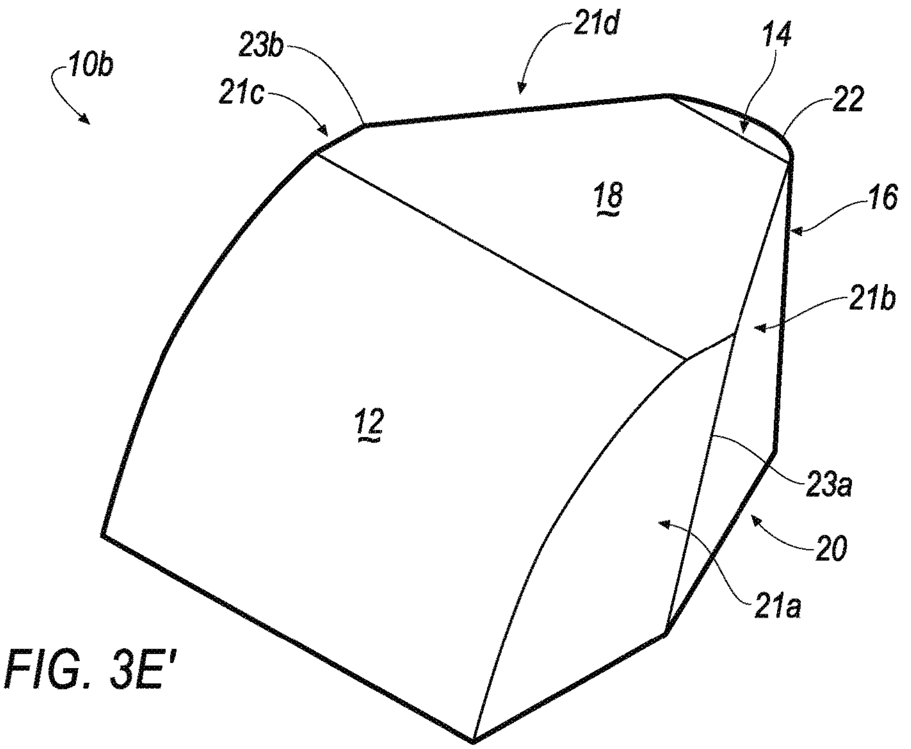

Referring to FIGS. 3E' and 4E, the laser beam entrance face 12 may be defined by an outwardly-projecting (e.g., convex) surface having a non-linear, curved or arcuate configuration such as, e.g., a lateral cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*b* at the laser beam entrance face 12 defined by the outwardly-projecting lateral cylindrical configuration, the laser beam refracted segment $L_1$ of the laser beam L becomes convergent (see, e.g., FIG. 3E) as the laser beam refracted segment $L_1$ travels through the laser-transmitting machining tool 10*b* and then diverges from a focal point $F_P$ (see, e.g., FIG. 3E) upstream up of the arcuate or curved cutting edge 22. After the laser beam reflected segment $L_2$ is subsequently reflected by the flank side face 20 and contacts and travels through one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent (see, e.g., FIGS. 3E and 4E).

Figure 3F:
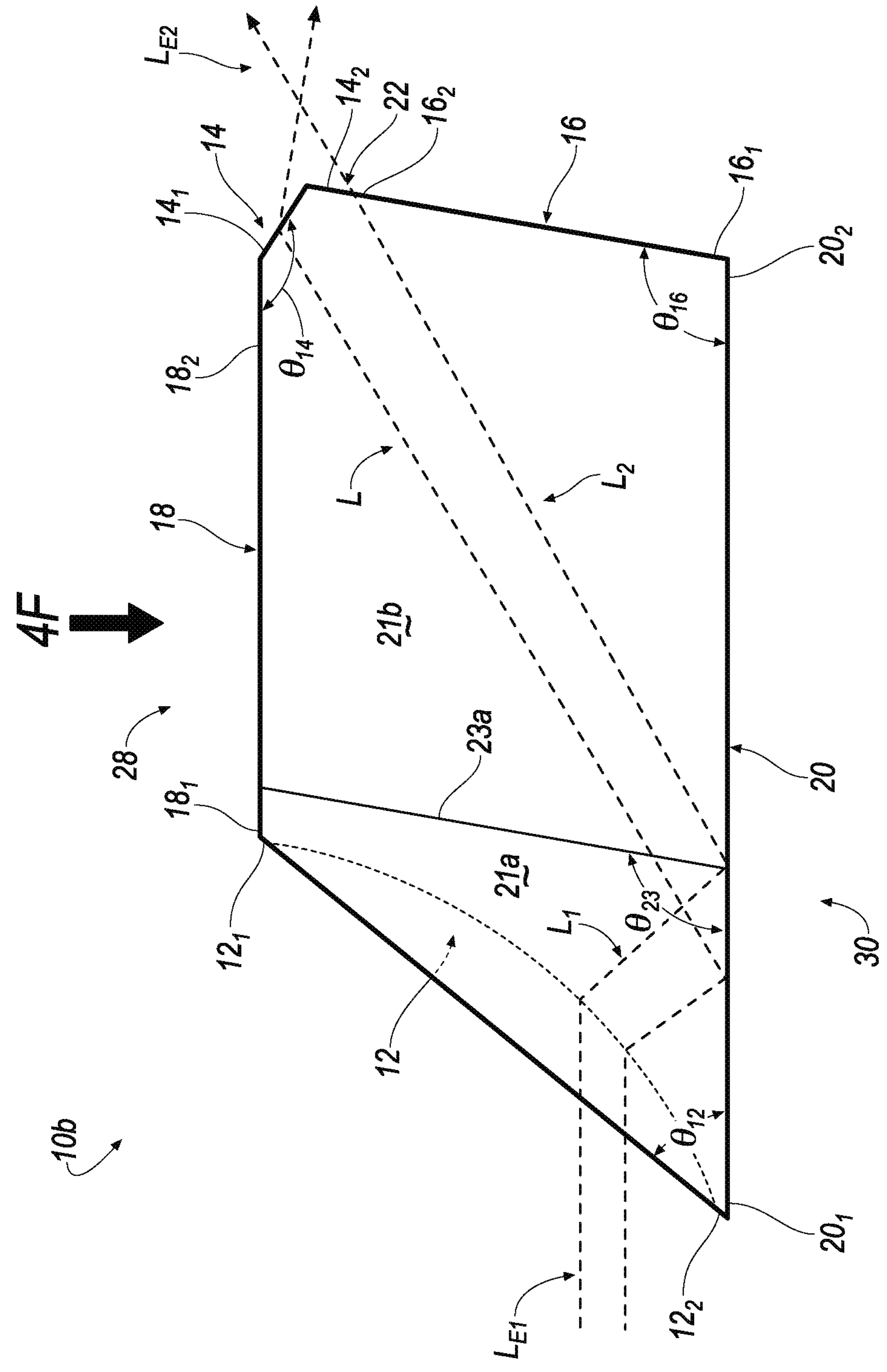
FIG. 3F is a side view of an exemplary optomechanical tool that receives a collimated light beam at an inwardly-projecting spherical light beam entrance face arranged at an acute back-relief angle.
Figure 4F:
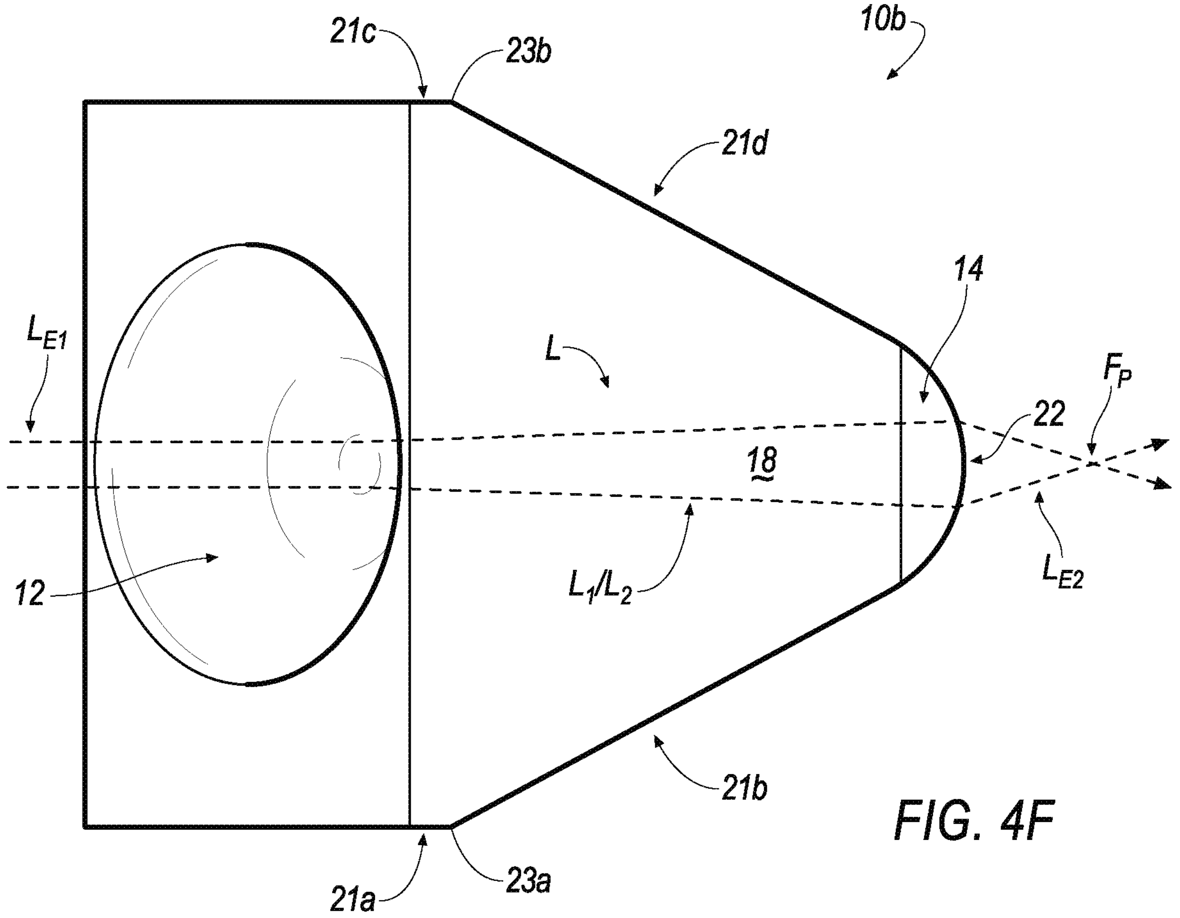
FIG. 4F is a top view of the optomechanical tool of FIG. 3F.
Figure 3F:
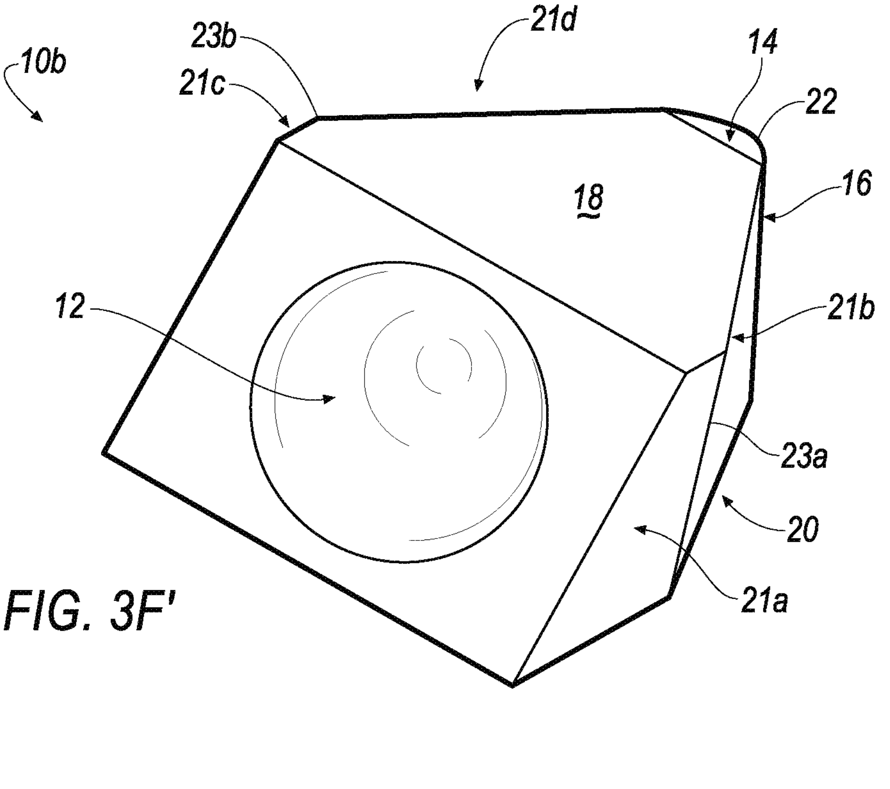

As seen at FIGS. 3F' and 4F, the laser beam entrance face 12 may be defined by an inwardly-projecting (e.g., concave) surface having a non-linear, curved or arcuate configuration such as, e.g., a spherical configuration that extends between the first end $\mathbf{12}_1$ of the laser-beam entrance face 12 and the second end $\mathbf{12}_2$ of the laser-beam entrance face 12. After the collimated laser beam entrance segment $L_1$ enters the laser-transmitting machining tool 10*b* at the laser beam entrance face 12 defined by the inwardly-projecting spherical configuration, the laser beam refracted segment $L_1$ of the laser beam L becomes divergent (see, e.g., FIGS. 3F and 4F) as the laser beam refracted segment $L_1$ travels through the laser-transmitting machining tool 10*b*. After the laser beam reflected segment $L_2$ is subsequently reflected by the flank side face 20 and contacts and travels through one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L becomes convergent (see, e.g., FIGS. 3F and 4F).

Figure 3G:
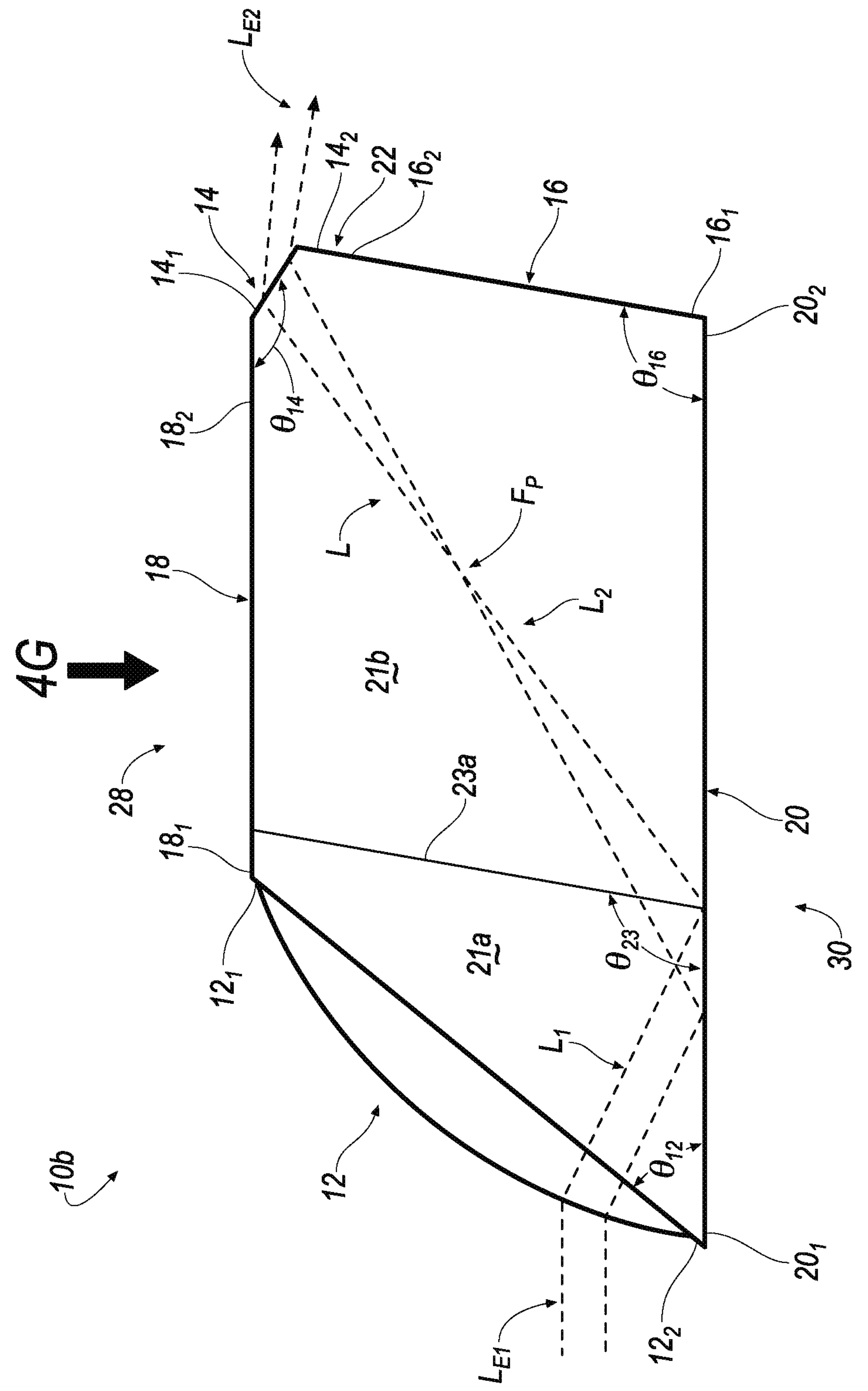
FIG. 3G is a side view of an exemplary optomechanical tool that receives a collimated light beam at an outwardly-projecting spherical light beam entrance face arranged at an acute back-relief angle.
Figure 3G:
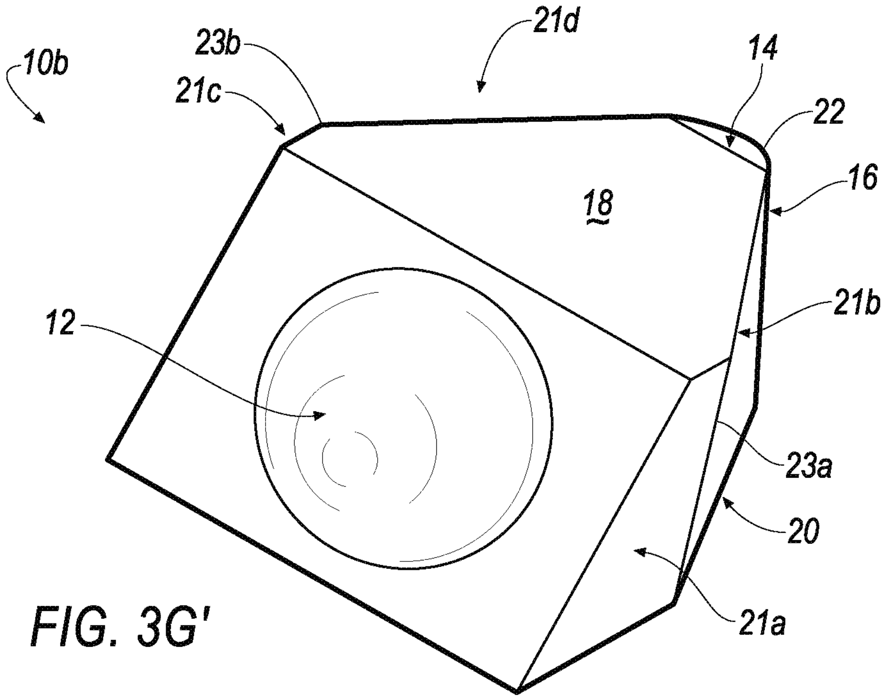

Referring to FIGS. 3G' and 4G, the laser beam entrance face 12 may be defined by an outwardly-projecting (e.g., convex) surface having a non-linear, curved or arcuate configuration such as, e.g., a spherical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*b* at the laser beam entrance face 12 defined by the outwardly-projecting spherical configuration, the laser beam refracted segment $L_1$ of the laser beam L becomes convergent as the laser beam refracted segment $L_1$ travels through the laser-transmitting machining tool 10*b* and then diverges from a focal point $F_P$ (see. e.g., FIGS. 3G and 4G) upstream up of the arcuate or curved cutting edge 22. After the laser beam reflected segment $L_2$ is subsequently reflected by the flank side face 20 and contacts and travels through one or more of: (1) the arcuate or curved cutting edge 22 (causing the laser beam reflected segment $L_2$ to refract onto the workpiece W); (2) the negative rake face 14 near the arcuate or curved cutting edge 22 (causing the laser beam reflected segment $L_2$ to refract onto the workpiece W); and (3) the flank face 16 near the arcuate or curved cutting edge 22 (causing the laser beam reflected segment $L_2$ to refract onto the workpiece W), the laser beam exit segment $L_{E2}$ of the laser beam L remains divergent (see, e.g., FIGS. 3G and 4G).

Figure 4H:
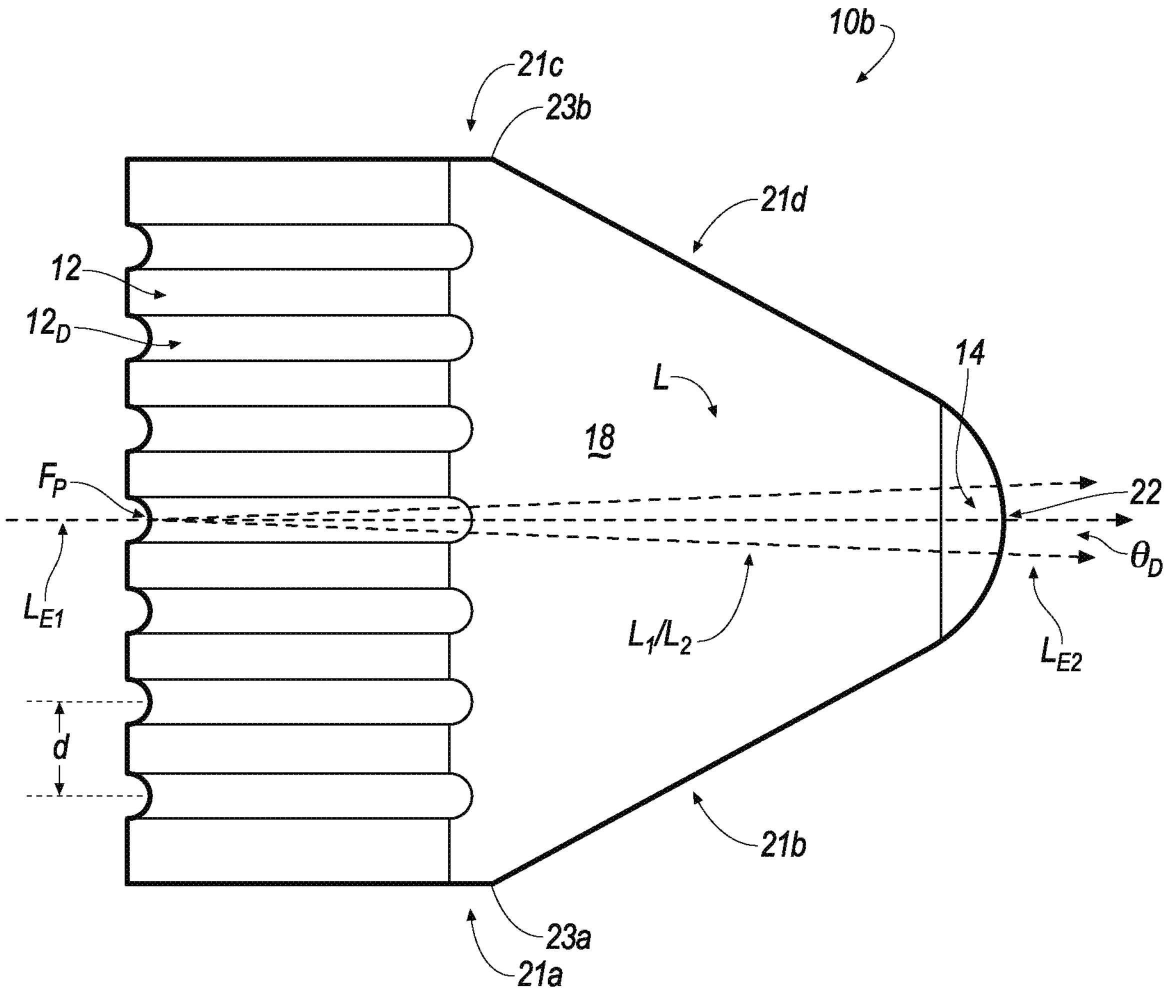
FIG. 4H is a top view of an exemplary optomechanical tool including a light beam entrance face arranged at an acute back-relief angle defining one or more diffractive surface portions.

Referring to FIG. 4H, the laser beam entrance face 12 may be defined by a combination of: (1) a substantially linear, flat or planar as the laser beam entrance face 12 extends between the first end $\mathbf{12}_1$ of the laser-beam entrance face 12 and the second end $\mathbf{12}_2$ of the laser-beam entrance face 12; and (2) one or more diffractive surface portions $\mathbf{12}_D$ extending between the first end 12 of the laser-beam entrance face 12 and the second end $\mathbf{12}_2$ of the laser-beam entrance face 12. Adjacent diffractive surface portion $\mathbf{12}_D$ may be spaced apart by a distance, d. Although the laser beam entrance face 12 including the one or more diffractive surface portions $\mathbf{12}_D$ is shown being associated with a substantially linear, flat or planar as the laser beam entrance face 12 that is substantially similar to FIGS. 3A and 4A, any of the laser beam entrance faces 12 of FIGS. 3B-3G and 4B-4G may also include the one or more diffractive surface portions $\mathbf{12}_D$.

At least one of the one or more diffractive surface portions $\mathbf{12}_D$ of the laser beam entrance face 12 receives and diffracts the laser beam entrance segment $L_{E1}$ of the laser beam L, splitting the laser beam entrance segment $L_{E1}$ into the plurality of diffracted laser beam segments $L_1$ within the body of the laser-transmitting machining tool 10*b*. The plurality of diffracted laser beam segments $L_1$ may include three diffracted laser beam segments $L_1$. Each diffracted laser beam segment $L_1$ is separated by the diffraction angle $\theta_D$. The three diffracted laser beam segments $L_1$ distribute laser power over a total angle of $2\theta_D$. Assuming $n_1=1$ for air, the total swept angle $2\theta_D$ of the diffracted laser beams L having a wavelength $\lambda$ and passing through a diffractive surface portion $\mathbf{12}_D$ so comprising a grating with distance d between slits may be given using the grating equation to compute $\theta_D$: $n2\lambda=d \sin \theta_D$ $$n_2\lambda = d\sin(\theta_D) \tag{34}$$

In some examples, at least one of the one or more diffractive surface portions $\mathbf{12}_D$ of the laser beam entrance face 12 is configured to diffract the laser beam entrance segment $L_{E1}$ from a diffraction point $F_P$ at a diffractive surface portion $12_D$ of the one or more diffractive surface portions $12_D$ such that the plurality of diffracted laser beam segments $L_1$ are directed toward and received (as laser beam reflected segments $L_2$ reflected by the flank side face 20) by the arcuate or curved cutting edge 22.

In some examples, the one of the one or more diffractive surface portions $12_D$ focuses or defocuses the laser beam L, or increases or decreases the focal length of the laser-transmitting machining tool 10*b*. Furthermore, in some configurations, two or more laser beams L may distribute laser power more broadly in the workpiece W than a single laser beam L.

Figure 4I:
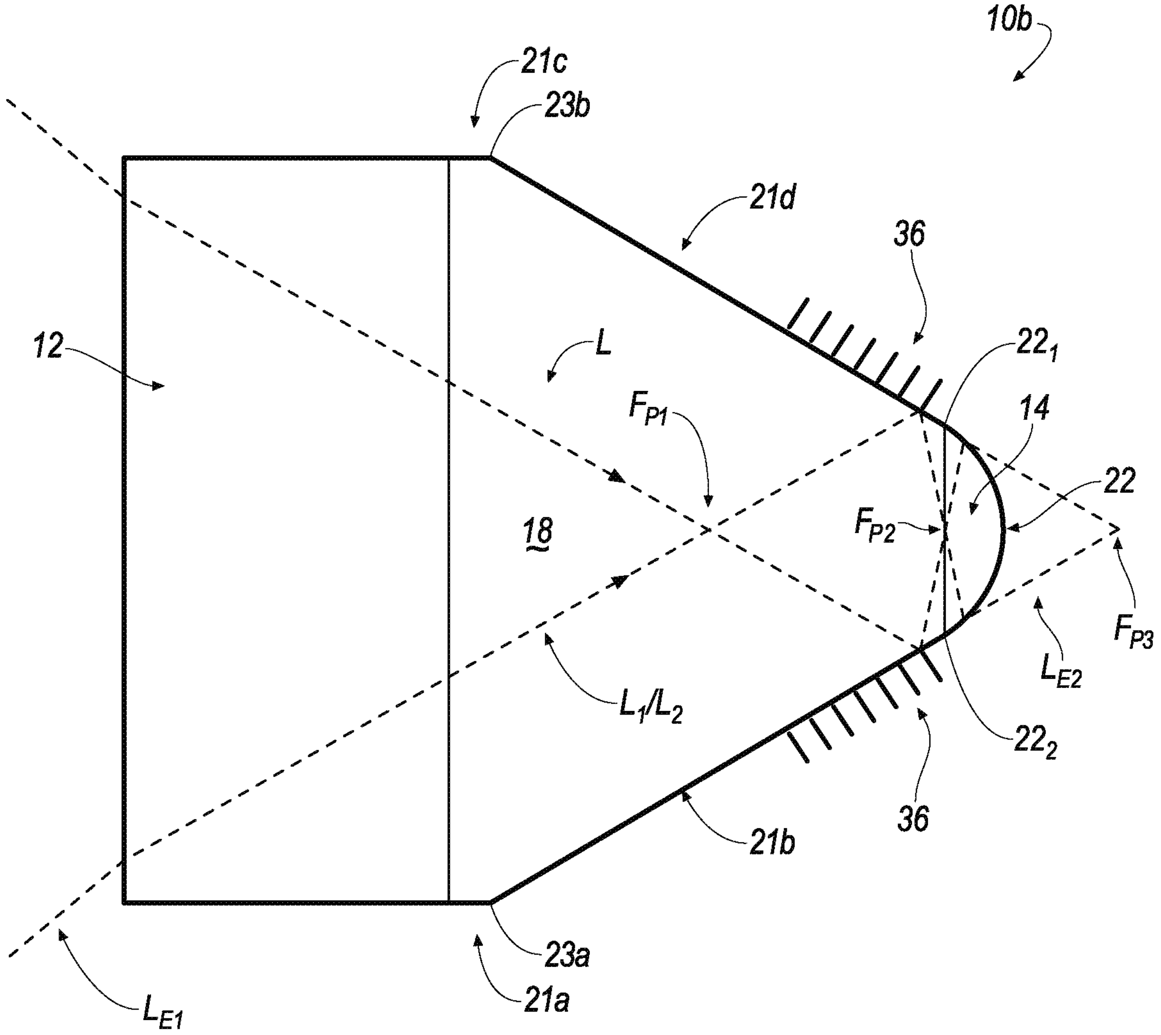
FIG. 4I is a top view of an exemplary optomechanical tool including a light beam entrance face arranged at an acute back-relief angle and a reflection-enhancing coating applied to one or more outer surfaces of the optomechanical tool.

Referring to FIG. 4I, the laser beam entrance face 12 may be substantially linear, flat or planar as the laser beam entrance face 12 extends between the first end $12_1$ of the laser-beam entrance face 12 and the second end $12_2$ of the laser-beam entrance face 12. Additionally, as seen at FIG. 4I, one or more surfaces of the plurality of surfaces 12-20 of the laser-transmitting machining tool 10*b* is partially or wholly coated with a reflection-enhancing coating 36. Although the reflection-enhancing coating 36 is shown being associated with a substantially linear, flat or planar as the laser beam entrance face 12 that is substantially similar to FIGS. 3A and 4A, any of the laser-transmitting machining tools 10*b* of FIGS. 3B-3G and 4B-4G may also include the reflection-enhancing coating 36.

The coating 36 enhances reflection of the laser beam L (which may be defined by a converging laser beam entrance segment $L_{E1}$ as seen at FIG. 4I) by providing a mirror surface on the laser-transmitting machining tool 10*b* that reflects the laser beam L to desired zones of the laser-transmitting machining tool 10*b* with the goal of an increase in efficiency and tool coverage. In some instances, the coating 36 is applied to the laser-transmitting machining tool 10*b* when the ability of employing internal reflections is not feasible. In some implementations, the coating 36 includes a metallic material. Exemplary metallic materials that may be utilized for the coating 36 includes but is not limited to aluminum, silver, gold, INCONEL®, chrome, nickel, and titanium nitride. The coating 36 may be disposed over: (1) a portion of the rake face 14 near the first end $22_1$ of the arcuate or curved cutting edge 22; (2) a portion of the flank face 16 near the second end $22_2$ of the arcuate or curved cutting edge 22; and (3) one or both of the first downstream sidewall surface or face 21*b* and the second downstream sidewall surface or face 21*d* near the arcuate or curved cutting edge 22.

As seen at FIG. 4I, the laser-beam entrance face 12 is configured to receive a laser beam L. The laser beam L may be further defined by a plurality of segments $L_{E1}$. $L_1$, $L_{E2}$. The plurality of segments $L_{E1}$, $L_1$, $L_2$, and $L_{E2}$ includes at least, for example, a converging laser beam entrance segment $L_{E1}$, a laser beam refracted segment $L_1$, a laser beam reflected segment $L_2$, a laser beam exit segment $L_{E2}$. The laser beam entrance face 12 receives the converging laser beam entrance segment $L_{E1}$. The laser beam refracted segment $L_1$ converges at a first focal point $F_{P1}$ upstream of an outward-most portion of the arcuate or curved cutting edge 22. Thereafter the laser beam refracted segment $L_1$ diverges from the first focal point $F_{P1}$ and may (as laser beam reflected segments $L_2$ reflected by the flank side face 20) be incident upon one or both of the first downstream sidewall surface or face 21*b* and the second downstream sidewall surface or face 21*d* that includes the coating 36. Thereafter, the laser beam reflected segments $L_2$ of the laser beam L converges at a second focal point $F_{P2}$ upstream of the outward-most portion of the arcuate or curved cutting edge 22. Thereafter the laser beam reflected segments $L_2$ diverges from the second focal point $F_{P2}$ and may be incident upon the arcuate or curved cutting edge 22. Thereafter, the laser beam reflected segments $L_2$ of the laser beam L is refracted off the arcuate or curved cutting edge 22 to define the laser beam exit segment $L_{E2}$ that will then subsequently converge at a third focal point $F_{P3}$ downstream of the outward-most portion of the arcuate or curved cutting edge 22.

Referring now to FIGS. 5A-5G and 6A-6 exemplary laser-transmitting machining tools are shown generally at 10*c* The medium of the laser-transmitting machining tools 10*c* may include any desirable material such as, for example any type of so single or poly crystal transmissive media including but not limited to: diamonds; sapphires; moissanites; chrysoberyls; alexandrite; and the like. In other configurations, exemplary materials defining the medium of the laser-transmitting machining tools 10*c* may include but are not limited to other transmissive media such as, for example: carbides; cubic boron nitride (CBN); silicon; nitrides; steels; alloys; ceramics; alumina, glass; glass composites; composites; and the like.

The laser-transmitting machining tools 10*c* are substantially similar to the laser-transmitting machining tools 10*a* described above. Accordingly, the description associated with reference numerals of the laser-transmitting machining tools 10*c* shown at FIGS. 5A-5G and 6A-6I are similar to the laser-transmitting machining tools 10*a* at FIGS. 1A-1G and 2A-2I, therefore, attention is directed to the written description associated with FIGS. 1A-1G and 2A-2I in order to identify structure associated with reference numerals of the laser-transmitting machining tools 10*c* of FIGS. 5A-5G and 6A-6I.

Unlike the back-relief angle $\theta_{12}$ of the laser-transmitting machining tools 10*a* of FIGS. 1A-G and 2A-2I that are arranged at an obtuse (i.e., greater than 90°) angle, the back-relief angle $\theta_{12}$ of the laser-transmitting machining tools 10*c* of FIGS. 5A-5G are arranged at a right (i.e., equal to 90°) angle.

As seen at FIGS. 5A-5G, the laser beam L that enters and then exits the laser-transmitting machining tools 10*c* is shown being defined by a plurality of segments U, $L_1$, $L_{E2}$. The plurality of segments $L_{E1}$, $L_1$, $L_{E2}$ include a laser beam entrance segment $L_{E1}$, a laser beam segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIGS. 5A-5G, the laser beam entrance face 12 is configured to receive the collimated laser beam entrance segment $L_{E1}$ such that the laser beam segment $L_1$ is directed toward and through one or more of: (1) the arcuate or curved cutting edge 22 (causing, e.g., the laser beam exit segment $L_1$ to refract onto the workpiece W); (2) the negative rake face 14 near the arcuate or curved cutting edge 22 (causing. e.g., the laser beam exit segment $L_{E2}$ to refract onto the workpiece W); and (3) the flank face 16 near the arcuate or curved cutting edge 22 (causing, e.g., the laser beam exit segment $L_{E2}$ to refract onto the workpiece W). Although the cutting edge 22 may be non-linear, curved or arcuate, the cutting edge 22 may be defined to include other configurations, such as, for example, a linear, non-curved or non-arcuate shape. The back-relief angle $\theta_{12}$ is configured to receive the laser beam segment $L_1$ at the laser beam entrance face 12 according to Snell's law. As seen at FIGS. 5A and 6A, the perpendicular or right back-relief angle $\theta_{12}$ of an exemplary substantially linear, flat or planar as the laser beam entrance face 12 results in the laser-transmitting machining tool 10$c$ not refracting the laser beam entrance segment $L_{E1}$; rather, the laser beam entrance face 12 of the laser-transmitting machining tool 10$c$ of FIGS. 5A and 6A permits the laser beam entrance segment $L_{E1}$ to pass into the body of the transmitting machining tool 10$c$ for defining the laser beam segment $L_1$.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

In some instances, the negative rake angle $\theta_{14}$ and the clearance angle $\theta_{16}$ are configured so that both the rake face 14 and the flank face 16 receive the laser beam L at an angle less than a critical angle $\theta_C$, as defined in Equation 3. For instance, the negative rake angle $\theta_{14}$ may be an obtuse angle greater than 90° and less than 180°; in some instances, the rake angle $\theta_{14}$ may range between approximately 95° 115° and the clearance angle $\theta_{14}$ may be an obtuse angle less than 105°. The back-relief angle $\theta_{12}$ may be configured to receive the laser beam segment $L_1$ at entrance face 12 for subsequently being directed toward, respectively, the negative rake face 14 at an angle less than the critical angle or toward and the flank face 16 at an angle less than the critical angle, when the following relationship is satisfied for obtuse rake face angles $\theta_{14}$ and flank face angles $\theta_{16}$:

$$(\theta_{16}-90°)+(\theta_{14}-90°)<2\theta_C \qquad (35)$$

Referring to FIGS. 5A-5G. 5B'-5G', and 6A-6I, a plurality of alternative laser beam entrance faces 12 defining the laser beam entrance end 24 of the laser-transmitting machining tools 10$c$ are shown. Referring initially to FIGS. 5A and 6A, the laser beam entrance face 12 may be substantially linear, flat or planar as the laser beam entrance face 12 extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10$c$ at the substantially linear, flat or planar laser beam entrance face 12, the laser beam segment $L_1$ of the laser beam L remains collimated as the laser beam segment $L_1$ travels through the laser-transmitting machining tool 10$c$. After the laser beam segment $L_1$ contacts and travels through one or more of: (1) the arcuate or curved cutting edge 22 (causing the laser beam segment $L_1$ to refract onto the workpiece W), (2) the negative rake face 14 near the arcuate or curved cutting edge 22 (causing the laser beam segment $L_1$ to refract onto the workpiece W); and (3) the flank face 16 near the arcuate or curved cutting edge 22 (causing the laser beam segment $L_1$ to refract onto the workpiece W), the laser beam exit segment $L_{E2}$ of the laser beam L becomes convergent (see, e.g., FIG. 6A).

As seen at FIGS. 5B' and 6B, the laser beam entrance face 12 may be defined by an inwardly-projecting (e.g., concave) surface having a non-linear, curved or arcuate configuration such as, e.g., an inwardly-projecting axial cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10$c$ at the laser beam entrance face 12 defined by the inwardly-projecting axial cylindrical configuration, the laser beam refracted segment $L_1$ of the laser beam L becomes divergent (see, e.g., FIG. 6B) as the laser beam refracted segment $L_1$ travels through the laser-transmitting machining tool 10$c$. After the laser beam refracted segment $L_1$ contacts and travels through one or more of: (1) the arcuate or curved cutting edge 22 (causing the laser beam refracted segment $L_1$ to refract onto the workpiece W); (2) the negative rake face 14 near the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment $L_{E2}$ of the laser beam L becomes convergent (see, e.g., FIG. 6B).

Referring to FIGS. 5C' and 6C, the laser beam entrance face 12 may be defined by an outwardly-projecting (e.g., convex) surface having a non-linear, curved or arcuate configuration such as, e.g., an axial cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10$c$ at the laser beam entrance face 12 defined by the outwardly-projecting axial cylindrical configuration, the laser beam refracted segment $L_1$ of the laser beam L becomes convergent (see, e.g., FIG. 6C) as the laser beam refracted segment $L_1$ travels through the laser-transmitting machining tool 10$c$ and then diverges from a focal point F (see, e.g., FIG. 6C) upstream up of the arcuate or curved cutting edge 22. After the laser beam refracted segment $L_1$ contacts and travels through one or more of: one or more of: (1) the arcuate or curved cutting edge 22 (causing the laser beam refracted segment $L_1$ to refract onto the workpiece W); (2) the negative rake face 14 near the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment $L_{E2}$ of the laser beam L remains divergent (see, e.g., FIG. 6C).

As seen at FIGS. 5D' and 6D, the laser beam entrance face 12 may be defined by an inwardly-projecting (e.g., concave) surface having a non-linear, curved or arcuate configuration such as, e.g., a lateral cylindrical configuration that extends between the first end $\mathbf{12}_1$ of the laser-beam entrance face 12 and the second end $\mathbf{12}_2$ of the laser-beam entrance face 12. After the collimated laser beam entrance segment $L_1$ enters the laser-transmitting machining tool 10$c$ at the laser beam entrance face 12 defined by the inwardly-projecting lateral cylindrical configuration, the laser beam refracted segment $L_1$ of the laser beam L becomes divergent (see, e.g., FIG. 5D) as the laser beam refracted segment $L_1$ travels through the laser-transmitting machining tool 10$c$. After the laser beam refracted segment $L_1$ contacts and travels through one or more of: (1) the arcuate or curved cutting edge 22 (causing the laser beam refracted segment $L_1$ to refract onto the workpiece W); (2) the negative rake face 14 near the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment $L_{E2}$ of the laser beam L becomes convergent (see, e.g., FIG. 6D).

With reference to FIG. $5D_C$, unlike the example described above associated with FIGS. 5D, 5D', and 6D, the laser beam entrance segment $L_{E1}$ may be defined by a converging laser beam. The inwardly-projecting lateral cylindrical configuration of the laser beam entrance face 12 receives the laser beam entrance segment $L_{E1}$ that is defined by a converging cone angle $\theta_{CA}$ having a first focal point $F_P$; accordingly, the laser beam L may be referred to as a convergent laser beam. The first focal point $F_P$ is located downstream from of the inwardly-projecting lateral cylindrical configuration of the laser beam entrance face 12.

The inwardly-projecting lateral cylindrical configuration of the laser beam entrance face 12 refracts the laser beam L according to Snell's law, causing the laser beam refracted segment $L_1$ to have a transformed cone angle $\theta_{CA}'$ and a transformed focal point $F_P'$. The inwardly-projecting lateral cylindrical configuration of the laser beam entrance face 12 may focus the laser beam L such that the transformed focal point $F_P'$ is arranged within the laser-transmitting machining tool 10*c*, upstream of the rake face 14 and the flank face 16 at a second distance D2 extending from the focal point $F_P$.

With reference to the following equation, the second distance D2 associated with the transformed focal point $F_P'$ may be dictated by the following equation, where positive values of D1 extend upstream, and positive values of D2 extend downstream:

$$D2 = \frac{n_2 R D1}{(n_2 - n_1)D1 - n_1 R} \tag{36}$$

Accordingly, the transformed cone angle $\theta_{CA}'$ is related to the cone angle $\theta_{CA}$ by the following equation:

$$\tan(\theta'_{CA}/2) = \text{abs}(D1/D2)\tan(\theta_{CA}/2) \tag{37}$$

In another example as seen at FIG. $5D_D$, unlike the example described above associated with FIG. FIG. $5D_C$, the laser beam entrance segment $L_{E1}$ may be defined by a diverging laser beam. The inwardly-projecting lateral cylindrical configuration of the laser beam entrance face 12 receives the laser beam entrance segment $L_{E1}$ that is defined by a diverging cone angle $\theta_{CA}$ having a first focal point $F_P$; accordingly, the laser beam L may be referred to as a divergent laser beam. The first focal point $F_P$ is located upstream of the inwardly-projecting lateral cylindrical configuration of the laser beam entrance face 12. The inwardly-projecting lateral cylindrical configuration of the laser beam entrance face 12 refracts the laser beam L according to Snell's law, causing the laser beam refracted segment $L_1$ to have a transformed cone angle $\theta_{CA}'$; because the laser beam entrance segment $L_{E1}$ is defined by a diverging laser beam, the laser beam entrance segment $L_{E1}$ does not define a transformed focal point $F_P'$, and, as such, the laser beam entrance segment $L_{E1}$ continues to diverge as it travels through the laser-transmitting machining tool 10*c* toward the rake face 14, the flank face 16, and the arcuate or curved cutting edge 22.

Referring to FIGS. 5E' and 6E, the laser beam entrance face 12 may be defined by an outwardly-projecting (e.g., convex) surface having a non-linear, curved or arcuate configuration such as, e.g., a lateral cylindrical configuration that extends between the first end $12_1$ of the laser-beam entrance face 12 and the second end $12_2$ of the laser-beam entrance face 12. After the collimated laser beam entrance segment $L_{E1}$ enters the laser-transmitting machining tool 10*c* at the laser beam entrance face 12 defined by the outwardly-projecting lateral cylindrical configuration, the laser beam refracted segment $L_1$ of the laser beam L becomes convergent (see, e.g., FIG. 5E) as the laser beam refracted segment $L_1$ travels through the laser-transmitting machining tool 10*c* and then diverges from a focal point $F_P$ (see, e.g., FIG. 5E) upstream up of the arcuate or curved cutting edge 22. After the laser beam refracted segment $L_1$ contacts and travels through one or more of: (1) the arcuate or curved cutting edge 22 (causing the laser beam refracted segment L to refract onto the workpiece W); (2) the negative rake face 14 near so the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment L of the laser beam L becomes convergent (see, e.g., FIG. 6E).

With reference to FIG. $5E_C$, unlike the example described above associated with FIGS. 5E, 5E', and 6E, the laser beam entrance segment $L_{E1}$ may be defined by a converging laser beam. The outwardly-projecting lateral cylindrical configuration of the laser beam entrance face 12 receives the laser beam entrance segment $L_{E1}$ that is defined by a converging cone angle $\theta_{CA}$ having a first focal point $F_P$; accordingly, the laser beam L may be referred to as a convergent laser beam. The first focal point $F_P$ is located downstream from of the outwardly-projecting lateral cylindrical configuration of the laser beam entrance face 12.

The outwardly-projecting lateral cylindrical configuration of the laser beam entrance face 12 refracts the laser beam L according to Snell's law, causing the laser beam refracted segment $L_1$ to have a transformed cone angle $\theta_{CA}'$ and a transformed focal point $F_P'$. The outwardly-projecting lateral cylindrical configuration of the laser beam entrance face 12 may focus the laser beam L such that the transformed focal point $F_P'$ is arranged within the laser-transmitting machining tool 10*c*, upstream of the rake face 14 and the flank face 16 at a second distance D2 extending from the focal point $F_P$.

With reference to the following equation, the second distance D2 associated with the transformed focal point $F_P'$ may be dictated by the following equation, where positive values of D1 extend upstream, and positive values of D2 extend downstream.

$$D2 = \frac{n_2 R D1}{(n_2 - n_1)D1 - n_1 R} \tag{38}$$

Accordingly, the transformed cone angle $\theta_{CA}'$ is related to the cone angle $\theta_{CA}$ by the following equation:

$$\tan(\theta'_{CA}/2) = \text{abs}(D1/D2)\tan(\theta_{CA}/2) \tag{39}$$

In another example as seen at FIG. $5E_D$, unlike the example described above associated with FIG. FIG. $5E_C$, the laser beam entrance segment $L_{E1}$ may be defined by a diverging laser beam. The outwardly-projecting lateral cylindrical configuration of the laser beam entrance face 12 receives the laser beam entrance segment $L_{E1}$ that is defined by a diverging cone angle $\theta_{CA}$ having a first focal point $F_P$;

accordingly, the laser beam L may be referred to as a divergent laser beam. The first focal point $F_P$ is located upstream of the outwardly-projecting lateral cylindrical configuration of the laser beam entrance face 12. The outwardly-projecting lateral cylindrical configuration of the laser beam entrance face 12 refracts the laser beam L according to Snell's law, causing the laser beam refracted segment $L_1$ to have a transformed cone angle $\theta_{CA}'$, because the laser beam entrance segment $L_{E1}$ is defined by a diverging laser beam, the outwardly-projecting lateral cylindrical configuration of the laser beam entrance face 12 may defocus the laser beam L such that the transformed focal point $F_P'$ is arranged outside of the laser-transmitting machining tool 10*c*, downstream of the rake face 14, the flank face 16, and the arcuate or curved cutting edge 22 at a second distance D2 extending from the outwardly-most portion of the outwardly-projecting lateral cylindrical configuration of the laser beam entrance face 12, and, as such, the laser beam entrance segment $L_{E1}$ converges as it travels through the laser-transmitting machining tool 10*c* toward the rake face 14, the flank face 16, and the arcuate or curved cutting edge 22.

As seen at FIGS. 5F' and 6F, the laser beam entrance face 12 may be defined by an inwardly-projecting (e.g., concave) surface having a non-linear, curved or arcuate configuration such as, e.g., a spherical configuration that extends between the first end $\mathbf{12}_1$ of the laser-beam entrance face 12 and the second end 12 of the laser-beam entrance face 12. After the collimated laser beam entrance segment $L_{E1}$ enters the laser-transmitting machining tool 10*c* at the laser beam entrance face 12 defined by the inwardly-projecting spherical configuration, the laser beam refracted segment $L_1$ of the laser beam L becomes divergent (see, e.g., FIGS. 5F and 6F) as the laser beam refracted segment $L_1$ travels through the laser-transmitting machining tool 10*c*. After the laser beam refracted segment $L_1$ contacts and travels through one or more of: (1) the arcuate or curved cutting edge 22 (causing the laser beam refracted segment $L_1$ to refract onto the workpiece W), (2) the negative rake face 14 near the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment $L_{E2}$ of the laser beam L becomes convergent (see, e.g., FIG. 6F).

Referring to FIGS. 5G' and 6G, the laser beam entrance face 12 may be defined by an outwardly-projecting (e.g., convex) surface having a non-linear, curved or arcuate configuration such as, e.g., a spherical configuration that extends between the first end $\mathbf{12}_1$ of the laser-beam entrance face 12 and the second end $\mathbf{12}_2$ of the laser-beam entrance face 12. After the collimated laser beam entrance segment $L_{E1}$ enters the laser-transmitting machining tool 10*c* at the laser beam entrance face 12 defined by the outwardly-projecting spherical configuration, the laser beam refracted segment $L_1$ of the laser beam L becomes convergent as the laser beam refracted segment L travels through the laser-transmitting machining tool 10*c* and then diverges from a focal point $F_P$ (see, e.g., FIGS. 5G and 6G) upstream up of the arcuate or curved cutting edge 22. After the laser beam refracted segment $L_1$ contacts and travels through one or more of: (1) the arcuate or curved cutting edge 22 (causing the laser beam refracted segment $L_1$ to refract onto the workpiece W); (2) the negative rake face 14 near the arcuate or curved cutting edge 22 (causing the laser beam refracted segment $L_1$ to refract onto the workpiece W); and (3) the flank face 16 near the arcuate or curved cutting edge 22 (causing the laser beam refracted segment $L_1$ to refract onto the workpiece W), the laser beam exit segment $L_{E2}$ of the laser beam L remains divergent (see, e.g., FIGS. 5G and 6G).

Referring to FIG. 6H, the laser beam entrance face 12 may be defined by a combination of: (1) a substantially linear, flat or planar as the laser beam entrance face 12 extends between the first end $\mathbf{12}_1$ of the laser-beam entrance face 12 and the second end $\mathbf{12}_2$ of the laser-beam entrance face 12, and (2) one or more diffractive surface portions $\mathbf{12}_D$ extending between the first end $\mathbf{12}_1$ of the laser-beam entrance face 12 and the second end $\mathbf{12}_2$ of the laser-beam entrance face 12. Adjacent diffractive surface portions $\mathbf{12}_D$ may be spaced apart by a distance, d. Although the laser beam entrance face 12 including the one or more diffractive surface portions $\mathbf{12}_D$ is shown being associated with a substantially linear, flat or planar as the laser beam entrance face 12 that is substantially similar to FIGS. 5A and 6A, any of the laser beam entrance faces 12 of FIGS. 58-5G and 6B-6G may also include the one or more diffractive surface portions $\mathbf{12}_D$.

At least one of the one or more diffractive surface portions $\mathbf{12}_D$ of the laser beam entrance face 12 receives and diffracts the laser beam entrance segment $L_{E1}$ of the laser beam L, splitting the laser beam entrance segment L into the plurality of diffracted laser beam segments $L_1$ within the body of the laser-transmitting machining tool 10*c*. The plurality of diffracted laser beam segments $L_1$ may include three diffracted laser beam segments $L_1$. Each diffracted laser beam segment $L_1$ is separated by the diffraction angle $\theta_D$. The three diffracted laser beam segments $L_1$ distribute laser power over a total angle of $2\theta_D$. Assuming $n_1=1$ for air, the total swept angle $2\theta_D$ of the diffracted laser beams L having a wavelength $\lambda$ and passing through a diffractive surface portion $\mathbf{12}_D$ comprising a grating with distance d between slits may be given using the grating equation to compute $\theta_D$: $n2\lambda=d \sin \theta_D$ $$n_2\lambda = d\sin(\theta_D) \tag{40}$$

In some examples, at least one of the one or more diffractive surface portions $\mathbf{12}_D$ of the laser beam entrance face 12 is configured to diffract the laser beam entrance segment $L_{E1}$ from a diffraction point $F_P$ at a diffractive surface portion $\mathbf{12}_D$ of the one or more diffractive surface portions $\mathbf{12}_D$ such that the plurality of diffracted laser beam segments $L_1$ are directed toward and received by the arcuate or curved cutting edge 22.

In some examples, the one of the one or more diffractive surface portions $\mathbf{12}_D$ focuses or defocuses the laser beam L, or increases or decreases the focal length of the laser-transmitting machining tool 10*c*. Furthermore, in some configurations, two or more laser beams L may distribute laser power more broadly in the workpiece W than a single laser beam L.

Referring to FIG. 6I, the laser beam entrance face 12 may be substantially linear, flat or planar as the laser beam entrance face 12 extends between the first end $\mathbf{12}_1$ of the laser-beam entrance face 12 and the second end $\mathbf{12}_2$ of the laser-beam entrance face 12. Additionally, as seen at FIG. 6I, one or more surfaces of the plurality of surfaces 12-20 of the laser-transmitting machining tool 10*c* is partially or wholly coated with a reflection-enhancing coating 36. Although the reflection-enhancing coating 36 is shown being associated with a substantially linear, flat or planar as the laser beam entrance face 12 that is substantially similar to FIGS. 5A and 6A, any of the laser-transmitting machining tools 10*c* of FIGS. 5B-5G and 6B-6G may also include the reflection-enhancing coating 36.

The coating 36 enhances reflection of the laser beam L (which may be defined by a converging laser beam entrance segment $L_{E1}$ as seen at FIG. 6I) by providing a mirror surface on the laser-transmitting machining tool 10*c* that reflects the laser beam L to desired zones of the laser-transmitting machining tool 10*c* with the goal of an increase in efficiency and tool coverage. In some instances, the coating 36 is applied to the laser-transmitting machining tool 10*c* when the ability of employing internal reflections is not feasible. In some implementations, the coating 36 includes a metallic material. Exemplary metallic materials that may be utilized for the coating 36 includes but is not limited to aluminum, silver, gold, INCONEL®, chrome, nickel, and titanium nitride. The coating 36 may be disposed over: (1) a portion of the rake face 14 near the first end $22_1$ of the arcuate or curved cutting edge 22; (2) a portion of the flank face 16 near the second end $22_2$ of the arcuate or curved cutting edge 22; and (3) one or both of the first downstream sidewall surface or face 21*b* and the second downstream sidewall surface or face 21*d* near the arcuate or curved cutting edge 22.

As seen at FIG. 6I, the laser-beam entrance face 12 is configured to receive a laser beam L. The laser beam L may be further defined by a plurality of segments $L_{E1}$, $L_1$, $L_{E2}$. The plurality of segments $L_{E1}$, $L_1$, $L_{E2}$ includes at least, for example, a converging laser beam entrance segment $L_{E1}$, a laser beam refracted segment $L_1$ and a laser beam exit segment $L_{E2}$. The laser beam entrance face 12 receives the converging laser beam entrance segment $L_{E1}$. The laser beam refracted segment $L_1$ converges at a first focal point $F_{P1}$ upstream of an outward-most portion of the arcuate or curved cutting edge 22. Thereafter the laser beam refracted segment $L_1$ diverges from the first focal point $F_{P1}$ and may be incident upon one or both of the first downstream sidewall surface or face 21*b* and the second downstream sidewall surface or face 21*d* that includes the coating 36. Thereafter, the laser beam refracted segment $L_1$ of the laser beam L converges at a second focal point $F_{P2}$ upstream of the outward-most portion of the arcuate or curved cutting edge 22. Thereafter the laser beam refracted segment L diverges from the second focal point $F_{P2}$ and may be incident upon the arcuate or curved cutting edge 22. Thereafter, the laser beam refracted segment $L_1$ of the laser beam L is refracted off the arcuate or curved cutting edge 22 to define the laser beam exit segment L that will then subsequently converge at a third focal point $F_{P3}$ downstream of the outward-most portion of the arcuate or curved cutting edge 22.

Referring now to FIGS. 7A-7G and 8A-8I, exemplary laser-transmitting machining tools are shown generally at 10*d*. The medium of the laser-transmitting machining tools 10*d* may include any desirable material such as, for example any type of single or poly crystal transmissive media including but not limited to: diamonds; sapphires; moissanites; chrysoberyls; alexandrite; and the like. In other configurations, exemplary materials defining the medium of the laser-transmitting machining tools 10*d* may include but are not limited to other transmissive media such as, for example: carbides; cubic boron nitride (CBN), silicon, nitrides, steels; alloys; ceramics, alumina; glass; glass composites; composites; and the like.

Referring to FIGS. 7A-8I, the exemplary laser-transmitting machining tools 10*d* are also defined a plurality of sidewall surfaces or faces 21*a*-21*d*. The plurality of sidewall surfaces or faces 21*a*-21*d* includes a first upstream sidewall surface or face 21*a* (see, e.g., FIGS. 7A-7G and 8A-8I), a first downstream sidewall surface or face 21*b* (see, e.g., FIGS. 7A-7G and 8A-81), a second upstream sidewall surface or face 21*c* (see, e.g., FIGS. 8A-8I), and a second downstream sidewall surface or face 21*d* (see, e.g. FIGS. 8A-8I).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* (see, e.g., FIGS. 7A-7G and 8A-8I) that is arranged at an angle $\theta_{23}$ (see, e.g., FIGS. 7A-7G) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*d* to the second side 30 (i.e., one or both of the flank face 16 and the second side face 20) of the laser-transmitting machining tools 10*d*.

The second upstream sidewall surface or face 21*c* meets the second downstream sidewall surface or face 21*d* at a second side edge 23*b* (see, e.g., FIGS. 8A-8I) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*d* to the second side 30 (i.e., one or both of the flank face 16 and the second side face 20) of the laser-transmitting machining tools 10*d*.

A first end $\mathbf{18}_1$ of the rake side face 18 extends away from a first end $\mathbf{12}_1$ of the laser-beam entrance face 12. A first end $\mathbf{20}_1$ of the flank side face 20 extends away from a second end $\mathbf{12}_2$ of the laser-beam entrance face 12. A first end $\mathbf{14}_1$ of the rake face 14 extends away from a second end $\mathbf{18}_2$ of the rake side face 18. A first end $\mathbf{16}_1$ of the flank face 16 extends away from a second end $\mathbf{20}_2$ of the flank side face 20. A second end $\mathbf{14}_2$ of the rake face 14 is joined to a second end $\mathbf{16}_2$ of the flank face 16 to define a cutting edge 22 that may be non-linear, curved or arcuate (as seen in, e.g., FIGS. 8A-8I); although the cutting edge 22 may be non-linear, curved or arcuate, the cutting edge 22 may be defined to include other configurations, such as, for example, a linear, non-curved or non-arcuate shape. Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end 16 of the flank face 16 extends away from the second end $\mathbf{20}_2$ of the flank side face 20 at an obtuse flank angle or clearance angle $\theta_{16}$. The negative rake angle $\theta_{14}$ may be an obtuse angle greater than 90° and less than 180°; in some instances, the rake angle $\theta_{14}$ may range between approximately 135° and 155°.

The exemplary laser-transmitting machining tools 10*d* are defined by a substantially similar structural configuration with respect to the transmitting machining tools 10 and 10*a* of FIGS. 1 and 27 described above and includes the plurality of surfaces or faces 12-20 and the cutting edge 22. In some instances, the laser-transmitting machining tools 10*d* may be utilized for machining a workpiece W (see, e.g., any of FIGS. 29, and 30A-30E). Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$.

The laser beam entrance face 12 may be defined by a functional entrance face segment $\mathbf{12}_f$ and a non-functional entrance face segment $\mathbf{12}_n$. A first end $\mathbf{12}_{n1}$ of the non-functional entrance face segment $\mathbf{12}_n$ extends perpendicularly away from the first end $\mathbf{20}_1$ of the flank side face 20 at a height $H_n$. A first end $\mathbf{12}_{f1}$ of the functional entrance face segment $\mathbf{12}_f$ extends away from the second end $\mathbf{12}_{n2}$ of the non-functional entrance face segment $\mathbf{12}_n$ (according to a reference line associated with the height $H_n$ that is parallel to the flank side face 20). A second end $\mathbf{12}_{f2}$ of the functional entrance face segment $\mathbf{12}_f$ extends away from the first end $\mathbf{18}_1$ of the rake side face 18.

The first end $\mathbf{12}_{f1}$ of the functional entrance face segment $\mathbf{12}_f$ extends away from the second end $\mathbf{12}_{n2}$ of the non-functional entrance face segment $\mathbf{12}_n$ at an angle (see, e.g., $\theta_{12}$) that is reference from a plane (see, e.g., a dashed line) that is parallel to the flank side face 20. The angle $\theta_{12}$ may be alternatively referred to as the back-relief angle $\theta_{12}$. As similarly described above in, for example, FIGS. 1A-1G, in some examples, the back-relief angle $\theta_{12}$ acute (i.e., less than 90°). In some implementations, the acute back-relief angle $\theta_{12}$ approximately equal to 60°. The back-relief angle $\theta_{12}$ is configured to refract the laser beam L at the functional entrance face segment $\mathbf{12}_f$ of the laser beam entrance face 12 according to Snell's law. The acute back-relief angle $\theta_{12}$ results in the laser beam L being refracted in a direction away from the rake side face 18.

With reference to FIGS. 7A-7G, the functional entrance face segment $\mathbf{12}_f$ of the laser beam entrance face 12 is configured to receive and refract the laser beam L at a height $H_i$ that is greater than the height $H_n$ defining the non-functional entrance face segment $\mathbf{12}_n$ of the laser beam entrance face 12. Accordingly, the laser beam L does not enter the non-functional entrance face $\mathbf{12}_n$.

As seen at FIGS. 7A-7G, the laser beam L that enters and then exits the laser-transmitting machining tools 10*d* is shown being defined by a plurality of segments $L_{E1}$, $L_1$, $L_2$, $L_{E2}$. The plurality of segments $L_{E1}$, $L_1$, $L_2$, $L_{E2}$ include a laser beam entrance segment $L_{E1}$, a laser beam refracted segment $L_1$, a laser beam reflected segment $L_2$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIGS. 7A-7G, the functional entrance face segment $\mathbf{12}_f$ of the laser beam entrance face 12 is configured to receive and refract the collimated laser beam entrance segment $L_{E1}$ such that the laser beam refracted segment $L_1$ (that is subsequently reflected by the flank side face 20 for defining the laser beam reflected segment $L_2$) is directed toward and through one or more of: (1) the cutting edge 22 (causing, e.g. the laser beam exit segment $L_{E2}$ to refract onto the workpiece W), (2) the negative rake face 14 near the cutting edge 22 (causing, e.g., the laser beam exit segment $L_{E2}$ to refract onto the workpiece W), and (3) the flank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the functional entrance face segment $\mathbf{12}_f$ of the laser beam entrance face 12 according to Snell's law. The acute back-relief angle $\theta_{12}$ results in the laser beam refracted segment $L_1$ being refracted in a direction toward the flank side face 20.

Although the laser beam entrance segment $L_{E1}$ entering the functional entrance face segment $\mathbf{12}_f$ of the laser beam entrance face 12 is collimated, the laser beam entrance segment $L_{E1}$ may enter the functional entrance face segment $\mathbf{12}_f$ of the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

In some examples, the functional entrance face $\mathbf{12}_f$ of the laser beam entrance face 12 receives the collimated laser beam entrance segment $L_{E1}$ at the height $H_i$ above the flank side face 20; the height $H_i$ is a portion of a tool height $H_t$ extending between the flank side face 20 and the rake side face 18. The functional entrance face segment $\mathbf{12}_f$ of the laser beam entrance face 12 refracts the collimated laser beam entrance segment $L_{E1}$ to define the laser beam refracted segment $L_1$ that is directed toward and received by the flank side face 20.

The flank side face 20 receives the laser beam refracted segment $L_1$ at an incident mirror angle $\theta_{m-i}$ (that is referenced from a reference line $\theta_m$ extending perpendicularly away from the flank side face 20). The flank side face 20 reflects the laser beam refracted segment L to define the laser beam reflected segment $L_2$. The laser beam reflected segment $L_2$ extends away from the flank side face 20 at a reflected mirror angle $\theta_{m-r}$ (that is also referenced from the reference line $\theta_m$ extending perpendicularly away from the flank side face 20). The reflected mirror angle $\theta_{m-r}$ equal to the incident mirror angle $\theta_{m-i}$.

The laser beam reflected segment $L_2$ is then directed toward and received by one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The laser beam exit segment $L_{E2}$ may be refracted into the workpiece W with a high level of heat efficiency.

The laser beam exit segment $L_{E2}$ exits the laser-transmitting machining tool 10*d* at a height $H_e$ above the flank side face 20. In some examples, the rake face receives the laser beam reflected segment $L_2$ at an angle less than a critical angle $\theta_C$, as defined in Equation 3, if the following relationship is satisfied:

$$\text{abs}(\theta_m + \theta_{14} - 180°) < \theta_C \quad (41)$$

As can be readily seen from FIGS. 7A-7G, the length l of the laser-transmitting machining tool 10*d* may be decreased by increasing the height $H_n$ defining the non-functional entrance face segment $\mathbf{12}_n$. The length l of the laser-transmitting machining tool 10*d* may be dictated by the following equation.

$$l = (H_i + H_e) * \tan(\theta_m) + (H_i - H_n) * \tan(90° - \theta_{12}) \quad (42)$$

Accordingly, the greater the height H. of the non-functional entrance face $12_n$, the shorter the length l of the laser-transmitting machining tool 10*d*.

Referring to FIGS. 7A-7G. 7B'-7G', and 8A-I, a plurality of alternative laser beam entrance faces 12 defining the laser beam entrance end 24 of the laser-transmitting machining tools 10*d* are shown. Referring initially to FIGS. 7A and 8A, the functional entrance face segment $12_f$ of the laser beam entrance face 12 may be substantially linear, flat or planar as the functional entrance face segment $12_f$ of the laser beam entrance face 12 extends between the first end $12_{f1}$ of the functional entrance face segment $12_f$ of the laser-beam entrance face 12 and the second end $12_{f2}$ of the functional entrance face segment $12_f$ of the laser-beam entrance face 12. After the collimated laser beam entrance segment $L_{E1}$ enters the laser-transmitting machining tool 10*d* at the substantially linear, flat or planar the functional entrance face segment $12_f$ of the laser beam entrance face 12, the laser beam refracted segment $L_1$ of the laser beam L remains collimated as the laser beam refracted segment $L_1$ travels through the laser-transmitting machining tool 10*d*. After the laser beam reflected segment $L_2$ is subsequently reflected by the flank side face 20 and contacts and travels through one or more of: (1) the cutting edge 22 (causing the laser beam reflected segment $L_1$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes convergent.

As seen at FIGS. 7B' and 7B, the functional entrance face segment $12_f$ of the laser beam entrance face 12 may be defined by an inwardly-projecting (e.g., concave) surface having a non-linear, curved or arcuate configuration such as, e.g., an inwardly-projecting axial cylindrical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. After the collimated laser beam entrance segment $L_{E1}$ enters the laser-transmitting machining tool 10*d* at the functional entrance face segment $12_f$ of the laser beam entrance face 12 defined by the inwardly-projecting axial cylindrical configuration, the laser beam refracted segment $L_1$ of the laser beam L becomes divergent (see, e.g., FIG. 8B) as the laser beam refracted segment $L_1$ travels through the laser-transmitting machining tool 10*d*. After the laser beam reflected segment $L_2$ is subsequently reflected by the flank side face 20 and contacts and travels through one or more of: (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes convergent (see, e.g., FIGS. 7B and 8B).

Referring to FIGS. 7C' and 8C, the functional entrance face segment $12_f$ of the laser beam entrance face 12 may be defined by an outwardly-projecting (e.g., convex) surface having a non-linear, curved or arcuate configuration such as, e.g., an axial cylindrical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. After the collimated laser beam entrance segment $L_{E1}$ enters the laser-transmitting machining tool 10*d* at the functional entrance face segment $12_f$ of the laser beam entrance face 12 defined by the outwardly-projecting axial cylindrical configuration, the laser beam refracted segment $L_1$ of the laser beam L becomes convergent (see, e.g., FIG. 8C) as the laser beam refracted segment L travels through the laser-transmitting machining tool 10*d* and then diverges from a focal point $F_P$ (see, e.g., FIG. 8C) upstream up of the cutting edge 22. After the laser beam reflected segment $L_2$ is subsequently reflected by the flank side face 20 and contacts and travels through one or more of: one or more of: (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W), and (3) the flank face 16 near the cutting edge 22 (causing the laser beam reflected segment $L_2$ to refract onto the workpiece W), the laser beam exit segment $L_{E2}$ of the laser beam L becomes convergent (see, e.g., FIG. 7C).

As seen at FIGS. 7D' and 8D, the functional entrance face segment $12_f$ of the laser beam entrance face 12 may be defined by an inwardly-projecting (e.g., concave) surface having a non-linear, curved or arcuate configuration such as, e.g., a lateral cylindrical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. Ater the collimated laser beam entrance segment $L_{E1}$ enters the laser-transmitting machining tool 10*d* at the functional entrance face segment $12_f$ of the laser beam entrance face 12 defined by the inwardly-projecting lateral cylindrical configuration, the laser beam refracted segment $L_1$ of the laser beam L becomes divergent (see, e.g., FIG. 7D) as the laser beam refracted segment $L_1$ travels through the laser-transmitting machining tool 10*d*. After the laser beam reflected segment $L_2$ is subsequently reflected by the flank side face 20 and contacts and travels through one or more of: (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes convergent (see, e.g., FIGS. 7D and 8D).

Referring to FIGS. 7E' and 8E, the functional entrance face segment $12_f$ of the laser beam entrance face 12 may be defined by an outwardly-projecting (e.g., convex) surface having a non-linear, curved or arcuate configuration such as, e.g., a lateral cylindrical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. Ater the collimated laser beam entrance segment $L_{E1}$ enters the laser-transmitting machining tool 10*d* at the functional entrance face segment $12_f$ of the laser beam entrance face 12 defined by the outwardly-projecting lateral cylindrical configuration, the laser beam refracted segment $L_1$ of the laser beam L becomes convergent (see, e.g., FIG. 7E) as the laser beam refracted segment $L_1$ travels through the laser-transmitting machining tool 10*d* and then diverges from a focal point $F_P$ (see, e.g., FIG. 7E) upstream up of the cutting edge 22. Ater the laser beam reflected segment $L_2$ is subsequently reflected by the flank side face 20 and contacts and travels through one or more of (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes convergent (see. e.g., FIGS. 7E and 8E).

As seen at FIGS. 7F' and 8F, the functional entrance face segment $12_f$ of the laser beam entrance face 12 may be defined by an inwardly-projecting (e.g., concave) surface having a non-linear, curved or arcuate configuration such as, e.g., a spherical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. After the collimated laser beam entrance segment $L_{E1}$ enters the laser-transmitting machining tool 10*d* at the functional entrance face segment $12_f$ of the laser beam entrance face 12 defined by the inwardly-projecting spherical configuration, the laser beam refracted segment $L_1$ of the laser beam L becomes divergent (see, e.g., FIGS. 7F and 8F) as the laser beam refracted segment $L_1$ travels through the laser-transmitting machining tool 10*d*. After the laser beam reflected segment $L_2$ is subsequently reflected by the flank side face 20 and contacts and travels through one or more of: (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes convergent (see, e.g., FIGS. 7F and 5F).

Referring to FIGS. 7G' and 8G, the functional entrance face segment $12_f$ of the laser beam entrance face 12 may be defined by an outwardly-projecting (e.g., convex) surface having a non-linear, curved or arcuate configuration such as, e.g., a spherical configuration that extends between the first end $12_{f1}$ of the functional entrance face segment $12_f$ of the laser-beam entrance face 12 and the second end $12_{f2}$ of the functional entrance face segment $12_f$ of the laser-beam entrance face 12. After the collimated laser beam entrance segment $L_{E1}$ enters the laser-transmitting machining tool 10*d* at the functional entrance face segment $12_f$ of the laser beam entrance face 12 defined by the outwardly-projecting spherical configuration, the laser beam refracted segment $L_1$ of the laser beam L becomes convergent as the laser beam refracted segment $L_1$ travels through the laser-transmitting machining tool 10*d* and then diverges from a focal point $F_P$ (see, e.g., FIGS. 7G and 8G) upstream up of the cutting edge 22. After the laser beam reflected segment $L_2$ is subsequently reflected by the flank side face 20 and contacts and travels through one or more of: (1) the cutting edge 22 (causing the laser beam reflected segment $L_2$ to refract onto the workpiece W); (2) the negative rake face 14 near the cutting edge 22 (causing the laser beam reflected segment $L_2$ to refract onto the workpiece W); and (3) the flank face 16 near the cutting edge 22 (causing the laser beam reflected segment $L_2$ to refract onto the workpiece W), the laser beam exit segment $L_{E2}$ of the laser beam L becomes divergent (see, e.g., FIGS. 7G and 8G).

Referring to FIG. 8H, the functional entrance face segment $12_f$ of the laser beam entrance face 12 may be defined by a combination of: (1) a substantially linear, flat or planar as the functional entrance face segment $12_f$ of the laser beam entrance face 12 extends between the first end $12_{f1}$ of the functional entrance face segment $12_{f1}$ of the laser-beam entrance face 12 and the second end $12_{f2}$ of the functional entrance face segment $12_f$ of the laser-beam entrance face 12; and (2) one or more diffractive surface portions $12_D$ extending between the first end $12_{f1}$ of the functional entrance face segment $12_f$ of the laser-beam entrance face 12 and the second end $12_{f2}$ of the functional entrance face segment $12_f$ of the laser-beam entrance face 12. Adjacent diffractive surface portion $12_D$ may be spaced apart by a distance, d. Although the functional entrance face segment $12_f$ of the laser beam entrance face 12 including the one or more diffractive surface portions $12_D$ is shown being associated with a substantially linear, flat or planar as the functional entrance face segment $12_f$ of the laser beam entrance face 12 that is substantially similar to FIGS. 7A and 8A, any of the laser beam entrance faces 12 of FIGS. 7B-7G and 8B-8G may also include the one or more diffractive surface portions $12_D$.

At least one of the one or more diffractive surface portions $12_D$ of the functional entrance face segment $12_f$ of the laser beam entrance face 12 receives and diffracts the laser beam entrance segment $L_{E1}$ of the laser beam L, splitting the laser beam entrance segment $L_{E1}$ into the plurality of diffracted laser beam segments $L_1$ within the body of the laser-transmitting machining tool 10*d*. The plurality of diffracted laser beam segments $L_1$ may include three diffracted laser beam segments $L_1$. Each diffracted laser beam segment $L_1$ is separated by the diffraction angle $\theta_D$. The three diffracted laser beam segments $L_1$ distribute laser power over a total angle of $2\theta_D$. Assuming $n_1=1$ for air, the total swept angle $2\theta_D$ of the diffracted laser beams L having a wavelength $\lambda$ and passing through a diffractive surface portion $12_D$ comprising a grating with distance d between slits may be given using the grating equation to compute $\theta_D$: $n2\lambda=d \sin \theta_D$ $$n_2\lambda = d\sin(\theta_D) \tag{43}$$

In some examples, at least one of the one or more diffractive surface portions $12_D$ of the functional entrance face segment $12_f$ of the laser beam entrance face 12 is configured to diffract the laser beam entrance segment $L_{E1}$ from a diffraction point $F_P$ at a diffractive surface portion $12_D$ of the one or more diffractive surface portions $12_D$ such that the plurality of diffracted laser beam segments $L_1$ are directed toward and received (as laser beam reflected segments $L_2$ reflected by the flank side face 20) by the arcuate or curved cutting edge 22.

In some examples, the one of the one or more diffractive surface portions $12_D$ focuses or defocuses the laser beam L, or increases or decreases the focal length of the laser-transmitting machining tool 10*d*. Furthermore, in some configurations, two or more laser beams L may distribute laser power more broadly in the workpiece W than a single laser beam L.

Referring to FIG. 8I, the functional entrance face segment $12_f$ of the laser beam entrance face 12 may be substantially linear, flat or planar as the functional entrance face segment $12_f$ of the laser beam entrance face 12 extends between the first end $12_{f1}$ of the functional entrance face segment $12_f$ of the laser-beam entrance face 12 and the second end $12_{f2}$ of the functional entrance face segment $12_f$ of the laser-beam entrance face 12. Additionally, as seen at FIG. 8I, one or more surfaces of the plurality of surfaces 12-20 of the laser-transmitting machining tool 10*d* is partially or wholly coated with a reflection-enhancing coating 36. Although the reflection-enhancing coating 36 is shown being associated with a substantially linear, flat or planar as the functional entrance face segment $12_f$ of the laser beam entrance face 12 that is substantially similar to FIGS. 7A and 8A, any of the laser-transmitting machining tools 10*d* of FIGS. 7B-7G and 8B-G may also include the reflection-enhancing coating 36.

The coating 36 enhances reflection of the laser beam L (which may be defined by a converging laser beam entrance segment $L_{E1}$ as seen at FIG. 8I) by providing a mirror surface on the laser-transmitting machining tool 10*d* that reflects the laser beam L to desired zones of the laser-transmitting machining tool 10*d* with the goal of an increase in efficiency and tool coverage. In some instances, the coating 36 is applied to the laser-transmitting machining tool 10*d* when the ability of employing internal reflections is not feasible. In some implementations, the coating 36 includes a metallic material. Exemplary metallic materials that may be utilized for the coating 36 includes but is not limited to aluminum, silver, gold, INCONEL®, chrome, nickel, and titanium nitride. The coating 36 may be disposed over: (1) a portion of the rake face 14 near the first end $22_1$ of the arcuate or curved cutting edge 22; (2) a portion of the flank face 16 near the second end $22_2$ of the arcuate or curved cutting edge 22; and (3) one or both of the first downstream sidewall surface or face 21*b* and the second downstream sidewall surface or face 21*d* near the arcuate or curved cutting edge 22.

As seen at FIG. 8I, the laser-beam entrance face 12 is configured to receive a laser beam L. The laser beam L may be further defined by a plurality of segments $L_{E1}$, $L_1$, $L_{E2}$. The plurality of segments $L_{E1}$, $L_1$, $L_{E2}$ includes at least, for example, a converging laser beam entrance segment $L_{E1}$, a laser beam refracted segment $L_1$, a laser beam reflected segments $L_2$ and a laser beam exit segment $L_{E2}$. The functional entrance face segment $12_f$ of laser beam entrance face 12 receives the converging laser beam entrance segment $L_{E1}$. The laser beam refracted segment $L_1$ converges at a first focal point $F_{P1}$ upstream of an outward-most portion of the arcuate or curved cutting edge 22. Thereafter the laser beam refracted segment $L_1$ diverges from the first focal point $F_{P1}$ and may (as laser beam reflected segments $L_2$ reflected by the flank side face 20) be incident upon one or both of the first downstream sidewall surface or face 21*b* and the second downstream sidewall surface or face 21*d* that includes the coating 36. Thereafter, the laser beam reflected segments $L_2$ of the laser beam L converges at a second focal point $F_{P2}$ upstream of the outward-most portion of the arcuate or curved cutting edge 22. Thereafter the laser beam reflected segments $L_2$ diverges from the second focal point $F_{P2}$ and may be incident upon the arcuate or curved cutting edge 22. Thereafter, the laser beam reflected segments $L_2$ of the laser beam L is refracted off the arcuate or curved cutting edge 22 to define the laser beam exit segment $L_{E2}$ that will then subsequently converge at a third focal point $F_{P3}$ downstream of the outward-most portion of the arcuate or curved cutting edge 22.

Referring now to FIGS. 9 and 10, an exemplary laser-transmitting machining tool is shown generally at 10*e*. The medium of the laser-transmitting machining tool 10*e* may include any desirable material such as, for example any type of single or poly crystal transmissive media including but not limited to: diamonds, sapphires, moissanites; chrysoberyls; alexandrite; and the like. In other configurations, exemplary materials defining the medium of the laser-transmitting machining tool 10*e* may include but are not limited to other transmissive media such as, for example: carbides; cubic boron nitride (CBN); silicon; nitrides; steels; alloys; ceramics; alumina; glass; glass composites; composites; and the like.

Referring to FIGS. 9 and 10, the exemplary laser-transmitting machining tool 10*e* is also defined a plurality of sidewall surfaces or faces 21*a*-21*d*. The plurality of sidewall surfaces or faces 21*a*-21*d* includes a first upstream sidewall surface or face 21*a* (see, e.g., FIGS. 9 and 10), a first downstream sidewall surface or face 21*b* (see, e.g., FIGS. 9 and 10), a second upstream sidewall surface or face 21*c* (see, e.g., FIG. 10), and a second downstream sidewall surface or face 21*d* (see, e.g., FIG. 10). Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and the flank face or clearance face 16. The first upstream surface or face 21*a* meets the first downstream sidewall surface or face 21*b* at a first side edge 23*a* (see, e.g., FIGS. 9 and 10) that is arranged at an angle $\theta_{23}$ (see, e.g., FIG. 9) that may be substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*e* to the second side 30 (i.e., one or both of the flank face 16 and the second side face 20) of the laser-transmitting machining tool 10*e*. The second upstream sidewall surface or face 21*c* meets the second downstream sidewall surface or face 21*d* at a second side edge 23*b* (see, e.g., FIG. 10) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*e* to the second side 30 (i.e., one or both of the flank face 16 and the second side face 20) of the laser-transmitting machining tool 10*e*.

The exemplary laser-transmitting machining tool 10*e* is defined by a substantially similar structural configuration with respect to the transmitting machining tools 10 and 10*a*-10*d* of FIGS. 1A-8I and 27 described above and includes: the plurality of surfaces or faces 12-20; the first end $\mathbf{12_1}$-$\mathbf{20_1}$ of each respective surface 12-20; and the second end $\mathbf{12_2}$-$\mathbf{20_2}$ of each respective surface 12-20. Furthermore, the first end $\mathbf{14_1}$ of the rake face 14 extends away from the second end $\mathbf{18_2}$ of the rake side face 18 at a negative rake angle $\theta_{14}$; accordingly, the rake face 14 may be referred to as a negative rake face.

In some examples, the second end $\mathbf{12_2}$ of the laser-beam entrance face 12 extends away from the first end $\mathbf{20_1}$ of the second side face 20 at a back-relief angle $\theta_{12}$. As seen at FIG. 9, the back-relief angle $\theta_{12}$ is obtuse (i.e., greater than 90°). In some implementations, the obtuse back-relief angle $\theta_{12}$ of the laser-transmitting machining tool 10*e* is approximately equal to 102°. However, in other examples as seen at, e.g., FIG. 11, an exemplary laser-transmitting machining tool 10*f* includes a back-relief angle $\theta_{12}$ that is acute (i.e., less than 90°). In yet other examples, as seen at, e.g., FIG. 13, an exemplary laser-transmitting machining tool 10*g* includes a back-relief angle $\theta_{12}$, that may be a right angle (i.e., equal to 90°).

As seen at FIG. 9, the laser beam L that enters and then exits the laser-transmitting machining tool 10*e* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIG. 9, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The cutting edge 22 may be non-linear, curved or arcuate (as seen in, e.g., FIG. 10); although the cutting edge 22 may be non-linear, curved or arcuate, the cutting edge 22 may be defined to include other configurations, such as, for example, a linear, non-curved or non-arcuate shape. The back-relief angle $\theta_{12}$ is configured to refract the laser beam refracted segment $L_1$ at the laser beam entrance face 12 according to Snell's law. The obtuse back-relief angle $\theta_{12}$ results in the laser beam refracted segment $L_1$ being refracted in a direction away from the flank side face 20.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

The laser-transmitting machining tool 10*e* further includes a secondary clearance face 34 extending between and connecting the flank face 16 to the flank side face 20. In some examples, a first end $\mathbf{34}_1$ of the secondary clearance face 34 extends away from the second end $\mathbf{20}_2$ of the flank side face 20, and a second end $\mathbf{34}_2$ of the secondary clearance face 34 extends away from the first end $\mathbf{16}_1$ of the flank face 16. In some instances, the laser-transmitting machining tool 10*e* may be utilized for machining a workpiece W (see, e.g., any of FIGS. 29, and 30A-30E).

The first end $\mathbf{16}_1$ of the flank face 16 extends away from the second end $\mathbf{34}_2$ of the secondary clearance face 34 to define a flank angle or clearance angle $\theta_{16}$. The flank angle or clearance angle $\theta_{16}$ is obtuse.

The secondary clearance face 34 may extend away from the flank side face 20 so at a secondary clearance angle $\theta_{34}$. In some instances, the secondary clearance angle $\theta_{34}$ is obtuse. The secondary clearance face angle $\theta_{34}$ may be between 120° and 180°. In some implementations, the obtuse secondary clearance angle $\theta_{34}$ is approximately equal to 150°. In some instances, assuming that the secondary clearance angle $\theta_{34}$ is approximately equal to 120°, the clearance angle $\theta_{16}$ may range between approximately 110° and approximately 130°.

As seen at FIG. 9, the laser beam entrance face 12 receives the laser beam entrance segment $L_{E1}$ at a height $H_i$ above the flank side face 20; the height $H_i$ is a portion of a tool height $H_t$ extending between the flank side face 20 and the rake side face 18. The laser beam entrance face 12 refracts the laser beam entrance segment $L_{E1}$ to define the laser beam refracted segment $L_1$ that is directed toward and received by the rake side face 18.

The rake side face 18 receives the laser beam refracted segment $L_1$ at an incident mirror angle $\theta_{m-i}$ relative to the rake side face 18 (that is referenced from a reference line $\theta_m$ extending perpendicularly away from the rake side face 18). The rake side face 18 reflects the laser beam refracted segment $L_1$ to define the laser beam reflected segment $L_2$. The laser beam reflected segment $L_2$ extends away from the rake side face 18 at a reflected mirror angle $\theta_{m-r}$ (that is also referenced from the reference line $\theta_m$ extending perpendicularly away from the rake side face 18). The reflected mirror angle $\theta_{m-r}$ is equal to the incident mirror angle $\theta_{m-i}$.

The laser beam reflected segment $L_2$ is then directed toward and received by one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W); according to an exemplary configuration of the laser-transmitting machining tool 10*e* seen at FIG. 9, the laser beam reflected segment $L_2$ is then directed toward and received by the second end $\mathbf{16}_2$ of flank face 16 near the cutting edge 22. Thereafter, the laser beam reflected segment $L_2$ exits the laser-transmitting machining tool 10*e* and defines the laser beam exit segment $L_{E2}$ of the laser beam L. The laser beam exit segment $L_{E2}$ may be refracted into the workpiece W. In some instances, the laser-transmitting machining tool 10*e* is used for machining a deeply concave workpiece W, such as a workpiece W having features with a small radius of curvature (ROC) and small clear aperture (CA).

The laser beam exit segment $L_{E2}$ exits the laser-transmitting machining tool 10*e* at a height $H_e$ above the flank side face 20. In some examples, the rake side face 18 receives the laser beam reflected segment $L_2$ at an angle less than a critical angle $\theta_C$, as defined in Equation 3, when the following relationship is satisfied:

$$\text{abs}(\theta_m - \theta_{34} - \theta_{16} + 360°) < \theta_C,\ \theta_m > \theta_C \tag{44}$$

Although the rake side face 18 is shown reflecting the laser beam reflected segment $L_2$ toward the flank face 16 at FIG. 9, in other examples, the rake side face 18 may reflect the laser beam reflected segment $L_2$ toward the rake face 14, causing the rake face 14 to refract the laser beam reflected segment $L_2$ into the workpiece W. The rake side face 18 may reflect the laser beam reflected segment $L_2$ toward other faces of the laser-transmitting machining tool 10*e* as well. The tool length l of the laser-transmitting machining tool 10*e* may be dictated by the following equation:

$$l = (H_t + H_e) * \tan(\theta_m) + (H_t - H_i) * \tan(\theta_{12} - 90°) \tag{45}$$

Referring to FIGS. 9 and 10, the laser beam entrance face 12 may be defined by a substantially linear, flat or planar as the laser beam entrance face 12 that extends between the first end $\mathbf{12}_1$ of the laser-beam entrance face 12 and the second end $\mathbf{12}_2$ of the laser-beam entrance face 12. Although the laser beam entrance face 12 is defined by a substantially linear, flat or planar as the laser beam entrance face 12 that is substantially similar to the substantially linear, flat or planar as the laser beam entrance faces 12 of the laser-transmitting machining tools 10*a*, 10*b*, 10*c*, and 10*d* of, respectively. FIGS. 2A, 4A, 6A, and 8A, any of the other configurations described above (e.g., an inwardly-projecting axial cylindrical configuration, an outwardly-projecting axial cylindrical configuration, an inwardly-projecting lateral cylindrical configuration, an outwardly-projecting lateral so cylindrical configuration, an inwardly-projecting spherical configuration, an outwardly-projecting spherical configuration, or one or more diffractive surface portions) at FIGS. 2B-2H, 4B-4H, 6B-6H, and 8B-8H may define the laser beam entrance faces 12 of the laser-transmitting machining tools 10*e*. Similarly, one or more surfaces of the plurality of surfaces 12-20 of the laser-transmitting machining tool 10*e* may be partially or wholly coated with a reflection-enhancing coating 36 as similarly described above at FIGS. 2I, 4I, 6I, and 8I.

Referring now to FIGS. 11A-12A and 11B-12B, exemplary laser-transmitting machining tools are shown generally at 10*f*. The medium of the laser-transmitting machining tools 10*f* may include any desirable material such as, for example any type of single or poly crystal transmissive media including but not limited to: diamonds; sapphires; moissanites, chrysoberyls, alexandrite; and the like. In other configurations, exemplary materials defining the medium of the laser-transmitting machining tools 10*f* may include but are not limited to other transmissive media such as, for example: carbides; cubic boron nitride (CBN); silicon; nitrides; steels; alloys; ceramics; alumina; glass; glass composites; composites; and the like.

The exemplary laser-transmitting machining tools 10*f* are also defined a plurality of sidewall surfaces or faces 21*a*-21*d*. The plurality of sidewall surfaces or faces 21*a*-21*d* includes a first upstream sidewall surface or face 21*a* (see, e.g., FIGS. 11A-12A and 11B-12B), a first downstream sidewall surface or face 21*b* (see, e.g., FIGS. 11A-12A and 11B-12B) a second upstream sidewall surface or face 21*c* (see, e.g., FIGS. 12A and 12B), and a second downstream sidewall surface or face 21*d* (see, e.g., FIGS. 12A and 12B). Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and the flank face or clearance face 16. The first upstream surface or face 21*a* meets the first downstream sidewall surface or face 21*b* at a first side edge 23*a* (see, e.g., FIGS. 11A-12A and 11B-12B) that is arranged at an angle $\theta_{23}$ (see, e.g., FIGS. 11A and 11B) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tools 10*f* to the second side 30 (i.e., one or both of the flank face 16 and the second side face 20) of the laser-transmitting machining tools 10*f*. The second upstream sidewall surface or face 21*c* meets the second downstream sidewall surface or face 21*d* at a second side edge 23*b* (see, e.g., FIGS. 12A and 12B) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*f* to the second side 30 (i.e., one or both of the flank face 16 and the second side face 20) of the laser-transmitting machining tools 10*f*.

The exemplary laser-transmitting machining tools 10*f* are defined by a substantially similar structural configuration with respect to the transmitting machining tools 10 and 10*a*-10*d* of FIGS. 1A-8I and 27 described above and includes: the plurality of surfaces or faces 12-20, the first end $\mathbf{12_1}$-$\mathbf{20_1}$ of each respective surface 12-20; and the second end $\mathbf{12_2}$-$\mathbf{20_2}$ of each respective surface 12-20. Furthermore, the first end $\mathbf{14_1}$ of the rake face 14 extends away from the second end $\mathbf{18_2}$ of the rake side face 18 at a negative rake angle $\theta_{14}$; accordingly, the rake face 14 may be referred to as a negative rake face. The negative rake angle $\theta_{14}$ may be an obtuse angle greater than 90° and less than 180°. In some instances, the rake angle $\theta_{14}$ of FIG. 11A may range between approximately 135° and 155°. In other examples, the rake angle $\theta_{14}$ of FIG. 11B may range between approximately 155° and an amount less than 180°.

In some examples, the second end $\mathbf{12_2}$ of the laser-beam entrance face 12 extends away from the first end $\mathbf{20_1}$ of the second side face 20 at a back-relief angle $\theta_{12}$. As seen at FIGS. 11A and 11B, the back-relief angle $\theta_{12}$ is acute (i.e., less than 90°). In some implementations as seen at, e.g., FIG. 11A, the acute back-relief angle $\theta_{12}$ of the laser-transmitting machining tool 10*f* is approximately equal to 60°. In other implementations as seen at, e.g., FIG. 11B, the acute back-relief angle $\theta_{12}$ of the laser-transmitting machining tool 10*f* is approximately equal to 70°.

As seen at FIGS. 11A and 11B, the laser beam L that enters and then exits the laser-transmitting machining tool 10*f* is shown being defined by a plurality of segments $L_{E1}$, $L_1$, $L_2$, $L_2$. The plurality of segments $L_{E1}$, $L_1$, $L_2$, $L_2$ include a laser beam entrance segment $L_{E1}$, a laser beam refracted segment $L_1$, laser beam reflected segment $L_2$, and a law beam exit segment $L_{E2}$. The laser beam entrance segment $L_{E1}$ is collimated, which is generally defined by a tube or cylindrical arrays of rays (see. e.g., the laser beam L of FIGS. 31A-31B including a central ray $\Phi_A$ and circumferential arrays of rays $\Phi_{R1}$, $\Phi_{R2}$).

With reference to FIGS. 11A and 11B, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The cutting edge 22 may be non-linear, curved or arcuate (as seen in, e.g., FIGS. 12A and 12B); although the cutting edge 22 may be non-linear, curved or arcuate, the cutting edge 22 may be defined to include other configurations, such as, for example, a linear, non-curved or non-arcuate shape. The back-relief angle $\theta_{12}$ is configured to refract the laser beam refracted segment $L_1$ at the laser beam entrance face 12 according to Snell's law. The acute back-relief angle $\theta_{12}$ of FIG. 11A (that is less than the acute back-relief angle $\theta_{12}$ of FIG. 11B) results in the laser beam refracted segment $L_1$ being refracted in a direction toward the flank side face 20; however, as seen at FIG. 11B, the acute back-relief angle $\theta_{12}$ (that is greater than the acute back-relief angle $\theta_{12}$ of FIG. 11A) results in the laser beam refracted segment $L_1$ being refracted in a direction toward a secondary clearance face 34. Furthermore, in some instances, the flank face 16 of the laser-transmitting machining tool 10*f* of FIG. 11A is proportionally less than the flank face 16 of the laser-transmitting machining tool 10*f* of FIG. 11B. Yet even further, in other examples the secondary clearance face 34 of the laser-transmitting machining tool 10$f$ of FIG. 11A is greater than the secondary clearance face 34 of the laser-transmitting machining tool 10$f$ of FIG. 11B. Accordingly, as seen at FIGS. 11A and 11B (and being similarly application to any of the laser-transmitting machining tools 10$a$-10$o$ of the present disclosure), one or a combination of the orientation of the back-relief angle $\theta_{12}$ and relative dimensions or lengths of any of the plurality of surfaces or faces 12-20 may change how the laser beam L travels through the laser-transmitting machining tool 10$f$.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. $5D_C$ and $5E_C$). In other examples, the laser beam entrance segment $L_{E1}$ may be defined by a diverging laser beam (as seen in, e.g., FIGS. $5D_D$ and $5E_D$).

The laser-transmitting machining tools 10$f$ further include the secondary clearance face 34 extending between and connecting the flank face 16 to the flank side face 20. In some examples, a first end $34_1$ of the secondary clearance face 34 extends away from the second end $20_2$ of the flank side face 20, and a second end $34_2$ of the secondary clearance face 34 extends away from the first end $16_1$ of the flank face 16. In some instances, the laser-transmitting machining tool 10$f$ may be utilized for machining a workpiece W (see, e.g., any of FIGS. 29, and 30A-30E).

The first end $16_1$ of the flank face 16 extends away from the second end $34_2$ of the secondary clearance face 34 to define a flank angle or clearance angle $\theta_{16}$. The flank angle or clearance angle $\theta_{16}$ is obtuse.

The secondary clearance face 34 may extend away from the flank side face 20 at a secondary clearance angle $\theta_{34}$. In some instances, the secondary clearance angle $\theta_{34}$ is obtuse. The secondary clearance face angle $\theta_{34}$ may be between 120° and 180°. In some implementations, the obtuse secondary clearance angle $\theta_{34}$ is approximately equal to 150°.

As seen at FIGS. 11A and 11B, the laser beam entrance face 12 receives the laser beam entrance segment $L_{E1}$ at a height $H_i$ above the flank side face 20; the height $H_i$ is a portion of a tool height $H_t$ extending between the flank side face 20 and the rake side face 18. With reference to FIG. 11A, the laser beam entrance face 12 refracts the laser beam entrance segment $L_{E1}$ to define the laser beam refracted segment $L_1$ that is directed toward and received by the flank side face 20. As a result of the acute back-relief angle $\theta_{12}$ of the laser-transmitting machining tool 10$f$ of FIG. 11B being greater than the acute back-relief angle $\theta_{12}$ of the laser-transmitting machining tool 10$f$ at FIG. 11A as described above, the laser beam entrance face 12 of the laser-transmitting machining tool 10$f$ of FIG. 11B refracts the laser beam entrance segment $L_{E1}$ to define the laser beam refracted segment $L_1$ that is directed toward and received by the secondary clearance face 34.

With reference to FIG. 11A, the flank side face 20 receives the laser beam refracted segment $L_1$ at an incident mirror angle $\theta_{m-i}$ relative to the flank side face 20 (that is referenced from a reference line $\theta_m$ extending perpendicularly away from the flank side face 20). The flank side face 20 reflects the laser beam refracted segment $L_1$ to define the laser beam reflected segment $L_2$. The laser beam reflected segment $L_2$ extends away from the flank side face 20 at a reflected mirror angle $\theta_{m-r}$ (that is also referenced from the reference line $\theta_m$ extending perpendicularly away from the flank side face 20). The reflected mirror angle $\theta_{m-r}$ is equal to the incident mirror angle $\theta_{m-i}$. As seen at FIG. 11B, the secondary clearance face 34 receives the laser beam refracted segment $L_1$ at an incident mirror angle $\theta_{m-i}$ (that is referenced from a reference line $\theta_m$ extending perpendicularly away from the secondary clearance face 34). The secondary clearance face 34 reflects the laser beam refracted segment $L_1$ to define the laser beam reflected segment $L_2$. The laser beam reflected segment $L_2$ extends away from the secondary clearance face 34 at a reflected mirror angle $\theta_{m-r}$ (that is also referenced from the reference line $\theta_m$ extending perpendicularly away from the secondary clearance face 34). The reflected mirror angle $\theta_{m-r}$ is equal to the incident mirror angle $\theta_{m-i}$.

As seen at both of FIGS. 11A and 11B, the laser beam reflected segment $L_2$ is then directed toward and received by one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment L to refract onto the workpiece W); and (3) the flank face 16 near the cutting edge 22 (causing, e.g., the laser beam exit segment $L_{E2}$ to refract onto the workpiece W); according to an exemplary configuration of the laser-transmitting machining tools 10$f$ seen at FIGS. 11A and 11B, the laser beam reflected segment $L_2$ is then directed toward and received by the second end $14_2$ of rake face 14 near the cutting edge 22. Thereafter, the laser beam reflected segment $L_2$ exits the laser-transmitting machining tools 10$f$ and defines the laser beam exit segment $L_{E2}$ of the laser beam L. The laser beam exit segment $L_{E2}$ may be refracted into the workpiece W. In some instances, the laser-transmitting machining tool 10$f$ is used for machining a deeply concave workpiece W, such as a workpiece W having features with a small radius of curvature (ROC) and small clear aperture (CA).

The laser beam exit segment $L_{E2}$ exits the laser-transmitting machining tools 10$f$ of FIGS. 11A and 11B at a height $H_e$ above the flank side face 20. In some examples, the flank side face 20 receives the laser beam reflected segment $L_2$ at an angle less than a critical angle $\theta_C$, as defined in Equation 3, when the following relationship is satisfied:

$$\mathrm{abs}(\theta_m - \theta_{34} - \theta_{16} + 360°) < \theta_C,\ \theta_m > \theta_C \tag{46}$$

Although the flank side face 20 is shown reflecting the laser beam reflected segment $L_2$ toward the rake face 14 at FIG. 11A, in other examples, the flank side face 20 may reflect the laser beam reflected segment $L_2$ toward the flank face 16, causing the flank face 16 to refract the laser beam reflected segment $L_2$ into the workpiece W. The flank side face 20 may reflect the laser beam reflected segment $L_2$ toward other faces of the laser-transmitting machining tool 10$f$ as well. The tool length l of the laser-transmitting machining tool 10$f$ may be dictated by the following equation:

$$l = (H_t - H_e) * \tan(\theta_m) + (H_t - H_i) * \tan(\theta_{12} - 90°) \tag{47}$$

Referring to FIGS. 11A-12A and 11B-12B, the laser beam entrance face 12 may be defined by a substantially linear, flat or planar as the laser beam entrance face 12 that extends between the first end $12_1$ of the laser-beam entrance face 12 and the second end $12_2$ of the laser-beam entrance face 12. Although the laser beam entrance face 12 is defined by a substantially linear, flat or planar as the laser beam entrance face 12 that is substantially similar to the substantially linear, flat or planar as the laser beam entrance faces 12 of the laser-transmitting machining tools 10*a*, 10*b*, 10*c*, and 10*d* of, respectively, FIGS. 2A, 4A, 6A, and 8A, any of the other configurations described above (e.g., an inwardly-projecting axial cylindrical configuration, an outwardly-projecting axial cylindrical configuration, an inwardly-projecting lateral cylindrical configuration, an outwardly-projecting lateral cylindrical configuration, an inwardly-projecting spherical configuration, an outwardly-projecting spherical configuration, or one or more diffractive so surface portions) at FIGS. 2B-2H, 4B-4H, 6B-6H, and 8B-8H may define the laser beam entrance faces 12 of the laser-transmitting machining tools 10*f*. Similarly, one or more surfaces of the plurality of surfaces 12-20 of the laser-transmitting machining tool 10*f* may be partially or wholly coated with a reflection-enhancing coating 36 as similarly described above at FIGS. 2I, 4I, 6I, and 8I.

Referring now to FIGS. 13 and 14, an exemplary laser-transmitting machining tool is shown generally at 10*g*. The medium of the laser-transmitting machining tool 10*g* may include any desirable material such as, for example any type of single or poly crystal transmissive media including but not limited to: diamonds, sapphires, moissanites; chrysoberyls; alexandrite; and the like. In other configurations, exemplary materials defining the medium of the laser-transmitting machining tool 10*g* may include but are not limited to other transmissive media such as, for example, carbides, cubic boron nitride (CBN); silicon; nitrides; steels; alloys; ceramics; alumina; glass; glass composites; composites; and the like.

Referring to FIGS. 13 and 14, the exemplary laser-transmitting machining tool 10*g* is also defined a plurality of sidewall surfaces or faces 21*a*-21*d* The plurality of sidewall surfaces or faces 21*a*-21*d* includes a first upstream sidewall surface or face 21*a* (see, e.g., FIGS. 13 and 14), a first downstream sidewall surface or face 21*b* (see, e.g., FIGS. 13 and 14), a second upstream sidewall surface or face 21*c* (see, e.g., FIG. 14), and a second downstream sidewall surface or face 21*d* (see, e.g., FIG. 14). Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and the flank face or clearance face 16. The first upstream surface or face 21*a* meets the first downstream sidewall surface or face 21*b* at a first side edge 23*a* (see, e.g., FIGS. 13 and 14) that is arranged at an angle $\theta_{23}$ (see, e.g., FIG. 13) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*g* to the second side 30 (i.e., one or both of the flank face 16 and the second side face 20) of the laser-transmitting machining tool 10*g*. The second upstream sidewall surface or face 21*c* meets the second downstream sidewall surface or face 21*d* at a second side edge 23*b* (see, e.g., FIG. 14) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*g* to the second side 30 (i.e., one or both of the flank face 16 and the second side face 20) of the laser-transmitting machining tool 10*g*.

The exemplary laser-transmitting machining tool 10*g* is defined by a substantially similar structural configuration with respect to the transmitting machining tools 10 and 10*a*-10*d* of FIGS. 1A-8I and 27 described above and includes: the plurality of surfaces or faces 12-20; the first end $\mathbf{12}_1$-$\mathbf{20}_1$ of each respective surface 12-20; and the second end $\mathbf{12}_2$-$\mathbf{20}_2$ of each respective surface 12-20. Furthermore, the first end $\mathbf{14}_1$ of the rake face 14 extends away from the second end $\mathbf{18}_2$ of the rake side face 18 at a negative rake angle $\theta_{14}$; accordingly, the rake face 14 may be referred to as a negative rake face. In some instances, the rake angle $\theta_{14}$ may range between approximately 155° and an amount less than 180°

In some examples, the second end $\mathbf{12}_2$ of the laser-beam entrance face 12 extends away from the first end $\mathbf{20}_1$ of the second side face 20 at a back-relief angle $\theta_{12}$. As seen at FIG. 13, the back-relief angle $\theta_{12}$ is right angle (i.e., equal to 90°).

As seen at FIG. 13, the laser beam L that enters and then exits the laser-transmitting machining tool 10*g* is shown being defined by a plurality of segments $L_{E1}$, $L_1$, $L_2$, $L_{E2}$. The plurality of segments $L_{E1}$, $L_1$, $L_2$, $L_{E2}$ include a laser beam entrance segment $L_{E1}$, a laser beam segment $L_1$, laser beam reflected segment $L_2$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIG. 13, the laser beam entrance face 12 is configured to receive the collimated laser beam entrance segment $L_{E1}$ such that the laser beam segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The cutting edge 22 may be non-linear, curved or arcuate (as seen in, e.g., FIG. 14); although the cutting edge 22 may be non-linear, curved or arcuate, the cutting edge 22 may be defined to include other configurations, such as, for example, a linear, non-curved or non-arcuate shape. The back-relief angle $\theta_{12}$ is configured to receive the laser beam segment $L_1$ at the laser beam entrance face 12 according to Snell's law. The perpendicular or right back-relief angle θ, results in the laser-transmitting machining tool 10*g* not refracting the laser beam entrance segment $L_{E1}$; rather, the laser beam entrance face 12 of the laser-transmitting machining tool 10*g* permits the laser beam entrance segment $L_{E1}$ to pass into the body of the transmitting machining tool 10*g* for defining the laser beam segment $L_1$.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

The laser-transmitting machining tool 10*g* further includes a secondary clearance face 34 extending between and connecting the flank face 16 to the flank side face 20. In some examples, a first end $\mathbf{34}_1$ of the secondary clearance face 34 extends away from the second end $\mathbf{20}_2$ of the flank side face 20, and a second end $\mathbf{34}_2$ of the secondary clearance face 34 extends away from the first end $\mathbf{16}_1$ of the flank face 16. In some instances, the laser-transmitting machining tool 10*g* may be utilized for machining a workpiece W (see, e.g., any of FIGS. 29, and 30A-30E).

The first end $\mathbf{16}_1$ of the flank face 16 extends away from the second end $\mathbf{34}_2$ of the secondary clearance face 34 to define a flank angle or clearance angle $\theta_{16}$. The flank angle or clearance angle $\theta_{16}$ is obtuse.

The secondary clearance face 34 may extend away from the flank side face 20 at a secondary clearance angle $\theta_{34}$. In some instances, the secondary clearance angle $\theta_{34}$ is obtuse. The secondary clearance face angle $\theta_{34}$ may be between 120° and 180°. In some implementations, the obtuse secondary clearance angle $\theta_{34}$ is approximately equal to 150°.

As seen at FIG. 13, the laser beam entrance face 12 receives the laser beam entrance segment $L_{E1}$ at a height $H_i$ above the flank side face 20; the height $H_i$ is a portion of a tool height $H_t$ extending between the flank side face 20 and the rake side face 18. The laser beam entrance face 12 receives the laser beam entrance segment $L_{E1}$ to define the laser beam segment $L_1$ that is directed that is not toward either of the rake side face 18 and the flank side face 20; accordingly, the laser beam segment $L_1$ may be directed toward and may be received by one of: the rake face 14; the flank face 16; or the secondary clearance face 34. In some instances, the laser beam segment $L_1$ may be directed directly to the cutting edge 22. Any of the rake face 14, the flank face 16, the secondary clearance face 34 reflects the laser beam segment $L_1$ to define the laser beam reflected segment $L_2$; the laser beam reflected segment $L_2$ may then be directed toward and received by one or more of: (1) the negative rake face 14 near the cutting edge 22 (causing, e.g., the laser beam exit segment. $L_{E2}$ to refract onto the workpiece W); (2) the flank face 16 near the cutting edge 22 (causing, e.g., the laser beam exit segment $L_{E2}$ to refract onto the workpiece W); and (3) the secondary clearance face 34 (causing. e.g., the laser beam exit segment $L_{E2}$ to refract onto the workpiece W). In some instances, the laser-transmitting machining tool 10*g* is used for machining a deeply concave workpiece W, such as a workpiece W having features with a small radius of curvature (ROC) and small clear aperture (CA).

In an example, the laser beam entrance face 12 receives the laser beam entrance segment $L_{E1}$. The secondary clearance face 34 receives the laser beam segment $L_1$ at an incident mirror angle $\theta_{m-i}$ (that is referenced from a reference line $\theta_m$ extending perpendicularly away from the secondary clearance face 34). The secondary clearance face 34 reflects the laser beam segment $L_1$ to define the laser beam reflected segment $L_2$. The laser beam reflected segment $L_2$ extends away from the secondary clearance face 34 at a reflected mirror angle $\theta_{m-r}$ (that is also referenced from the reference line $\theta_m$ extending perpendicularly away from the secondary clearance face 34). The reflected mirror angle $\theta_{m-r}$ is equal to the incident mirror angle $\theta_{m-i}$.

The laser beam reflected segment $L_2$ is then directed toward the and received by one of: the rake face 14, the flank face 16; and the cutting edge 22; according to an exemplary configuration of the laser-transmitting machining tool 10*g* seen at FIG. 13, the laser beam reflected segment $L_2$ is then refracted or directed toward and received near the cutting edge 22. Thereafter, the laser beam reflected segment $L_2$ exits the laser-transmitting machining tool 10*g* and defines the laser beam exit segment $L_{E2}$ of the laser beam L. The laser beam exit segment $L_{E2}$ may be refracted toward the workpiece W.

Referring to FIGS. 13 and 14, the laser beam entrance face 12 may be defined by a substantially linear, flat or planar as the laser beam entrance face 12 that extends between the first end $\mathbf{12}_1$ of the laser-beam entrance face 12 and the second end $\mathbf{12}_2$ of the laser-beam entrance face 12. Although the laser beam entrance face 12 is defined by a substantially linear, flat or planar as the laser beam entrance face 12 that is substantially similar to the substantially linear, flat or planar as the laser beam entrance faces 12 of the laser-transmitting machining tools 10*a*, 10*b*, 10*c*, and 10*d* of, respectively. FIGS. 2A, 4A, 6A, and 8A, any of the other configurations described above (e.g. an inwardly-projecting axial cylindrical configuration, an outwardly-projecting axial cylindrical configuration, an inwardly-projecting lateral cylindrical configuration, an outwardly-projecting lateral cylindrical configuration, an inwardly-projecting spherical configuration, an outwardly-projecting spherical configuration, or one or more diffractive surface portions) at FIGS. 2B-2H, 4B-4H, 6B-6H, and 8B-8H may define the laser beam entrance faces 12 of the laser-transmitting machining tools 10*g*. Similarly, one or more surfaces of the plurality of surfaces 12-20 of the laser-transmitting machining tool 10*g* may be partially or wholly coated with a reflection-enhancing coating 36 as similarly described above at FIGS. 2I, 4I, 6I, and 8I.

Referring now to FIGS. 15 and 16, an exemplary laser-transmitting machining tool is shown generally at 10*h*. The medium of the laser-transmitting machining tool 10*h* may include any desirable material such as, for example any type of single or poly crystal transmissive media including but not limited to: diamonds, sapphires, moissanites; chrysoberyls; alexandrite; and the like. In other configurations, exemplary materials defining the medium of the laser-transmitting machining tool 10*h* may include but are not limited to other transmissive media such as, for example: carbides, cubic boron nitride (CBN); silicon; nitrides; steels; alloys; ceramics; alumina; glass; glass composites; composites; and the like.

Referring to FIGS. 15 and 16, the exemplary laser-transmitting machining tool 10*h* is also defined a plurality of sidewall surfaces or faces 21*a*-21*b*. The plurality of sidewall surfaces or faces 21*a*-21*b* includes a first sidewall surface or face 21*a* (see, e.g., FIGS. 15 and 16) and a second sidewall surface or face 21*b* (see, e.g., FIG. 16). Each of the first sidewall surface or face 21*a* and the second sidewall surface or face 21*b* extends from: the laser-beam entrance face 12; the rake face 14; the flank face or clearance face 16; the flank side face 20; and the secondary clearance face 34.

The exemplary laser-transmitting machining tool 10*h* is defined by a substantially similar structural configuration with respect to the transmitting machining tools 10 and 10*a*-10*d* of FIGS. 1A-8I and 27 described above and includes: the plurality of surfaces or faces 12-16 and 20 with the exception of a rake side face 18 (i.e., the rake face 14 of the laser-transmitting machining tool 10*h* extends from and directly connects the laser beam entrance face 12 to the flank face 16). Furthermore, the first end $\mathbf{14}_1$ of the rake face 14 extends away from the second end $\mathbf{12}_2$ of the laser beam entrance face 12, and, the second end $\mathbf{14}_2$ of the rake face 14 extends away from the second end $\mathbf{16}_2$ of the flank face 16 at a rake angle $\theta_{14}$. Unlike the exemplary laser-transmitting machining tools 10 and 10*a*-10*g* described above, the laser-transmitting machining tool 10*h* does not define a rake angle $\theta_{14}$ that is a negative or obtuse. As seen at FIG. 15, the second end $14_2$ of the rake face 14 extends away from the second end $16_2$ of the flank face 16 at a positive or acute rake angle $\theta_{14}$; accordingly, the rake face 14 may be referred to as a positive rake face. In some instances, the positive rake angle $\theta_{14}$ may range between approximately 70° and an amount less than 90°.

In some examples, the second end $12_2$ of the laser-beam entrance face 12 extends away from the first end $20_1$ of the second side face 20 at a back-relief angle $\theta_{12}$. As seen at FIG. 15, the back-relief angle $\theta_{12}$ is right angle (i.e., equal to 90°).

As seen at FIG. 15, the laser beam L that enters and then exits the laser-transmitting machining tool 10*h* is shown being defined by a plurality of segments $L_{E1}$, $L_1$, $L_2$, $L_{E2}$. The plurality of segments $L_{E1}$, $L_1$, $L_2$, $L_{E2}$ include a laser beam entrance segment $L_{E1}$, a laser beam segment $L_1$, laser beam reflected segment $L_2$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIG. 15, the laser beam entrance face 12 is configured to receive the collimated laser beam entrance segment $L_{E1}$ such that the laser beam segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The cutting edge 22 may be non-linear, curved or arcuate (as seen in, e.g., FIG. 16); although the cutting edge 22 may be non-linear, curved or arcuate, the cutting edge 22 may be defined to include other configurations, such as, for example, a linear, non-curved or non-arcuate shape. The back-relief angle $\theta_{12}$ is configured to receive the laser beam segment $L_1$ at the laser beam entrance face 12 according to Snell's law. The perpendicular or right back-relief angle $\theta_{12}$ results in the laser-transmitting machining tool 10*h* not refracting the laser beam entrance segment $L_{E1}$; rather, the laser beam entrance face 12 of the laser-transmitting machining tool 10*h* permits the laser beam entrance segment $L_{E1}$ to pass into the body of the transmitting machining tool 10*h* for defining the laser beam segment $L_1$.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

The laser-transmitting machining tool 10*h* further includes a secondary clearance face 34 extending between and connecting the flank face 16 to the flank side face 20. In some examples, a first end $34_1$ of the secondary clearance face 34 extends away from the second end $20_2$ of the flank side face 20, and a second end $34_2$ of the secondary clearance face 34 extends away from the first end $16_1$ of the flank face 16. In some instances, the laser-transmitting machining tool 10*h* may be utilized for machining a workpiece W (see, e.g., any of FIGS. 29, and 30A-30E).

The first end $16_1$ of the flank face 16 extends away from the second end $34_2$ of the secondary clearance face 34 to define a flank angle or clearance angle $\theta_{16}$. The flank angle or clearance angle $\theta_{16}$ is obtuse.

The secondary clearance face 34 may extend away from the flank side face 20 at a secondary clearance angle $\theta_{34}$. In some instances, the secondary clearance angle $\theta_{34}$ is obtuse. The secondary clearance face angle $\theta_{34}$ may be between 120° and 180°. In some implementations, the obtuse secondary clearance angle $\theta_{34}$ is approximately equal to 140°.

In an example, the laser beam entrance face 12 receives the laser beam entrance segment $L_{E1}$. The laser beam entrance face 12 of the laser-transmitting machining tool 10*h* does not refract the laser beam entrance segment $L_{E1}$; rather, the laser beam entrance face 12 of the laser-transmitting machining tool 10*h* permits the laser beam entrance segment $L_{E1}$ to pass into the body of the transmitting machining tool 10*h*, defining the laser beam segment $L_1$ that is directed toward and received by the secondary clearance face 34.

The secondary clearance face 34 receives the laser beam segment $L_1$ at an incident mirror angle $\theta_{m-i}$ (that is referenced from a reference line $\theta_m$ extending perpendicularly away from the secondary clearance face 34). The secondary clearance face 34 reflects the laser beam segment $L_1$ to define the laser beam reflected segment $L_2$. The laser beam reflected segment $L_2$ extends away from the secondary clearance face 34 at a reflected mirror angle $\theta_{m-i}$ (that is also referenced from the reference line $\theta_m$ extending perpendicularly away from the secondary clearance face 34). The reflected mirror angle $\theta_{m-r}$ is equal to the incident mirror angle $\theta_{m-i}$.

The laser beam reflected segment $L_2$ is then directed toward the and received by (1) the cutting edge 22 (causing. e.g., the laser beam exit segment $L_{E2}$ to refract onto the workpiece W); (2) the negative rake face 14 near the cutting edge 22 (causing. e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W); according to an exemplary configuration of the laser-transmitting machining tool 10*h* seen at FIG. 15, the laser beam reflected segment $L_2$ is then refracted or directed toward and received near the cutting edge 22. Thereafter, the laser beam reflected segment $L_2$ exits the laser-transmitting machining tool 10*h* and defines the laser beam exit segment $L_{E2}$ of the laser beam L. The laser beam exit segment $L_{E2}$ may be refracted toward the workpiece W.

Referring to FIGS. 15 and 16, the laser beam entrance face 12 may be defined by a substantially linear, flat or planar as the laser beam entrance face 12 that extends between the first end $12_1$ of the laser-beam entrance face 12 and the second end $12_2$ of the laser-beam entrance face 12. Although the laser beam entrance face 12 is defined by a substantially linear, flat or planar as the laser beam entrance face 12 that is substantially similar to the substantially linear, flat or planar as the laser beam entrance faces 12 of the laser-transmitting machining tools 10*a*, 10*b*, 10*c*, and 10*d* of, respectively, FIGS. 2A, 4A, 6A, and 8A, any of the other configurations described above (e.g., an inwardly-projecting axial cylindrical configuration, an outwardly-projecting axial cylindrical configuration, an inwardly-projecting lateral cylindrical configuration, an outwardly-projecting lateral cylindrical configuration, an inwardly-projecting spherical configuration, an outwardly-projecting spherical configuration, or one or more diffractive surface portions) at FIGS. 2B-2H, 4B-4H, 6B-6H, and 8B-8H may define the laser beam entrance faces 12 of the law-transmitting machining tools 10*h*. Similarly, one or more surfaces of the plurality of surfaces 12-20 of the laser-transmitting machining tool 10*h* may be partially or wholly coated with a reflection-enhancing coating 36 as similarly described above at FIGS. 2I, 4I, 6I, and 8I.

Referring now to FIGS. 17, 17', and 18, an exemplary laser-transmitting machining tool is shown generally at 10*i*. The medium of the laser-transmitting machining tool 10*i* may include any desirable material such as, for example any type of single or poly crystal transmissive media including but not limited to: diamonds; sapphires, moissanites; chrysoberyls; alexandrite; and the like. In other configurations, exemplary materials defining the medium of the laser-transmitting machining tool 10*i* may include but are not limited to other transmissive media such as, for example: carbides; cubic boron nitride (CBN); silicon, nitrides, steels; alloys; ceramics, alumina; glass; glass composites; composites; and the like.

Referring to FIG. 17, the exemplary laser-transmitting machining tool 10*i* is defined by a substantially similar structural configuration with respect to the transmitting machining tools 10 and 10*a*-10*d* of FIGS. 1A-8I and 27 described above and includes the plurality of surfaces or faces 12-20. The laser-transmitting machining tool 10*i* also includes the non-linear, curved or arcuate cutting edge 22; although the cutting edge 22 may be non-linear, curved or arcuate, the cutting edge 22 may be defined to include other configurations, such as, for example, a linear, non-curved or non-arcuate shape. In some instances, the laser-transmitting machining tool 10*i* may be utilized for machining a workpiece W (see. e.g., any of FIGS. 29, and 30A-30E). The laser-transmitting machining tool 10*i* defines a rake angle $\theta_{14}$ that is a negative or obtuse. The first end 16$_1$ of the flank face 16 extends away from the second end 20$_2$ of the flank side face 20 to define a flank angle or clearance angle $\theta_{16}$. The flank angle or clearance angle $\theta_{16}$ is obtuse.

In some examples, the second end 12$_2$ of the laser-beam entrance face 12 extends away from the first end 20$_1$ of the flank side face 20 at a back-relief angle $\theta_{12}$. In some examples, the back-relief angle $\theta_{12}$ is a right angle (i.e., equal to 90°). Although the back-relief angle $\theta_{12}$ may be a right angle, the back-relief angle $\theta_{12}$ may be obtuse (i.e., greater than 90°) or are acute (i.e., less than 90°) in a substantially similar manner as described above at, for example, FIGS. 1A-4I with respect to the laser-transmitting machining tools 10*a* and 10*b*.

Referring to FIGS. 17 and 18, the exemplary laser-transmitting machining tool 10*i* is also defined a plurality of sidewall surfaces or faces 21*a*-21*d*. The plurality of sidewall surfaces or faces 21*a*-21*d* includes a first upstream sidewall surface or face 21*a* (see, e.g., FIGS. 17 and 18), a first downstream sidewall surface or face 21*b* (see, e.g., FIGS. 17 and 18), a second upstream sidewall surface or face 21*c* (see, e.g., FIG. 18), and a second downstream sidewall surface or face 21*d* (see, e.g., FIG. 18).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* (see, e.g., FIGS. 17 and 18) that is arranged at an angle $\theta_{23}$ (see, e.g., FIG. 17) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*i* to the second side 30 (i.e., one or both of the flank face 16 and the second side face 20) of the laser-transmitting machining tool 10*i*.

The second upstream sidewall surface or face 21*c* meets the second downstream sidewall surface or face 21*d* at a second side edge 23*b* (see. e.g., FIG. 18) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*i* to the second side 30 (i.e., one or both of the flank face 16 and the second side face 20) of the laser-transmitting machining tool 10*i*.

As seen at FIG. 17, the laser beam L that enters and then exits the laser-transmitting machining tools 10*i* is shown being defined by a plurality of segments $L_{E1}$, $L_1$, $L_2$, $L_{E2}$. The plurality of segments $L_{E1}$, $L_1$, $L_{E2}$ include a laser beam entrance segment $L_{E1}$, a laser beam refracted segment $L_1$, a laser beam reflected segment $L_2$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$)

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

As seen at FIGS. 17, 17' and 18, the laser beam entrance face 12 may be defined by a recessed, inverted or inwardly-projecting wedge shape including a first substantially linear, flat or planar laser beam entrance face segment 12*a* and a second substantially linear, flat or planar laser beam entrance face segment 12*b* both extending between the first end 12$_1$ of the laser-beam entrance face 12 (from the rake side face 18) and the second end 12$_2$ of the laser-beam entrance face 12 (from the flank side face 20). The first substantially linear, flat or planar laser beam entrance face segment 12*a* also extends from the first upstream sidewall surface or face 21*a*. The second substantially linear, flat or planar laser beam entrance face segment 12*b* also extends from the second upstream sidewall surface or face 21*c*. The first substantially linear, flat or planar laser beam entrance face segment 12*a* and the second substantially linear, flat or planar laser beam entrance face segment 12*b* meet at an entrance face edge 12*c*.

With continued reference to FIG. 18, a plane $P_{12}$ extends across the laser-transmitting machining tool 10*i* proximate the laser beam entrance face 12. In an example, the plane $P_{12}$ extends across an edge where: (1) the first substantially linear, flat or planar laser beam entrance face segment 12*a* extends from the first upstream sidewall surface or face 21*a*; and (2) the second substantially linear, flat or planar laser beam entrance face segment 12*b* extends from the second upstream sidewall surface or face 21*c*. Furthermore, the plane $P_{12}$ is substantially perpendicular with respect to both of the first upstream sidewall surface or face 21*a* and the second upstream sidewall surface or face 21*c*.

In some instances, each of the first substantially linear, flat or planar laser beam entrance face segment 12*a* and the second substantially linear, flat or planar laser beam entrance face segment 12*b* are arranged at an inwardly-projecting angle $\theta_W$ that defines the recessed, inverted or inwardly-projecting wedge shape of the laser beam entrance face 12 of the laser-transmitting machining tool 10*i*. In some instances, the inwardly-projecting angle $\theta_W$ is acute (i.e., less than 90°) and projects in a direction toward the arcuate or curved cutting edge 22: in some implementations, the inwardly-projecting angle $\theta_W$ is approximately equal to 20°. Both of the first substantially linear, flat or planar laser beam entrance face segment 12*a* and the second substantially linear, flat or planar laser beam entrance face segment 12*b* are configured to refract the laser beam L at the laser beam entrance face 12 according to Snell's law.

As seen at FIG. 18, in some instances, the recessed, inverted or inwardly-projecting wedge shape of the laser beam entrance face 12 of the laser-transmitting machining tool 10*i* receives the laser beam entrance segment $L_{E1}$ of the laser beam L and thereafter causes the laser beam refracted segment $L_1$ of the laser beam L to become divergent after the laser beam L enters the body of the laser-transmitting machining tool 10*i*. As can readily be seen in FIG. 18, the laser beam L is refracted by the entrance face 12 according to Snell's law, the refracted laser beam assuming an angle $\theta_R$ relative to a line R normal to the entrance face 12. $\theta_R$ may be expressed by the following equation:

$$\theta_R = \sin^{-1}\left(\frac{\sin\theta_W}{n_2}\right) \tag{48}$$

In some examples, the recessed, inverted or inwardly-projecting wedge shape of the laser beam entrance face 12 of the laser-transmitting machining tool 10*i* receives the laser beam entrance segment $L_{E1}$ of the laser beam L and thereafter causes the laser beam refracted segment $L_1$ of the laser beam L to become divergent after the laser beam L enters the body of the laser-transmitting machining tool 10*i*. The laser beam refracted segment $L_1$ of the laser beam L thereafter may be incident upon one or both of the first downstream sidewall surface or face 21*b* and the second downstream sidewall surface or face 21*d* near the arcuate or curved cutting edge 22 for defining the laser beam reflected segment $L_2$. Thereafter, laser beam reflected segment $L_2$, of the laser beam L is reflected off one or both of the first downstream sidewall surface or face 21*b* and the second downstream sidewall surface or face 21*d* and converges at a focal point $F_P$ upstream of the arcuate or curved cutting edge 22. Thereafter, the laser beam reflected segment $L_2$, of the laser beam L is refracted off the arcuate or curved cutting edge 22 to define the laser beam exit segment $L_{E2}$ that may be refracted toward the workpiece W. The angle of convergence $\theta_S$ of the reflected laser beam may be expressed by the following equation:

$$\theta_S = 180° - 2(\theta_W - \theta_R) \tag{49}$$

Referring now to FIGS. 19, 19', and 20, an exemplary laser-transmitting machining tool is shown generally at 10*j*. The medium of the laser-transmitting machining tool 10*j* may include any desirable material such as, for example any type of single or poly crystal transmissive media including but not limited to: diamonds; so sapphires; moissanites, chrysoberyls, alexandrite; and the like. In other configurations, exemplary materials defining the medium of the laser-transmitting machining tool 10*j* may include but are not limited to other transmissive media such as, for example: carbides; cubic boron nitride (CBN); silicon; nitrides; steels, alloys, ceramics; alumina, glass; glass composites; composites; and the like.

Referring to FIG. 19, the exemplary laser-transmitting machining tool 10*j* is defined by a substantially similar structural configuration with respect to the transmitting machining tools 10 and 10*a*-10*d* of FIGS. 1A-8I and 27 described above and includes the plurality of surfaces or faces 12-20. The laser-transmitting machining tool 10*j* also includes the non-linear, curved or arcuate cutting edge 22; although the cutting edge 22 may be non-linear, curved or arcuate, the cutting edge 22 may be defined to include other configurations, such as, for example, a linear, non-curved or non-arcuate shape. In some instances, the laser-transmitting machining tool 10*j* may be utilized for machining a workpiece W (see, e.g., any of FIGS. 29, and 30A-30E). The laser-transmitting machining tool 10*j* defines a rake angle $\theta_{14}$ that is a negative or obtuse. The first end $\mathbf{16}_1$ of the flank face 16 extends away from the second end $\mathbf{20}_2$ of the flank side face 20 to define a flank angle or clearance angle $\theta_{16}$. The flank angle or clearance angle $\theta_{16}$ is obtuse.

In some examples, the second end $\mathbf{12}_2$ of the laser-beam entrance face 12 extends away from the first end $\mathbf{20}_1$ of the flank side face 20 at a back-relief angle $\theta_{12}$. In some examples, the back-relief angle $\theta_{12}$ is a right angle (i.e., equal to 90°). Although the back-relief angle $\theta_{12}$ may be a right angle, the back-relief angle $\theta_{12}$ may be obtuse (i.e., greater than 90°) or are acute (i.e., less than 90°) in a substantially similar manner as described above at, for example, FIGS. 1A-4I with respect to the laser-transmitting machining tools 10*a* and 10*b*.

Referring to FIGS. 19 and 20, the exemplary laser-transmitting machining tool 10*j* is also defined a plurality of sidewall surfaces or faces 21*a*-21*d*. The plurality of sidewall surfaces or faces 21*a*-21*d* includes a first upstream sidewall surface or face 21*a* (see, e.g., FIGS. 19 and 20), a first downstream sidewall surface or face 21*b* (see, e.g., FIGS. 19 and 20), a second upstream sidewall surface or face 21*c* (see, e.g., FIG. 20), and a second downstream sidewall surface or face 21*d* (see, e.g., FIG. 20).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* (see, e.g., FIGS. 19 and 20) that is arranged at an angle $\theta_{23}$ (see, e.g., FIG. 19) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*j* to the second side 30 (i.e., one or both of the flank face 16 and the second side face 20) of the laser-transmitting machining tool 10*j*.

The second upstream sidewall surface or face 21*c* meets the second downstream sidewall surface or face 21*d* at a second side edge 23*b* (see, e.g., FIG. 20) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*j* to the second side 30 (i.e., one or both of the flank face 16 and the second side face 20) of the laser-transmitting machining tool 10*j*.

As seen at FIG. 19, the laser beam L that enters and then exits the laser-transmitting machining tools 10*j* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$)

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

As seen at FIGS. 19' and 20, the laser beam entrance face 12 may be defined by a protruding or outwardly-projecting wedge shape including a first substantially linear, flat or planar laser beam entrance face segment 12*a* and a second substantially linear, flat or planar laser beam entrance face segment 12*b* both extending between the first end $\mathbf{12}_1$ of the laser-beam entrance face 12 (from the rake side face 18) and the second end $\mathbf{12}_2$ of the laser-beam entrance face 12 (from the flank side face 20). The first substantially linear, flat or planar laser beam entrance face segment 12*a* also extends from the first upstream sidewall surface or face 21*a*. The second substantially linear, flat or planar laser beam entrance face segment 12*b* also extends from the second upstream sidewall surface or face 21*c*. The first substantially linear, flat or planar laser beam entrance face segment 12*a* and the second substantially linear, flat or planar laser beam entrance face segment 12*b* meet at an entrance face edge 12*c*.

With continued reference to FIG. 20, a plane $P_{12}$ extends across the laser-transmitting machining tool 10*j* proximate the laser beam entrance face 12. In an example, the plane $P_{12}$ extends across an edge where: (1) the first substantially linear, flat or planar laser beam entrance face segment 12*a* extends from the first upstream sidewall surface or face 21*a*; and (2) the second substantially linear, flat or planar laser beam entrance face segment 12*b* extends from the second upstream sidewall surface or face 21*c*. Furthermore, the plane $P_{12}$ is substantially perpendicular with respect to both of the first upstream sidewall surface or face 21*a* and the second upstream sidewall surface or face 21*c*.

In some instances, each of the first substantially linear, flat or planar laser beam entrance face segment 12*a* and the second substantially linear, flat or planar laser beam entrance face segment 12*b* are arranged at an outwardly-projecting angle $\theta_W'$ that defines the protruding or outwardly-projecting wedge shape of the laser beam entrance face 12 of the laser-transmitting machining tool 10*j* In some instances, the outwardly-projecting angle $\theta_W'$ is acute (i.e., less than 90°) and projects in a direction away from the arcuate or curved cutting edge 22, in some implementations, the outwardly-projecting angle $\theta_W'$ is approximately equal to 20°. Both of the first substantially linear, flat or planar laser beam entrance face segment 12*a* and the second substantially linear, flat or planar laser beam entrance face segment 12*b* are configured to refract the laser beam L at the laser beam entrance face 12 according to Snell's law.

As seen at FIG. 20, in some instances, the protruding or outwardly-projecting wedge shape of the laser beam entrance face 12 of the laser-transmitting machining tool 10*j* receives the laser beam entrance segment $L_{E1}$ of the laser beam L and thereafter causes the laser beam refracted segment $L_1$ of the laser beam L to become convergent after the laser beam L enters the body of the laser-transmitting machining tool 10*j*. As can readily be seen in FIG. 20, the laser beam L is refracted by the entrance face 12 according to Snell's law, the refracted laser beam assuming an angle $\theta_R$ relative to a line R normal to the entrance face 12. $\theta_R$ may be expressed by the following equation:

$$\theta_R = \sin^{-1}\left(\frac{\sin\theta_W'}{n_2}\right) \tag{50}$$

Accordingly, the angle of convergence $\theta_S$ may be expressed as a function of $\theta_R$ and the obtuse back-relief angle $\theta_{12}$ by the following equation:

$$\theta_S = 2(\theta_W' - \theta_R) \tag{51}$$

The laser beam refracted segment $L_1$ of the laser beam L thereafter converges at a focal point $F_P$ upstream of an outward-most portion of the arcuate or curved cutting edge 22. Thereafter the laser beam refracted segment $L_1$ diverges from the focal point $F_P$ and may be incident upon the arcuate or curved cutting edge 22. Thereafter, the laser beam refracted segment $L_1$ of the laser beam L is refracted off the arcuate or curved cutting edge 22 to define the laser beam exit segment $L_{E2}$.

Referring now to FIG. 21, an exemplary laser-transmitting machining tool is shown generally at 10*k* The medium of the laser-transmitting machining tool 10*k* may include any desirable material such as, for example any type of single or poly crystal so transmissive media including but not limited to: diamonds; sapphires; moissanites; chrysoberyls; alexandrite; and the like. In other configurations, exemplary materials defining the medium of the laser-transmitting machining tool 10*k* may include but are not limited to other transmissive media such as, for example: carbides; cubic boron nitride (CBN); silicon; nitrides; steels; alloys; ceramics; alumina; glass; glass composites; composites, and the like.

The exemplary laser-transmitting machining tool 10*k* is defined by a substantially similar structural configuration with respect to the transmitting machining tools 10, 10*a*-10*d* of FIGS. 1A-8I and 30 described above and includes the plurality of surfaces or faces 12-20 and the cutting edge 22, which may be non-linear, curved or arcuate; although the cutting edge 22 may be non-linear, curved or arcuate, the cutting edge 22 may be defined to include other configurations, such as, for example, a linear, non-curved or non-arcuate shape. In some instances, the laser-transmitting machining tool 10*k* may be utilized for machining a workpiece W (see, e.g., any of FIGS. 29, and 30A-30E). Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end $\mathbf{16}_1$ of the flank face 16 extends away from the second end $20_2$ of the flank side face 20 at an obtuse flank angle or clearance angle $\theta_{16}$.

Referring to FIG. 21, the exemplary laser-transmitting machining tool 10*k* is also defined a plurality of sidewall surfaces or faces 21*a*-21*d*. The plurality of sidewall surfaces or faces 21*a*-21*d* includes a first upstream sidewall surface or face 21*a*, a first downstream sidewall surface or face 21*b*, a second upstream sidewall surface or face 2*c* (not shown/refer to, e.g., FIGS. 2A-2I above), and a second downstream sidewall surface or face 21*d* (not shown/refer to, e.g., FIGS. 2A-2I above).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* that is arranged at an angle $\theta_{23}$ that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*k* to the second side 30 (i.e., one or both of the flank face 16 and the second side face 20) of the laser-transmitting machining tool 10*k*.

The second upstream sidewall surface or face 21*c* meets the second downstream sidewall surface or face 21*d* at a second side edge 23*b* that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*k* to the second side 30 (i.e., one or both of the flank face 16 and the second side face 20) of the laser-transmitting machining tool 10*k*.

In some examples, the second end $12_2$ of the laser-beam entrance face 12 extends away from the first end $20_1$ of the flank side face 20 at a back-relief angle $\theta_{12}$. In some examples, the back-relief angle $\theta_{12}$ is a right angle (i.e., equal to 90°). The laser-beam entrance face 12 is configured to receive a laser beam L. The laser beam L may be further defined by a plurality of segments $L_{E1}$, $L_1$ (see. e.g., $L_{1a}$, $L_{1b}$), $L_2$, $L_{E2}$. The plurality of segments $L_{E1}$. $L_{E1}$, $L_1$ (see, e.g., $L_{1a}$, $L_{1b}$), $L_2$, $L_{E2}$ includes at least, for example, a laser beam entrance segment $L_{E1}$ and a laser beam exit segment $L_{E2}$.

As seen at FIG. 21, the laser beam L that enters and then exits the laser-transmitting machining tools 10*k* is shown being defined by a plurality of segments $L_{E1}$, $L_1$, $L_{E2}$. The plurality of segments $L_{E1}$, $L_1$, $L_{E2}$, include a laser beam entrance segment $L_{E1}$, a laser beam refracted segment $L_1$, a laser beam reflected segment $L_2$, and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIG. 21, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing. e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the laser beam entrance face 12 according to Snell's law.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

The laser beam entrance face 12 may be further defined by one or more diffractive surface portions $\mathbf{12}_D$. At least one of the one or more diffractive surface portions $\mathbf{12}_D$ of the laser beam entrance face 12 receives and diffracts the laser beam entrance segment $L_{E1}$ of the laser beam L, splitting the laser beam refracted segment $L_1$ into a least a first refracted laser beam portion $L_{1a}$ and a second refracted laser beam portion $L_{1b}$ each having intense maxima at specific angles. The first refracted laser beam portion $L_1$ and the second refracted laser beam portion $L_2$ may diffract at a diffraction angle $\theta_D$. In some examples, at least one of the one or more diffractive surface portions $\mathbf{12}_D$ of the laser beam entrance face 12 is configured to diffract. (1) the first refracted laser beam portion $L_{1a}$ of the laser beam refracted segment $L_1$ away from the flank side face 20; and (2) the second laser beam portion $L_{1b}$ of laser beam refracted segment $L_1$ toward the flank side face 20.

The first refracted laser beam portion $L_{1a}$ of the laser beam refracted segment $L_1$ may be directed toward one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The second laser beam portion $L_{1b}$ of laser beam refracted segment $L_1$ reflects off of the flank side face 20 for defining the laser beam reflected segment $L_2$. The second laser beam portion segment $L_{1b}$ of the laser beam refracted segment $L_1$ reflects off of the flanks side face 20 at an incident mirror angle $\theta_{m\text{-}i}$ (that is referenced from a reference line $\theta_m$ extending perpendicularly away from the flank side face 20). The second laser beam portion segment $L_{1b}$ of the laser beam refracted segment $L_1$ extends away from the flank side face 20 at a reflected mirror angle $\theta_{m\text{-}r}$ (that is also referenced from the reference line $\theta_m$ extending perpendicularly away from the flank side face 20). The reflected mirror angle $\theta_{m\text{-}r}$ is equal to the incident mirror angle $\theta_{m\text{-}i}$. The laser beam reflected segment $L_2$ may be directed toward one or more of: (1) the cutting edge 22 (causing. e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W).

The first refracted laser beam portion $L_{1a}$ of the laser beam refracted segment $L_1$ and the laser beam reflected segment $L_2$ exits the laser-transmitting machining tool 10*k* at the cutting edge 22 and defines the laser beam exit segment $L_{E2}$ of the laser beam L. The laser beam exit segment $L_{E2}$ may be refracted into the workpiece W.

In some examples, the negative rake angle $\theta_{14}$ and the flank angle $\theta_{16}$ are configured to cause the rake face 14 and the flank face 16 to respectively receive each of the first laser beam portion $L_1$ and the second laser beam portion $L_2$ of laser beam L at an angle less than the critical angle $\theta_c$. In some examples, the negative rake angle $\theta_{14}$ and the flank angle $\theta_{16}$ are configured to cause the rake face 14 and the flank face 16 to refract each of the first laser beam portion $L_1$ and the second laser beam portion $L_2$ of laser beam L into the workpiece W. The first laser beam portion $L_1$ and the second laser beam portion $L_2$ of laser beam L may distribute laser power more broadly in the workpiece W than a laser beam L that is not diffracted at the laser beam entrance face 12 thereby improving the laser beam L or focus quality of the laser beam L over an effective area of the workpiece W, particularly, in some instances, when a workpiece W is defined by limited working distances.

Referring now to FIG. 22, an exemplary laser-transmitting machining tool is shown generally at **10*l*. The medium of the laser-transmitting machining tool 10*l* may so include any desirable material such as, for example any type of single or poly crystal transmissive media including but not limited to: diamonds; sapphires; moissanites; chrysoberyls; alexandrite; and the like. In other configurations, exemplary materials defining the medium of the laser-transmitting machining tool 10*l*** may include but are not limited to other transmissive media such as, for example: carbides; cubic boron nitride (CBN); silicon; nitrides; steels; alloys; ceramics; alumina; glass; glass composites; composites, and the like.

The exemplary laser-transmitting machining tool **10*l* is defined by a substantially similar structural configuration with respect to the transmitting machining 10, 10*a*-10*d* of FIGS. 1A-8I and 30 described above and includes: the plurality of surfaces or faces 12-20; the first end $\mathbf{12_1}$-$\mathbf{20_1}$ of each respective surface 12-20; and the second end $\mathbf{12_2}$-$\mathbf{20_2}$ of each respective surface 12-20. Furthermore, the first end $\mathbf{14_1}$ of the rake face 14 extends away from the second end $\mathbf{18_2}$ of the rake side face 18 at a negative rake angle $\theta_{14}$; accordingly, the rake face 14 may be referred to as a negative rake face. The first end $\mathbf{16_1}$ of the flank face 16 extends away from the second end $\mathbf{20_2}$ of the flank side face 20 to define a flank angle or clearance angle $\theta_{16}$. The flank angle or clearance angle $\theta_{16}$ is obtuse. In some instances, the laser-transmitting machining tool 10*l* may be utilized for machining a workpiece W (see, e.g., any of FIGS. 29, and 30A-30**E).

Referring to FIG. 22, the exemplary laser-transmitting machining tool **10*l* is also defined a plurality of sidewall surfaces or faces 21*a*-21*d*. The plurality of sidewall surfaces or faces 21*a*-21*d* includes a first upstream sidewall surface or face 21*a*, a first downstream sidewall surface or face 21*b*, a second upstream sidewall surface or face 21*c* (not shown/refer to, e.g., FIGS. 2A-2I above), and a second downstream sidewall surface or face 21*d* (not shown/refer to, e.g., FIGS. 2A-2**I above).

Each of the first upstream surface or face **21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16**.

The first upstream surface or face **21*a* meets the first downstream sidewall surface or face 21*b* at a first side edge 23*a* that is arranged at an angle $\theta_{23}$ that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*l* to the second side 30 (i.e., one or both of the flank face 16 and the second side face 20) of the laser-transmitting machining tool 10*l***.

The second upstream sidewall surface or face **21*c* meets the second downstream sidewall surface or face 21*d* at a second side edge 23*b* (not shown/refer to, e.g., FIGS. 2A-2I above) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*l* to the second side 30 (i.e., one or both of the flank face 16 and the second side face 20) of the laser-transmitting machining tool 10*l***.

A first end $\mathbf{18_1}$ of the rake side face 18 extends away from a first end $\mathbf{12_1}$ of the laser-beam entrance face 12. A first end $\mathbf{20_1}$ of the flank side face 20 extends away from a second end $\mathbf{12_2}$ of the laser-beam entrance face 12. A first end $\mathbf{14_1}$ of the rake face 14 extends away from a second end $\mathbf{18_2}$ of the rake side face 18. A first end $\mathbf{16_1}$ of the flank face 16 extends away from a second end $\mathbf{20_2}$ of the flank side face 20. A second end $\mathbf{14_2}$ of the rake face 14 is joined to a second end $\mathbf{16_2}$ of the flank face 16 to define a cutting edge 22 that may be non-linear, curved or arcuate; although the cutting edge 22 may be non-linear, curved or arcuate, the cutting edge 22 may be defined to include other configurations, such as, for example, a linear, non-curved or non-arcuate shape. Furthermore, the first end $\mathbf{14_1}$ of the rake face 14 extends away from the second end $\mathbf{18_2}$ of the rake side face 18 at a negative or obtuse rake angle $\theta_{14}$; accordingly, the rake face 14 may be referred to as a negative rake face. The first end $\mathbf{16_1}$ of the flank face 16 extends away from the second end $\mathbf{20_2}$ of the flank side face 20 at an obtuse flank angle or clearance angle $\theta_{16}$.

As seen at FIG. 22, the laser beam L that enters and then exits the laser-transmitting machining tools **10*l* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or IV) cylindrical arrays of rays (see, e.g., the laser beam L of FIGS. 31A-31**B including a central ray $\Phi_A$ and circumferential arrays of rays $\Phi_{R1}$, $\Phi_{R2}$).

With reference to FIG. 22, the laser beam entrance face 12 is configured to receive and refract the collimated laser beam entrance segment L such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the Rank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the laser beam entrance face 12 according to Snell's law.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

Unlike the laser-transmitting machining tools 10*a*-10*k* described above, the substantially linear laser-beam entrance face 12 of the laser-transmitting machining tool 10*l* does not extend from the flank side face 20 to define a back-relief angle $\theta_{12}$; however, the substantially linear laser-beam entrance face 12 is arranged substantially perpendicularly with respect to the flank side face 20 such that a back-relief angle is seen generally at $\theta_{12}$, defining a right angle (i.e., $\theta_{12}$ is equal to 90°).

Furthermore, as seen at FIG. 22, the laser-beam entrance face 12 of the laser-transmitting machining tool 10*l* defines a portion of an optical lens recess 38 that is sized for receiving an optical lens 40. In some examples, the optical lens 40 may be removed or exchanged for another optical lens (not shown) having different optical properties. The optical lens 40 may be circular, oval, or the like. Furthermore, the optical lens 40 may be non-movably or fixedly disposed within the optical lens recess 38. Accordingly, so the optical lens 40 may be referred to as a non-movable or fixed optical lens.

In addition to the laser-beam entrance face 12, the optical lens recess 38 is further defined by a plurality of surface portions $\mathbf{38}_1$-$\mathbf{38}_4$. In an example, a first surface portion $\mathbf{38}_1$ of the plurality of surface portions $\mathbf{38}_1$-$\mathbf{38}_4$ defining the optical lens recess 38 extends away from the first end $\mathbf{12}_1$ of the laser-beam entrance face 12, and respectively, a second surface portion $\mathbf{38}_2$ of the plurality of surface portions $\mathbf{38}_1$-$\mathbf{38}_4$ defining the optical lens recess 38 extends away from the second end $\mathbf{12}_2$ of the laser-beam entrance face 12. The laser-beam entrance face 12 may be substantially perpendicularly arranged with respect to both of the first surface portion $\mathbf{38}_1$ and the second surface portion $\mathbf{38}_2$. A third surface portion $\mathbf{38}_3$ of the plurality of surface portions $\mathbf{38}_1$-$\mathbf{38}_4$ defining the optical lens recess 38 connects the first end 18 of the rake side face 18 to the first surface portion $\mathbf{38}_1$ of the plurality of surface portions $\mathbf{38}_1$-$\mathbf{38}_4$ defining the optical lens recess 38. A fourth surface portion $\mathbf{38}_4$ of the plurality of surface portions $\mathbf{38}_1$-$\mathbf{38}_4$ defining the optical lens recess 38 connects the first end $\mathbf{20}_1$ of the flank side face 20 to the second surface portion $\mathbf{38}_2$ of the plurality of surface portions $\mathbf{38}_1$-$\mathbf{38}_4$ defining the optical lens recess 38.

As seen at FIG. 22, a first end $\mathbf{40}_1$ of the non-movable or fixed optical lens 40 may be disposed adjacent the first surface portion $\mathbf{38}_1$ of the plurality of surface portions $\mathbf{38}_1$-$\mathbf{38}_4$ defining the optical lens recess 38, and respectively a second end $\mathbf{40}_2$ of the non-movable or fixed optical lens 40 may be disposed adjacent the second surface portion $\mathbf{38}_2$ of the plurality of surface portions $\mathbf{38}_1$-$\mathbf{38}_4$ defining the optical lens recess 38. An upstream side $\mathbf{40}_U$ of the non-movable or fixed optical lens 40 is configured to receive a laser beam L and a downstream side $\mathbf{40}_D$ of the non-movable or fixed optical lens 40 is configured to permit the laser beam L to exit the non-movable or fixed optical lens 40 such that the laser beam L may be received by the laser beam entrance face 12. In some configurations, the downstream side $\mathbf{40}_D$ of the non-movable or fixed optical lens 40 is spaced apart from the laser-beam entrance face 12 to define a gap G therebetween.

As seen at FIG. 22, the laser beam L that enters and then exits the laser-transmitting machining tool 10*l* is shown being defined by a plurality of segments $L_{E1}$, $L_1$. The plurality of segments $L_{E1}$, $L_1$ include a laser beam entrance segment $L_{E1}$ and a laser beam refracted segment $L_1$. The laser beam entrance segment $L_{E1}$ is shown firstly entering the non-movable or fixed optical lens 40 at the upstream side $\mathbf{40}_U$ of the non-movable or fixed optical lens 40. After entering the movable or fixed optical lens 40, the laser beam L is defined by the laser beam refracted segment $L_1$ that starts to converge, passing through the downstream side $\mathbf{40}_D$ of the non-movable or fixed optical lens 40 and thereafter entering the laser-transmitting machining tool 10*l* at the laser beam entrance face 12. The laser beam refracted segment $L_1$ of the laser beam L thereafter may be incident and converge upon a focal point $F_P$ located at an outward-most portion of the arcuate or curved cutting edge 22. The focal point $F_P$ is located between the first end $\mathbf{16}_1$ and the second end $\mathbf{16}_2$ of the flank face 16.

Referring now to FIGS. 23A, 23B, and 23C, an exemplary laser-transmitting machining tool is shown generally at 10*m*. The medium of the laser-transmitting machining tool 10*m* may include any desirable material such as, for example any type of single or poly crystal transmissive media including but not limited to: diamonds; sapphires; moissanites; chrysoberyls; alexandrite; and the like. In other configurations, exemplary materials defining the medium of the laser-transmitting machining tool 10*m* may include but are not limited to other transmissive media such as, for example: carbides, cubic boron nitride (CBN); silicon; nitrides; steels; alloys, ceramics; alumina, glass; glass composites; composites; and the like.

The exemplary laser-transmitting machining tool 10*m* may be defined by a substantially similar structural configuration with respect to the transmitting machining tools 10, 10*a*-10*k* described above, including: a plurality of surfaces or faces 12-20; the first end $\mathbf{12}_1$-$\mathbf{20}_1$ of each respective surface 12-20; and the second end $\mathbf{12}_2$-$\mathbf{20}_2$ of each respective surface 12-20. Furthermore, the first end $\mathbf{14}_1$ of the rake face 14 extends away from the second end $\mathbf{18}_2$ of the rake side face 18 at a negative rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$. The laser-transmitting machining tool 10*m* is configured to machine a workpiece W (see, e.g., any of FIGS. 29, and 30A-30E).

Referring to FIGS. 23A-23C, the exemplary laser-transmitting machining tool 10*m* is also defined a plurality of sidewall surfaces or faces 21*a*-21*d*. The plurality of sidewall surfaces or faces 21*a*-21*d* includes a first upstream sidewall surface or face 21*a*, a first downstream sidewall surface or face 21*b*, a second upstream sidewall surface or face 21*c* (not shown/refer to, e.g., FIGS. 2A-2I above), and a second downstream sidewall surface or face 21*d* (not shown/refer to, e.g., FIGS. 2A-2I above).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* that is arranged at an angle $\theta_{23}$ that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*m* to the second side 30 (i.e., one or both of the flank face 16 and the second side face 20) of the laser-transmitting machining tool 10*m*.

The second upstream sidewall surface or face 21*c* meets the second downstream sidewall surface or face 21*d* at a second side edge 23*b* (not shown/refer to, e.g., FIGS. 2A-2I above) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*m* to the second side 30 (i.e., one or both of the flank face 16 and the second side face 20) of the laser-transmitting machining tool 10*m*.

A first end $\mathbf{18}_1$ of the rake side face 18 extends away from a first end $\mathbf{12}_1$ of the laser-beam entrance face 12. A first end $\mathbf{20}_1$ of the flank side face 20 extends away from a second end $\mathbf{12}_2$ of the laser-beam entrance face 12. A first end $\mathbf{14}_1$ of the rake face 14 extends away from a second end $\mathbf{18}_2$ of the rake side face 18. A first end $\mathbf{16}_1$ of the flank face 16 extends away from a second end $\mathbf{20}_2$ of the flank side face 20. A second end $\mathbf{14}_2$ of the rake face 14 is joined to a second end $\mathbf{16}_2$ of the flank face 16 to define a cutting edge 22 that may be non-linear, curved or arcuate, although the cutting edge 22 may be non-linear, curved or arcuate, the cutting edge 22 may be defined to include other configurations, such as, for example, a linear, non-curved or non-arcuate shape. Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$.

As seen at FIGS. 23A-23C, the laser beam L that enters and then exits the laser-transmitting machining tools 10*m* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

With reference to FIGS. 23A-23C, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W), (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the laser beam entrance face 12 according to Snell's law.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. $\mathbf{5}D_C$ and $\mathbf{5}E_C$). In other examples, the laser beam entrance segment $L_{E1}$ may be defined by a diverging laser beam (as seen in, e.g., FIGS. $\mathbf{5}D_D$ and $\mathbf{5}E_D$).

Unlike the laser-transmitting machining tools 10, 10*a*-10*k* described above, the laser-transmitting machining tool 10*m* does not include a substantially linear laser-beam entrance face 12 that cooperates with the flank side face 20 to define a back-relief angle $\theta_{12}$. Rather, the laser beam entrance face 12 may be defined by a sinusoidal (e.g., a third-order polynomial) surface having a non-linear, arcuate, or curved configuration extending between the first upstream sidewall surface or face 21*a* and the second upstream sidewall surface or face 21*c*.

The optical shape of the non-linear, arcuate, or curved laser-beam entrance face 12 may be defined by a third-order polynomial, using an x-y coordinate system with the origin at the center of the optical shape. For example, the thickness Z of the optical shape may be defined by the following equation, where H is a scale factor.

$$Z(x, y) = H\left(x^3 = 3xy^2\right) \tag{52}$$

Furthermore, the laser-transmitting machining tool 10*m* may be arranged proximate an optical lens system 42 including an optical lens 44 and a movement actuator 46 connected to the optical lens 44. The optical lens 44 may be made from the same material as the laser-transmitting machining tool 10*m*. As will be described in the following disclosure, the movement actuator 46 causes the optical lens 44 to be moveably arranged relative to the laser-transmitting machining tool 10*m*. Accordingly, the optical lens 44 may be referred to as a movable or non-fixed optical lens. The movement actuator 46 may cause the moveable or non-fixed optical lens to move substantially perpendicularly with respect to a central axis of the laser beam L.

The movable or non-fixed optical lens 44 may have the same index of refraction $n_2$ as the laser-transmitting machining tool 10*m*. In some examples, the movable or non-fixed optical lens 44 is separated from the entrance face 12 by a gap G or a material having a different index of refraction (e.g., air $n_1$). The movement actuator 46 imparts movement to the movable or non-fixed optical lens 44 relative to the laser beam entrance face 12 in order to achieve different optical properties of the laser-transmitting machining tool 10*m*. As will be described in the following disclosure, the arrangement of the movable or non-fixed optical lens 44 relative the laser-transmitting machining tool 10*m* of FIG. 23A shows the laser beam L becoming generally diverging; in other words, the arrangement of the movable or non-fixed optical lens 44 relative the laser-transmitting machining tool 10*m* shown at FIG. 23A provides a defocusing optical so property. The arrangement of the movable or non-fixed optical lens 44 relative the laser-transmitting machining tool 10*m* shown at FIG. 23B neither focuses nor defocuses the laser beam L. The arrangement of the movable or non-fixed optical lens 44 relative the laser-transmitting machining tool 10*m* shown at FIG. 23C shows the laser beam L becoming generally converging; in other words, the arrangement of the movable or non-fixed optical lens 44 relative the laser-transmitting machining tool 10*m* shown at FIG. 23C provides a focusing optical property.

In some examples, the movable or non-fixed optical lens 44 and the laser beam entrance face 12 may form a lens system with a focal length $l_f$ inversely proportional to a lateral shift δ. Assuming $n_1=1$ for air, the focal length $l_f$ may be approximately dictated by the following equation.

$$l_f = 1/(6H\delta(n_2 - 1)) \tag{53}$$

As seen at FIGS. 23A-23C, a first end $\mathbf{44}_1$ of the movable or non-fixed optical lens 44 may be connected to the movement actuator 46. An upstream side $\mathbf{44}_U$ of the movable or non-fixed optical lens 44 is configured to receive a laser beam L and a downstream side $\mathbf{44}_D$ of the movable or non-fixed optical lens 44 is configured to permit the laser beam L to exit the movable or non-fixed optical lens 44 such that the laser beam L may be received by the laser beam entrance face 12. In some configurations, the downstream side $\mathbf{44}_D$ of the movable or non-fixed optical lens 44 is spaced apart from the laser-beam entrance face 12 to define the gap G there-between.

The upstream side $\mathbf{44}_U$ of the movable or non-fixed optical lens 44 may be substantially perpendicular to both of the first end $\mathbf{44}_1$ and the second end $\mathbf{44}_2$ of the movable or non-fixed optical lens 44. Furthermore, the downstream side $\mathbf{44}_D$ of the movable or non-fixed optical lens 44 may be defined by a sinusoidal (e.g., a third-order polynomial) surface having a non-linear, arcuate or curved configuration that is similar to the laser-beam entrance face 12; accordingly, as seen at FIG. 23B, when the first end $\mathbf{44}_1$ and the second end $\mathbf{44}_2$ of the movable or non-fixed optical lens 44 are respectively aligned with the second upstream sidewall surface or face 21*c* and the first upstream sidewall surface or face 21*a* of the laser-transmitting machining tool 10*m*, a distance so between downstream side $\mathbf{44}_D$ of the movable or non-fixed optical lens 44 and the laser beam entrance face 12 of the laser-transmitting machining tool 10*m* defining the gap G is the same along a width of the non-fixed optical lens 44 and the laser-transmitting machining tool 10*m*. Conversely, as seen at FIGS. 23A and 23C, when the first end $\mathbf{44}_1$ and the second end $\mathbf{44}_2$ of the movable or non-fixed optical lens 44 are not respectively aligned with the second upstream sidewall surface or face 21*c* and the first upstream sidewall surface or face 21*a* of the laser-transmitting machining tool 10*m*, the distance between the downstream side $\mathbf{44}_D$ of the movable or non-fixed optical lens 44 and the laser beam entrance face 12 of the laser-transmitting machining tool 10*m* defining the gap G is not the same along a width of the non-fixed optical lens 44 and the laser-transmitting machining tool 10*m*.

As seen at FIGS. 23A-23C, the laser-beam entrance face 12 is configured to receive a laser beam L. The laser beam L may be further defined by a plurality of segments $L_{E1}$, $L_1$, $L_{E2}$. The plurality of segments $L_{E1}$, $L_1$, $L_{E2}$ includes at least, for example, a laser beam entrance segment $L_{E1}$, a laser beam refracted segment $L_1$ and a laser beam exit segment $L_{E2}$.

The laser beam entrance segment $L_{E1}$ is shown firstly entering the upstream side $\mathbf{44}_U$ of the movable or non-fixed optical lens 44 and then subsequently exits the downstream side $\mathbf{44}_D$ of the movable or non-fixed optical lens 44. The laser beam L then enters the gap G and is subsequently incident upon the laser beam entrance face 12 of the laser-transmitting machining tool 10*m*.

Referring initially to FIG. 23A, the movement actuator 46 arranges the movable or non-fixed optical lens 44 in an first orientation whereby the gap G between the downstream side $\mathbf{44}_D$ of the movable or non-fixed optical lens 44 and the laser beam entrance face 12 of the laser-transmitting machining tool 10*m* is relatively smaller (when compared to the orientation of FIG. 23C). As a result of the orientation of movable or non-fixed optical lens 44 relative the laser beam entrance face 12, the laser beam entrance face 12 receives the laser beam entrance segment $L_{E1}$ of the laser beam L and thereafter causes the laser beam refracted segment $L_1$ of the laser beam L to become divergent after the laser beam L enters the body of the laser-transmitting machining tool 10*m*. The laser beam refracted segment $L_1$ of the laser beam L thereafter may be incident upon one or more of the rake face 14, the flank face 16, and the arcuate or curved cutting edge 22. Thereafter, the laser beam refracted segment $L_1$ of the laser beam L may be refracted off one or more of the rake face 14, the flank face 16, and the arcuate or curved cutting edge 22 to define the laser beam exit segment $L_{E2}$. The laser beam exit segment $L_{E2}$ converges upon a focal point $F_P$ located away from an outwardly most portion of the arcuate or curved cutting edge 22 at a first distance D1.

Referring to FIG. 23B, the movement actuator 46 arranges the movable or non-fixed optical lens 44 in a second or "neutral" orientation whereby the gap G between the downstream side $\mathbf{44}_D$ of the movable or non-fixed optical lens 44 and the laser beam entrance face 12 of the laser-transmitting machining tool 10*m* is the same along a width of the non-fixed optical lens 44 and the laser-transmitting machining tool 10*m*. As a result of the orientation of movable or non-fixed optical lens 44 relative the laser beam entrance face 12, the laser beam entrance face 12 receives the laser beam entrance segment $L_{E1}$ of the laser beam L and thereafter does not change a direction of the laser beam defined by the laser beam entrance segment $L_{E1}$ (i.e., the orientation of the non-fixed optical lens 44 relative the laser-transmitting machining tool 10*m* does not cause the laser beam refracted segment $L_1$ of the laser beam L to become divergent or convergent after the laser beam L enters the body of the laser-transmitting machining tool 10*m*; as a result, the laser beam L may remain collimated). The laser beam refracted segment $L_1$ of the laser beam L thereafter may be incident upon one or more of the rake face 14, the flank face 16, and the arcuate or curved cutting edge 22. Thereafter, the laser beam refracted segment $L_1$ of the laser beam L may be refracted off one or more of the rake face 14, the flank face 16, and the arcuate or curved cutting edge 22 to define the laser beam exit segment $L_{E2}$. The laser beam exit segment $L_{E2}$ converges upon a focal point $F_P$ located away from an outwardly most portion of the arcuate or curved cutting edge 22 at a first distance D1.

Referring to FIG. 23C, the movement actuator 46 arranges the movable or non-fixed optical lens 44 in a third orientation whereby the gap G between the downstream side $\mathbf{44}_D$ of the movable or non-fixed optical lens 44 and the laser beam entrance face 12 of the laser-transmitting machining tool 10*m* is relatively larger (when compared to the orientation of FIG. 23A). As a result of the orientation of movable or non-fixed optical lens 44 relative the laser beam entrance face 12, the laser beam entrance face 12 receives the laser beam entrance segment $L_{E1}$ of the laser beam L and thereafter causes the laser beam refracted segment $L_1$ of the laser beam L to become convergent after the laser beam L enters the body of the laser-transmitting machining tool 10*m*. The laser beam refracted segment $L_1$ of the laser beam L thereafter may be incident upon a focal point $F_P$ located at the arcuate or curved cutting edge 22. Thereafter, the laser beam refracted segment $L_1$ of the laser beam L is refracted off the arcuate or curved cutting edge 22 to define the laser beam exit segment $L_{E2}$. The laser beam exit segment $L_{E2}$ diverges from the focal point $F_P$.

Referring now to FIGS. 24A, 24B, and 24C, an exemplary laser-transmitting machining tool is shown generally at 10*n*. The medium of the laser-transmitting machining tool 10*n* may include any desirable material such as, for example any type of single or poly crystal transmissive media including but not limited to: diamonds; sapphires, moissanites; chrysoberyls; alexandrite; and the like. In other configurations, exemplary materials defining the medium of the laser-transmitting machining tool 10*n* may include but are not limited to other transmissive media such as, for example: carbides, cubic boron nitride (CBN); silicon; nitrides; steels; alloys; ceramics; alumina; glass; glass composites; composites; and the like.

The exemplary laser-transmitting machining tool 10*n* is defined by a substantially similar structural configuration with respect to the transmitting machining tools 10, 10*a*-10*d* of FIGS. 1A-8I and 30 described above, including: a plurality of surfaces or faces 12-20; the first end $\mathbf{12}_1$-$\mathbf{20}_1$ of each respective surface 12-20; and the second end $\mathbf{12}_2$-$\mathbf{20}_2$ of each respective surface 12-20. Furthermore, the first end $\mathbf{14}_1$ of the rake face 14 extends away from the second end $\mathbf{18}_2$ of the rake side face 18 at a negative rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$. The laser-transmitting machining tool 10*n* is configured to machine a workpiece W (see, e.g., any of FIGS. 29, and 30A-30E).

In some examples, the second end $\mathbf{12}_2$ of the laser-beam entrance face 12 extends away from the first end $\mathbf{20}_1$ of the second side face 20 at a back-relief angle $\theta_{12}$. In some configurations, the back-relief angle $\theta_{12}$ may be a right angle (i.e., equal to 90°). In other configurations, the back-relief angle $\theta_{12}$ may be obtuse (i.e., greater than 90°). In yet other configurations, the back-relief angle $\theta_{12}$ that is acute (i.e., less than 90°).

Referring to FIGS. 24A-24C, the exemplary laser-transmitting machining tool 10*n* is also defined a plurality of sidewall surfaces or faces 21*a*-21*d*. The plurality of sidewall surfaces or faces 21*a*-21*d* includes a first upstream sidewall surface or face 21*a*, a first downstream sidewall surface or face 21*b*, a second upstream sidewall surface or face 21*c* (not shown/refer to, e.g., FIGS. 2A-2I above), and a second downstream sidewall surface or face 21*d* (not shown/refer to, e.g., FIGS. 2A-2I above).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* that is arranged at an angle $\theta_{23}$ that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*n* to the second side 30 (i.e., one or both of the flank face 16 and the second side face 20) of the laser-transmitting machining tool 10*n*.

The second upstream sidewall surface or face 21*c* meets the second downstream sidewall surface or face 21*d* at a second side edge 23*b* (not shown/refer to, e.g., FIGS. 2A-2I above) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*n* to the second side 30 (i.e., one or both of the flank face 16 and the second side face 20) of the laser-transmitting machining tool 10*n*.

A first end $\mathbf{18}_1$ of the rake side face 18 extends away from a first end $\mathbf{12}_1$ of the laser-beam entrance face 12. A first end $\mathbf{20}_1$ of the flank side face 20 extends away from a second end $\mathbf{12}_2$ of the laser-beam entrance face 12. A first end $\mathbf{14}_1$ of the rake face 14 extends away from a second end $\mathbf{18}_2$ of the rake side face 18. A first end $\mathbf{16}_1$ of the flank face 16 extends away from a second end $\mathbf{20}_2$ of the flank side face 20. A second end $\mathbf{14}_2$ of the rake face 14 is joined to a second end $\mathbf{16}_2$ of the flank face 16 to define a cutting edge 22 that may be non-linear, curved or arcuate; although the cutting edge 22 may be non-linear, curved or arcuate, the cutting edge 22 may be defined to include other configurations, such as, for example, a linear, non-curved or non-arcuate shape. Furthermore, the first end $\mathbf{14}_1$ of the rake face 14 extends away from the second end $\mathbf{18}_2$ of the rake side face 18 at a negative or obtuse rake angle $\theta_{14}$; accordingly, the rake face 14 may be referred to as a negative rake face. The first end $\mathbf{16}_1$ of the flank face 16 extends away from the second end $\mathbf{20}_2$ of the flank side face 20 at an obtuse flank angle or clearance angle $\theta_{16}$.

As seen at FIGS. 24A-24C, the laser beam L that enters and then exits the laser-transmitting machining tools 10*n* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 34A-34B including a central ray $\Phi_A$ and circumferential arrays of rays $\Phi_{R1}$. $\Phi_{R2}$).

With reference to FIGS. 24A-24C, the laser beam entrance face 12 is configured to receive and refract the collimated laser beam entrance segment $L_{E1}$ such that the laser beam refracted segment $L_1$ is directed toward and through one or more of: (1) the cutting edge 22 (causing, e.g., the laser beam exit segment $L_{E2}$ to refract onto the workpiece W); (2) the negative rake face 14 near the cutting edge 22 (causing, e.g., the laser beam exit segment $L_{E2}$ to refract onto the workpiece W); and (3) the flank face 16 near the cutting edge 22 (causing, e.g., the laser beam exit segment $L_{E2}$ to refract onto the workpiece W). The back-relief angle $\theta_{12}$ is configured to refract the laser beam refracted segment $L_1$ at the laser beam entrance face 12 according to Snell's law.

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. 5$D_C$ and 5$E_C$). In other examples, the laser beam entrance segment $L_{E1}$ may be defined by a diverging laser beam (as seen in, e.g., FIGS. 5$D_D$ and 5$E_D$).

Furthermore, the laser-transmitting machining tool 10*n* may be arranged proximate an optical prism system 48 including a first right angle prism 50, a second right angle prism 52 and a movement actuator 54 connected to the second right angle prism 52. As will be described in the following disclosure, the movement actuator 54 causes the second right angle prism 52 to be moveably-arranged relative to a non-movable, fixed or grounded orientation of the right angle prism 50 and the laser-transmitting machining tool 10*n*. Accordingly, the first right angle prism 50 may be referred to as a non-movable or fixed right angle prism the second right angle prism 52 may be referred to as a movable or non-fixed right angle prism. The movement actuator 54 may cause the moveable or non-fixed right angle prism 52 to move in a similar axial direction as that of the laser beam L.

The first, non-movable or fixed right angle prism 50 is defined by an acute prism angle $\theta_P$. The second, moveable or non-fixed right angle prism 52 is also defined by the same acute prism angle $\theta_P$. The first, non-movable or fixed right angle prism 50 is positioned to firstly receive the laser beam L and then subsequently transmit the laser beam L through the second, moveable or non-fixed right angle prism 52 toward the laser beam entrance face 12.

In some examples, the first, non-movable or fixed right angle prism 50 is defined by a prism index of refraction n and the second, moveable or non-fixed right angle prism 52 is also defined by the same prism index of refraction $n_p$. In some examples, the first, non-movable or fixed right angle prism 50 and the second, moveable or non-fixed right angle prism 52 are separated by a separation distance h by a material, such as, for example, air that is defined by a different index of refraction (e.g., $n_1$). The laser beam L is subsequently received by the laser beam entrance face 12 after being laterally shifted (see, e.g., $L_{shift}$ in equation 43) by the first, non-movable or fixed right angle prism 50 and the second, moveable or non-fixed right angle prism 52. The lateral shift $L_{shift}$ may be proportional to a separation distance change (see, e.g., Δh) according to so the following equation:

$$L_{shift} = \frac{n_p \sin(2\theta_p)}{2\sqrt{n_1^2 - n_p^2 \sin(\theta_p)}} \Delta h \quad (54)$$

The separation distance h between the first, non-movable or fixed right angle prism 50 and the second, moveable or non-fixed right angle prism 52 adjustable as a result of the movement actuator 54 imparting movement to the second, moveable or non-fixed right angle prism 52. With reference to FIG. 24A, the first, non-movable or fixed right angle prism 50 is separated from the second, moveable or non-fixed right angle prism 52 by a separation distance h that is less than a second separation distance h seen at FIGS. 24B and 24C. As seen at FIG. 24B, the first, non-movable or fixed right angle prism 50 is separated from the second, moveable or non-fixed right angle prism 52 by a separation distance h that is greater than the first separation distance h of FIG. 24A but is less than a third separation distance h of FIG. 24C. Accordingly, depending on the selected orientation of the second, moveable or non-fixed right angle prism 52 relative the first, non-movable or fixed right angle prism 50, the axial orientation of the laser beam L is selectively adjustable at the entrance face 12 such that the laser beam may exit the laser-transmitting machining tool 10*n* at any of the rake face 14, the flank face 16 or the arcuate or curved cutting edge 22.

Referring now to FIGS. 25, 25', 26, and 26' an exemplary laser-transmitting machining tool is shown generally at 10*o*. The medium of the laser-transmitting machining tool 10*o* may include any desirable material such as, for example any type of single or poly crystal transmissive media including but not limited to: diamonds; sapphires; moissanites, chrysoberyls, alexandrite; and the like. In other configurations, exemplary materials defining the medium of the laser-transmitting machining tool 10*o* may include but are not limited to other transmissive media such as, for example: carbides; cubic boron nitride (CBN); silicon; nitrides; steels, alloys, ceramics; alumina, glass; glass composites; composites; and the like.

Referring to FIG. 25, the exemplary laser-transmitting machining tool 10*o* is defined by a substantially similar structural configuration with respect to the transmitting machining tools 10 and 10*a*-10*d* of FIGS. 1A-81 and 27 described above and includes the plurality of surfaces or faces 12-20. The laser-transmitting machining tool 10*o* also includes a "hybrid" or "split radius" cutting edge 22. Unlike the exemplary embodiments described above, as seen at FIG. 26' the hybrid or split radius cutting edge 22 may not be limited to being defined by non-linear, curved, or arcuate configuration (or, alternatively, a linear, non-curved, or non-arcuate configuration), but, rather, the hybrid or split radius cutting edge 22 may be defined to include a combination of: (1) a non-linear, curved, or arcuate portion (see, e.g., portion of the cutting edge 22 at reference numeral 21*d*2), and (2) a linear, non-curved, or non-arcuate portion (see, e.g., portion of the cutting edge 22 at reference numeral 21*b*$_2$). In some instances, the laser-transmitting machining tool 10*o* may be utilized for machining a workpiece W (see, e.g., any of FIGS. 29, and 30A-30E). The laser-transmitting machining tool 10*o* defines a rake angle $\theta_{14}$ that is a negative or obtuse. The first end 16$_1$ of the flank face 16 extends away from the second end 20$_2$ of the flank side face 20 to define a flank angle or clearance angle $\theta_{16}$. The flank angle or clearance angle $\theta_{16}$ is obtuse.

In some examples, the second end 12$_2$ of the laser-beam entrance face 12 extends away from the first end 20$_1$ of the flank side face 20 at a back-relief angle $\theta_{12}$. In some examples, the back-relief angle $\theta_{12}$ is a right angle (i.e., equal to 90°). Although the back-relief angle $\theta_{12}$ may be a right angle, the back-relief angle $\theta_{12}$ may be obtuse (i.e., greater than 90°) or are acute (i.e., less than 90°) in a substantially similar manner as described above at, for example, FIGS. 1A-4I with respect to the laser-transmitting machining tools 10*a* and 10*b*.

Referring to FIGS. 25 and 26, the exemplary laser-transmitting machining tool 10*o* is also defined a plurality of sidewall surfaces or faces 21*a*-21*d*. The plurality of sidewall surfaces or faces 21*a*-21*d* includes a first upstream sidewall surface or face 21*a* (see, e.g., FIGS. 25 and 26), a first downstream sidewall surface or face 21*b* (see, e.g., FIGS. 19 and 20), a second upstream sidewall surface or face 21*c* (see, e.g., FIG. 20), and a second downstream sidewall surface or face 21*d* (see, e.g., FIG. 20).

Each of the first upstream surface or face 21*a* and the second upstream sidewall surface or face 21*c* extends from the laser-beam entrance face 12. Each of the first downstream sidewall surface or face 21*b* and the second downstream sidewall surface or face 21*d* extends from the rake face 14 and flank face or clearance face 16.

The first upstream surface or face 21*a* meets the first downstream sidewall surface or face 21*b* at a first side edge 23*a* (see, e.g., FIGS. 25 and 26) that is arranged at an angle $\theta_{23}$ (see, e.g., FIG. 25) that is substantially similar to the flank angle or clearance angle $\theta_{16}$ that will be described in greater detail below. The first upstream surface or face 21*a* and the first downstream sidewall surface or face 21*b* connects the first side 28 (i.e., one or both of the rake face 14 and first side face 18) of the laser-transmitting machining tool 10*o* to the second side 30 (i.e., one or both of the flank face 16 and the second side face 20) of the laser-transmitting machining tool 10*o*.

The second upstream sidewall surface or face 21*c* meets the second downstream sidewall surface or face 21*d* at a second side edge 23*b* (see, e.g., FIG. 26) that is similarly arranged at the angle $\theta_{23}$. The second upstream surface or face 21*c* and the second downstream sidewall surface or face 21*d* also connects the first side 28 (i.e., one or both of the rake face 14 and first side face 18) of the laser-transmitting machining tool 10*o* to the second side 30 (i.e., one or both of the flank face 16 and the second side face 20) of the laser-transmitting machining tool 10*o*.

As seen at FIG. 26', the first downstream sidewall surface or face 21*b* is defined by a first portion $21b_1$ and a second portion $21b_2$, and the second downstream sidewall surface or face 21*d* is defined by a first portion $21d_1$ and a second portion $21d_2$. The first portion $21b_1$, $21d_1$ of both of the first downstream sidewall surface or face 21*b* and the second downstream sidewall surface or face 21*d* extends along the rake side face 18. The second portion $21b_2$, $21d_2$ of both of the first downstream sidewall surface or face 21*b* and the second downstream sidewall surface or face 21*d* extends along the rake face 14. The second portion $21b_2$ of the first downstream sidewall surface or face 21*b* define a linear, non-curved, or non-arcuate portion of the hybrid or split radius cutting edge 22 whereas the second portion $21d_2$ of the second downstream sidewall surface or face 21*b* defines a non-linear, curved, or arcuate portion of the hybrid or split radius cutting edge 22.

As seen at FIG. 25, the laser beam L that enters and then exits the laser-transmitting machining tools 10*o* is shown being defined by a plurality of segments $L_{E1}$, $L_1$, $L_{E2}$. The plurality of segments $L_{E1}$, $L_1$, $L_{E2}$ include a laser beam entrance segment $L_{E1}$, a laser beam refracted segment $L_1$ and a laser beam exit segment $L_{E2}$. The laser beam entrance segment $L_{E1}$ is collimated, which is generally defined by a tube or cylindrical arrays of rays (see, e.g., the laser beam L of FIGS. 31A-31B including a central ray $\Phi_A$ and circumferential arrays of rays $\Phi_{R1}$, $\Phi_{R2}$).

Although the laser beam entrance segment $L_{E1}$ entering the laser beam entrance face 12 is collimated, the laser beam entrance segment $L_{E1}$ may enter the laser beam entrance face 12 in other configurations. In some instances, the laser beam entrance segment $L_{E1}$ may be defined by a converging laser beam (as seen in, e.g., FIGS. $5D_C$ and $5E_C$). In other examples, the laser beam entrance segment $L_{E1}$ may be defined by a diverging laser beam (as seen in, e.g., FIGS. $5D_D$ and $5E_D$).

As seen at FIGS. 25' and 26, the laser beam entrance face 12 may be defined by a protruding or outwardly-projecting partial wedge shape including a first substantially linear, flat or planar laser beam entrance face segment 12*a* and a second substantially linear, flat or planar laser beam entrance face segment 12*b* both extending between the first end $12_1$ of the laser-beam entrance face 12 (from the rake side face 18) and the second end $12_2$ of the law-beam entrance face 12 (from the flank side face 20). The first substantially linear, flat or planar laser beam entrance face segment 12*a* also extends from the first upstream sidewall surface or face 21*a*. The second substantially linear, flat or planar laser beam entrance face segment 12*b* also extends from the second upstream sidewall surface or face 21*c* The first substantially linear, flat or planar laser beam entrance face segment 12*a* and the second substantially linear, flat or planar laser beam entrance face segment 12*b* meet at an entrance face edge 12*c*. As will be described in the following disclosure, the first substantially linear, flat or planar laser beam entrance face segment 12*a* may be alternatively referred to as a substantially linear, flat or planar laser beam function entrance face segment, and the second substantially linear, flat or planar laser beam entrance face segment 12*b* may be alternatively referred to as a substantially linear, flat or planar laser beam non-functional entrance face segment.

With continued reference to FIG. 26, a plane $P_{12}$ extends across the laser-transmitting machining tool 10*o* proximate the laser beam entrance face 12. In an example, the plane $P_{12}$ extends across an edge where the substantially linear, flat or planar laser beam functional entrance face segment 12*a* extends from the first upstream sidewall surface or face 21*a*. Furthermore, the plane $P_{12}$ is substantially perpendicular with respect to the first upstream sidewall surface or face 21*a*. The substantially linear, flat or planar laser beam non-functional entrance face segment 12*b* perpendicularly extends from the second downstream sidewall surface or face 21*d* and meets the substantially linear, flat or planar laser beam functional entrance face segment 12*a* at the entrance face edge 12*c*. The substantially linear, flat or planar laser beam non-functional entrance face segment 12*b* may be spaced apart from the plane $P_{12}$ at a distance d.

In some instances, the substantially linear, flat or planar laser beam functional entrance face segment 12*a* is arranged at an outwardly-projecting angle $\theta_W'$ that defines the protruding or outwardly-projecting partial wedge shape of the laser beam entrance face 12 of the laser-transmitting machining tool 10*o*. In some instances, the outwardly-projecting angle $\theta_W'$ is acute (i.e., less than 90°) and projects in a direction away from the hybrid or split radius cutting edge 22; in some implementations, the outwardly-projecting angle $\theta_W'$ is approximately equal to 25'. The substantially linear, flat or planar laser beam functional entrance face segment 12*a* is configured to refract the laser beam L at the laser beam entrance face 12 according to Snell's law.

As seen at FIG. 26, in some instances, the substantially linear, flat or planar laser beam functional entrance face segment 12*a* of the protruding or outwardly-projecting partial wedge shape of the laser beam entrance face 12 of the laser-transmitting machining tool 10*o* receives the laser beam entrance segment $L_{E1}$ of the laser beam L and thereafter causes the laser beam refracted segment $L_1$ of the laser beam L to remain collimated after the laser beam L enters the body of the laser-transmitting machining tool 10*o*. As can readily be seen in FIG. 26, the laser beam L is refracted by the entrance face 12 according to Snell's law, the refracted laser beam assuming an angle $\theta_R$ relative to a line R normal to the entrance face 12. $\theta_R$ may be expressed by the following equation:

$$\theta_R = \sin^{-1}\left(\frac{\sin\theta_W'}{n_2}\right) \tag{55}$$

Referring to FIG. 26', the laser beam refracted segment $L_1$ of the laser beam L may be incident upon the hybrid or split radius cutting edge 22. In some instances, the laser beam refracted segment $L_1$ of the laser beam L is incident upon the second portion $21d_2$ of the second downstream sidewall surface or face 21*b* that defines the non-linear, curved, or arcuate portion of the hybrid or split radius cutting edge 22. Thereafter, the laser beam refracted segment $L_1$ of the laser beam L is refracted off the second portion $21d_2$ of the second downstream sidewall surface or face 21*b* that defines the non-linear, curved, or arcuate portion of the hybrid or split radius cutting edge 222 to define the laser beam exit segment $L_{E2}$. After the laser beam refracted segment $L_1$ contacts and travels through the hybrid or split radius cutting edge 22, the laser beam exit segment $L_{E2}$ of the laser beam L becomes convergent.

FIG. 32 is schematic view of an example computing device 3200 that may be used to implement the systems and methods described in this document (e.g., the computing device 3200 may be connected to or be a component of a beam profiler (not shown) having beam characterization software for generating the laser beam L that is received by any of the exemplary laser-transmitting machining tools 10*a*-10*o* described above). The computing device 3200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 3200 includes a processor 3210 (also referred to as data processing hardware), memory 3220 (also referred to as memory hardware), a storage device 3230, a high-speed interface/controller 3240 connecting to the memory 3220 and high-speed expansion ports 3250, and a low speed interface/controller 3260 connecting to a low speed bus 3270 and a storage device 3230. Each of the components 3210, 3220, 3230, 3240, 3250, and 3260, are interconnected using various busses, and may be mounted on a common motherboard or in other manners as appropriate. The processor 3210 can process instructions for execution within the computing device 3200, including instructions stored in the memory 3220 or on the storage device 3230 to display graphical so information for a graphical user interface (GUI) on an external input/output device, such as display 3280 coupled to high speed interface 3240. In other implementations, multiple processors and/or multiple buses may be used, as appropriate, along with multiple memories and types of memory. Also, multiple computing devices 3200 may be connected, with each device providing portions of the necessary operations (e.g., as a server bank, a group of blade servers, or a multi-processor system).

The memory 3220 stores information non-transitorily within the computing device 3200. The memory 3220 may be a computer-readable medium, a volatile memory unit(s), or non-volatile memory unit(s). The non-transitory memory 3220 may be physical devices used to store programs (e.g., sequences of instructions) or data (e.g., program state information) on a temporary or permanent basis for use by the computing device 3200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM)(e.g., typically used for firmware, such as boot programs). Examples of volatile memory include, but are not limited to, random access memory (RAM), dynamic random access memory (DRAM) static random access memory (SRAM), phase change memory (PCM) as well as disks or tapes.

The storage device 3230 is capable of providing mass storage for the computing device 3200. In some implementations, the storage device 3230 is a computer-readable medium. In various different implementations, the storage device 3230 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 3220, the storage device 3230, or memory on processor 3210.

The high-speed controller 3240 manages bandwidth-intensive operations for the computing device 3200, while the low speed controller 3260 manages lower so bandwidth-intensive operations. Such allocation of duties is exemplary only. In some implementations, the high-speed controller 3240 is coupled to the memory 3220, the display 3280 (e.g., through a graphics processor or accelerator), and to the high-speed expansion ports 3250, which may accept various expansion cards (not shown). In some implementations, the low-speed controller 3260 is coupled to the storage device 3230 and a low-speed expansion port 3290. The low-speed expansion port 3290, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 3200 may be implemented in a number of different forms, as shown in the figure. For example, it may be implemented as a standard server 3200*a* or multiple times in a group of such servers 3200*a*, as a laptop computer 3200*b*, or as part of a rack server system 3200*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The term “machine-readable signal” refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback. e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. An optomechanical tool for machining a workpiece, the optomechanical tool comprising:

a transmissive body of material having an entrance face, a rake face, a flank face, a rake side face, a flank side face, a first sidewall, a second sidewall, a secondary clearance face, wherein the secondary clearance face extends between and connects the flank face to the flank side face, wherein the first sidewall includes a first upstream sidewall surface or face connected to a first downstream sidewall surface or face at a first side edge, wherein the second sidewall includes a second upstream sidewall surface or face connected to a second downstream sidewall surface or face at a second side edge, wherein the rake side face and the flank side face are connected to the entrance face, the rake side face is connected to the rake face, the flank side face is connected to the flank face, the rake face is connected to the flank face to define an at least partially curved cutting edge, wherein the first upstream sidewall surface or face and the second upstream sidewall surface or face extend from the entrance face, wherein the first downstream sidewall surface or face and the second downstream sidewall surface or face extend from both of the rake face and the flank face, wherein the entrance face extends away from the flank side face to define a back-relief angle, wherein the rake face extends away from the rake side face to define a rake angle, wherein the optomechanical tool is configured to direct a light beam along a path:

toward a light beam entrance surface of the entrance face of the transmissive body of material;

through the light beam entrance surface of the entrance face of the transmissive body of material;

optically through the transmissive body of material and toward one or more of the rake face, the flank face, the rake side face, the flank side face, and the at least partially curved cutting edge; and through one or more of the rake face, the flank face, and the at least partially curved cutting edge for causing the light beam to refract onto the workpiece, wherein the transmissive body of material is selected from the group consisting of diamonds, sapphires, moissanites, chrysoberyls, alexandrite, carbides, cubic boron nitride, silicon, nitrides, alloys, ceramics, alumina, glass, and glass composites.

2. The optomechanical tool of claim 1, wherein the rake angle is a negative rake angle.

3. The optomechanical tool of claim 1, wherein the back-relief angle is obtuse.

4. The optomechanical tool of claim 1, wherein the back-relief angle is acute.

5. The optomechanical tool of claim 1, wherein the back-relief angle is perpendicular.

6. The optomechanical tool of claim 1, wherein the entrance face is substantially linear, flat or planar.

7. The optomechanical tool of claim 1, wherein the entrance face is defined by an inwardly-projecting axial cylindrical configuration.

8. The optomechanical tool of claim 1, wherein the entrance face is defined by an outwardly-projecting axial cylindrical configuration.

9. The optomechanical tool of claim 1, wherein the entrance face is defined by an inwardly-projecting lateral cylindrical configuration.

10. The optomechanical tool of claim 1, wherein the entrance face is defined by an outwardly-projecting lateral cylindrical configuration.

11. The optomechanical tool of claim 1, wherein the entrance face is defined by an inwardly-projecting spherical configuration.

12. The optomechanical tool of claim 1, wherein the entrance face is defined by an outwardly-projecting spherical configuration.

13. The optomechanical tool of claim 1, wherein the entrance face is defined by one or more diffractive surface portions.

14. The optomechanical tool of claim 1, wherein the optomechanical tool is at least partially coated with a reflection-enhancing coating material.

15. The optomechanical tool of claim 14, wherein the reflection-enhancing coating material is aluminum, silver, gold, chrome, nickel, or titanium nitride.

16. The optomechanical tool of claim 1, wherein the entrance face further comprises a functional entrance face segment and a non-functional entrance face segment, the functional entrance face segment is connected to the rake side face, the non-functional entrance face segment is connected to the flank side face, wherein the non-functional entrance face segment extends away from the functional entrance face segment.

17. The optomechanical tool of claim 1, wherein the flank face extends away from the flank side face to define a clearance angle.

18. The optomechanical tool of claim 17, wherein the first side edge is arranged at a first side edge angle that is substantially similar to the clearance angle, wherein the second side edge is arranged at a second side edge angle that is substantially similar to the clearance angle.

19. The optomechanical tool of claim 1, wherein the flank face extends away from the secondary clearance face to define a clearance angle, wherein the secondary clearance face extends away from the flank side face to define a secondary clearance angle.

20. The optomechanical tool of claim 1, wherein the first upstream sidewall surface or face and the second upstream sidewall surface or face connect the rake side face to the flank side face, wherein the entrance face is defined by a wedge shape including a first light beam entrance face segment and a second light beam entrance face segment that meet at an entrance face edge, the first light beam entrance face segment is connected to the first upstream sidewall surface or face, the second light beam entrance face segment is connected to the second upstream sidewall surface or face.

21. The optomechanical tool of claim 20, wherein the wedge shape is defined by a recessed, inverted or inwardly-projecting configuration.

22. The optomechanical tool of claim 20, wherein the wedge shape is defined by a protruding or outwardly-projecting configuration.

23. The optomechanical tool of claim 1, wherein the entrance face defines an optical lens housing to configured to retain an optical lens.

24. The optomechanical tool of claim 1, wherein a portion of the first downstream sidewall surface or face extending along the rake face defines a linear, non-curved, or non-arcuate portion of the at least partially curved cutting edge, wherein a portion of the second downstream sidewall surface or face extending along the rake face defines a non-linear, curved, or arcuate portion of the at least partially curved cutting edge, wherein the at least partially curved cutting edge is a hybrid or split radius cutting edge.

25. An optomechanical tool for machining a workpiece, the optomechanical tool comprising:

a transmissive body of material having an entrance face, a rake face, a flank face, and a flank side face, a first sidewall, a second sidewall, a secondary clearance face, wherein the secondary clearance face extends between and connects the flank face to the flank side face, wherein the first sidewall includes a first upstream sidewall surface or face connected to a first downstream sidewall surface or face at a first side edge, wherein the second sidewall includes a second upstream sidewall surface or face connected to a second downstream sidewall surface or face at a second side edge, wherein the rake face and the flank side face are connected to the entrance face, the flank side face is connected to the flank face, the rake face is connected to the flank face to define an at least partially curved cutting edge, wherein the first upstream sidewall surface or face and the second upstream sidewall surface or face extend from the entrance face, wherein the first downstream sidewall surface or face and the second downstream sidewall surface or face extend from both of the rake face and the flank face, wherein the entrance face extends away from the flank side face to define a back-relief angle, wherein the rake face extends away from the flank face to define a rake angle, wherein the optomechanical tool is configured to direct a light beam along a path:

toward a light beam entrance surface of the entrance face of the transmissive body of material;

through the light beam entrance surface of the entrance face of the transmissive body of material;

optically through the transmissive body of material and toward one or more of the rake face, the flank face, the flank side face, and the at least partially curved cutting edge; and through one or more of the rake face, the flank face, and the at least partially curved cutting edge for causing the light beam to refract onto the workpiece, wherein the transmissive body of material is selected from the group consisting of diamonds, sapphires, moissanites, chrysoberyls, alexandrite, carbides, cubic boron nitride, silicon, nitrides, alloys, ceramics, alumina, glass, and glass composites.

26. The optomechanical tool of claim 25, wherein the rake angle is a positive rake angle.

27. The optomechanical tool of claim 25, wherein the back-relief angle is perpendicular.

28. The optomechanical tool of claim 25, wherein the entrance face is substantially linear, flat or planar.

29. The optomechanical tool of claim 25, wherein the flank face extends away from the secondary clearance face to define a clearance angle, wherein the secondary clearance face extends away from the flank side face to define a secondary clearance angle.

30. The optomechanical tool of claim 25, wherein the flank face extends away from the flank side face to define a clearance angle, wherein the first side edge is arranged at a first side edge angle that is substantially similar to the clearance angle, wherein the second side edge is arranged at a second side edge angle that is substantially similar to the clearance angle.

31. A system comprising:

an optomechanical tool including a transmissive body of material having an entrance face, a rake face, a flank face, a rake side face, and a flank side face, a first sidewall, and a second sidewall, a secondary clearance face, wherein the secondary clearance face extends between and connects the flank face to the flank side face, wherein the first sidewall includes a first upstream sidewall surface or face connected to a first downstream sidewall surface or face at a first side edge, wherein the second sidewall includes a second upstream sidewall surface or face connected to a second downstream sidewall surface or face at a second side edge, wherein the rake side face and the flank side face are connected to the entrance face, the rake side face is connected to the rake face, the flank side face is connected to the flank face, the rake face is connected to the flank face to define an at least partially curved cutting edge, wherein the first upstream sidewall surface or face and the second upstream sidewall surface or face extend from the entrance face, wherein the first downstream sidewall surface or face and the second downstream sidewall surface or face extend from both of the rake face and the flank face, wherein the entrance face extends away from the flank side face to define a back-relief angle, wherein the rake face extends away from the rake side face to define a rake angle, wherein the optomechanical tool is configured to direct a light beam along a path:

toward a light beam entrance surface of the entrance face of the transmissive body of material;

through the light beam entrance surface of the entrance face of the transmissive body of material;

optically through the transmissive body of material and toward one or more of the rake face, the flank face, the rake side face, the flank side face, and the at least partially curved cutting edge; and through one or more of the rake face, the flank face, and the at least partially curved cutting edge for causing the light beam to refract onto a workpiece; and an optical lens system or an optical prism system arranged upstream of the entrance face of the optomechanical tool, wherein the transmissive body of material is selected from the group consisting of diamonds, sapphires, moissanites, chrysoberyls, alexandrite, carbides, cubic boron nitride, silicon, nitrides, alloys, ceramics, alumina, glass, and glass composites.

32. The system of claim 31, wherein the optical lens system includes:

an optical lens; and a movement actuator connected to the optical lens that is configured to laterally-shift the optical lens relative to the entrance face of the optomechanical tool, wherein the optical prism system includes:

a first right angle prism;

a second right angle prism; and a movement actuator connected to the second right angle prism that is configured to axially-shift the second right angle prism relative to the entrance face of the optomechanical tool and the first right angle prism.

33. The system of claim 31, wherein the optomechanical tool includes the first upstream sidewall surface or face and the second upstream sidewall surface or face, wherein the first upstream sidewall surface or face and the second upstream sidewall surface or face extend from the entrance face, wherein the first upstream sidewall surface or face and the second upstream sidewall surface or face connect the rake side face to the flank side face, wherein the entrance face is defined by a third order polynomial surface having a non-linear, arcuate, or curved configuration extending between the first upstream sidewall surface or face and the second upstream sidewall surface or face.

34. The system of claim 31, wherein a downstream side of the optical lens is defined by a third order polynomial surface having a non-linear, arcuate, or curved configuration that extends between a first end and a second end of the optical lens.

35. The system of claim 31, wherein the flank face extends away from the flank side face to define a clearance angle, wherein the first side edge is arranged at a first side edge angle that is substantially similar to the clearance angle, wherein the second side edge is arranged at a second side edge angle that is substantially similar to the clearance angle.

36. A system comprising:

an optomechanical tool including a transmissive body of material having an entrance face, a rake face, a flank face, a rake side face, and a flank side face, a first sidewall, and a second sidewall, a secondary clearance face, wherein the secondary clearance face extends between and connects the flank face to the flank side face, wherein the first sidewall includes a first upstream sidewall surface or face connected to a first downstream sidewall surface or face at a first side edge, wherein the second sidewall includes a second upstream sidewall surface or face connected to a second downstream sidewall surface or face at a second side edge, wherein the rake side face and the flank side face are connected to the entrance face, the rake side face is connected to the rake face, the flank side face is connected to the flank face, the rake face is connected to the flank face to define an at least partially curved cutting edge, wherein the first upstream sidewall surface or face and the second upstream sidewall surface or face extend from the entrance face, wherein the first downstream sidewall surface or face and the second downstream sidewall surface or face extend from both of the rake face and the flank face, wherein the entrance face extends away from the flank side face to define a back-relief angle, wherein the rake face extends away from the rake side face to define a rake angle, wherein the optomechanical tool is configured to direct a light beam along a path:

toward a light beam entrance surface of the entrance face of the transmissive body of material;

through the light beam entrance surface of the entrance face of the transmissive body of material;

optically through the transmissive body of material and toward one or more of the rake face, the flank face, the rake side face, the flank side face, and the at least partially curved cutting edge; and through one or more of the rake face, the flank face, and the at least partially curved cutting edge for causing the light beam to refract onto a workpiece.

37. The system of claim 36, wherein the transmissive body of material is selected from the group consisting of diamonds, sapphires, moissanites, chrysoberyls, alexandrite, carbides, cubic boron nitride, silicon, nitrides, alloys, ceramics, alumina, glass, and glass composites.

38. The system of claim 36, wherein the transmissive body of material of the optomechanical tool comprises a diamond material.

39. The system of claim 36, wherein the flank face extends away from the flank side face to define a clearance angle, wherein the first side edge is arranged at a first side edge angle that is substantially similar to the clearance angle, wherein the second side edge is arranged at a second side edge angle that is substantially similar to the clearance angle.

40. A method of directing a light beam toward a workpiece comprising:

providing an optomechanical tool including a transmissive body of material defined by an entrance face, a rake face, a flank face connected to the rake face, a rake side face extending between the entrance face and the rake face, a flank side face extending between the entrance face and the flank face, wherein the connection of the rake face to the flank face defines an at least partially curved cutting edge, and a secondary clearance face extending between the flank face and the flank side face;

wherein the optomechanical tool is configured to direct the light beam along a path by:

receiving the light beam at a light beam entrance surface of the entrance face of the transmissive body of material;

passing the light beam through the light beam entrance surface of the entrance face of the transmissive body of material;

optically directing the light beam through the transmissive body of material;

refracting the light beam toward a reflecting face defined by one or more of the rake side face and the flank side face;

reflecting the light beam toward one or more of the rake face, the flank face, and the at least partially curved cutting edge; and refracting the light beam through the rake face, the flank face, and the at least partially curved cutting edge toward the workpiece, wherein the transmissive body of material is selected from the group consisting of diamonds, sapphires, moissanites, chrysoberyls, alexandrite, carbides, cubic boron nitride, silicon, nitrides, alloys, ceramics, alumina, glass, and glass composites.

41. The method of claim 40, wherein the reflecting face is the flank side face.

42. The method of claim 40, wherein the optomechanical tool, wherein the secondary clearance face extends between the flank face and the flank side face to define a secondary clearance angle, wherein the reflecting face further defined by the secondary clearance face.

43. The method of claim 42, wherein the secondary clearance angle is between 120° and 180°.

44. The method of claim 40, wherein the optomechanical tool reflecting face is entirely coated or partially coated with a reflection-enhancing coating material.

45. The method of claim 44, wherein the reflection-enhancing coating material is aluminum, silver, gold, chrome, nickel, or titanium nitride.

46. The method of claim 40, wherein the entrance face is defined by a curved surface.

47. The method of claim 40, wherein the light beam is defined by an initial focal point or focal plane, wherein the entrance face is configured to refract the light beam to define a transformed focal point or focal plane.

* * * * *